US011070813B2

(12) United States Patent
Socek et al.

(10) Patent No.: US 11,070,813 B2
(45) Date of Patent: Jul. 20, 2021

(54) GLOBAL MOTION ESTIMATION AND MODELING FOR ACCURATE GLOBAL MOTION COMPENSATION FOR EFFICIENT VIDEO PROCESSING OR CODING

(71) Applicant: Intel Corporation, Santa Clara, CA (US)

(72) Inventors: Daniel Socek, Miami, FL (US); Atul Puri, Redmond, WA (US)

(73) Assignee: Intel Corporation, Santa Clara, CA (US)

(*) Notice: Subject to any disclaimer, the term of this patent is extended or adjusted under 35 U.S.C. 154(b) by 144 days.

(21) Appl. No.: 16/024,122

(22) Filed: Jun. 29, 2018

(65) Prior Publication Data

US 2019/0045192 A1 Feb. 7, 2019

(51) Int. Cl.
| | |
|---|---|
| *H04N 19/137* | (2014.01) |
| *H04N 19/567* | (2014.01) |
| *H04N 19/172* | (2014.01) |
| *H04N 19/527* | (2014.01) |
| *H04N 19/573* | (2014.01) |
| *H04N 19/513* | (2014.01) |
| *H04N 19/80* | (2014.01) |
| *H04N 19/543* | (2014.01) |

(52) U.S. Cl.
CPC ........ *H04N 19/137* (2014.11); *H04N 19/172* (2014.11); *H04N 19/521* (2014.11); *H04N 19/527* (2014.11); *H04N 19/543* (2014.11); *H04N 19/567* (2014.11); *H04N 19/573* (2014.11); *H04N 19/80* (2014.11)

(58) Field of Classification Search
None
See application file for complete search history.

(56) References Cited

U.S. PATENT DOCUMENTS

| | | | | |
|---|---|---|---|---|
| 7,646,437 | B1* | 1/2010 | Dumitras | H04N 5/145 348/700 |
| 2004/0252230 | A1* | 12/2004 | Winder | H04N 21/440281 348/402.1 |
| 2005/0013369 | A1* | 1/2005 | Lee | H04N 19/63 375/240.16 |
| 2010/0272369 | A1* | 10/2010 | Hiraga | G06T 5/003 382/195 |

(Continued)

OTHER PUBLICATIONS

Marquardt, Donald W., "An Algorithm for Least Square Estimation of Nonlinear Parameters" Journal of Society for Industrial and Applied Mathematics, pp. 431-441, Jun. 1963.

(Continued)

*Primary Examiner* — Tyler W. Sullivan
(74) *Attorney, Agent, or Firm* — Jordan IP Law, LLC

(57) ABSTRACT

Methods, apparatuses and systems may provide for technology that performs global motion estimation. More particularly, implementations relate to technology that provides accurate global motion compensation in order to improve video processing efficiency. In some implementations, a highly adaptive and accurate approach may be used to address the problem of estimation and compensation of global motion in video scenes. The solution may be content adaptive as it uses adaptive modeling of motion using best of multiple models that are used to estimate global motion.

8 Claims, 38 Drawing Sheets

(56) References Cited

U.S. PATENT DOCUMENTS

| | | | |
|---|---|---|---|
| 2014/0016829 A1* | 1/2014 | Chen | H04N 7/0137 |
| | | | 382/107 |
| 2018/0070102 A1* | 3/2018 | Zhang | H04N 19/521 |
| 2018/0218511 A1* | 8/2018 | Chan | G06T 7/579 |
| 2018/0270500 A1* | 9/2018 | Li | H04N 19/54 |
| 2019/0149841 A1* | 5/2019 | Mukherjee | H04N 19/573 |
| | | | 375/240.16 |
| 2019/0158873 A1* | 5/2019 | Xu | H04N 19/577 |
| 2020/0092578 A1* | 3/2020 | Huang | H04N 19/52 |
| 2020/0177911 A1* | 6/2020 | Aono | H04N 19/139 |

OTHER PUBLICATIONS

Huang et al, "Affine Skip and Direct Modes for Efficient Video Coding," SPIE Visual Communication and Image Processing (VCIP), 6 pages, 2012.

Dufaux et al., "Efficient, Robust and Fast Global Motion Estimation for Video Coding," IEEE Trans. on Image Processing, pp. 497-501, 2000.

Chan et al., "Improved Global Motion Estimation Using Prediction and Early Termination," IEEE Intl. Conf. on Image Processing (ICIP), pp. II-285-II-288, 2002.

Felip et al., "A new Parameter Estimator based on Helmholtz Principle," IEEE Intl. Conf. on Image Processing (ICIP), 4 pages, 2005.

Dane et al., "Efficient Motion Accuracy Search for Global Motion Vector Coding," Fortieth Asilomar Conference on Signals, Systems and Computers (ACSSC '06), pp. 1072-1075, 2006.

Zheng et al., "Adaptive Selection of Motion Models for Panoramic Vieo Coding," Proc. Int. Conf on Multimedia and Expo (ICME), pp. 1319-1322, 2007.

Felip et al., "Robust Dominant Motion Estimation using MPEG Information in Sports Sequences," IEEE Trans. Circuits and Systems for Video Technology, vol. 18, No. 1, pp. 12-22, Jan. 2008.

Tok et al., "Compressed Domain Global Motion Estimation Using the Helmholtz Tradeoff Estimator" Proc. of 2010 IEEE Intnl. Conf. on Image Processing (ICIP), pp. 777-780, Sep. 2010, Hong Kong.

Jozawa et al., "Two-Stage Motion Compensation Using Adaptive Global MC and Local Affine MC," IEEE Trans. Circuits and Systems for Video Technology, vol. 7, No. 1, pp. 75-85, Feb. 1997.

Cheung et al., "Local Affine Motion Prediction for H.264 Without Extra Overhead" Proc. 2010 IEEE Int. Symposium on Circuits and Systems (ISCAS), pp. 1555-1558, 2010.

Y. Keller et al., "Fast Global Motion Estimation for MPEG-4 Video Compression," Packet Video, vol. 216, 10 pages, 2003.

S.W. Jang et al., "Adaptive Robust Estimation of Milne Parameters from Block Motion Vectors," Imagine and Vision Computing, pp. 1250-1263, 2005.

M. Haller et al., "Robust Global Motion Estimation Using Motion Vectors of Variable Block Sizes and Automatic Motion Model Selection," Proc. 2010 IEEE International Conference on Image Processing, pp. 737-740, Sep. 2010.

H. Lakshman et al., "Adaptive Motion Model Selection using a Cubic Spline based Estimation Framework," Proc. 2010 IEEE International Conference on Imagine Processing, 4 pages, Sep. 2010.

C. Heithausen et al., "Motion Compensation with Higher Order Motion Models for HEVC," Proc. IEEE International Conference on Acoustics, Speech and Signal Processing, 5 pages, Apr. 2015.

C. Heithausen et al., "Improved Higher Order Motion Compensation in HEVC with Block-to-Block Translational Shift Compensation," Proc. IEEE International Conference on Image Processing, 5 pages, Sep. 2016.

A.M. Tourapis et al., "An Extension of Direct Macroblock Coding in Predictive (P)Slices of the H.264 Standard,"Journal Visual Communication and Image Representation, 8 pages, 2005.

Kenneth Levenberg, "An Method for the solution of certain non-Linear Problems in Least Squares", Quarterly of Applied Mathematics, vol. 2, No. 2, pp. 164-168, Jul. 1944.

J. Shi et al., "Good Features to Track", IEEE Conference on Computer Vision and Pattern Recognition, pp. 593-600, Jun. 1994.

S. Mann et al., "Video Orbits of the Projective Group: A Simple Approach to Featureless Estimation of Parameters," IEEE Transactions on Image Processing, vol. 6, No. 9, pp. 1281-1295, Sep. 1997.

Maurizio Pilu, "On Using Raw MPEG Motion Vectors to Determine Global Camera Motion," SPIE Visual Communications and Image Processing '98, vol. 3309, pp. 448-460, Hewlett-Packard Company, Aug. 1997.

A. Smolic et al., "Direct Estimation of Long-term Global Motion Parameters Using Athne and Higher Order Polynomial Models," Proc. Picture Coding Symposium (PCS), pp.239-242, Apr. 1999.

A. Smolic et al., "Long-term Global Motion Estimation and its Application for Sprite Coding, Content Description, and Segmentation," IEEE Transactions on Circuits, Systems for Video Technology (CSVT), vol. 9, No. 8, pp. 1227-1242, Dec. 1999.

G.B. Rath et al., "Iterative Least Squares and Compression Based Estimations for Four-Parameter Linear Global Motion Model and Global Motion Compensation," IEEE Transactions on Circuits, Systems for Video Technology (CSVT),vol. 9, No. 7, pp. 1075-1099, Oct. 1999.

A. Smolic et al., "Robust Global Motion Estimation Using Simplified M-Estimator Approach," Proceedings of IEEE International Conference on Image Processing (ICIP), pp. 868-871, 2000.

H. Richter, "Real-time Global Motion Estimation for an MPEG-4 Video Encoder," Proceedings of Picture Coding Symposium (PCS), 2001.

Y. Keller et al., "Fast Gradient Methods Based on Global Motion Estimation for Video Compression," IEEE Transactions on Circuits and Systems for Video Technology, vol. 13, No. 4, 4 pages, Apr. 2003.

G. Sorwar et al., "Fast Global Motion Estimation using Iterative Least Square Estimation Technique," 4th International Conference on Information, Communications and Signal Processing and Pacific-Rim Conference on Multimedia (ICICS-PCM), pp. 282-286, Dec. 2003.

A. Smolic et al., "Long-term Global Motion-Compensation for Advanced Video Coding," ITG-Fachtagung Dortmunder Fernsehseminar, pp. 213-216, 2003.

A. Smolic et al., "Improved Video Coding using Long-term Global Motion-Compensation," SPIE Visual Communications and Image Processing (VCIP), 12 pages, 2004.

S. Soldatov et al., "Low Complexity Global Motion Estimation from Block Motion Vectors," Spring Conference on Computer Graphics, 7 pages, 2006.

M. Haller et al., "Evaluation of Pixel and Motion Vector-Based Global Motion Estimation for Camera Motion Characterizatoin," International Workshop for Image Analysis for Multimedia Interactive Services (WIAMIS), pp. 49-52, May 2009.

L. Li et al., "An Efficient Four-Parameter Milne Motion Model for Video Coding," IEEE Transactions on Circuits and Systems for Video Technology, pp. 1-14, Feb. 21, 2017.

R. V. Babu et al., "Background Sprite Generation using MPEG Motion Vectors," Indian Conference on Computer Vision, Graphics, and Image Processing, pp. 7-12, 2002.

P. H. F. T. Soares et al., "Video Compression for UAV Application Using a Global Motion Estimation in H.264 Standards," International Workshop on Telecommunications (IWT), 4 pages, 2013.

M. Narroschke et al., "Extending HEVC by an Athne Motion Model," Proceedings Picture Coding Symposium (PCS), Panasonic, 15 pages, Dec. 11, 2013.

* cited by examiner

GLOBAL MOTION ESTIMATION AND MODELING FOR ACCURATE GLOBAL MOTION COMPENSATION FOR EFFICIENT VIDEO PROCESSING OR CODING

TECHNICAL FIELD

Embodiments generally relate to global motion estimation. More particularly, embodiments relate to technology that provides accurate global motion compensation in order to improve video processing efficiency.

BACKGROUND

Numerous previous approaches have attempted to improve estimation of global motion by a variety of approaches to achieve better global motion compensation and thus enable higher coding efficiency.

For instance a group of techniques have tried to improve robustness by filtering the often noisy motion field that is typically available from block motion estimation and used as first step in global motion estimation. Another group of techniques have tried to improve global motion compensated prediction by using pixel based motion or model adaptively (e.g., in a specialized case of panoramas) or higher order motion models. Another group of techniques have tried to improve global motion estimation quality by using better estimation accuracy, an improved framework, or by using variable block size motion. Another group of techniques have tried to get better coding efficiency at low bit cost by improving model efficiency. A still further group of techniques have tried to address the issue of complexity or performance.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
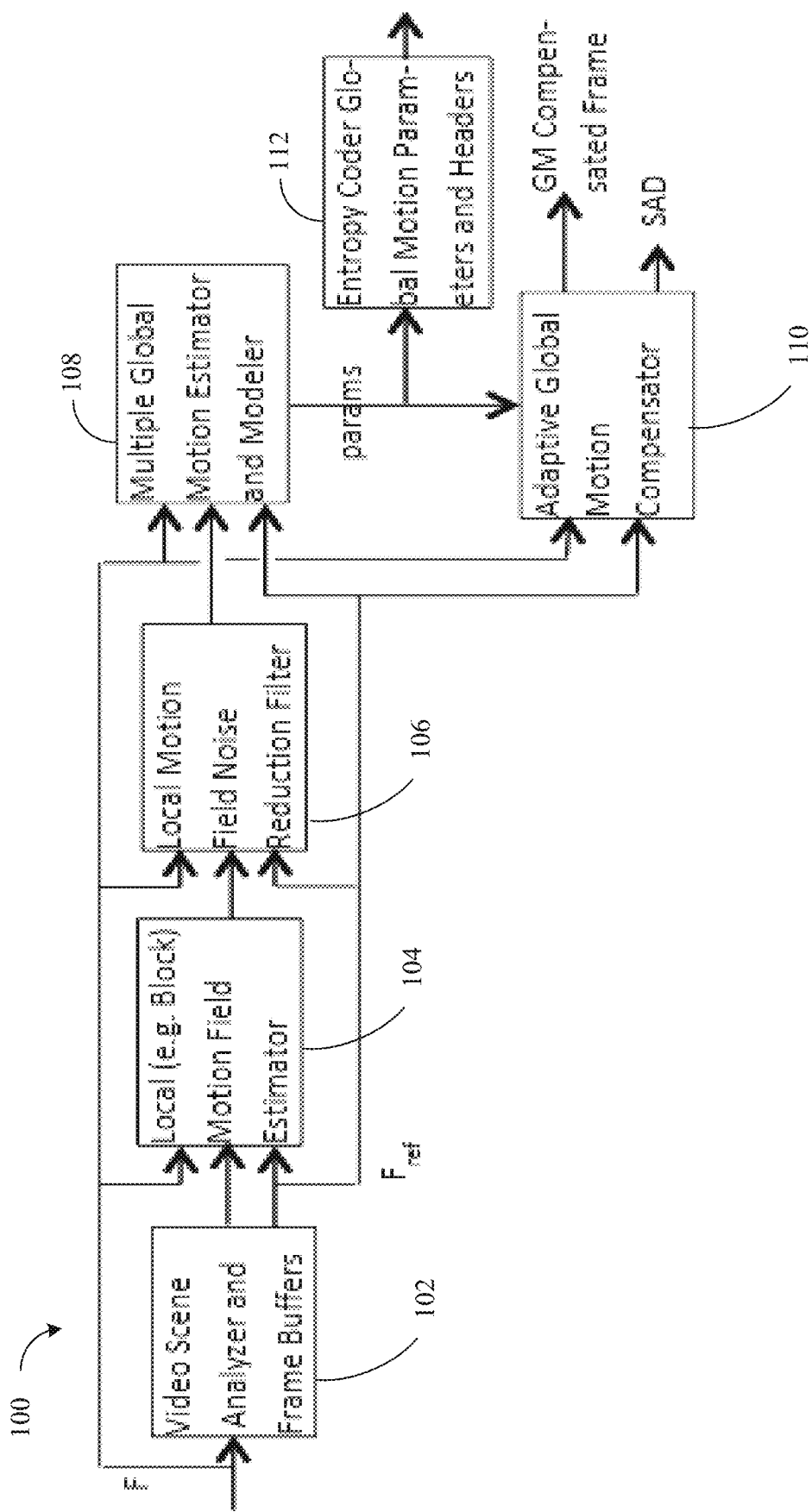
FIG. 1 is an illustrative block diagram of an example global motion analyzer system according to an embodiment.

As described above, numerous previous approaches have attempted to improve estimation of global motion by a variety of approaches to achieve better global motion compensation and thus enable higher coding efficiency.

However, while several schemes have managed to progress the state-of-the art, the actual achieved gains have been limited or have considerably fallen short of their objectives. What has been missing so far is a comprehensive approach for improving global motion estimation, compensation, and parameter coding problem. The implementations described herein represents such a solution to the existing failures of the existing state-of-the art, which include: low robustness or reliability in consistently and accurately measuring global motion; insufficiently accurate measured estimate of global motion; computed global motion estimate resulting in poor global motion compensated frame and thus poor global motion compensated prediction error; insufficient gain from use of global motion, even in scenes with global motion; high bit cost of coding global motion parameters; high computational complexity of algorithms; and low adaptively/high failure rates for complex content and noisy content.

As will be described in greater detail below, implementations described herein may provide a solution to the technical problem of significantly improving, in video scenes with global motion, the quality of global motion estimation, the accuracy of global motion compensation, and the efficiency of global motion parameters coding—in both, a robust and a complexity-bounded manner.

In some implementations, a highly adaptive and accurate approach may be used to address the problem of estimation and compensation of global motion in video scenes. The solution may be content adaptive as it uses adaptive modeling of motion using best of multiple models that are used to estimate global motion. Further, global motion estimation parameters may themselves be computed using one of the two optimization based approaches depending on the selected global motion model. Using estimated global motion parameters, compensation of global motion may be performed using interpolation filters that are adaptive to nature of the content. Further, the global motion parameters may be encoded using a highly adaptive approach that either uses a codebook or a context based differential coding approach for efficient bits representation. The aforementioned improvements in global motion estimation/compensation may be achieved under the constraint of keeping complexity to as low as possible. Overall, the implementations presented herein present an adaptive and efficient approach for accurate representation of global motion for efficient video coding.

For example, the solutions described herein may estimate global motion within a video sequence with an improved motion filtering and selection technique for calculation of global motion models, calculating multiple global motion models for a number of different parametric models per frame. From computed global motion models, a determination and selection may be made of the best global motion model and the best sub-pel interpolation filter per frame for performing global motion compensation. The computed global motion model parameters may then be efficiently encoded using a combination of codebook and differential encoding techniques that allow for compact representation for efficient video coding.

Accordingly, some implementations described below present a fast, robust, novel, accurate, and efficient method for performing global motion estimation and compensation in video scenes with global motion. For example, some implementations described below represent a significant step forward in state-of-the-art, and may be applicable to variety of applications including improved long term prediction, motion compensated filtering, frame-rate conversion, and compression efficiency of lossy/lossless video, scalable video, and multi-viewpoint/360 degree video. This tool may be expected to be a candidate for integration in future video standards, although it should also be possible to integrate this tool in extensions of current and upcoming standards such as H.264, H.265, AOM AV1, or H.266, for example.

FIG. 1 is an illustrative block diagram of an example global motion analyzer system 100, arranged in accordance with at least some implementations of the present disclosure. In various implementations, example global motion analyzer system 100 may include a video scene analyzer 102 (e.g., Video Scene Analyzer and Frame Buffer), a local block based motion field estimator 104 (e.g., Local (e.g., Block) Motion Field Estimator), a local motion filed noise reduction filter 106 (e.g., Local Motion Field Noise Reduction Filter), a multiple global motion estimator and modeler 108 (e.g., Multiple Global Motion Estimator and Modeler), an adaptive global motion compensator 110 (e.g., Adaptive Global Motion Compensator), a global motion model parameter and headers entropy coder 112 (e.g., Entropy Coder Global Motion Parameters and Headers), the like, and/or combinations thereof. For example, some of the individual components of global motion analyzer system 100 may not be utilized in all embodiments. In one such example, video scene analyzer 102 may be utilized in some implementations or eliminated in other implementations.

As illustrated, FIG. 1 shows a high level conceptual diagram of global motion analyzer system 100 including aggregated building blocks to simplify discussion. Video frames are shown input to video scene analyzer 102, which performs scene analysis such as scene change detection (and optionally scene transition detection) as well as having frames buffered to enable use of reordered frames (e.g., as per a group-of-pictures organization scheme). Next, a pair of frames (e.g., a current frame and a reference frame) are input to local block based motion field estimator 104, which computes motion-vectors for all blocks of the frame. Next, this motion-field is filtered by local motion filed noise reduction filter 106 to remove noisy motion vector regions. The filtered motion-field is then input to multiple global motion estimator and modeler 108, which computes estimate of global motion by trying per frame different motion models and selecting the best one. Next, the selected motion field parameters are encoded by global motion model parameter and headers entropy coder 112, and the motion field is provided to adaptive global motion compensator 110, which generates global motion compensated frame.

In operation, global motion analyzer system 100 may be operated based on the basic principle that exploitation of global motion in video scenes is key to further compression gains by integration in current generation coders as well as development of new generation coders. Further, the implementations described herein, as compared to the current state-of-the-art, offers improvements on all fronts, e.g., global motion estimation, global motion compensation, and global parameters coding.

As regards the global motion estimation, significant care is needed not only in selecting a global motion model but also how that motion model is computed. For lower to medium order models (such as 4 or parameters) implementations herein may use least square estimation and/or random sampling method. For higher order models (such as 8 and 12 parameters) implementations herein may use the Levenberg-Marquardt Algorithm (LMA) method. For an 8 parameter model, implementations herein may identify many choices that are available, such as the bi-linear model, the perspective model, and the pseudo-perspective model; via thorough testing, the pseudo-perspective model may often be utilized to provide consistent and robust results. Further, the task of finding any global motion model parameters is complicated by noisiness of motion field so a good algorithm for filtering of motion field was developed to separate outlier vectors that otherwise contribute to distorting calculation of global motion field. Further, while the same global motion model can be presumably used for a group of frames that have similar motion characteristics, content based adaptively and digital sampling may require more-or-less an independent selection of motion model per frame from among a number of available motion models. Further, rate-distortion constraints can also be used in selection of motion model due to cost of motion parameter coding bits. Lastly, in some implementations herein, additional care may be taken during motion estimation to not include inactive areas of a frame.

As will be described in greater detail below, in operation, once the best global motion model is selected per frame, the model parameters require efficient coding for which the implementations herein may use a hybrid approach that uses a combination of small codebook and direct coding of residual coefficients that use prediction from past if closest match is not found in the codebook. Some rate-distortion tradeoffs may be employed to keep coding bit cost low. Further, since a current global motion model and a past global motion model that is used for prediction may be different in number and type of coefficient, a coefficient mapping strategy may be used by implementations herein to enable successful prediction that can reduce the residual coefficients that need to be coded. The codebook index or coefficient residuals may be entropy coded and transmitted to a decoder.

At the decoder, after entropy decoding of coefficient residuals to which prediction is added to generate reconstructed coefficients, or alternatively using coefficients indexed from codebook, global motion compensation may be performed, which may require sub-pel interpolation. Headers in the encoded stream for a frame may be used to indicate the interpolation precision and filtering from among choice of 4 interpolation filter combinations available, to generate correct global motion compensated prediction; at encoder various filtering options were evaluated and best selection made and signaled per frame via bitstream.

Figure 2:
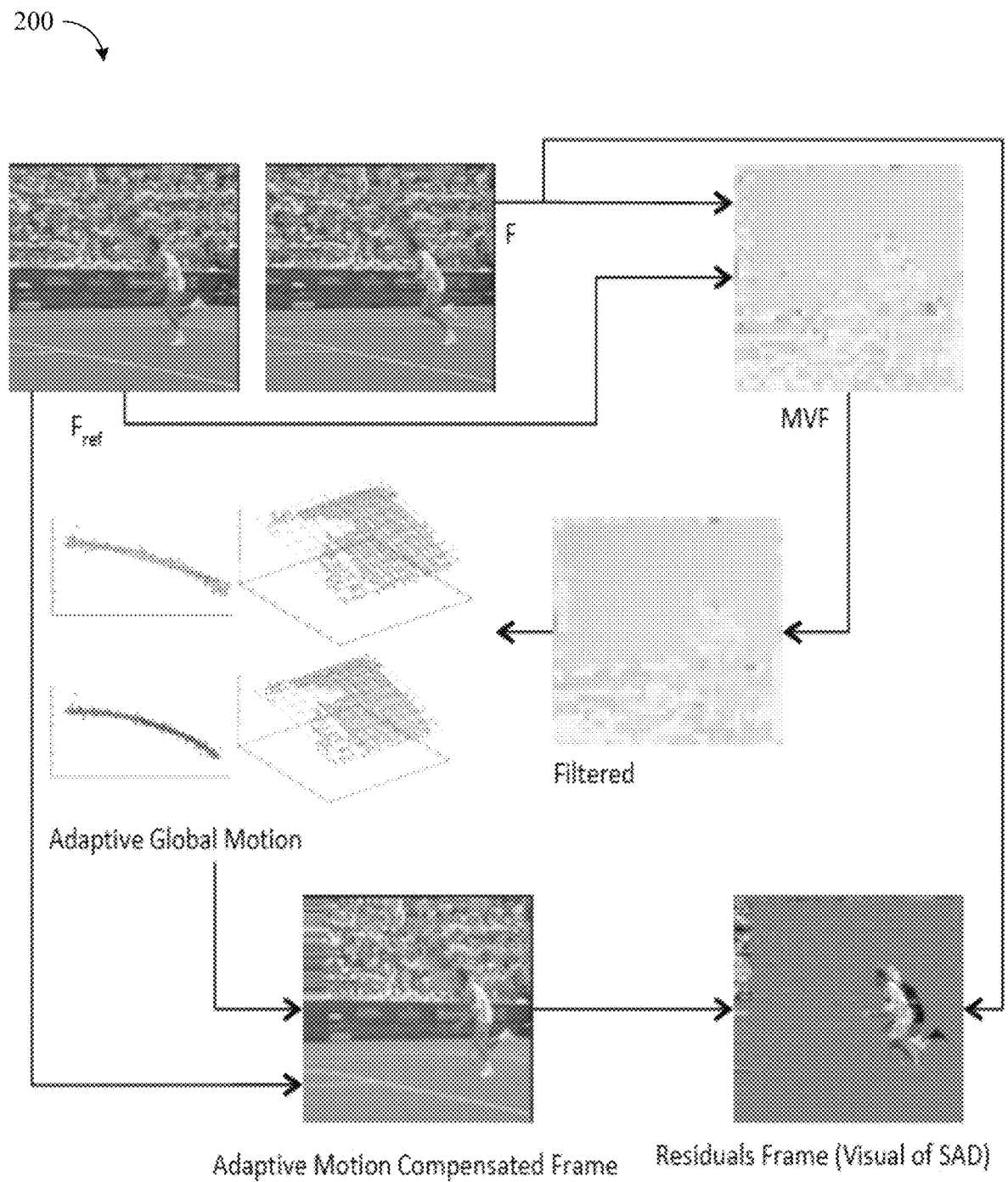
FIG. 2 is an illustrative diagram of an example global motion analysis process according to an embodiment.

FIG. 2 is an illustrative diagram of an example global motion analysis process 200, arranged in accordance with at least some implementations of the present disclosure. In various implementations, FIG. 2 pictorially depicts the various steps in this process using a selected fast moving portion of "Stefan" sequence. A reference frame $F_{ref}$ of the sequence and current frame F are shown that are used in block motion estimation, which generates motion field MVF. The motion field is then filtered to Filtered MVF and used by multiple global motion models that perform global motion estimation generating candidate models from which the best model is selected. This model is then used to compute global motion compensated frame, the generation of which requires a matching motion interpolation filter that is used to generate high precision sub-pel motion compensation. The original frame is differenced with global motion compensated frame and the residual frame is shown that contains low energy everywhere except for boundary block extension region, and the uncovered and uncompensated local moving region.

Accordingly, implementations of global motion analyzer system 100 may be implemented so as to provide the following improvements as compared to other solutions: utilizes moderate complexity only when absolutely necessary to reduce motion compensated residual; provides a high degree of adaptively to complex content; provides a high degree of adaptively to noisy content; provides a high robustness in consistently and accurately measuring global motion; ability to deal with static black bars/borders so computed global motion is not adversely impacted; ability to deal with static logos and text overlays so computed global motion is not adversely impacted; improvements in computed global motion estimate results in a good global motion compensated frame and thus lower global motion compensated prediction error; typically provide a good gain from global motion in scenes with small or slowly moving local motion areas; and/or typically provide a low bit cost of coding global motion parameters.

Figure 3:
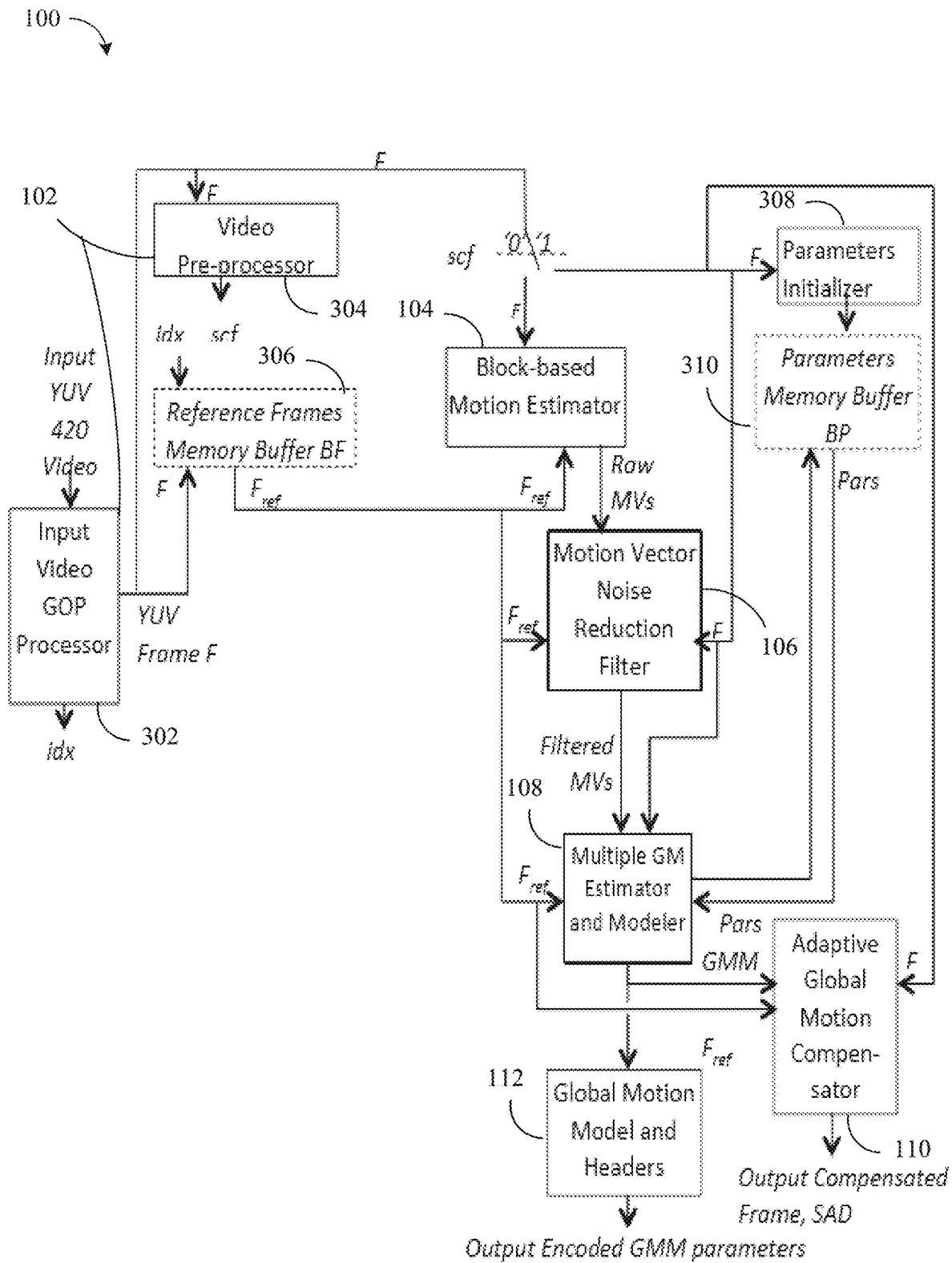
FIG. 3 is an illustrative block diagram of a more detailed example global motion analyzer system according to an embodiment.

FIG. 3 is an illustrative block diagram of a more detailed example global motion analyzer system 100, arranged in accordance with at least some implementations of the present disclosure. In various implementations, example global motion analyzer system 100 may include video scene analyzer 102 (e.g., Input Video GOP processor 302 and Video Pre-processor 304), local block based motion field estimator 104 (e.g., Block-based Motion Estimator), local motion filed noise reduction filter 106 (e.g., Motion Vector Noise Reduction Filter), multiple global motion estimator and modeler 108 (e.g., Multiple Global Motion Estimator and Modeler), adaptive global motion compensator 110 (e.g., Adaptive Global Motion Compensator), global motion model parameter and headers entropy coder 112 (e.g., Global Motion Model and Headers Entropy Coder), the like, and/or combinations thereof. For example, some of the individual components of global motion analyzer system 100 may not be utilized in all embodiments. In one such example, video scene analyzer 102 may be utilized in some implementations or eliminated in other implementations. Additionally, global motion analyzer system 100 may include reference frames memory buffer 306, parameters initializes 308, and parameters memory buffer 310.

As illustrated, global motion analyzer system 100 may operate so that input video is first organized into group of pictures (GOP) form via input video GOP processor 302. Next, current frame F and reference frame $F_{ref}$ may be analyzed in a pre-processing step to detect scene changes and re-set memory buffers/codebook used for entropy coding via video pre-processor 304. If the current frame is not the first frame in the scene then block-based motion estimation may be performed between current frame F and reference frame $F_{ref}$ via local block based motion field estimator 104, where $F_{ref}$ may be retrieved via reference frames memory buffer 306. The resulting motion vector field (MVF) is prone to noise so that motion vector noise reduction filtering may be applied to the motion vector field (MVF) in an attempt to minimize the amount of outlier, noise-related vectors via local motion filed noise reduction filter 106. The core of the proposed algorithm is the adaptive global motion estimation and modeling, which may use the filtered motion vectors as input via multiple global motion estimator and modeler 108. This step may use adaptive selection of motion vectors for global motion estimation that combines a statistics-based approach and a simple segmentation-based approach. In addition, three models of different complexity may be evaluated and the most suitable model may be selected for modeling of the global moving area of the current frame. The computed global motion model (GMM) may then be passed to the compensation step, which may use an adaptively selected (e.g., out of four available filters) sub-pixel interpolation filtering that best suits the texture type in the globally moving area via adaptive global motion compensator 110. GMM parameters may be encoded and to the reference points motion vectors (MVs) representation and reconstructed at quantized accuracy. The compensator outputs the reconstructed frame and final sum of absolute differences (SAD)/residuals. Finally, the GMM parameters in the reference point form may be encoded with a codebook-based entropy coder via global motion model parameter and headers entropy coder 112. The parameters may either be coded as an index of the existing GMM from the codebook, or as residuals to an existing codeword. The residuals may be coded with an adaptive modified exp-Golomb codes (e.g., three tables may be used for codes of the most frequent values, while the rest of the values (e.g., less frequent values) may be represented via exp-Golomb codes formula).

Video pre-processor 304 may perform scene change detection. Current and reference (e.g. previous) frames are analyzed in order to detect the beginning of new scene and reinitialize past frames' related information. For example, video pre-processor 304 may signal parameters initializer to initialize parameters memory buffer 310 in response to a determined scene change.

Local block based motion field estimator 104 may use block-based motion estimation to create a block-level motion vector field between the current frame and the reference frame(s). In one implementation, graphics hardware-accelerated video motion estimation (VME) routines may be used to generate block-based motion vectors.

Local motion filed noise reduction filter 106 may use motion vector filtering to create a smoother motion vector field from the existing raw field that was created by the local block based motion field estimator 104. This process may serve to eliminate outlier vectors from the motion vector field.

Multiple global motion estimator and modeler 108 may use global motion model generation, which may include several steps. In this part of the process, a near-optimal global motion model may be computed for the current frame.

Multiple global motion estimator and modeler 108 may determine an initial affine global motion model via random sampling. For example, random sampling may be used to compute a best candidate affine model by random sampling and histogram peak analysis. This method may be used to create an initial rough estimate of affine parameters for global moving area. Highest peaks in each of the affine parameters likely correspond to a global motion model estimate. This process may be performed twice: once with all blocks used as input, and once with only likely reliable blocks used as input (e.g., as may be defined by an unreliable motion vectors mask). The global motion model with smallest error estimate (e.g., sum of absolute differences (SAD)-based) may be selected.

Multiple global motion estimator and modeler 108 may select motion vectors for global motion model estimation. In this step, the initial affine global motion model from the previous step may be used to estimate a selection mask, which may define blocks to be used for the global motion model parameters estimation. In one example, a total of eight candidate selection masks may be computed and the one that yields the smallest estimated error measure is chosen as the final selection mask. Although a different number of candidate selection masks could be used.

Multiple global motion estimator and modeler 108 may select an adaptive sub-pixel filter. This operation may be adaptively performed depending on the sharpness of the video content. For example, there may be four (or another suitable number) of sub-pixel filtering methods selected for different types of video content, for example, there may be the following filter types: (1) a $\frac{1}{16}$-th pixel accurate bilinear filter used mostly for content with blurry texture, (2) a $\frac{1}{16}$-th pixel accurate bicubic filter used for content with slightly blurry and normal texture levels, (3) a $\frac{1}{8}$-th pixel accurate AVC-based filter usually used for normal and slightly sharp content, and (4) a $\frac{1}{8}$-th pixel accurate HEVC-based filter typically used for the sharpest types of content.

Multiple global motion estimator and modeler 108 may perform adaptive global motion model computation and selection. In such an operation, there may be several (e.g., two) modes of operation defined that may adapt between different motion models: (1) Mode 0 (default mode) which may adaptively switch on a frame basis between translational 4-parameter, affine 6-parameter and pseudo-perspective 8-parameter global motion model, and (2) Mode 1 which may adaptively switch on a frame basis between affine 6-parameter, pseudo-perspective 8-parameter and bi-quadratic 12-parameter global motion model.

Adaptive global motion compensator 110 may perform global motion model-based compensation. For example, such global motion model-based compensation may be done for each block at a pixel level within the block using final motion model with the selected sub-pel filtering method. For each pixel within a block, a global motion may be computed and the pixel may be moved at a sub-pel position according to the previously determined sub-pel filtering method. Thus, a pixel on one side of the block may have different motion vector than a pixel on the other side of the same block. Compensation may be done with quantized/reconstructed global motion model parameters. In addition, coefficients may be represented as a quotient with denominator scaled (e.g., to a power of two) in order to achieve fast performance (e.g., by using bitwise shifting instead of division).

Global motion model parameter and headers entropy coder 112 may perform codebook-based global motion model parameters coding. For example, such codebook-based global motion model parameters coding may be used to encode the global motion model parameters. Such codebook-based global motion model parameters coding maybe based on the concept of reference points. The motion vectors corresponding to reference points may be predicted and the residuals may be coded with modified exp-Golomb codes. Predictions may be generated from the codebook that contains several (e.g., up to eight last occurring global motion model parameters).

Figure 4:
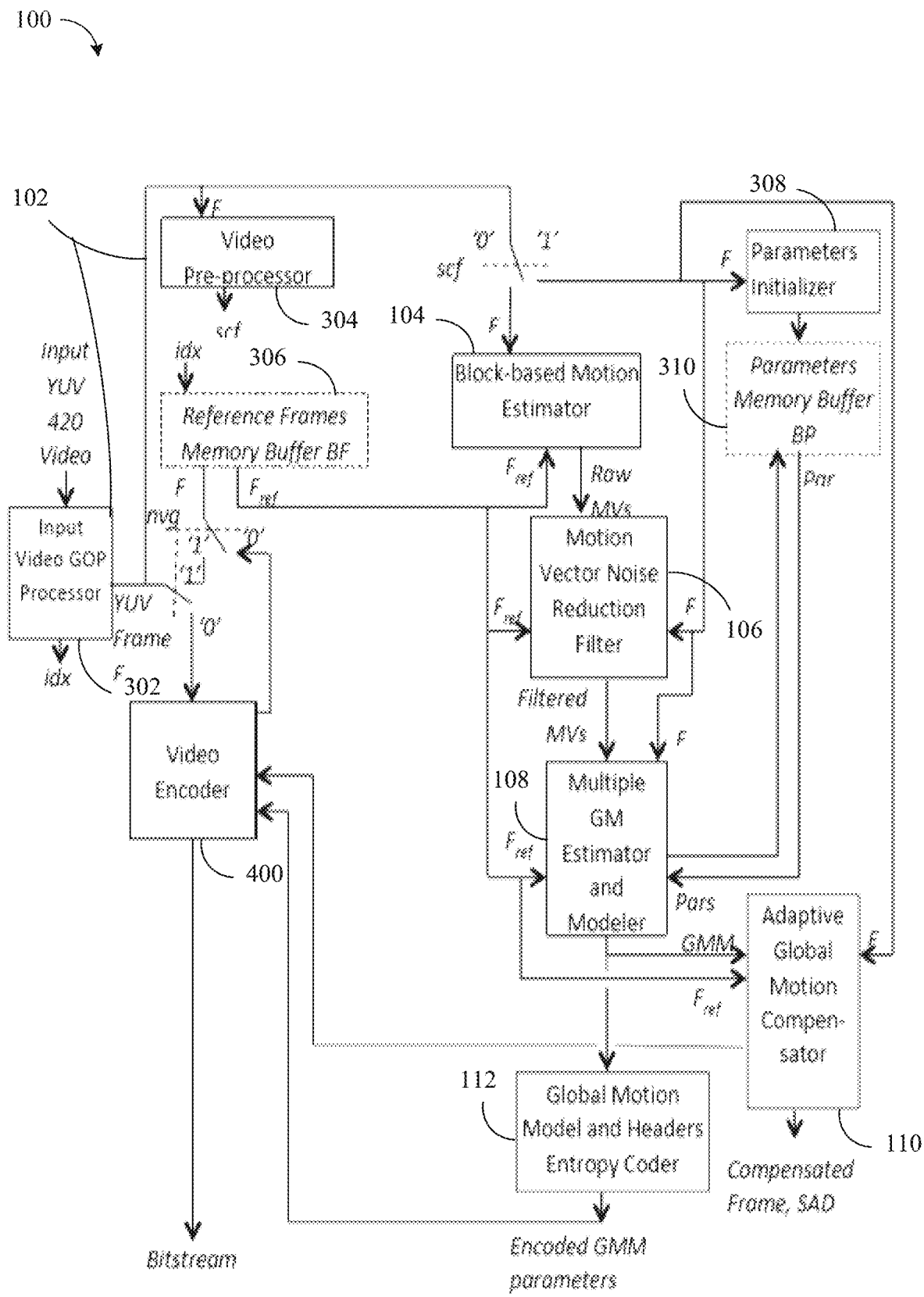
FIG. 4 is an illustrative block diagram of a more detailed example global motion analyzer system that is integrated with a video encoder according to an embodiment.

FIG. 4 is an illustrative block diagram of a more detailed example global motion analyzer system 100 that is integrated with a video encoder 400 in accordance with at least some implementations of the present disclosure. In various implementations, example global motion analyzer system 100 may include, or may be adapted to operate with video encoder 400.

As illustrated, video encoder 400 may receive a compensated frame and a corresponding error value (e.g., SAD) from adaptive global motion compensator 110. Additionally, video encoder 400 may receive encoded GMM parameters and headers corresponding to the compensated frame. Video encoder 400 may process this and other information when generating an encoded bitstream.

As used herein, the term "coder" may refer to an encoder and/or a decoder. Similarly, as used herein, the term "coding" may refer to encoding via an encoder and/or decoding via a decoder. For example video encoder 400 may include a video encoder with an internal video decoder, as illustrated in FIG. 4, while a companion coder may only include a video decoder (not illustrated independently here), and both are examples of a "coder" capable of coding.

Some implementations described herein generally relate to improvements in estimation, representation and compensation of motion that are key components of an inter-frame coding system, which can directly improve the overall coding efficiency of inter-frame coding. Specifically, some implementations described herein introduce systems and methods to enable significant improvements in global motion estimation, global motion compensation, and global motion parameters coding to improve inter-frame coding efficiency. The improvements include but are not limited to improved modeling of complex global motion, and compact representation of global motion parameters. By comparison, traditional inter-frame video coding typically uses block based motion estimation, compensation and motion vector coding which can mainly compensate for local translator motion and is thus not only is limited in many ways in ability to deal with complex global motion, but also does not allow efficient motion representation.

Figure 5:
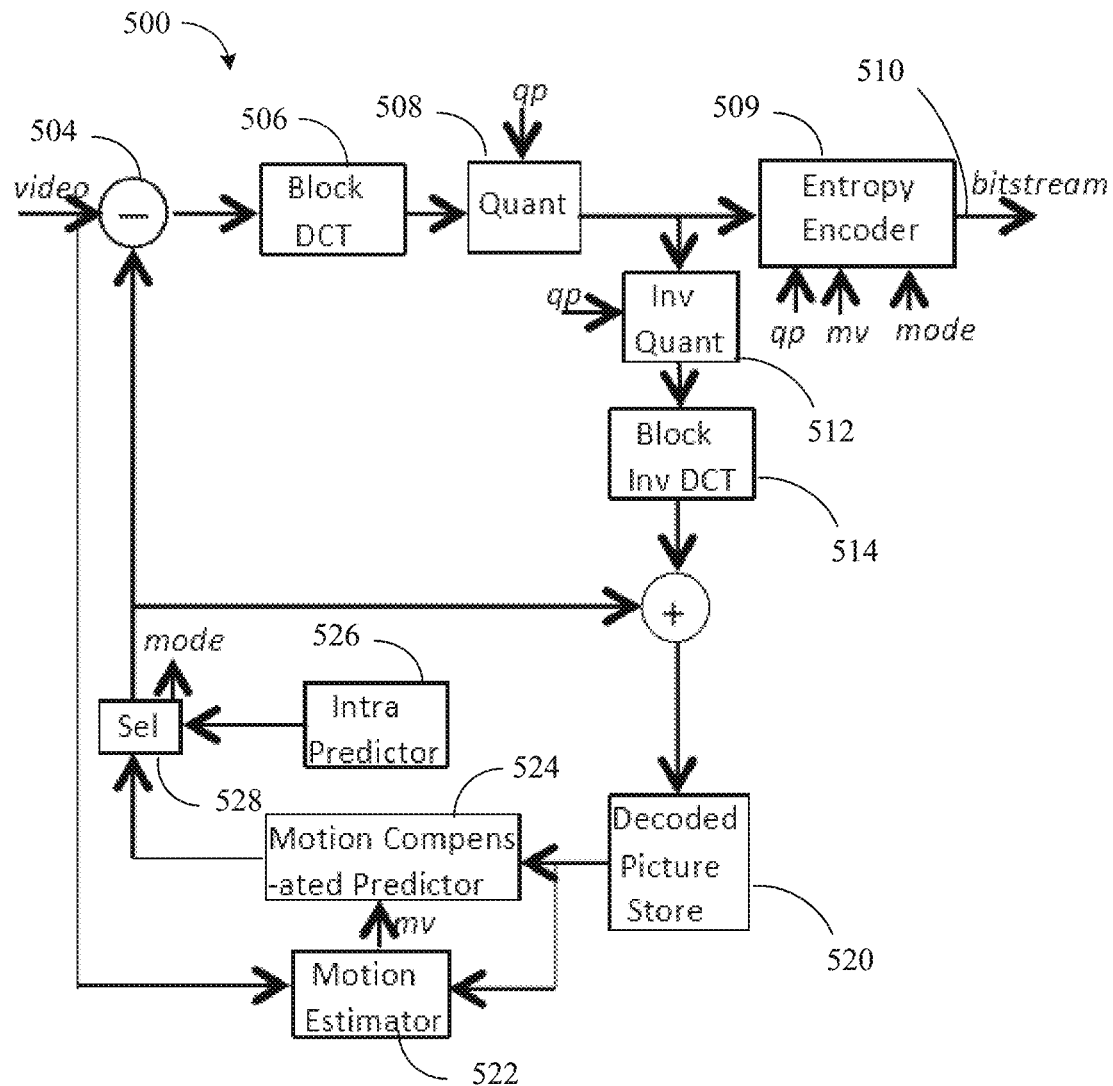
FIG. 5 is an illustrative block diagram of an example video encoder according to an embodiment.
Figure 6:
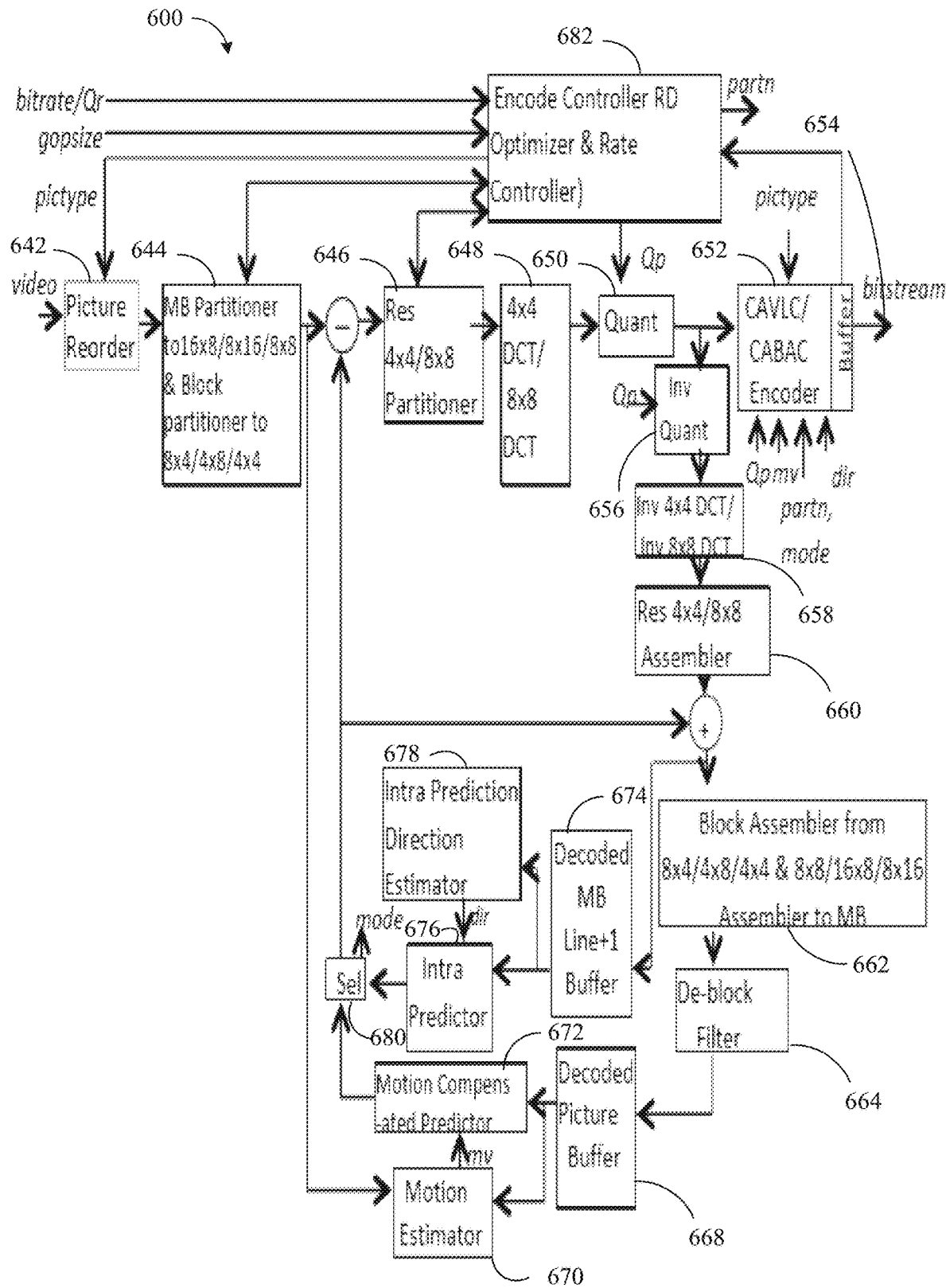
FIG. 6 is an illustrative block diagram of an example Advanced Video Coding video encoder according to an embodiment.
Figure 7:
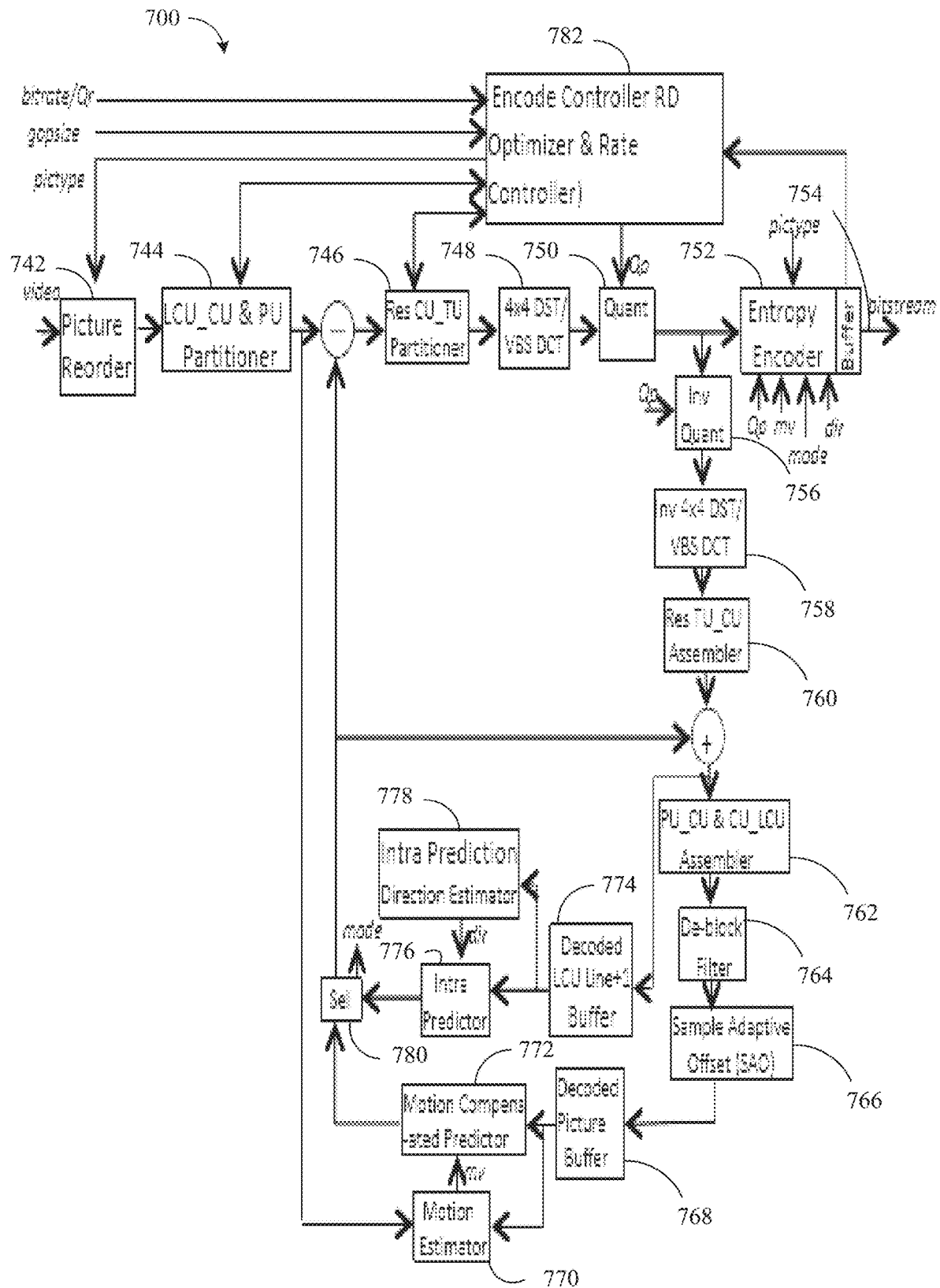
FIG. 7 is an illustrative block diagram of an example High Efficiency Video Coding video encoder according to an embodiment.

For reference, block based motion estimation forms the core motion compensation approach in recent video coding standards such as ITU-T H.264/ISO MPEG AVC and ITU-T H.265/ISO MPEG HEVC as well as upcoming standards in development such as ITU-T H.266 and the AOM AV1 standard. FIGS. 5-7 below will briefly review inter-frame video coding at a high level.

With reference to global motion analyzer system 100 of FIGS. 1, 3, and/or 4, there are a number of practical issues in making a system for global motion estimation and compensation work. [1] high complexity—calculation of global motion estimation (that typically starts after a calculation of block motion vectors) is a heavily compute intensive open-form process, typically requiring a least square minimization type of solution, that is iterative and whose quick convergence is not always guaranteed; [2] motion range limitations—if the starting block motion range is insufficient with respect to fast actual motion, the resulting global motion estimate will likely be quite inaccurate resulting in large prediction residual; [3] insufficient robustness—noisy motion vectors contribute to misdirection of global motion estimation process, not only making convergence hard but also can result in poor global motion estimates; [4] Local/Global motion interaction—often local motion of objects interferes with calculation of global motion causing global motion estimates to be either somewhat inaccurate or even downright erroneous; [5] mismatch of motion model to actual motion in the scene—for instance, if a fixed four parameter global motion model is used to represent changes in perspective in a video scene, the measured motion parameters may be erroneous; [6] limitations in extension of frame boundaries for cases of large motion—while this issue impacts both local block motion compensation as well as global motion compensation, local block motion vectors do not have to follow actual motion and sometimes may provide adequate results due to random matches; [7] limitations due to inactive static area in content—if such an area (e.g., this includes presence of black bars, black borders, letter-boxing, pillar-boxing etc.) is not rejected from global motion estimation, the resulting estimates can be erroneous leading to poor motion compensated prediction; [8] limitations due to static logos or overlaid text—if static logo region and globally moving background region are not separated for global motion estimation then it is difficult to find an accurate global motion estimate and thus global motion compensation quality is likely to suffer; [9] coding bit cost of global motion parameters—since both local and global motion tends to co-exist in a video scene, sending global motion parameters is not sufficient by itself, and needs to be sent in addition to local motion vectors; thus only a limited global motion bit cost can be afforded; and [10] global motion compensation accuracy—if limited precision sub-pel interpolation with simpler filters is performed to reduce motion compensation complexity (e.g., this may be important as this process is needed to be performed both at encoder and decoder), the resulting prediction is often blurry and does not generate small residual signal.

FIG. 5 is an illustrative block diagram of an example video encoder 500, arranged in accordance with at least some implementations of the present disclosure. In various implementations, video encoder 500 may be configured to undertake video coding and/or implement video codecs according to one or more advanced video codec standards, such as, for example, the Advanced Video Coding (e.g., AVC/H.264) video compression standard or the High Efficiency Video Coding (e.g., HEVC/H.265) video compression standard, but is not limited in this regard. Further, in various embodiments, video encoder 500 may be implemented as part of an image processor, video processor, and/or media processor.

As used herein, the term "coder" may refer to an encoder and/or a decoder. Similarly, as used herein, the term "coding" may refer to encoding via an encoder and/or decoding via a decoder. For example video encoder 500 may include a video encoder with an internal video decoder, as illustrated in FIG. 5, while a companion coder may only include a video decoder (not illustrated independently here), and both are examples of a "coder" capable of coding.

In some examples, video encoder 500 may include additional items that have not been shown in FIG. 5 for the sake of clarity. For example, video encoder 500 may include a processor, a radio frequency-type (RF) transceiver a display, an antenna, and/or the like. Further, video encoder 500 may include additional items such as a speaker, a microphone, an accelerometer, memory, a router, network interface logic, and/or the like that have not been shown in FIG. 5 for the sake of clarity.

Video encoder 500 may operate via the general principle of inter-frame coding, or more specifically, motion-compensated (DCT) transform coding that modern standards are based on (although some details may be different for each standard).

Motion estimation is done using fixed or variable size blocks of a frame of video with respect to another frame resulting in displacement motion vectors that are then encoded and sent to the decoder which uses these motion vectors to generate motion compensated prediction blocks. While interframe coders support both intra and inter coding, it is the interframe coding (which involves efficiently coding of residual signal between original blocks and corresponding motion compensated prediction blocks) that provides the significant coding gain. One thing to note is that it is coding of large number of high precision motion vectors of blocks (due to variable block size partitioning, and motion compensation with at least ¼ pixel accuracy as needed to reduce the residual signal) poses a challenge to efficient video coding due to needed coding bits for motion vectors even though clever techniques for motion vector prediction and coding have already been developed. Another issue with block motion vectors is that at best they can represent translatory motion model and are not capable of faithfully representing complex motion.

The key idea in modern interframe coding is thus to combine temporally predictive (motion compensated) coding that adapts to motion of objects between frames of video and is used to compute motion compensated differential residual signal, and spatial transform coding that converts spatial blocks of pixels to blocks of frequency coefficients typically by DCT (of block size such as 8×8) followed by reduction in precision of these DCT coefficients by quantization to adapt video quality to available bit-rate. Since the resulting transform coefficients have energy redistributed in lower frequencies, some of the small valued coefficients after quantization turn to zero, as well as some high frequency coefficients can be coded with higher quantization errors, or even skipped altogether. These and other characteristics of transform coefficients such as frequency location, as well as that some quantized levels occur more frequently than others, allows for using frequency domain scanning of coefficients and entropy coding (in its most basic form, variable word length coding) to achieve additional compression gains.

Inter-frame coding includes coding using up to three types picture types (e.g., I-pictures, P-Pictures, and B-pictures) arranged in a fixed or adaptive picture structure that is repeated a few times and collectively referred to as a group-of-pictures (GOP). I-pictures are typically used to provide clean refresh for random access (or channel switching) at frequent intervals. P-pictures are typically used for basic inter-frame coding using motion compensation and may be used successively or intertwined with an arrangement of B-pictures; where, P-pictures may provide moderate compression. B-pictures that are bi-directionally motion compensated and coded inter-frame pictures may provide the highest level of compression.

Since motion compensation is difficult to perform in the transform domain, the first step in an interframe coder is to create a motion compensated prediction error in the pixel domain. For each block of current frame, a prediction block in the reference frame is found using motion vector computed during motion estimation, and differenced to generate prediction error signal. The resulting error signal is transformed using 2D DCT, quantized by an adaptive quantizer (e.g., "quant") 508, and encoded using an entropy coder 509 (e.g., a Variable Length Coder (VLC) or an arithmetic entropy coder) and buffered for transmission over a channel.

As illustrated, the video content may be differenced at operation 504 with the output from the internal decoding loop to form residual video content.

The residual content may be subjected to video transform operations at transform module (e.g., "block DCT") 506 and subjected to video quantization processes at quantizer (e.g., "quant") 508.

The output of transform module (e.g., "block DCT") 506 and quantizer (e.g., "quant") 508 may be provided to an entropy encoder 509 and to an inverse transform module (e.g., "inv quant") 512 and a de-quantization module (e.g., "block inv DCT") 514. Entropy encoder 509 may output an entropy encoded bitstream 510 for communication to a corresponding decoder.

Within an internal decoding loop of video encoder 500, inverse transform module (e.g., "inv quant") 512 and de-quantization module (e.g., "block inv DCT") 514 may implement the inverse of the operations undertaken transform module (e.g., "block DCT") 506 and quantizer (e.g., "quant") 508 to provide reconstituted residual content. The reconstituted residual content may be added to the output from the internal decoding loop to form reconstructed decoded video content. Those skilled in the art may recognize that transform and quantization modules and de-quantization and inverse transform modules as described herein may employ scaling techniques. The decoded video content may be provided to a decoded picture store 120, a motion estimator 522, a motion compensated predictor 524 and an intra predictor 526. A selector 528 (e.g., "Sel") may send out mode information (e.g., intra-mode, inter-mode, etc.) based on the intra-prediction output of intra predictor 526 and the inter-prediction output of motion compensated predictor 524. It will be understood that the same and/or similar operations as described above may be performed in decoder-exclusive implementations of Video encoder 500.

FIG. 6 is an illustrative block diagram of an example Advanced Video Coding (AVC) video encoder 600, arranged in accordance with at least some implementations of the present disclosure. In various implementations, video encoder 600 may be configured to undertake video coding and/or implement video codecs according to one or more advanced video codec standards, such as, for example, the Advanced Video Coding (e.g., AVC/H.264) video compression standard or the High Efficiency Video Coding (e.g., HEVC/H.265) video compression standard, but is not limited in this regard. Further, in various embodiments, video encoder 600 may be implemented as part of an image processor, video processor, and/or media processor.

As illustrated, FIG. 6 shows block diagram of an AVC encoder that follows the principles of the generalized inter-frame video encoder 500 of FIG. 5 discussed earlier. Each frame is partitioned into macroblocks (MB's) that correspond to 16×16 luma (and two corresponding 8×8 chroma signals). Each MB can potentially be used as is or partitioned into either two 16×8s, or two 8×16s or four 8×8s for prediction. Each 8×8 can also be used as is or partitioned into two 8×4s, or two 4×8s or four 4×4s for prediction. The exact partitioning decision depends on coding bit-rate available vs. distortion optimization (by full or partial).

For each MB a coding mode can be assigned from among intra, inter or skip modes in unidirectionally predicted (P-) pictures. B- (bidirectionally) predicted pictures are also supported and include an additional MB or block based direct mode. Even P-pictures can refer to multiple (4 to 5) past references.

In the high profile, transform block size allowed are 4×4 and 8×8 that encode residual signal (generated by intra prediction or motion compensated inter prediction). The generated transform coefficients are quantized and entropy coded using a Context-Adaptive Binary Arithmetic Coding (CABAC) arithmetic encoder. A filter in the coding loop ensures that spurious blockiness noise is filtered, benefitting both objective and subjective quality.

In some examples, during the operation of video encoder 600, current video information may be provided to a picture reorder 642 in the form of a slice of video data. Picture reorder 642 may determine the picture type (e.g., I-, P-, or B-slices) of each video slice and reorder the video slices as needed.

The current video frame may be split so that each MB can potentially be used as is or partitioned into either two 16×8's, or two 8×16's or four 8×8's for prediction, and each 8×8 can also be used as is or partitioned into two 8×4's, or two 4×8's or four 4×4's for prediction at prediction partitioner 644 (e.g., "MB Partitioner"). A coding partitioner 646 (e.g., "Res 4×4/8×8 Partitioner") may partition residual macroblocks.

The coding partitioner 646 may be subjected to known video transform and quantization processes, first by a transform 648 (e.g., 4×4 DCT/8×8 DCT), which may perform a discrete cosine transform (DCT) operation, for example. Next, a quantizer 650 (e.g., Quant) may quantize the resultant transform coefficients.

The output of transform and quantization operations may be provided to an entropy encoder 652 as well as to an inverse quantizer 656 (e.g., Inv Quant) and inverse transform 658 (e.g., Inv 4×4DCT/Inv 8×8 DCT). Encoder 652 (e.g., "CAVLC/CABAC Encoder") may output an entropy encoded bitstream 654 for communication to a corresponding decoder.

Within the internal decoding loop of video encoder 600, inverse quantizer 656 and inverse transform 658 may implement the inverse of the operations undertaken by transform 648 and quantizer 650 to provide output to a residual assembler 660 (e.g., Res 4×4/8×8 Assembler).

The output of residual assembler 660 may be provided to a loop including a prediction assembler 662 (e.g., Block Assembler), a de-block filter 664, a decoded picture buffer 668, a motion estimator 670, a motion compensated predictor 672, a decoded macroblock line plus one buffer 674 (e.g., Decoded MB Line+1 Buffer), an intra prediction direction estimator 676, and an intra predictor 678. As shown in FIG. 6B, the output of either motion compensated predictor 672 or intra predictor 678 is selected via selector 680 (e.g., Sel) and may be combined with the output of residual assembler 660 as input to de-blocking filter 664, and is differenced with the output of prediction partitioner 644 to act as input to coding partitioner 646. An encode controller 682 (e.g., Encode Controller RD Optimizer & Rate Controller) may operate to perform Rate Distortion Optimization (RDO) operations and control the rate of video encoder 600.

FIG. 7 is an illustrative diagram of an example High Efficiency Video Coder (HEVC) video encoder 700, arranged in accordance with at least some implementations of the present disclosure. In various implementations, video encoder 700 may be configured to undertake video coding and/or implement video codecs according to one or more advanced video codec standards, such as, for example, the Advanced Video Coding (e.g., AVC/H.264) video compression standard or the High Efficiency Video Coding (e.g., HEVC/H.265) video compression standard, but is not limited in this regard. Further, in various embodiments, video encoder 700 may be implemented as part of an image processor, video processor, and/or media processor.

As illustrated in FIG. 7, the high level operation of video encoder 700 follows the principles of general inter-frame encoder discussed earlier via FIG. 5. For instance, video encoder 700 of FIG. 7 is also an inter-frame motion compensated transform encoder that typically either uses a combination of either I- and P-pictures only or I-, P- and B-pictures (note that in HEVC a generalized B-picture (GBP) can be used in place of P-picture) in a non-pyramid, or pyramid GOP arrangement. Further like H.264/AVC coding, not only B-pictures (that can use bi-directional references), but also P-picture can also use multiple references (these references are unidirectional for P-pictures). As in previous standards B-pictures implies forward and backward references, and hence picture reordering is necessary.

In some examples, during the operation of video encoder 700, current video information may be provided to a picture reorder 742 in the form of a frame of video data. Picture reorder 742 may determine the picture type (e.g., I-, P-, or B-frame) of each video frame and reorder the video frames as needed.

The current video frame may be split from Largest Coding Units (LCUs) to coding units (CUs), and a coding unit (CU) may be recursively partitioned into smaller coding units (CUs); additionally, the coding units (CUs) may be partitioned for prediction into prediction units (PUs) at prediction partitioner 744 (e.g., "LC_CU & PU Partitioner). A coding partitioner 746 (e.g., "Res CU_TU Partitioner) may partition residual coding units (CUs) into transform units (TUs).

The coding partitioner 746 may be subjected to known video transform and quantization processes, first by a transform 748 (e.g., 4×4DCT/VBS DCT), which may perform a discrete cosine transform (DCT) operation, for example. Next, a quantizer 750 (e.g., Quant) may quantize the resultant transform coefficients.

The output of transform and quantization operations may be provided to an entropy encoder 752 as well as to an inverse quantizer 756 (e.g., Inv Quant) and inverse transform 758 (e.g., Inv 4×4DCT/VBS DCT). Entropy encoder 752 may output an entropy encoded bitstream 754 for communication to a corresponding decoder.

Within the internal decoding loop of video encoder 700, inverse quantizer 756 and inverse transform 758 may implement the inverse of the operations undertaken by transform 748 and quantizer 750 to provide output to a residual assembler 760 (e.g., Res TU_CU Assembler).

The output of residual assembler 760 may be provided to a loop including a prediction assembler 762 (e.g., PU_CU & CU_LCU Assembler), a de-block filter 764, a sample adaptive offset filter 766 (e.g., Sample Adaptive Offset (SAO)), a decoded picture buffer 768, a motion estimator 770, a motion compensated predictor 772, a decoded largest coding unit line plus one buffer 774 (e.g., Decoded LCU Line+1 Buffer), an intra prediction direction estimator 776, and an intra predictor 778. As shown in FIG. 7B, the output of either motion compensated predictor 772 or intra predictor 778 is selected via selector 780 (e.g., Sel) and may be combined with the output of residual assembler 760 as input to de-blocking filter 764, and is differenced with the output of prediction partitioner 744 to act as input to coding partitioner 746. An encode controller 782 (e.g., Encode Controller RD Optimizer & Rate Controller) may operate to perform Rate Distortion Optimization (RDO) operations and control the rate of video encoder 700.

In operation, the Largest Coding Unit (LCU) to coding units (CU) partitioner partitions LCU's to CUs, and a CU can be recursively partitioned into smaller CU's. The CU to prediction unit (PU) partitioner partitions CUs for prediction into PUs, and the TU partitioner partitions residual CUs into Transforms Units (TUs). TUs correspond to the size of transform blocks used in transform coding. The transform coefficients are quantized according to Qp in the bitstream. Different Qps can be specified for each CU depending on maxCuDQpDepth with LCU based adaptation being of the least granularity. The encode decisions, quantized transformed difference and motion vectors and modes are encoded in the bitstream using Context Adaptive Binary Arithmetic Coder (CABAC).

An Encode Controller controls the degree of partitioning performed, which depends on quantizer used in transform coding. The CU/PU Assembler and TU Assembler perform the reverse function of partitioner. The decoded (every DPCM encoder incorporates a decoder loop) intra/motion compensated difference partitions are assembled following inverse DST/DCT to which prediction PUs are added and reconstructed signal then Deblock, and SAO Filtered that correspondingly reduce appearance of artifacts and restore edges impacted by coding. HEVC uses Intra and Inter prediction modes to predict portions of frames and encodes the difference signal by transforming it. HEVC uses various transform sizes called Transforms Units (TU). The transform coefficients are quantized according to Qp in the bitstream. Different Qps can be specified for each CU depending on maxCuDQpDepth.

AVC or HEVC encoding classifies pictures or frames into one of 3 basic picture types (pictype), I-Picture, P-Pictures, and B-Pictures. Both AVC and HEVC also allow out of order coding of B pictures, where the typical method is to encode a Group of Pictures (GOP) in out of order pyramid configuration. The typical Pyramid GOP configuration uses 8 pictures Group of Pictures (GOP) size (gopsz). The out of order delay of B Pictures in the Pyramid configuration is called the picture level in pyramid (piclvl).

Figure 8:
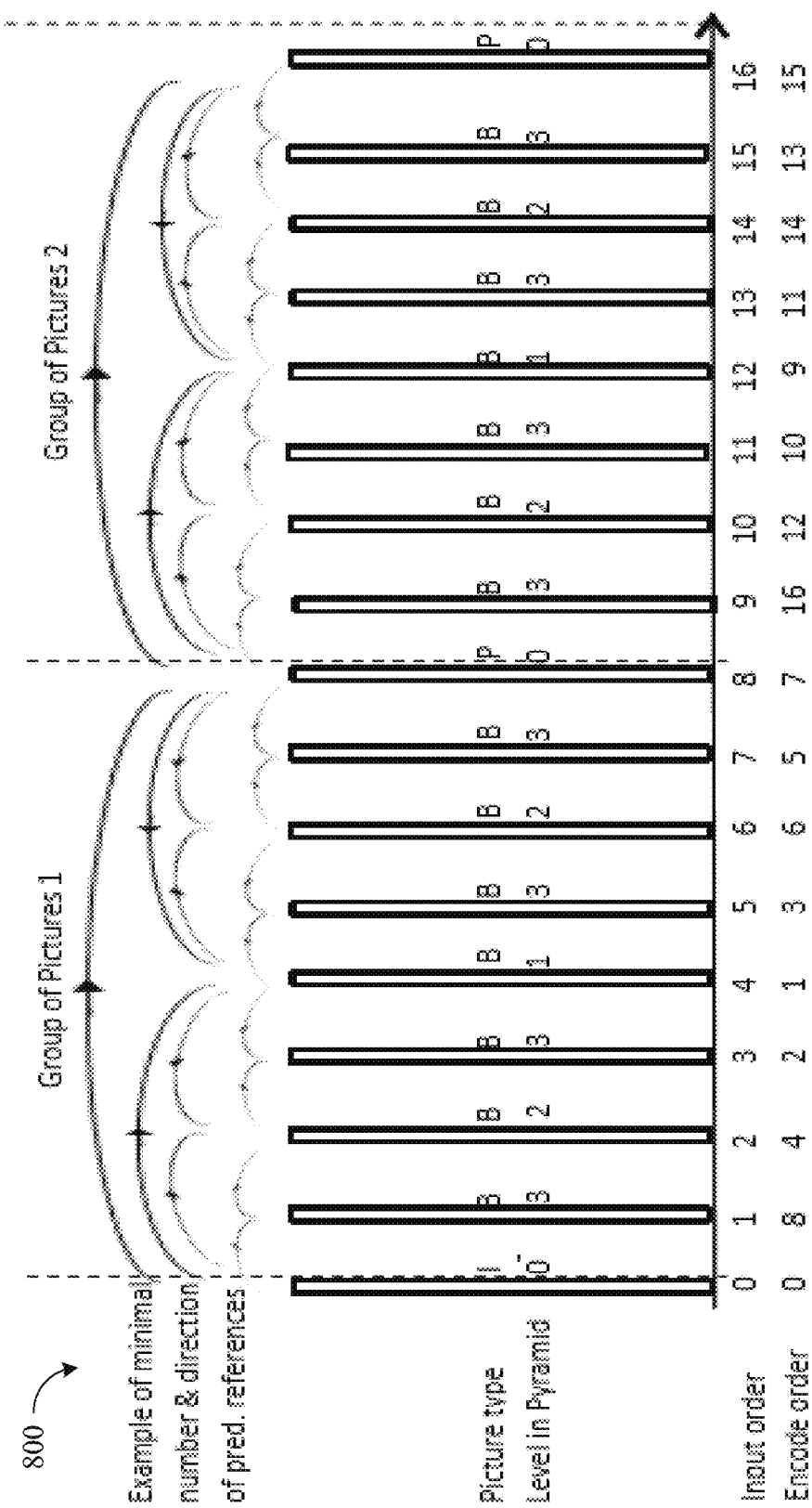
FIG. 8 is an illustrative diagram of an example Group of Pictures structure according to an embodiment.

FIG. 8 shows an example Group of Pictures 800 structure. Group of Pictures 800 shows a first 17 frames (frames 0 to 16) including a first frame (frame 0) an intra frame followed by two GOPs, each with eight pictures each. In the first GOP, frame 8 is a P frame (or can also be a Generalized B (GPB) frame) and is a level 0 frame in the pyramid. Whereas frame 1 is a first level B-frame, frame 2 and 6 are second level B-frames, and frames 1,3, 5 and 7 are all third level B-frames. For instance, frame 1 is called the first level B-frame, as it only needs the I-frame (or the last P-frame of previous GOP) as the previous reference and actual P-frame of current GOP as the next reference to create predictions necessary for encoding frame 1. In fact, frame 1 can use more than 2 references, although 2 references may be used to illustrate the principle. Further, frames 2 and 6 are called second level B-frames as they use first level B-frame (frame 1) as a reference, along with a neighboring I and P-frame. Similarly level 3 B-frames use at least one level 2 B-frame as a reference. A second GOP (frame 9 through 16) of the same size is shown, that uses decoded P-frame of previous GOP (instead of I-frame as in case of previous GOP), e.g., frame 8 as one reference; where the rest of the second GOP works identically to the first GOP. In terms of encoding order, the encoded bitstream encodes frame 0, followed by frame 8, frame 4, frame 2, frame 1, frame 3, frame 6, frame 5, frame 7, etc. as shown in the figure.

Figure 9:
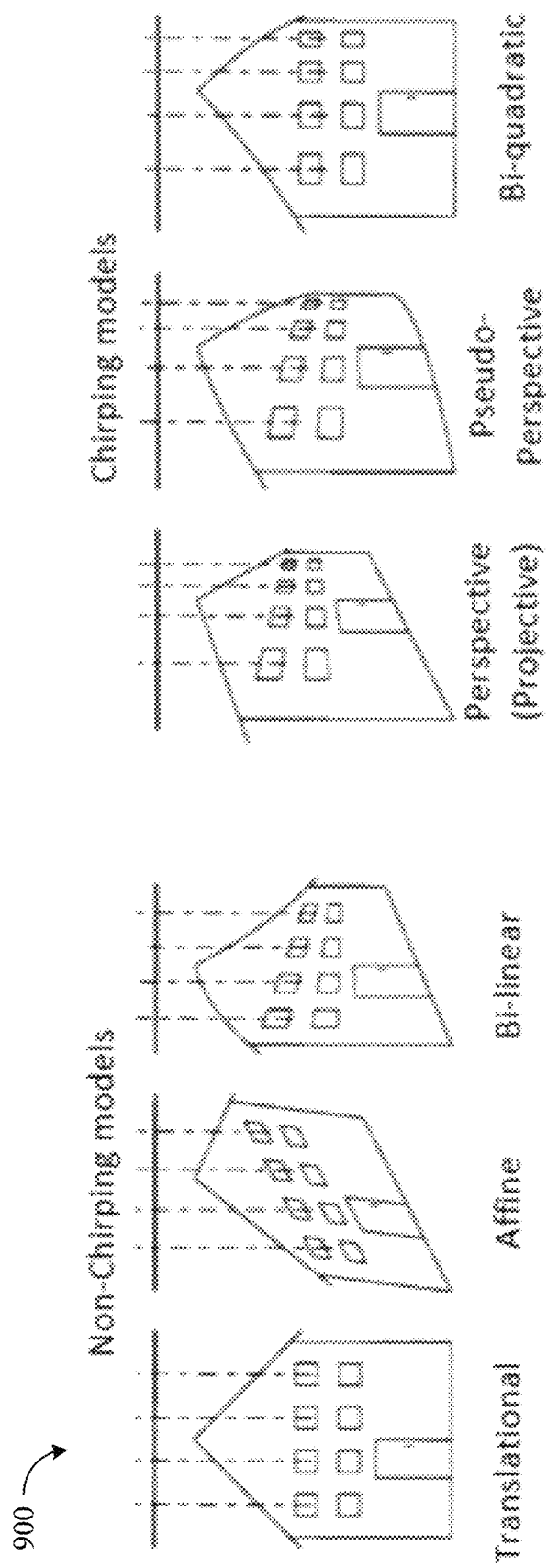
FIG. 9 is an illustrative diagram of various example global motion models with respect to chirping according to an embodiment.
Figure 10A:
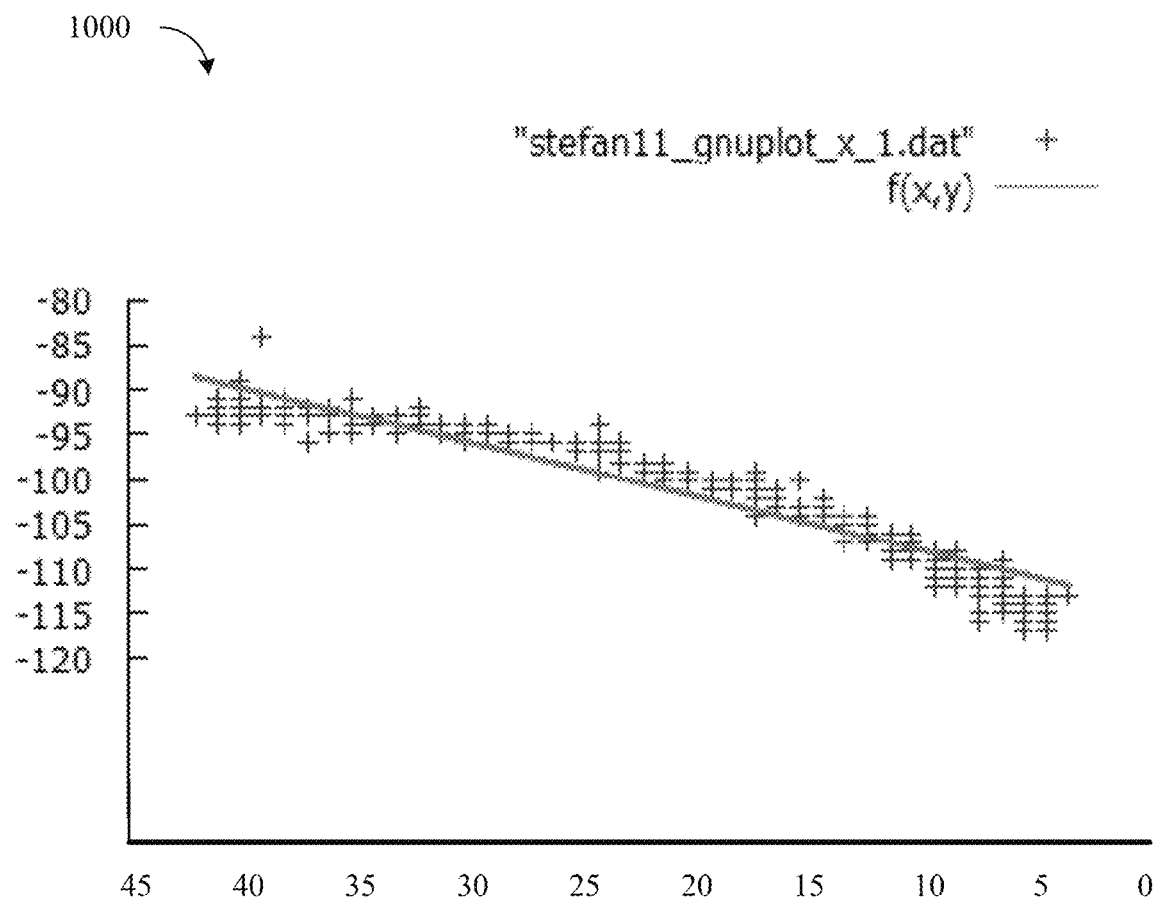
FIGS. 10A-10D are illustrative charts of an example Levenberg-Marquardt Algorithm (LMA) curve fitting model for approximating global motion according to an embodiment.
Figure 10B:
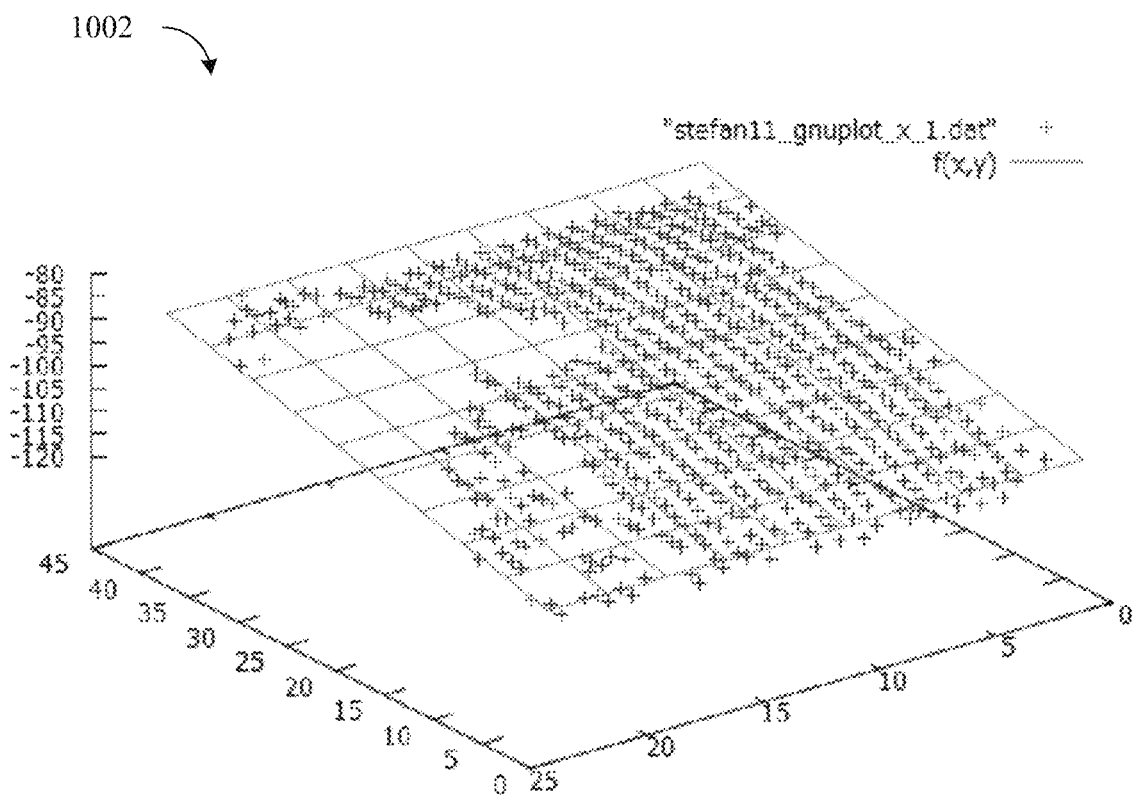
Figure 10C:
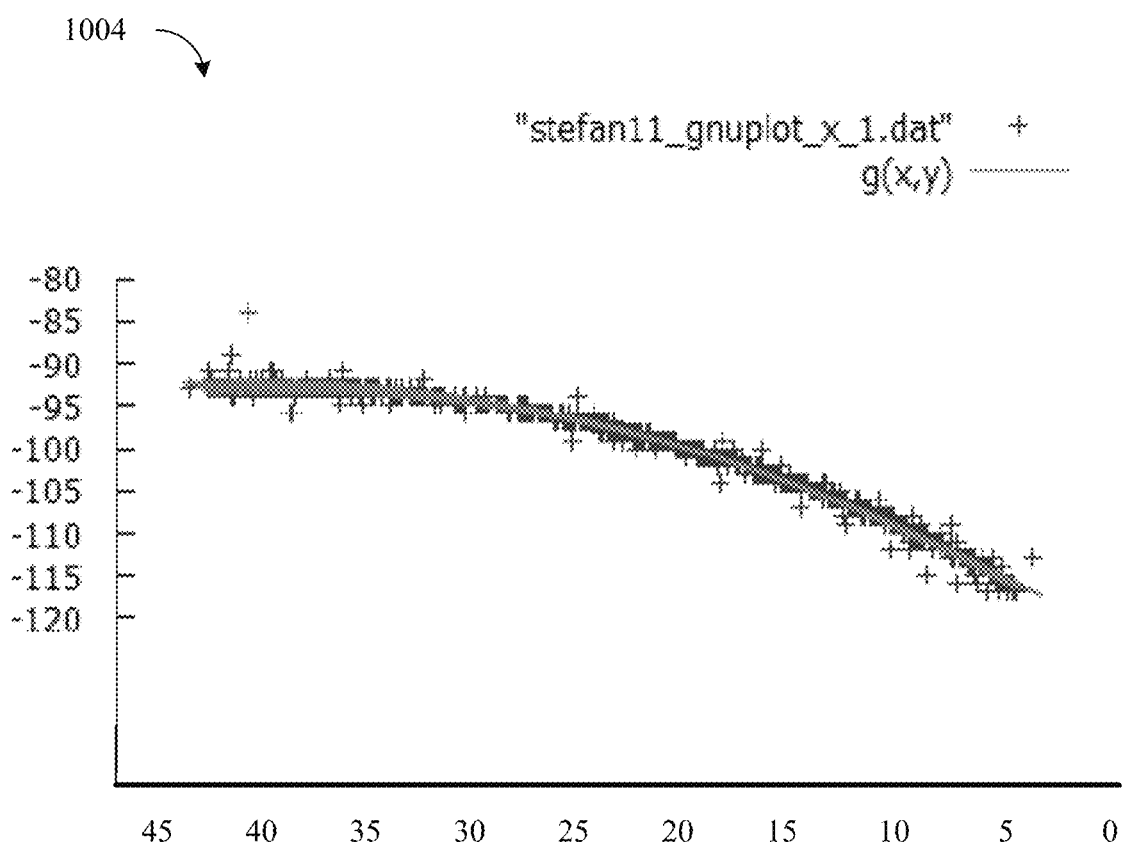
Figure 10D:
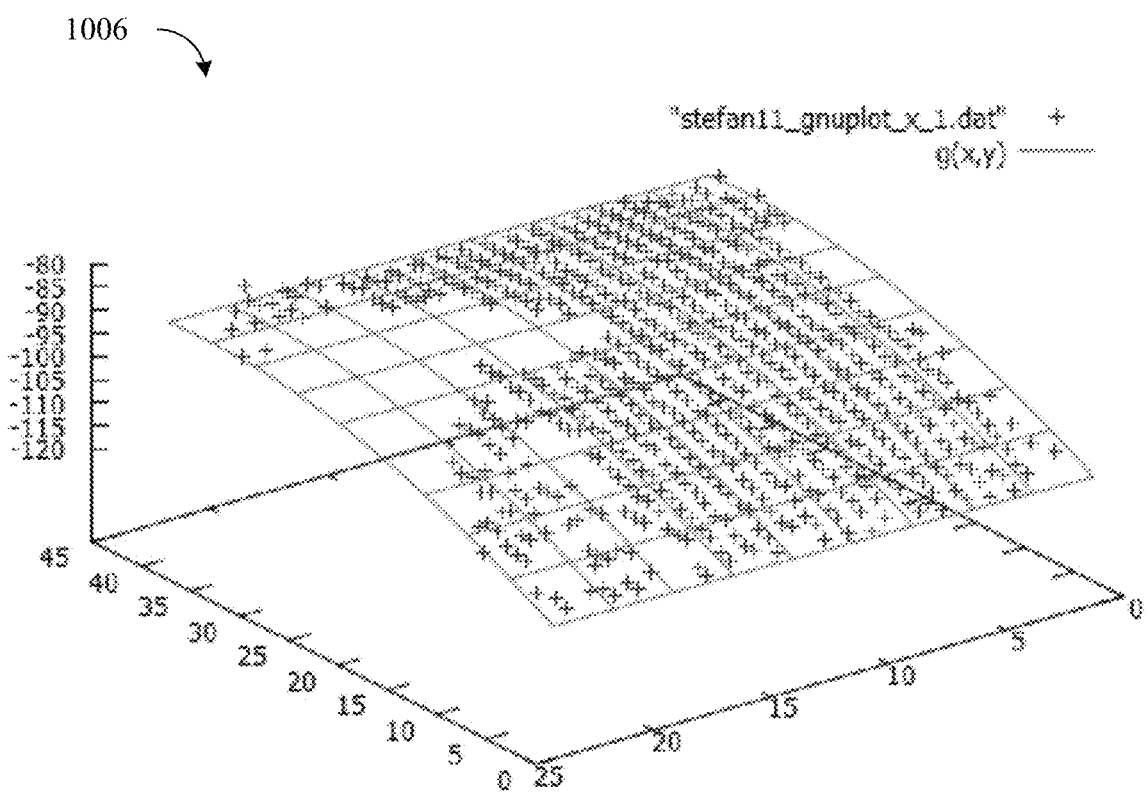

Global Motion Models:

FIG. 9 is an illustrative diagram of various example global motion models 900 with respect to chirping, arranged in accordance with at least some implementations of the present disclosure. In various implementations, example global motion models 900 may include a translational non-chirping model, an affine non-chirping model, a bi-liner non-chirping model, a perspective (e.g., projective) chirping model, a pseudo-perspective chirping model, a bi-biquadratic chirping model, the like, and/or combinations thereof.

A number of global motion models have been proposed in published literature. Generally speaking, a particular motion model establishes a tradeoff between the complexity of the model and the ability to handle different types of camera related motions, scene depth/perspective projections, etc. Models are often classified into linear (e.g., simple) models, and nonlinear (e.g., complex models). Linear models are capable of handling normal camera operations such as translational motion, rotation and even zoom. More complex models, which are typically non-linear and contain at least one quadratic (or higher order) term, are often used in cases when there is complex scene depth, strong perspective projection effects in the scene, or simply if more precision is needed for a given application. One disadvantage of non-linear models is that they have higher computational complexity. On the other hand, Translational and affine models are more prone to errors when noisy motion vector field is used for GME. The most commonly used models for global motion estimation in video coding applications are simpler, linear models.

Suppose we are given a motion vector field, ($MX_i$, $MY_i$), i=0, ... N−1, where N is the number of motion vectors in the frame. Then, each position ($x_i$, $y_i$) corresponding to the center of the block i of the frame is moved to ($x'_i$, $y'_i$) as per motion vector ($MX_i$, $MY_i$) as follows:

$$x'_i = x_i + MX_i$$

$$y'_i = y_i + MY_i$$

A simple 4-parameter motion model aims to approximate these global motion moves of frame positions by a single linear equation with a total of 4 parameters $\{a_0, a_1, a_2, a_3\}$:

$$x'_i = a_0 x_i + a_1$$

$$y'_i = a_2 y_i + a_3$$

This equation defines translational 4-parameter motion model. Another 4-parameter model, is referred to as a pseudo-affine 4-parameter motion model. Pseudo-affine motion model is defined as:

$$x'_i = a_0 x_i + a_i y_i + a_2$$

$$y'_i = a_0 y_i - a_i x_i + a_3$$

The advantage of pseudo-affine model is that it often can estimate additional types of global motion while having the same number of parameters as a simple translational model. One of the most commonly used motion models in practice is the 6-parameter affine global motion model. It can more precisely estimate most of the typical global motion caused by camera operations. The affine model is defined as follows:

$$x'_i = a_0 x_i + a_i y_i + a_2$$

$$y'_i = a_3 x_i + a_4 y_i + a_5$$

Unfortunately, linear models cannot handle camera pan and tilt properly. Thus, non-linear models are required for video scenes with these effects. More complex models are typically represented with quadratic terms. They are widely used for video applications such as medical imaging, remote sensing or computer graphics. The simplest non-linear model is bi-linear 8-parameter global motion model which is defined as:

$$x'_i = a_0 x_i y_i + a_1 x_i + a_2 y_i + a_3$$

$$y'_i = a_4 x_i y_i + a_5 x_i + a_6 y_i + a_7$$

Another popular 8-parameter model is perspective (or projective) 8-parameter global motion model. This model is designed to handle video scenes with strong perspective, which creates global motion field that follows more complex non-linear distribution. The Projective model is defined as follows:

$$x'_i = \frac{a_0 x_i + a_1 y_i + a_2}{a_6 x_i + a_7 y_i + 1}$$

$$y'_i = \frac{a_3 x_i + a_4 y_i + a_5}{a_6 x_i + a_7 y_i + 1}$$

A variant of the perspective model, called pseudo perspective model, has been is shown to have a good overall performance as it can handle perspective projections and related effects such as "chirping" (the effect of increasing or decreasing spatial frequency with respect to spatial location).

One 8-parameter pseudo-perspective model, is defined as follows:

$$x'_i = a_0 x_i^2 + a_1 x_i y_i + a_2 x_i + a_3 y_i + a_4$$

$$y'_i = a_1 y_i^2 + a_0 x_i y_i + a_5 x_i + a_6 y_i + a_7$$

Pseudo-projective model has an advantage over the perspective model because it typically has smaller computational complexity during the estimation process while at the same time is being able to handle all perspective-related effects on 2-D global motion field. Perspective model has been known to be notoriously difficult to estimate and often requires many more iterations in the estimation process.

FIG. 9 shows pictorial effects of different modeling functions. As illustrated, the pseudo-perspective model can produce both chirping and converging effects, and it is the best approximation of perspective mapping using low order polynomials. It also shows that bilinear function, although also has 8-parameters like perspective and pseudo-perspective models, fails to capture the chirping effect.

Finally, for video applications where very high precision in modeling is required, capable of handling all degrees of freedom in camera operations and perspective mapping effects, Bi-quadratic model can be used. It is a 12-parameter model, and thus most expensive in terms of coding cost. Bi-quadratic 12-parameter model is defines as follows:

$$x'_i = a_0 x_i^2 + a_1 y_i^2 + a_2 x_i y_i + a_3 x_i + a_4 y_i + a_5$$

$$y'_i = a_6 x_i^2 + a_7 y_i^2 + a_8 x_i y_i + a_9 x_i + a_{10} y_i + a_{11}$$

Table 1 shows summary of the aforementioned global motion models. For example, other, even higher order polynomial models are possible to define (e.g., 20-parameter bi-cubic model) but are rarely used in practice because of extremely high coding cost.

Table 1, below, illustrates a summary of global motion models and their properties.

TABLE 1

| Motion Model | Model Equation | Number of Parameters |
|---|---|---|
| Translational | $\begin{pmatrix} x' \\ y' \end{pmatrix} = \begin{pmatrix} a_0 x + a_1 \\ a_2 x + a_3 \end{pmatrix}$ | 4 |
| Pseudo-Affine | $\begin{pmatrix} x' \\ y' \end{pmatrix} = \begin{pmatrix} a_0 x + a_1 y + a_2 \\ a_0 y - a_1 x + a_3 \end{pmatrix}$ | 4 |
| Affine | $\begin{pmatrix} x' \\ y' \end{pmatrix} = \begin{pmatrix} a_0 x + a_1 y + a_2 \\ a_3 x + a_4 y + a_5 \end{pmatrix}$ | 6 |
| Bi-linear | $\begin{pmatrix} x' \\ y' \end{pmatrix} = \begin{pmatrix} a_0 xy + a_1 x + a_2 y + a_3 \\ a_4 xy + a_5 x + a_6 y + a_7 \end{pmatrix}$ | 8 |
| Perspective | $\begin{pmatrix} x' \\ y' \end{pmatrix} = \begin{pmatrix} (a_0 x + a_1 y + a_2)/(a_6 x + a_7 y + 1) \\ (a_3 x + a_4 y + a_5)/(a_6 x + a_7 y + 1) \end{pmatrix}$ | 8 |
| Pseudo-Perspective | $\begin{pmatrix} x' \\ y' \end{pmatrix} = \begin{pmatrix} a_0 x_i^2 + a_1 x_i y_i + a_2 x_i + a_3 y_i + a_4 \\ a_1 y_i^2 + a_0 x_i y_i + a_5 x_i + a_6 y_i + a_7 \end{pmatrix}$ | 8 |
| Bi-quadratic | $\begin{pmatrix} x' \\ y' \end{pmatrix} = \begin{pmatrix} a_0 x^2 + a_1 y^2 + a_2 xy + a_3 x + a_4 y + a_5 \\ a_6 x^2 + a_7 y^2 + a_8 xy + a_9 x + a_{10} y + a_{11} \end{pmatrix}$ | 12 |

Global Motion Model Estimation Approaches:

Most common techniques used to estimate the desired model's parameters are based on the least squares fitting. Next describe several least squares based methods are described that are used to compute the parameters of a global motion model.

Global Motion Model—Least Square Estimation:

Least squares error fitting method is often used to estimate optimal motion model parameter values. It is a standard approach used to find solutions to over-determined systems (e.g., sets of equations with more equations than unknowns).

In global motion estimation a motion vector field is given, $(MX_1, MY_i)$, i=0, . . . , N−1, where N is the number of motion vectors in the frame. According to the motion field, each position $(x_i, y_i)$ corresponding to the center of the block i of the frame is moved to $(x'_i, y'_i)$ as per motion vector $(mx_i, my_i)$ as follows:

$$x'_i = x_i + MX_i$$

$$y'_i = y_i + MY_i$$

In a 4-parameter Translational motion model the goal is to approximate 4 parameters $\{a_0, a_1, a_2, a_3\}$ so that the difference between observed data $(x'_i, y'_i)$ and modeled data $(a_0 x_i + a_1, a_2 y_i + a_3)$ is minimized. Least squares approach minimizes the following two squared errors with respect to parameters $\{a_0, a_1\}$ and $\{a_2, a_3\}$:

$$SE_{a_0, a_1} = \Sigma_{i=0}^{N-1} (x'_i - (a_0 x_i + a_1))^2$$

$$SE_{a_2, a_3} = \Sigma_{i=0}^{N-1} (y'_i - (a_2 y_i + a_3))^2$$

Typically the number of parameters (4 in this example) is much smaller than the total number of vectors used for estimation, making it an over-determined system.

For linear global motion models (such as Translational, Pseudo-Affine and Affine, for example), the minimum of the sum of squares is found by taking the partial derivatives with respect to each parameter and setting it to zero. This results in the set of linear equations whose solution represents the global minimum in the squared error sense, e.g., the least squares error. The above equation for a 4-parameter affine motion model with respect to $\{a_0, a_1\}$ is expanded as follows:

$$SE_{a_0 a_1} = \Sigma_{i=0}^{N-1} (x_i'^2 + a_0^2 x_i^2 + a_1^2 - 2a_0 x_i x'_i - 2a_1 x'_i + 2a_0 a_1 x_i)^2 =$$

$$\sum_{i=0}^{N-1} x_i'^2 + a_0^2 \sum_{i=0}^{N-1} x_i^2 + a_1^2 N - 2a_0 \sum_{i=0}^{N-1} x_i x'_i - 2a_1 \sum_{i=0}^{N-1} x'_i + 2a_0 a_1 \sum_{i=0}^{N-1} x_i$$

Taking partial derivatives of the above equation yields the following system:

$$\frac{\partial SE_{a_0 a_1}}{\partial a_0} = 2a_0 \Sigma_{i=0}^{N-1} x_i^2 + 2a_1 \Sigma_{i=1}^{N-1} x_i - 2\Sigma_{i=0}^{N-1} x_i x_i' = 0$$

$$\frac{\partial SE_{a_0 a_1}}{\partial a_1} = 2a_0 \Sigma_{i=0}^{N-1} x_i + 2a_1 N - 2\Sigma_{i=0}^{N-1} x_i' = 0$$

The system from above can be expressed as the following matrix equation which solution determines the two unknown parameters $\{a_0, a_1\}$:

$$\begin{pmatrix} a_0 \\ a_1 \end{pmatrix} = \begin{pmatrix} \Sigma_{i=0}^{N-1} x_i^2 & \Sigma_{i=0}^{N-1} x_i \\ \Sigma_{i=0}^{N-1} x_i & N \end{pmatrix}^{-1} \begin{pmatrix} \Sigma_{i=0}^{N-1} x_i x_i' \\ \Sigma_{i=0}^{N-1} x_i' \end{pmatrix}$$

Similarly, one is able to express the second set of parameters $\{a_2, a_3\}$ as the solution to the following matrix equation:

$$\begin{pmatrix} a_2 \\ a_3 \end{pmatrix} = \begin{pmatrix} \Sigma_{i=0}^{N-1} y_i^2 & \Sigma_{i=0}^{N-1} y_i \\ \Sigma_{i=0}^{N-1} y_i & N \end{pmatrix}^{-1} \begin{pmatrix} \Sigma_{i=0}^{N-1} y_i y_i' \\ \Sigma_{i=0}^{N-1} y_i' \end{pmatrix}$$

If a determinant based solution to matrix inverse is used, the two matrix equations from above can be further expressed as:

$$\begin{pmatrix} a_0 \\ a_1 \end{pmatrix} = \frac{1}{N\Sigma_{i=0}^{N-1} x_i^2 - (\Sigma_{i=0}^{N-1} x_i)^2} \begin{pmatrix} N & -\Sigma_{i=0}^{N-1} x_i \\ -\Sigma_{i=0}^{N-1} x_i & \Sigma_{i=0}^{N-1} x_i^2 \end{pmatrix} \begin{pmatrix} \Sigma_{i=0}^{N-1} x_i x_i' \\ \Sigma_{i=0}^{N-1} x_i' \end{pmatrix}; \text{ and}$$

$$\begin{pmatrix} a_2 \\ a_3 \end{pmatrix} = \frac{1}{N\Sigma_{i=0}^{N-1} y_i^2 - (\Sigma_{i=0}^{N-1} y_i)^2} \begin{pmatrix} N & -\Sigma_{i=0}^{N-1} y_i \\ -\Sigma_{i=0}^{N-1} y_i & \Sigma_{i=0}^{N-1} y_i^2 \end{pmatrix} \begin{pmatrix} \Sigma_{i=0}^{N-1} y_i y_i' \\ \Sigma_{i=0}^{N-1} y_i' \end{pmatrix}$$

Finally, the matrix equations yield the following least squares expressions for directly solving the unknown parameters of an affine 4-parameter global motion model:

$$a_0 = \frac{N\Sigma_{i=0}^{N-1} x_i x_i' - \Sigma_{i=0}^{N-1} x_i \Sigma_{i=0}^{N-1} x_i'}{N\Sigma_{i=0}^{N-1} x_i^2 - (\Sigma_{i=0}^{N-1} x_i)^2}$$

$$a_1 = \frac{\Sigma_{i=0}^{N-1} x_i^2 \Sigma_{i=0}^{N-1} x_i' - \Sigma_{i=0}^{N-1} x_i \Sigma_{i=0}^{N-1} x_i x_i'}{N\Sigma_{i=0}^{N-1} x_i^2 - (\Sigma_{i=0}^{N-1} x_i)^2}$$

$$a_2 = \frac{N\Sigma_{i=0}^{N-1} y_i y_i' - \Sigma_{i=0}^{N-1} y_i \Sigma_{i=0}^{N-1} y_i'}{N\Sigma_{i=0}^{N-1} y_i^2 - (\Sigma_{i=0}^{N-1} y_i)^2}$$

$$a_3 = \frac{\Sigma_{i=0}^{N-1} y_i^2 \Sigma_{i=0}^{N-1} y_i' - \Sigma_{i=0}^{N-1} y_i \Sigma_{i=0}^{N-1} y_i y_i'}{N\Sigma_{i=0}^{N-1} y_i^2 - (\Sigma_{i=0}^{N-1} y_i)^2}$$

Using the same procedure, least squares fitting equations for Pseudo-Affine 4-parameter and Affine 6-parameter global motion models can be determined. For non-linear global motion models, a non-linear least squares fitting method such as Levenberg-Marquardt algorithm (LMA for short) can be used. An overview of LMA is presented next.

Global Motion Model—Levenberg-Marquardt Least Squares Solution:

Levenberg-Marquardt algorithm is a well-established method for solving non-linear least squares problems. It was first published by Levenberg in 1944 and rediscovered by Marquardt in 1963. The LMA is an iterative procedure. To start a minimization, the user has to provide an initial guess for the parameters. Like many fitting algorithms, the LMA finds only a local minimum, which is not necessarily the global minimum. In case of multiple minima, the algorithm converges to the global minimum only if the initial guess is already somewhat close to the final solution. In the context of estimating global motion model parameters, setting the parameters to past values (e.g. previous frame(s)' parameters) generally improves the performance.

The LMA interpolates between two different non-linear least squares solving methods: (1) the Gauss-Newton algorithm (GNA), and (2) gradient descent the method. The LMA is more robust than the GNA, in the sense that in many cases it finds a solution even if it starts very far off the final minimum. An analysis has shown that LMA is in fact GNA with a trust region, where the algorithm restricts the converging step size to the trust region size in each iteration in order to prevent stepping too far from the optimum.

Again, let $(x'_i, y'_i)$, $i=0, \ldots, N-1$, represent the observed data, e.g., the new positions of the center $(x_i, y_i)$ of i-th block of a frame moved according to the block-based motion vector field. A model is referred to as separable if $x'_i$ and $y'_i$ model functions have exactly the same independent variables structure and parameter $a_k$ is only used in computing either $x'_i$ or $y'_i$ but not both. Otherwise model is referred to as non-separable. Therefore, Affine, Bi-linear, and Bi-quadratic models are separable, while Translational, Pseudo-Affine, Perspective, and Pseudo-Perspective are non-separable.

Let $\beta = (a_0, a_1, \ldots, a_{n-1})$ be the vector of parameters of an n-parameter model that is to be used to model the global motion. For a separable global motion model we first compute parameters $\beta_x = (a_0, \ldots, a_{(n/2)-1})$ and then we compute the remaining parameters $\beta_y = (a_{n/2}, \ldots, a_{n-1})$. On the other hand, for non-separable models we create 2N data points, and if i<N we use x' model equation, while if N≤i<2N we use y' model's equation. For simplicity of argument, we describe the LMA algorithm for global motion modeling by the $1^{st}$ part of separable parameters computation, e.g., computing the parameters associated with x' model equation.

In each LMA iteration step, the parameter vector $\beta$ is replaced by a new estimate $\beta+\delta$. To determine the step vector $\delta$, the functions $f(x_i, \beta+\delta)$ are approximated by their linearizations as follows:

$$f(x_i, \beta + \delta) \approx f(x_i, \beta) + J_i \delta$$

Where $$J_i = \frac{\partial f(x_i, \beta)}{\partial \beta}$$

Then, the sum of square errors $S(\beta+\delta)$ is approximated as $$S(\beta+\delta) \approx \Sigma_{i=0}^{N-1} (x'_i - f(x_i, \beta) - J_i \delta)^2$$

The sum of squared errors function S is at its minimum at zero gradient with respect to $\beta$. Taking the derivative of $S(\beta+\delta)$ with respect to $\delta$ and setting the result to zero gives the following equality:

$$(J^T J)\delta = J^T (x' - f(\beta))$$

Where J is the Jacobian matrix whose i-th row is $J_i$ and $f$ and x' are vectors whose i-th component is $f(x_i, \beta)$ and x'$_i$ respectively. This defines a set of linear equations, whose solution is the unknown vector δ.

FIGS. 10A-10D are illustrative charts 1000, 1002, 1004, and 1006 of an example Levenberg-Marquardt Algorithm (LMA) curve fitting model for approximating global motion, arranged in accordance with at least some implementations of the present disclosure. In various implementations, LMA curve fitting model for approximating global motion: charts 1000 and 1002 show plots of motion vector field (x dimension) of global moving area of "Stefan" sequence (dots) and the Affine 6-parameter model fit (lines) computed using the LMA. On the other hand, charts 1004 and 1006 show Bi-quadratic 12-parameter model for "Stefan" computed via LMA. As it can be observed, the perspective and zoom effects in this scene require a higher order model than the 6-parameter linear Affine model.

Levenberg contributed to replace this equation by a "damped" variant which uses a non-negative parameter), to control the rate of reduction of error function S:

$$(J^T J + \lambda I)\delta = x' - f(\beta)$$

Smaller λ value brings the LMA closer to GNA, while larger value of λ brings it closer to gradient descent method. If either the length of the calculated step δ or the reduction of S from the latest parameter vector β+δ fall below predefined limits, the LMA iteration stops, and the last β is output as the solution.

Marquardt improved the final LMA equation in order to avoid slow convergence in the direction of small gradient. He replaced the identity matrix I with the diagonal matrix consisting of the diagonal elements of the matrix $J^T J$, resulting in the final Levenberg-Marquardt algorithm equation:

$$(J^T J + \lambda \text{diag}(J^T J))\delta = x' - f(\beta)$$

Marquardt recommended an initial value of λ in a general case. However, for global motion modeling LMA, in some implementations herein, a method may instead be used where the initial parameter λ is set to the square root of the sum of the squared errors of the initial model parameters.

The LMA can be used to compute linear parameters as well. However, the empirical data shows that direct least square fitting estimate yields practically same SAD error when compared to the LMA, but with several key benefits: (1) computation of 4- and 6-parameter linear models can be done in one pass, and (2) while LMA gives more tuned coefficients, direct least square computation for linear models offers higher correlation of parameters from frame to frame, thus making the coding cost less expensive. Computing of non-linear models however is often best done with the LMA method. FIGS. 10A-10D show an example of the LMA estimation of 6- and 12-parameter global motion models.

Global Motion Model Parameters Coding Overview

Global motion parameters are typically computed as floating point numbers, and as such are not easily transmittable to the decoder. In MPEG-4 standard, coding of global motion parameters is proposed which uses so called "reference points" or "control grid points". Motion vectors of reference points are transmitted as the global motion parameters. Motion vectors of the reference points are easier to encode, and at the decoder, the parameters are reconstructed from the decoded vectors. Since the vectors are quantized (e.g. to half-pel precision in MPEG-4), the method is lossy. However, reconstructed coefficients typically produce very similar global motion field and loss in quality is tolerable.

In MPEG-4, up to 4 reference points are used, which can support translational, affine and perspective models. The number of reference points that are needed to be sent to the decoder depends on the complexity of the motion model. When an 8-parameter model is used in MPEG-4 (e.g., as in a perspective model), then 4 points are needed to determine the unknown parameters by solving the linear system. For a 4-parameter model and 6-parameter models the number of needed reference points is reduced to 2 and 3 respectively.

The reference points are located at the corners of the bounding box. The bounding box can be the entire frame area or a smaller rectangular area inside the frame. The locations of these parameters are defined as follows:

$$z_0 = (x_0, y_0)$$

$$z_1 = (x_1, y_1) = (x_0 + W, y_0)$$

$$z_2 = (x_2, y_2) = (x_0, y_0 + H)$$

$$z_3 = (x_3, y_3) = (x_0 + W, y_0 + H)$$

Where $(x_0, y_0)$ is the coordinate of the top left corner, W is the width and H is the height of the frame or the bounding box.

The estimated global motion model may be applied on the reference points resulting in the following motion vectors:

$$MX_i = x'_i - x_i$$

$$MY_i = y'_i - y_i$$

Where i=0, . . . , 3 and $(x'_i, y'_i)$ may be computed using the global motion model equation. When the decoder receives the vectors $(MX_i, MY_i)$ it may reconstruct the global motion parameters. If a 4-parameter model is used, the decoder receives two vectors $(MX_0, MY_0)$ and $(MX_3, MY_3)$ which correspond to reference points $z_0$ and $z_3$ respectively. For the case when global motion is defined over the entire frame, reference points are $z_0=(0, 0)$ and $z_3=(W, H)$ where W and H are the frame width and height. To reconstruct parameters $a_0, \ldots, a_3$ of a translational global motion model, the following two systems are solved:

$$\begin{pmatrix} a_0 \\ a_1 \end{pmatrix} = \begin{pmatrix} x_0 & 1 \\ x_3 & 1 \end{pmatrix}^{-1} \begin{pmatrix} x_0 + MX_0 \\ x_3 + MX_3 \end{pmatrix} = \begin{pmatrix} 0 & 1 \\ W & 1 \end{pmatrix}^{-1} \begin{pmatrix} x'_0 \\ x'_3 \end{pmatrix} = \begin{pmatrix} -\frac{1}{W} & \frac{1}{W} \\ 1 & 0 \end{pmatrix} \begin{pmatrix} x'_0 \\ x'_3 \end{pmatrix}$$

$$\begin{pmatrix} a_2 \\ a_3 \end{pmatrix} = \begin{pmatrix} y_0 & 1 \\ y_3 & 1 \end{pmatrix}^{-1} \begin{pmatrix} y_0 + MY_0 \\ y_3 + MY_3 \end{pmatrix} = \begin{pmatrix} 0 & 1 \\ H & 1 \end{pmatrix}^{-1} \begin{pmatrix} y'_0 \\ y'_3 \end{pmatrix} = \begin{pmatrix} -\frac{1}{H} & \frac{1}{H} \\ 1 & 0 \end{pmatrix} \begin{pmatrix} y'_0 \\ y'_3 \end{pmatrix}$$

When a 6-parameter model is used, the decoder may receive three vectors $(MX_0, MY_0)$, $(MX_1, MY_1)$, and $(MX_2, MY_2)$, which correspond to reference points $z_0$, and $z_2$ respectively. The reference points are $z_0=(0, 0)$, $z_1=(W, 0)$ and $z_2=(0, H)$. Reconstructing parameters $a_0, \ldots, a_5$ of an affine global motion model may be done by solving the following two systems:

$$\begin{pmatrix} a_0 \\ a_1 \\ a_2 \end{pmatrix} = \begin{pmatrix} 0 & 0 & 1 \\ W & 0 & 1 \\ 0 & H & 1 \end{pmatrix}^{-1} \begin{pmatrix} x_0 + MX_0 \\ x_1 + MX_1 \\ x_2 + MX_2 \end{pmatrix} = \begin{pmatrix} -\frac{1}{W} & \frac{1}{W} & 0 \\ -\frac{1}{H} & 0 & \frac{1}{H} \\ 1 & 0 & 0 \end{pmatrix} \begin{pmatrix} x'_0 \\ x'_1 \\ x'_2 \end{pmatrix}$$

-continued $$\begin{pmatrix} a_3 \\ a_4 \\ a_5 \end{pmatrix} = \begin{pmatrix} 0 & 0 & 1 \\ W & 0 & 1 \\ 0 & H & 1 \end{pmatrix}^{-1} \begin{pmatrix} y_0 + MY_0 \\ y_1 + MY_1 \\ y_2 + MY_2 \end{pmatrix} = \begin{pmatrix} -\frac{1}{W} & \frac{1}{W} & 0 \\ -\frac{1}{H} & 0 & \frac{1}{H} \\ 1 & 0 & 0 \end{pmatrix} \begin{pmatrix} y'_0 \\ y'_1 \\ y'_2 \end{pmatrix}$$

Similarly, other parameter models can be reconstructed by solving the linear system determined by the motion vectors of reference points.

For efficient representation, in MPEG-4 the motion vectors may be transmitted differentially. Suppose a 4-parameter model is used. Then, the motion vector ($MX_0$, $MY_0$) for grid point $z_0$ will be coded as is, while the motion vector for grid point $z_3$ will be coded differentially by using ($MX_3 - MX_0$, $MY_3 - MY_0$) [21]. The differentials are encoded using the exponential-Golomb code.

An exponential-Golomb code, or exp-Golomb code for short, is a type of universal code used to encode any non-negative integer. The following rule can be used to encode a non-negative integer n with exp-Golomb code: 1) represent n+1 in and write that number of zero bits preceding the previous bit string; 2) since motion vector differentials are not strictly non-negative integers, in MPEG-4 standard they are converted to non-negative binary digits; and 3) count the number of digits in binary representation of n+1, subtract one representation. The motion vector differential value m is represented as $v_m$ as follows:

$$v_m = \begin{cases} 2m - 1 & \text{when } m > 0, \\ -2m & \text{when } m \le 0. \end{cases}$$

In Table 2 below, the first 11 exp-Golomb codes for integers (m) and non-negative integers ($v_m$) are illustrated.

TABLE 2

| m | $v_m$ | Exp-Golomb Code | Bit Length |
|---|---|---|---|
| 0 | 0 | 1 | 1 |
| 1 | 1 | 010 | 3 |
| −1 | 2 | 011 | 3 |
| 2 | 3 | 00100 | 5 |
| −2 | 4 | 00101 | 5 |
| 3 | 5 | 00110 | 5 |
| −3 | 6 | 00111 | 5 |
| 4 | 7 | 0001000 | 7 |
| −4 | 8 | 0001001 | 7 |
| 5 | 9 | 0001010 | 7 |
| −5 | 10 | 0001011 | 7 |
| ... | ... | ... | ... |

Table 2, above, shows the first few exp-Golomb codes. For example, if a motion vector (differential) in MPEG-4 to be coded is −1, the encoder may represent it with a 3-bit codeword "011". This representation may be efficient since the probability of differentials is similar to the probability distribution represented by exp-Golomb coding.

Preprocessing

Detecting a scene change may be necessary in order to properly reset the algorithm parameters in some implementations. Generally speaking, any generic scene change detector can be used in this step; however, we use an advanced scene change detector (SCD), which reliably and efficiently performs scene change detection as the pre-processing stage. In scene change detection, each input frame at original pixel resolution is passed into the SCD algorithm, which computes a scene change flag scf. If the flag is on, the current frame is a part of the new scene and the buffer of past GMM parameters is initialized.

Motion Estimation

The proposed global motion modeling approach uses block-based motion vector field as a basis from which the model is computed. Although in general, any block-based motion estimator could be used to compute a motion vector field, one such estimator may be based on GPU graphics hardware-accelerated VME routines. Hardware-accelerated motion estimation approach allows for a significantly faster processing.

VME is a motion estimation routine which, relying on a graphics GPU, estimates motion vector field at one or more block accuracies. In some implementation described herein, VME may be used to obtain block-based motion vector fields at 16×16 and 8×8 levels. VME routine may use full search motion estimation method with a given search range. Unfortunately, the maximum VME search range is often limited and cannot handle very fast moving areas and/or larger distances between current and reference frames. Therefore, a multistage VME-based method may be used for block-based motion estimation in order to support larger search ranges. In particular, a 3-stage VME method may be used, which is described next.

A multistage VME may use subsampled frames in the previous stage in order to estimate the initial motion vectors for the current frame, e.g., the starting position of the VME motion search for each block. The subsampling factor may depend on the stage number as well as the frame resolution. In the first stage, the current and reference frames of low definition sequences are subsampled in each direction by 8. If a frame width is smaller than 600, frame height is smaller than 300, and the product of frame width and height is smaller than 180,000, then sequence is classified as the low definition sequence. On the other hand, the first stage for other (larger) resolutions may uses subsampling factor of 16 in each direction. Subsampling in $2^{nd}$ stage is by 4 in each direction for all resolutions. Finally, a $3^{rd}$ (final) stage VME may use full resolution frames and produces motion vector fields at 16×16 and 8×8 block accuracies. One such example of such a 3-stage VME algorithm may include the following steps:

1. If H<300 and W<600 and W×H<180,000 then set ld=1; otherwise set ld=0.
2. Given the current frame F and the reference frame $F_{ref}$, create subsampled luma frames SF' and SF'$_{ref}$ as the input to the $1^{st}$ stage VME. The subsampling is performed in each direction by 8 if ld=1 and by 16 if ld=0.
3. Perform $1^{st}$ stage VME routine using SF' and SF'$_{ref}$ with search range set to 64×32.
4. Filter and resize output of $1^{st}$ stage motion vector field to create input to $2^{nd}$ stage as follows:
   a. Remove isolated noise-like motion vectors from the 16×16 and 8×8 output motion vector fields. For a given vector ($mx_{(j,i)}$, $my_{(j,i)}$) at subsampled position (j, i) where w and h are subsampled motion vector field width and height (respectively), do:
      i. If j>0 set $d_L$=abs($mx_{(j,i)}$−$mx_{(j−1,i)}$)+abs($my_{(j,i)}$−$my_{(j−1,i)}$); otherwise set $d_L$=∞.
      ii. If i>0 set $d_T$=abs($mx_{(j,i)}$−$mx_{(j,i−1)}$)+abs($my_{(j,i)}$−$my_{(j,i−1)}$); otherwise set $d_T$=∞.
      iii. If j<w−1 set $d_R$=abs($mx_{(j,i)}$−$mx_{(j+1,i)}$)+abs($my_{(j,i)}$−$my_{(j+1,i)}$); otherwise set $d_R$=∞.
      iv. If i<h−1 set $d_B$=abs($mx_{(j,i)}$−$mx_{(j,i+1)}$)+abs($my_{(j,i)}$−$my_{(j,i+1)}$); otherwise set $d_B$=∞.

v. Set d=min($d_L$, $d_T$, $d_R$, $d_B$)
vi. If d>T (in our implementation T=16) then do the following:
1. If d=$d_L$ then replace ($mx_{(j,i)}$, $my_{(j,i)}$) with ($mx_{(j-1,i)}$, $my_{(j-1,i)}$)
2. Else If d=$d_T$ replace ($mx_{(j,i)}$, $my_{(j,i)}$) with ($mx_{(j,i-1)}$, $my_{(j,i-1)}$)
3. Else If d=$d_R$ replace ($mx_{(j,i)}$, $my_{(j,i)}$) with ($mx_{(j,i+1)}$, $my_{(j,i+1)}$)
4. Else If d=$d_B$ replace ($mx_{(j,i)}$, $my_{(j,i)}$) with ($mx_{(j,i+1)}$, $my_{(j,i+1)}$)
b. Merge 16×16 and 8×8 output motion vectors into merged 8×8 motion vector field: if SAD of a 16×16 block is up to 2% higher than sum of 4 collocated 8×8 blocks, then use repeat motion vector of a 16×16 block into the merged field; otherwise, otherwise copy 4 collocated motion vectors from 8×8 motion vector field. Note that here, for low definition sequences the resulting 8×8 block size in the sub-sampled resolution corresponds to 64×64 block size in the original full resolution, while in the other (higher) resolutions it corresponds to a 128×128 blocks in the original resolution.
c. Up-sample (resize) the merged motion vector field in each dimension by 2 for low definition and by 4 for other resolutions. Also for other resolutions, rescale motion vectors in the merged motion vector field by 2 (i.e., multiply each coordinate by 2).
5. Use the resulting merged motion vector field as the input motion vectors for $2^{nd}$ stage VME
6. Given the current frame F and the reference frame $F_{ref}$, create subsampled luma frames SF and $SF_{ref}$ as the input to the $2^{nd}$ stage VME. The subsampling is performed in each direction by 4.
7. Perform $2^{nd}$ stage VME routine using SF and $SF_{ref}$ with search range set to 64×32.
8. Filter and resize output of $2^{nd}$ stage motion vector field to create input to $3^{rd}$ stage as follows:
a. Remove isolated noise-like motion vectors from the 16×16 and 8×8 output motion vector fields. For a given vector ($mx_{(j,i)}$, $my_{(j,i)}$) at subsampled position (j, i) where w and h are subsampled motion vector field width and height (respectively), using same algorithm as in 4.a.
b. Merge 16×16 and 8×8 output motion vectors into merged 8×8 motion vector field as in 4.b
c. Compute median merged motion vector field by applying 5×5 median filter to merged motion vector field
d. Compute block based SAD for both merged MVF and median merged MMF using the current luma frame SF and the reference luma frame $SF_{ref}$
e. Create final merged motion vector field by choosing either vector from merged MVF of from median merged MMF, depending on which one of the two has a smaller block SAD.
f. Up-sample (resize) the final merged motion vector field in each dimension by 4, and rescale motion vectors in the merged motion vector field by 2 (i.e., multiply each coordinate by 2).
9. Use the resulting merged motion vector field as the input motion vectors for $3^{rd}$ stage VME
10. Perform $3^{rd}$ stage VME routine using SF and $SF_{ref}$ with search range set to 64×32.

The output of the 3-stage VME algorithm includes 16×16 and 8×8 block-based motion vector fields (e.g., where block size is relative to full frame resolution). Next how these vectors are filtered is described so that noisy matches during motion estimation stage are removed and replaced with more correct motion vectors in respect to the actual motion of the underlying visual objects in the scene.

Motion Vector Filtering

The motion estimation search often creates incorrect motion vector matches, referred to as outlier motion vectors. The outlier motion vectors are created because of the random matches during motion estimation phase and they do not correspond to the actual motion. Outliers occur either in flat areas or in blocks that contain edges/texture patterns that are prone to the aperture problem. The aperture problem refers to the fact that the motion of a visual object, which resembles a repeated 1-dimensional pattern (e.g. a bar or an edge) cannot be determined unambiguously when viewed through a small aperture (e.g. a block size window in block-based motion estimation). This is exactly what is happening during block-based motion estimation phase.

Incorrect motion vectors, even though they have small prediction error, can quite negatively affect global motion estimation phase. If several incorrect vectors are used to compute global motion the equation would be incorrect and thus global motion error would be large.

In order to cope with this problem, some implementations described herein are designed and implemented with a motion filtering method that reduces motion vector outliers and improves the motion vector field used for global motion estimation, as will be described in greater detail below.

Figure 11:
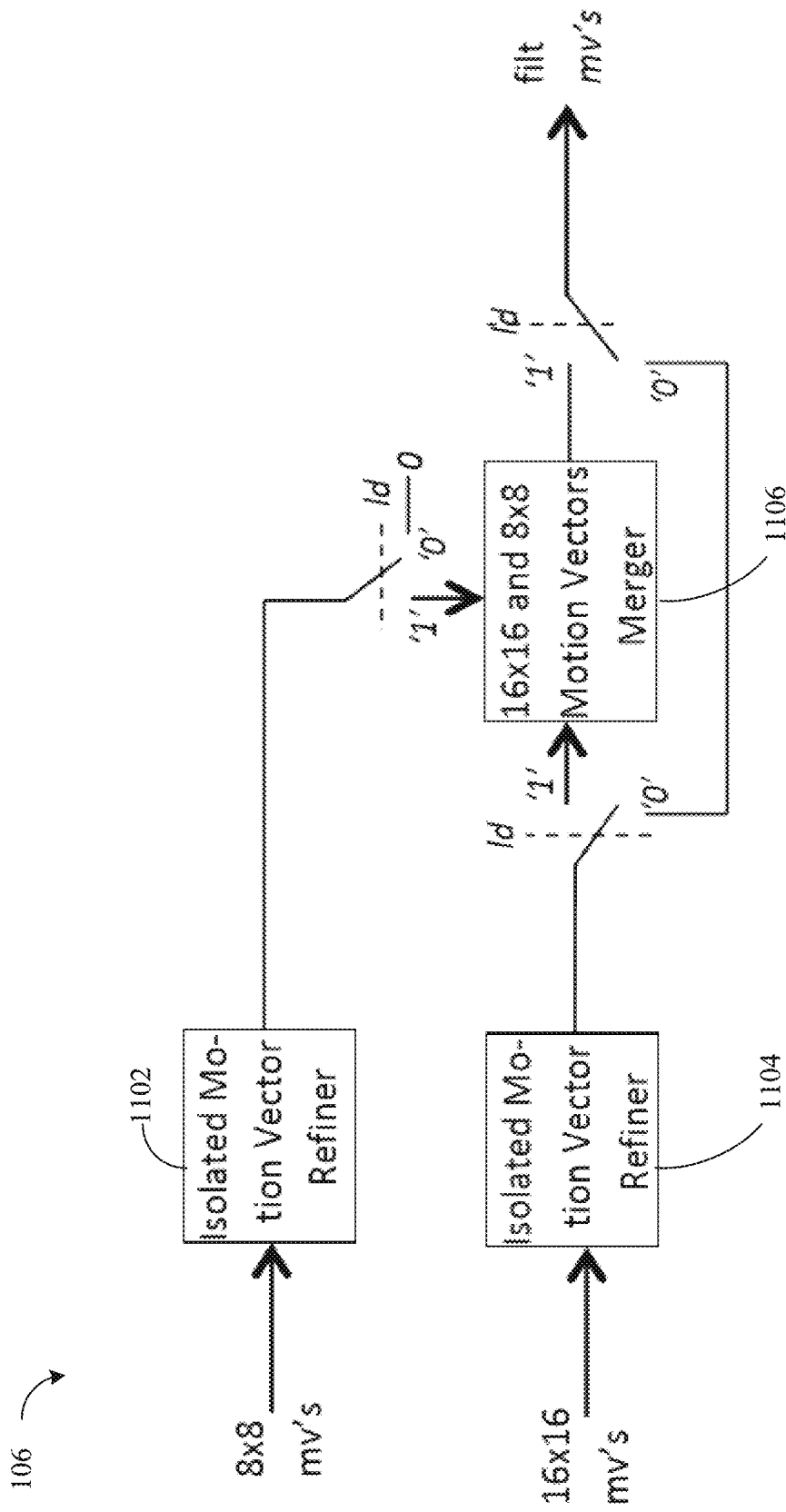
FIG. 11 is an illustrative block diagram of an example local motion field noise reduction filter according to an embodiment.

FIG. 11 is an illustrative block diagram of an example local motion field noise reduction filter, arranged in accordance with at least some implementations of the present disclosure. In various implementations of local motion field noise reduction filter 106, an ld signal may be used to switch between filtering 8×8 block-based motion vectors at isolated motion vector refiner 1102 and filtering 16×16 block-based motion vectors at isolated motion vector refiner 1104. The signal value may be previously set to ld=1 if the sequence is a low-definition sequence, or to ld=0 otherwise. For low definition sequences, the input may be an 8×8 block-based motion vector field, which is then filtered in 2 steps: (1) by removing isolated motion vectors (e.g., motion vectors that are very different than its 4 direct neighbors) at isolated motion vector refiner 1102, and (2) by merging some 4 8×8 vectors into a single collocated 16×16 vector at 16×16 and 8×8 motion vectors merger 1106. For other resolutions the filtering is in performed in one step, simply by removing of the isolated motion vectors. The isolated motion vectors removal may be performed by comparing the sum of absolute differences (SAD) coordinate-wise between a motion vector and its top, left, right and bottom direct neighbors. If all 4 differences are larger than the similarity threshold (e.g., which in some implementations may be set to 16, for example) then the vector is replaced with the smallest sum of absolute differences (SAD) of a corresponding direct neighbor.

In case of low definition sequences, the merging step may be performed by computing the sum of SADs of the 4 8×8 vectors in the 8×8 field and comparing it to the SAD of the collocated 16×16 motion vector. If the SAD of the 16×16 vector is within a small percentage (e.g., 1%) of error from the sum of 4 collocated 8×8s, then the 4 8×8 vectors may be merged and replaced with the single 16×6 collocated vector. One example of such an algorithm may include the following steps:

1. If H<300 and W<600 and W×H<180,000 then set ld=1; otherwise set ld=0.
2. If ld=1 then do the following:
   a. Remove isolated noise-like motion vectors from the 16×16 and 8×8 output motion vector fields. For a given vector ($mx_{(j,i)}$, $my_{(j,i)}$) at subsampled position (j, i) where w and h are subsampled motion vector field width and height (respectively), do:
      i. If j>0 set $d_L$=abs($mx_{(j,i)}$−$mx_{(j−1,i)}$)+abs($my_{(j,i)}$−$my_{(j−1,i)}$); otherwise set $d_L$=∞.
      ii. If i>0 set $d_T$=abs($mx_{(j,i)}$−$mx_{(j,i−1)}$)+abs($my_{(j,i)}$−$my_{(j,i−1)}$); otherwise set $d_T$=∞.
      iii. If j<w−1 set $d_R$=abs($mx_{(j,i)}$−$mx_{(j+1,i)}$)+abs($my_{(j,i)}$−$my_{(j,i+1)}$); otherwise set $d_R$=∞.
      iv. If i<h−1 set $d_B$=abs($mx_{(j,i)}$−$mx_{(j,i+1)}$)+abs($my_{(j,i)}$−$my_{(j,i+1)}$); otherwise set $d_B$=∞.
      v. Set d=min($d_L$, $d_T$, $d_R$, $d_B$)
      vi. If d>T (in our implementation T=16) then do the following:
         1. If d=$d_L$ then replace ($mx_{(j,i)}$, $my_{(j,i)}$) with ($mx_{(j−1,i)}$, $my_{(j−1,i)}$)
         2. Else If d=$d_T$ replace ($mx_{(j,i)}$, $my_{(j,i)}$) with ($mx_{(j,i−1)}$, $my_{(j,i−1)}$)
         3. Else If d=$d_R$ replace ($mx_{(j,i)}$, $my_{(j,i)}$) with ($mx_{(j+1,i)}$, $my_{(j+1,i)}$)
         4. Else If d=$d_B$ replace ($mx_{(j,i)}$, $my_{(j,i)}$) with ($mx_{(j+1,i)}$, $my_{(j+1,i)}$)
   b. Merge 16×16 and 8×8 output motion vectors into merged 8×8 motion vector field: if SAD of a 16×16 block is up to 2% higher than sum of 4 collocated 8×8 blocks, then use repeat motion vector of a 16×16 block into the merged field; otherwise, otherwise copy 4 collocated motion vectors from 8×8 motion vector field. Note that here, for low definition sequences the resulting 8×8 block size in the subsampled resolution corresponds to 64×64 block size in the original full resolution, while in the other (higher) resolutions it corresponds to a 128×128 blocks in the original resolution.
   c. Output merged 8×8 motion vector field to be used for computing the global motion model parameters
3. Otherwise if ld=0 then do the following:
   a. Remove isolated noise-like motion vectors from the 16×16 motion vector field. For a given vector ($mx_{(j,i)}$, $my_{(j,i)}$) at subsampled position (j, i) where w and h are subsampled motion vector field width and height (respectively), do:
      i. If j>0 set $d_L$=abs($mx_{(j,i)}$−$mx_{(j−1,i)}$)+abs($my_{(j,i)}$−$my_{(j−1,i)}$); otherwise set $d_L$=∞.
      ii. If i>0 set $d_T$=abs($mx_{(j,i)}$−$mx_{(j,i−1)}$)+abs($my_{(j,i)}$−$my_{(j,i−1)}$); otherwise set $d_T$=∞.
      iii. If j<w−1 set $d_R$=abs($mx_{(j,i)}$−$mx_{(j+1,i)}$)+abs($my_{(j,i)}$−$my_{(j+1,i)}$); otherwise set $d_R$=∞.
      iv. If i<h−1 set $d_B$=abs($mx_{(j,i)}$−$mx_{(j,i+1)}$)+abs($my_{(j,i)}$−$my_{(j,i+1)}$); otherwise set $d_B$=∞.
      v. Set d=min($d_L$, $d_T$, $d_R$, $d_B$)
      vi. If d>T (in our implementation T=16) then do the following:
         1. If d=$d_L$ then replace ($mx_{(j,i)}$, $my_{(j,i)}$) with ($mx_{(j−1,i)}$, $my_{(j−1,i)}$)
         2. Else If d=$d_T$ replace ($mx_{(j,i)}$, $my_{(j,i)}$) with ($mx_{(j−1,i)}$, $my_{(j−1,i)}$)
         3. Else If d=$d_R$ replace ($mx_{(j,i)}$, $my_{(j,i)}$) with ($mx_{(j+1,i)}$, $my_{(j+1,i)}$)
         4. Else If d=$d_B$ replace ($mx_{(j,i)}$, $my_{(j,i)}$) with ($mx_{(j+1,i)}$, $my_{(j+1,i)}$)
   b. Output the filtered 16×16 motion vector field to be used for computing the global motion model parameters Global Motion Model Generation Several factors impact the quality of estimated global motion from the given motion vector field. For example, the number of parameters and the model type, the GMM computation method (least squares, LMA), or a sub-pixel filtering method, all affect the quality of GMM estimation. However, the most important factor may be the selection of motion vectors from which global motion model parameters are computed. In a typical video scene there are many blocks whose motion does not correspond to the globally moving area. Blocks whose motion corresponds to locally moving objects, blocks that contain incorrect motion estimate (e.g., due to aperture effect or insufficient search range), or blocks that belong to uncovered area (e.g., a new area which enters the scene and it is not present in the reference frames), are all examples of blocks that are not part of the global motion in the scene. If a significant number of such non-globally moving blocks are used in the GMM estimation process, the computed model is inaccurate and it causes a large SAD error. Unfortunately, determining which blocks are truly part of globally moving area and which blocks are not, is not an easy task.

Generally, past research proposals tackle this problem in two different ways. One group of approaches uses statistical methods to eliminate the outlier motion blocks. Methods that rely on Helmholtz principle are examples of this group. The second group of approaches uses some form of segmentation as a pre-processing operation in order to directly estimate foreground/background regions. Here, background region is assumed to be pertinent to globally moving area and corresponding blocks within the frame are selected and used for global motion estimation. All other blocks (i.e., foreground corresponding blocks) are eliminated from the computation. In one such example, a coarse k-means segmentation may be used to estimate background moving region from which a global motion is computed.

Figure 12:
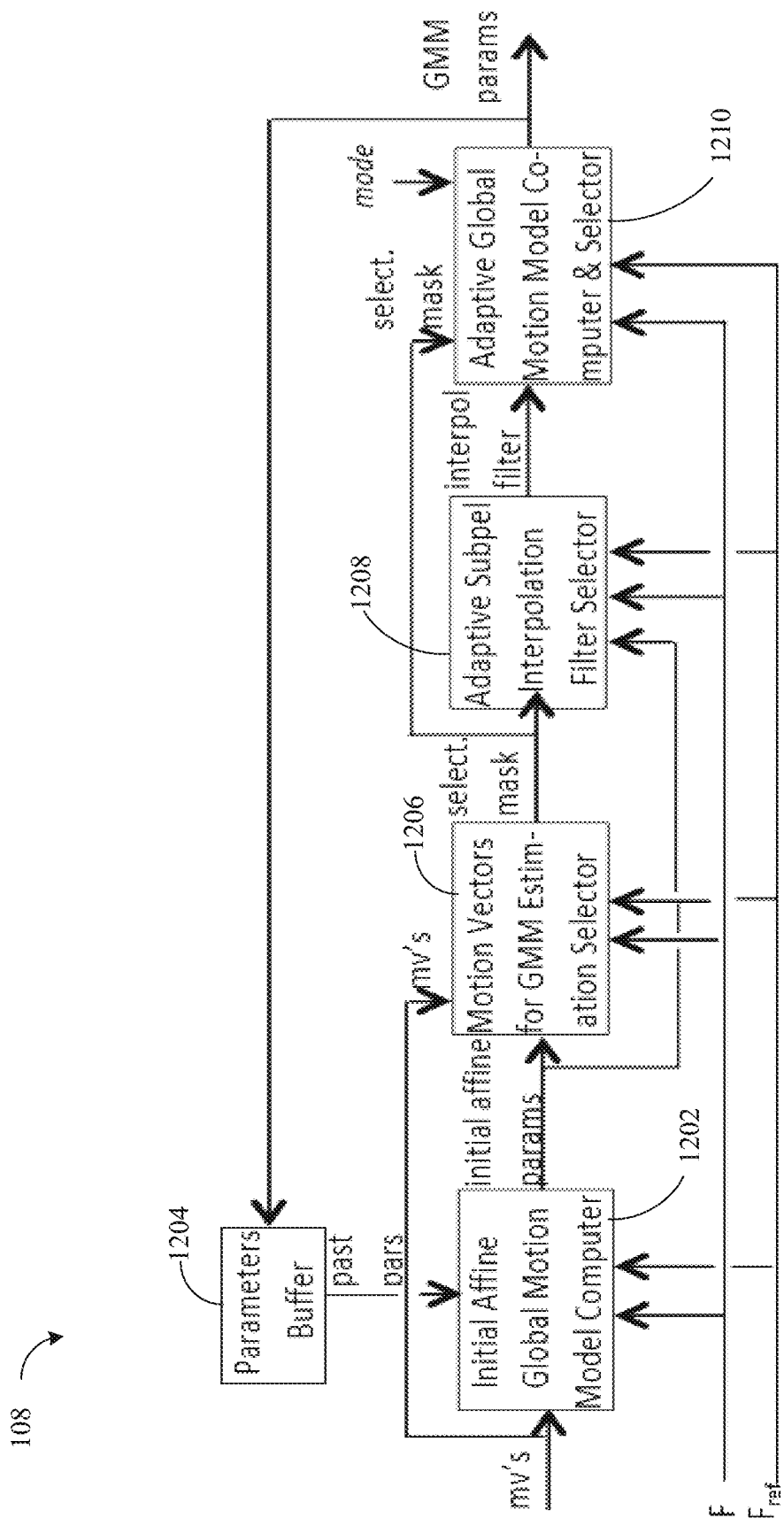
FIG. 12 is an illustrative block diagram of an example multiple global motion estimator and modeler according to an embodiment.

FIG. 12 is an illustrative block diagram of an example multiple global motion estimator and modeler 108, arranged in accordance with at least some implementations of the present disclosure. In various implementations, multiple global motion estimator and modeler 108 may include an initial affine global motion model computer 1202, a parameters buffer 1204, a motion vectors for GMM estimation selector 1206, an adaptive sub-pel interpolation filter selector 1208, and an adaptive global motion model computer and selector 1210.

FIG. 12 illustrates an example where the portion of the algorithm in which the final global motion model parameters for the frame are estimated. In the first step, the input motion vectors may be used to compute the initial affine 6-parameter model by random sampling via initial affine global motion model computer 1202. This step also uses parameters buffer 1204 of previous affine parameters to select the best affine model based on estimated error (e.g., subsampled frame SAD, which uses the current frame and the reference frame as input).

Once the initial affine model is computed, the next step is to select motion vectors to be used for final GMM parameters estimation via motion vectors for GMM estimation selector 1206. This step aims to remove the vectors belonging to the locally moving blocks as well as the remaining noisy vectors from the motion estimation phase. The pool of candidate masks may be computed and the best selection mask may be selected (e.g., based on the smallest subsampled SAD).

In the following step, the sub-pixel filtering method is selected from the 4 different filters via adaptive sub-pel interpolation filter selector 1208. For example, there may be several (e.g., 4) predefined filters in the systems described herein. In a 4 filter example the filters may include: (1) $\frac{1}{16}^{th}$-pel smooth texture filter (bilinear), (2) $\frac{1}{16}^{th}$-pel medium texture filter (bicubic), (3) $\frac{1}{8}^{th}$-pel medium sharp texture filter (modified AVC filter), and (4) $\frac{1}{8}^{th}$-pel sharp texture filter (modified HEVC filter). The best filter may be selected based on measured subsampled frame SAD.

Finally, given the previously computed selection mask, interpolation filter and the current and reference frames the last step is to adaptively choose the motion model to represent global motion in the current frame via adaptive global motion model computer and selector 1210. Depending on the value of the control signal mode, either standard or high-complexity models are used as candidates. If the value of the signal mode=0, the system may adaptively select one of the following models: (1) translational 4-parameter model, (2) affine 6-parameter model, and (3) pseudo-perspective 8-parameter model. On the other hand, if mode=1 the system may select between: (1) affine 6-parameter model, (2) pseudo-perspective 8-parameter model, and (3) bi-quadratic 12-parameter model.

In one such proposed GMM method, a hybrid type of approach may be used to select globally moving blocks. Such a scheme typically outperforms a method that solely relies on one type of approach. This is due to the fact that both types (groups) of approaches are highly stochastic in nature, and often one of them yields a more accurate estimate. A hybrid method helps ensure that the best type is selected for the given content. In the next two subsections some approaches are described for selecting globally moving blocks in detail.

Initial Global Motion Model Generation

In some implementations described herein, the first step in estimating global motion parameters may be to compute an initial affine 6-parameter global motion model by random sampling. An advantage of random sampling based global motion estimation is that it provides statistics from which a stable model can be deduced.

An affine global motion model may include 6 unknown parameters that are to be estimated, and therefore any 3 chosen motion vectors $(MX_0, MY_0)$, $(MX_1, MY_1)$ and $(MX_2, MY_2)$ at positions $(x_0, y_0)$, $(x_1, y_1)$ and $(x_2, y_2)$ from the motion vector field can be used to solve the system of equations for the parameters (provided they form the independent system) as follows:

$$a_0 = \frac{x'_0(y_1 - y_2) - x'_1(y_0 - y_2) + x'_2(y_0 - y_1)}{x_0 y_1 - x_0 y_2 - x_1 y_0 + x_1 y_2 + x_2 y_0 - x_2 y_1}$$

$$a_1 = \frac{-x'_0(x_1 - x_2) + x'_1(x_0 - x_2) - x'_2(x_0 - x_1)}{x_0 y_1 - x_0 y_2 - x_1 y_0 + x_1 y_2 + x_2 y_0 - x_2 y_1}$$

$$a_2 = \frac{x'_0(x_1 y_2 - x_2 y_1) - x'_1(x_0 y_2 - x_2 y_0) + x'_2(x_0 y_1 - x_1 y_0)}{x_0 y_1 - x_0 y_2 - x_1 y_0 + x_1 y_2 + x_2 y_0 - x_2 y_1}$$

$$a_3 = \frac{y'_0(y_1 - y_2) - y'_1(y_0 - y_2) + y'_2(y_0 - y_1)}{x_0 y_1 - x_0 y_2 - x_1 y_0 + x_1 y_2 + x_2 y_0 - x_2 y_1}$$

$$a_4 = \frac{-y'_0(x_1 - x_2) + y'_1(x_0 - x_2) - y'_2(x_0 - x_1)}{x_0 y_1 - x_0 y_2 - x_1 y_0 + x_1 y_2 + x_2 y_0 - x_2 y_1}$$

-continued $$a_5 = \frac{y'_0(x_1 y_2 - x_2 y_1) - y'_1(x_0 y_2 - x_2 y_0) + y'_2(x_0 y_1 - x_1 y_0)}{x_0 y_1 - x_0 y_2 - x_1 y_0 + x_1 y_2 + x_2 y_0 - x_2 y_1}$$

Where $x'_i = x_i + MX_i$ and $y'_i = y_i + MY_i$ for $i = \{0,1,2\}$.

Figure 13:
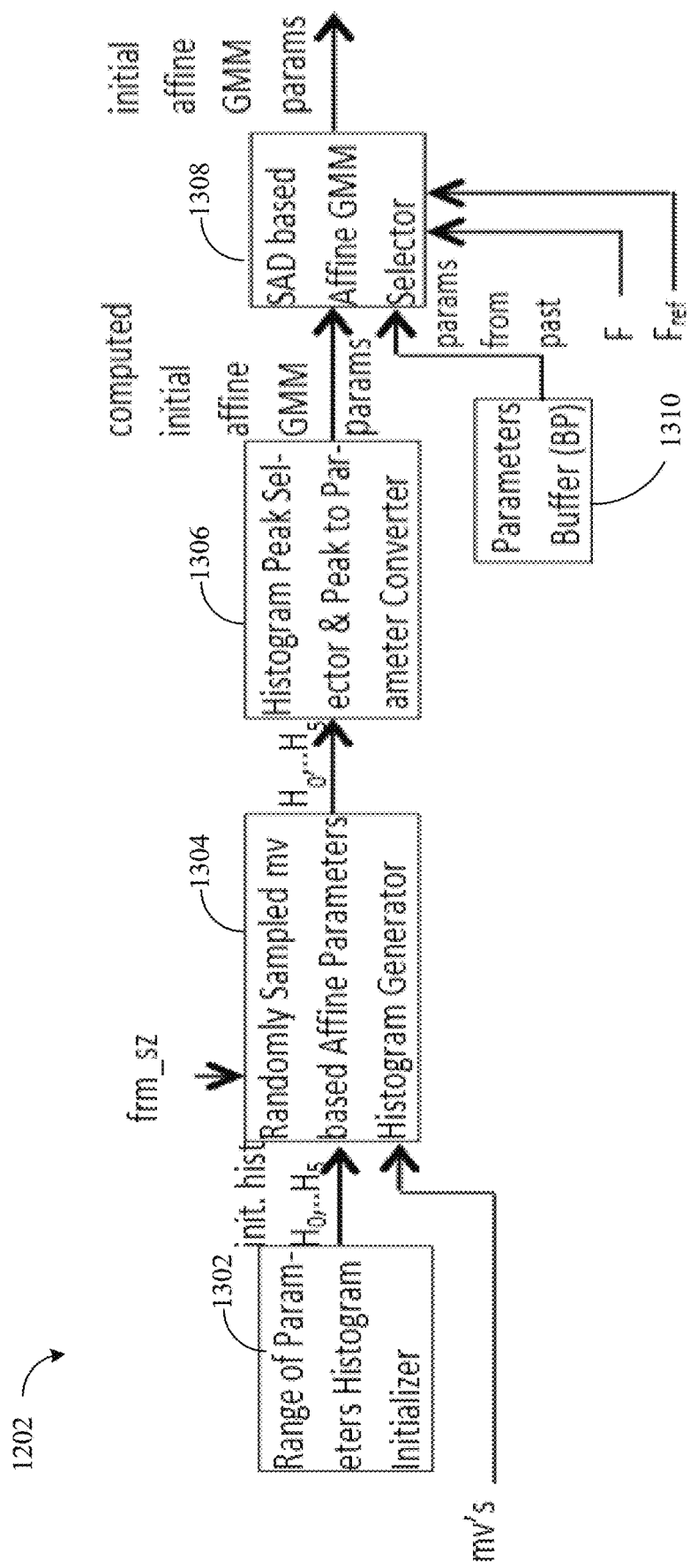
FIG. 13 is an illustrative block diagram of an example initial global motion model computer according to an embodiment.

FIG. 13 is an illustrative block diagram of an example initial affine global motion model computer 1202, arranged in accordance with at least some implementations of the present disclosure. In various implementations, initial affine global motion model computer 1202 may include a range of parameters histogram initializer 1302, a randomly sampled MV (e.g., motion vector) based affine parameters histogram generator 1304, a histogram peak selector and peak to parameter converter 1306, an SAD based affine GMM Selector 1308, and a parameters buffer 1310.

In the illustrated example, FIG. 13 shows details of the initial affine global motion model computer 1202 of FIG. 12. As illustrated, initial affine global motion model computer 1202 may compute the initial affine 6-parameter model. In the illustrated example, first, the range histograms are initialized to all 0 counts via range of parameters histogram initializer 1302. Ranges of the histogram may be determined empirically as described previously.

Next, in one example implementation, for the given block-based motion vector field, three MVs (or another suitable number) may be chosen at random frm_sz times via randomly sampled MV (e.g., motion vector) based affine parameters histogram generator 1304. For each triple of randomly selected MVs, a 6-parameter motion model may be computed using least squares approach. Then, each of the 6 parameters may be mapped to a range in the corresponding histogram and histogram count in that range is increased.

After the histograms are collected, in one example implementation, the next step may be to analyze and select the highest histogram peaks via histogram peak selector and peak to parameter converter 1306. For each selected peak, a parameter value may be computed as the mid-point of the given range. This results in an estimated 6-parameter affine global motion model for the frame.

In the final step, in one example implementation, previous models (e.g., up to 2) stored via a parameters buffer 1310 may be tested along with the computed model in order to select the model which yields the smallest subsampled SAD via SAD based affine GMM Selector 1308.

The number of motion vectors from which random samples are taken depends on the video resolution. For example, for standard and high definition, the block size may be set to 8; while for low definition sequences, the block size may be set to 16. If a frame width is smaller than 600, frame height is smaller than 300, and the product of frame width and height is smaller than 180,000, then sequence may be classified as the low definition sequence and the motion vector field from which the samples are taken is an 8×8 motion vector field, for example. Otherwise, 16×16 based motion vector field may be used as a pool from which random motion vector samples are drawn.

Figure 14:
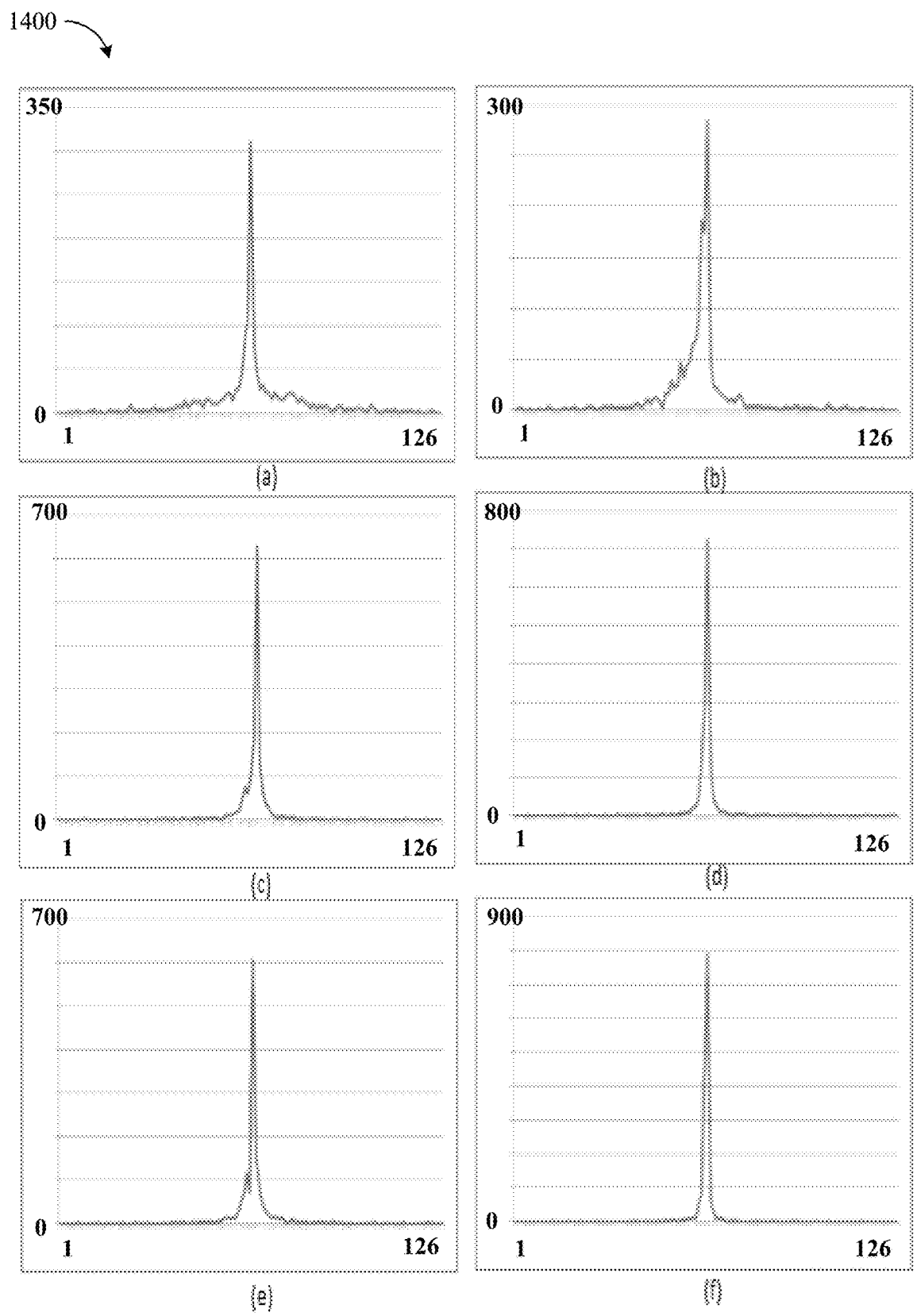
FIG. 14 is an illustrative chart of an example histogram distribution of locally computed affine global motion model parameters according to an embodiment.

The random sampling approach may use the equations above to solve for parameters $a_0, \ldots, a_5$ by selecting three motion vectors at random. The parameters computed from selected vectors that form an independent system are referred to as local parameters. After a large sample of local parameters are collected, statistical properties of collected data may be used to estimate a stable set of global motion parameters. The final random sampling based estimated parameters may be referred to as the initial affine global motion model. An example algorithm for the initial affine global motion model computation is described below:
1. Set N to a total number of motion vectors in the input motion vector field
2. Initialize 6 histograms $H_0, \ldots, H_5$ of a chosen size to 0. The histogram size, denoted here by $S_H$, determines how many bins are supported by each of the 6 histograms. More bins means more precision of estimating a parameter within the parameter range. However, too many bins would create a flat-looking histogram and determining the correct peak would be harder. In our implementation we set $S_H=128$.
3. Select range of values for each parameter. We use the following ranges: $a_{0,4} \in [0.95, 1.05)$, $a_{1,3} \in [-0.1, 0,1)$, $a_2 \in [-64, 64)$, $a_5 \in [-48,48)$.
4. For each parameter assign (in our case 128) equidistant sub-ranges within the selected range to a bin in the histogram. For example, for parameter $a_0$, a range [0.95,1.05) is subdivided to 128 bins (sub-ranges): [0.95,0.95078125), [0.95078125,0.9515625), ..., [1.04921875,1.05).
5. For i=0 to N do the following:
   a. Pick 3 random positions and corresponding vectors in the motion vector field
   b. Compute local affine 6-parameter model from 3 points/vectors
   c. For each parameter determine the histogram bin whose sub-range the parameter value falls into
   d. If a parameter value falls in a valid sub-range, increment histogram count at the index of that sub-range
6. Detect 6 highest peaks in each of the 6 histograms and select corresponding sub-ranges.
7. Set the initial affine global motion model candidate to the parameters corresponding to the mid-value of their peak sub-range. For example, if a peak in $H_0$ is at $2^{nd}$ position, then the peak sub-range for parameter $a_0$ is [0.95078125,0.9515625) and the parameter $a_0$= (0.95078125+0.9515625)/2=0.951171875.
8. Add the previous two initial affine motion models to the candidate set (clearly, at the beginning of the scene nothing is added and after the first frame one model is added)
9. If there is only 1 candidate, select it as the initial affine motion model for the current frame. Otherwise, if the number of candidates is more than 1 then:
   a. Compute SAD measure of all candidates as follows. For each candidate:
      i. Create reconstructed frame at pixel accuracy using global motion model candidate parameters
      ii. Compute SAD between reconstructed frame pixels and current frame pixels
   b. Select candidate with smallest SAD as the initial affine motion model for the current frame FIG. 14 is an illustrative chart of an example histogram distribution 1400 of locally computed affine global motion model parameters, arranged in accordance with at least some implementations of the present disclosure. In various implementations, histogram distribution 1400 illustrates locally computed affine global motion model parameters using random sampling for the "City" sequence where current frame is frame #1 and reference frame is frame #0. In the illustrated example, chart (a) shows an $H_0$ histogram where peak is in position 64 which corresponds to sub-range [1.0,1.00078125) so that parameter $a_0$ is set to the mid-point 1.000390625, chart (b) shows an $H_1$ histogram where peak is in position 64 which corresponds to sub-range [0.0, 0.0015625) so that parameter $a_1$ is set to the mid-point 0.00078125, chart (c) shows an $H_2$ histogram where peak is in position 66 which corresponds to sub-range [2.0,3.0) so that parameter $a_2$ is set to the mid-point 2.5, chart (d) shows an $H_3$ histogram where peak is in position 64 which corresponds to sub-range [0.0,0.0015625) so that parameter $a_3$ is set to the mid-point 0.00078125, chart (e) shows an $H_4$ histogram where peak is in position 64 which corresponds to sub-range [1.0,1.00078125) so that parameter $a_4$ is set to the mid-point 1.000390625, and chart (f) shows an $H_5$ histogram where peak is in position 64 which corresponds to sub-range [0.0,0.75) so that parameter $a_5$ is set to the mid-point 0.375.

Figure 15:
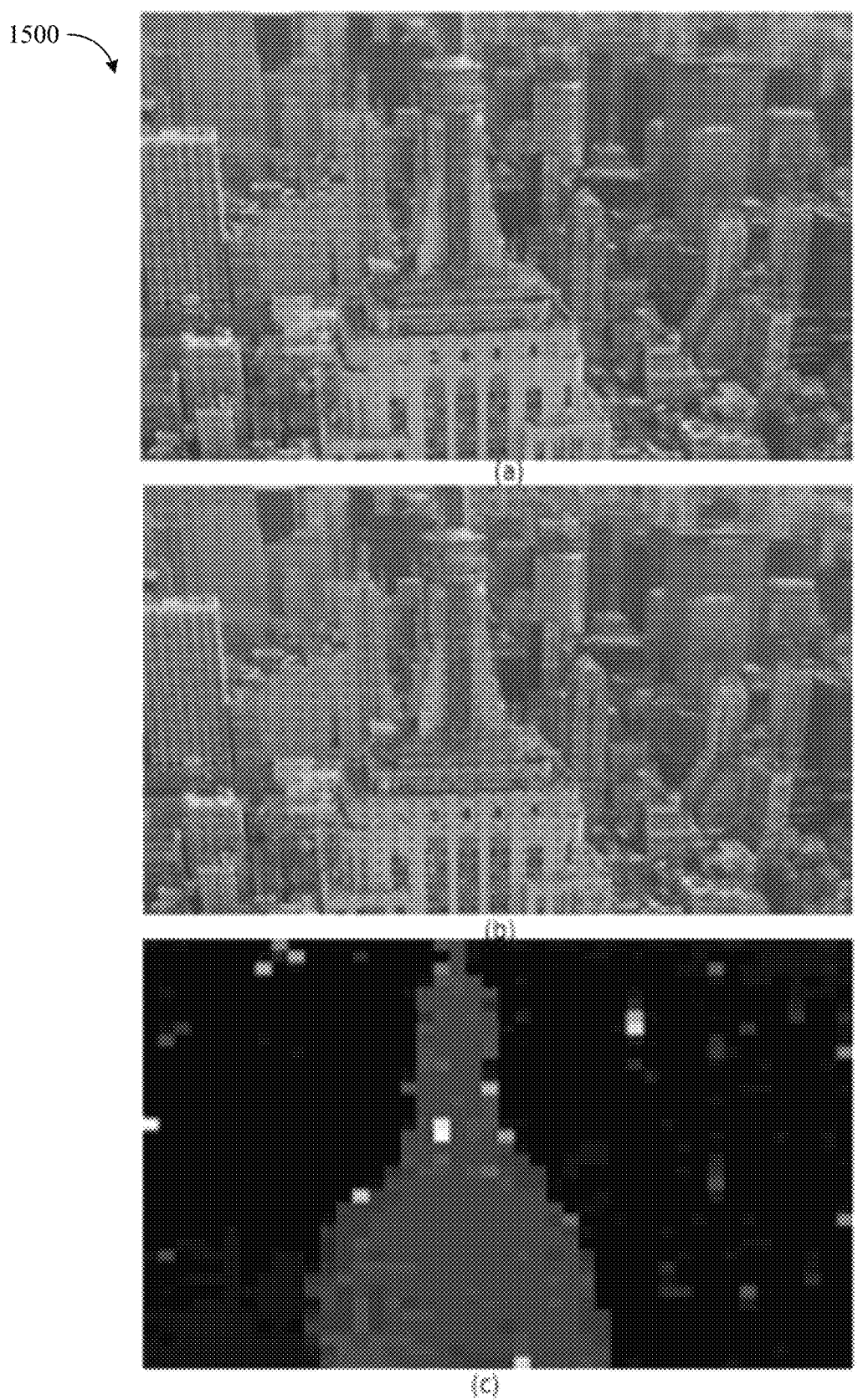
FIG. 15 is an illustrative video sequence of an example of the difference between global and local block based vectors according to an embodiment.

FIG. 15 is an illustrative video sequence 1500 of an example of the difference between global and local block based vectors, arranged in accordance with at least some implementations of the present disclosure. In various implementations, video sequence 1500 shows an example of the "City" sequence showing an initial affine global motion model from the previous figure, FIG. 14, where: frame (a) illustrates the current frame with an 8×8 block-based motion vector field shown with arrows, frame (b) illustrates the current frame with an 8×8 global motion vector field (also shown with arrows) derived from the computed initial affine global motion model, and frame (c) illustrates the difference heat map (e.g., darker shade indicate smaller differences between global and local block-based vectors, while lighter shade indicate larger differences).

Figure 16:
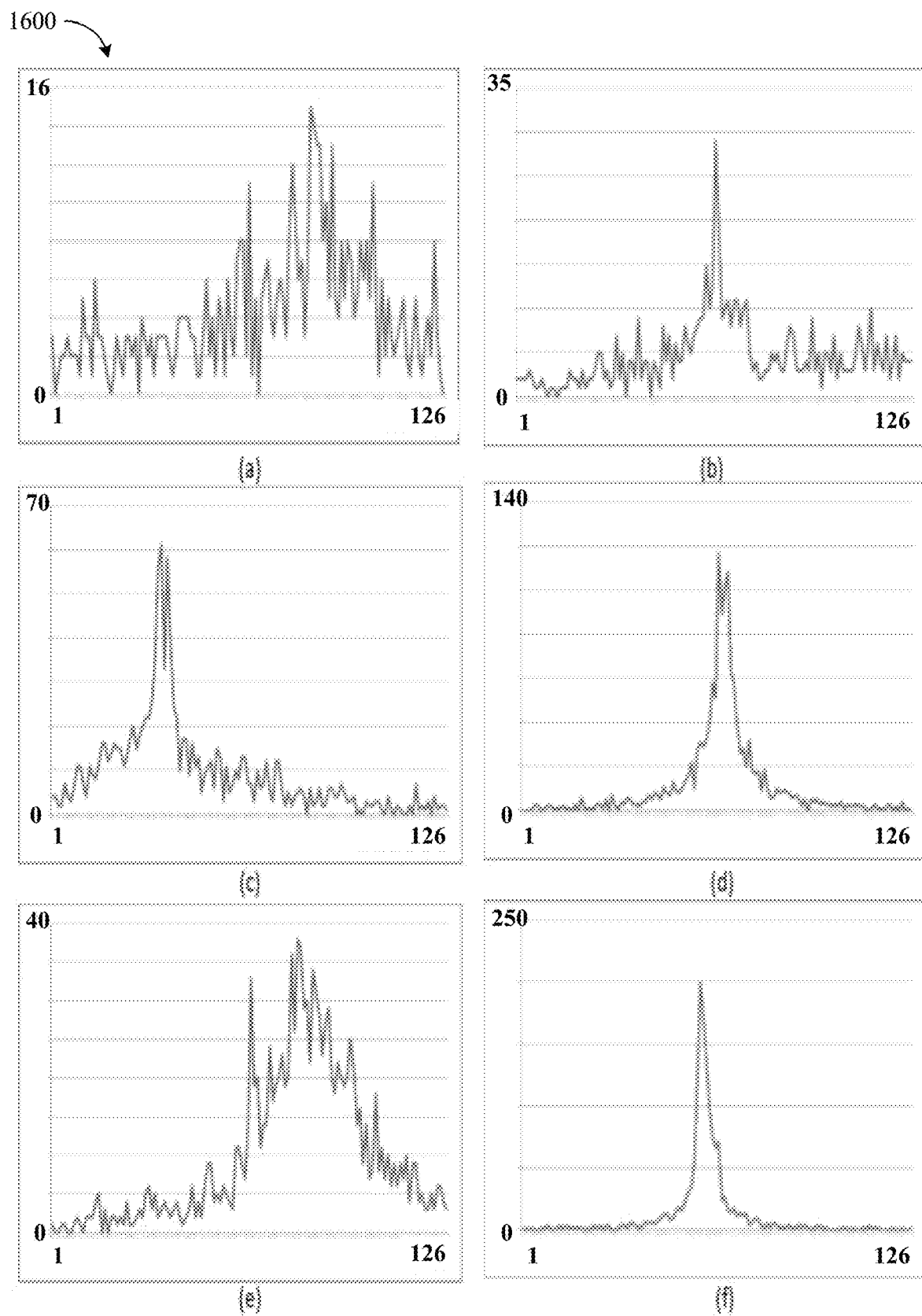
FIG. 16 is an illustrative chart of an example histogram distribution of locally computed affine global motion model parameters using a random sampling approach according to an embodiment.

FIG. 16 is an illustrative chart of an example histogram distribution 1600 of locally computed affine global motion model parameters using a random sampling approach, arranged in accordance with at least some implementations of the present disclosure. In various implementations, histogram distribution 1600 illustrates an example of histograms of locally computed affine global motion model parameters using random sampling approach for the "Stefan" sequence with current and reference frames being one frame apart. In the illustrated example, chart (a) shows an $H_0$ histogram where peak is in position 84 which corresponds to sub-range [1.015625,1.01640625) so that parameter $a_0$ is set to the mid-point 1.016015625, chart (b) shows an $H_1$ histogram where peak is in position 64 which corresponds to sub-range [0.0,0.0015625) so that parameter $a_1$ is set to the mid-point 0.00078125, chart (c) shows an $H_2$ histogram where peak is in position 35 which corresponds to sub-range [−29.0, −28.0) so that parameter $a_2$ is set to the mid-point −28.5, chart (d) shows an $H_3$ histogram where peak is in position 64 which corresponds to sub-range [0.0,0.0015625) so that parameter $a_3$ is set to the mid-point 0.00078125, chart (e) shows an $H_4$ histogram where peak is in position 79 which corresponds to sub-range [1.01171875,1.0125) so that parameter $a_4$ is set to the mid-point 1.012109375, and chart (f) an shows $H_5$ histogram where peak is in position 58 which corresponds to sub-range [−4.5, −3.75) so that parameter $a_5$ is set to the mid-point −4.125.

Figure 17:
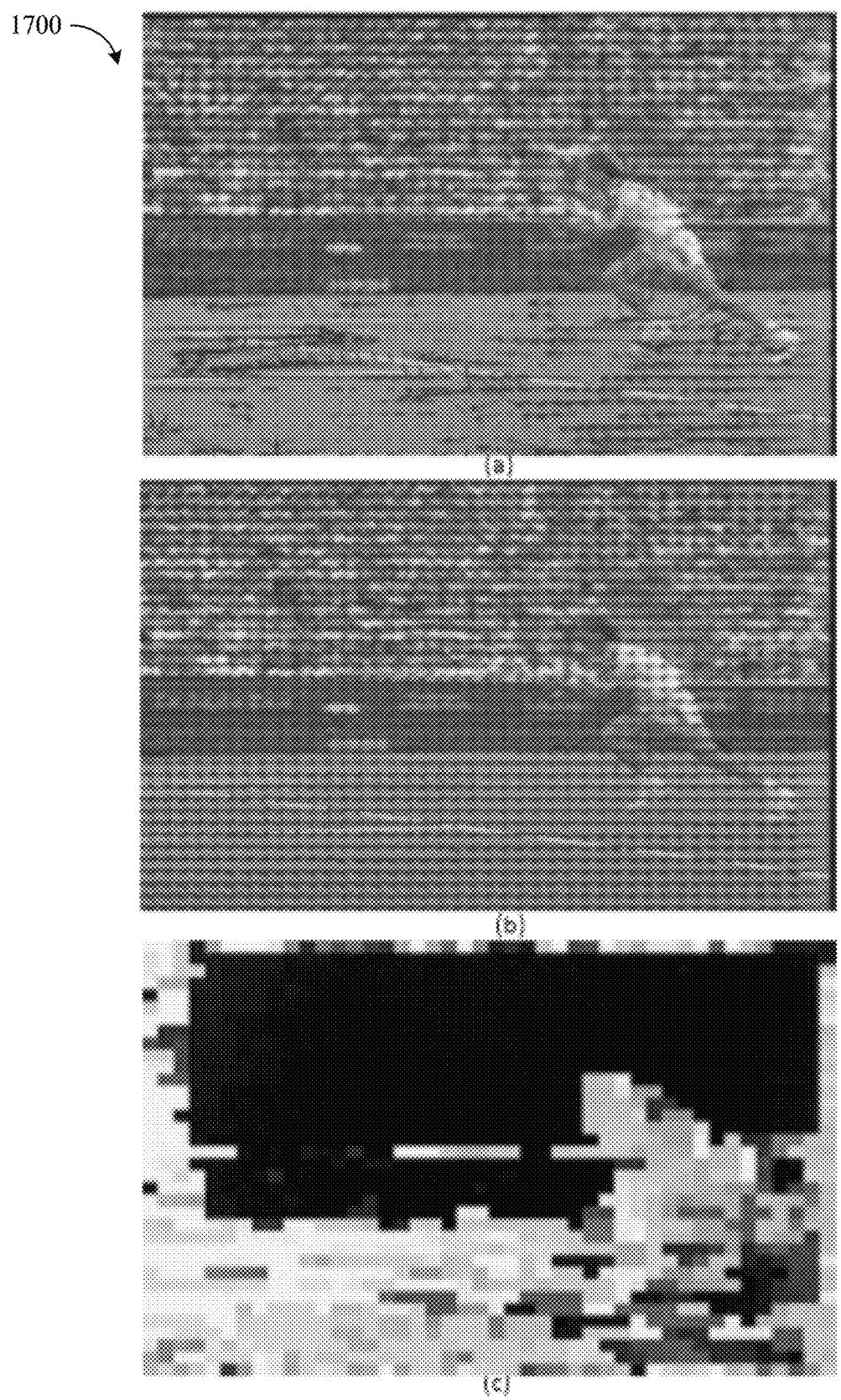
FIG. 17 is an illustrative video sequence of an example of the difference between global and local block based vectors according to an embodiment.

FIG. 17 is an illustrative video sequence 1700 of an example of the difference between global and local block based vectors, arranged in accordance with at least some implementations of the present disclosure. In various implementations, video sequence 1700 illustrates an example of the "Stefan" sequence showing an initial affine global motion model from the previous figure, FIG. 16. In the illustrated example, frame (a) illustrates the current frame with an 8×8 block-based motion vector field (shown with arrows), frame (b) illustrates the current frame with an 8×8 global motion vector field (also shown with arrows) derived from the computed initial affine global motion model, and frame (c) the difference heat map (darker shade indicate smaller differences between global and local block-based vectors, while lighter shade indicate larger differences).

In some examples, the initial affine global motion model may be used to select motion vectors that may be used for global motion model estimation. The selection process may include generation of a number of candidate selection masks and choosing the selection mask that yields smallest error. The proposed selection method is described next.

Selection of Motion Vectors for Global Motion Model Estimation

In order to correctly estimate global motion from the given motion vector field, it may be vital to first select which motion vectors should be included as well as which ones should be excluded. This task is not easy due to imperfect motion vector fields and the difficulty of perfectly separating blocks into moving visual objects. To solve this problem, some implementations described herein may use a candidate set (e.g., a set of 8, although a different number could be used) possible block selection masks from which the final selection mask is chosen.

Figure 19:
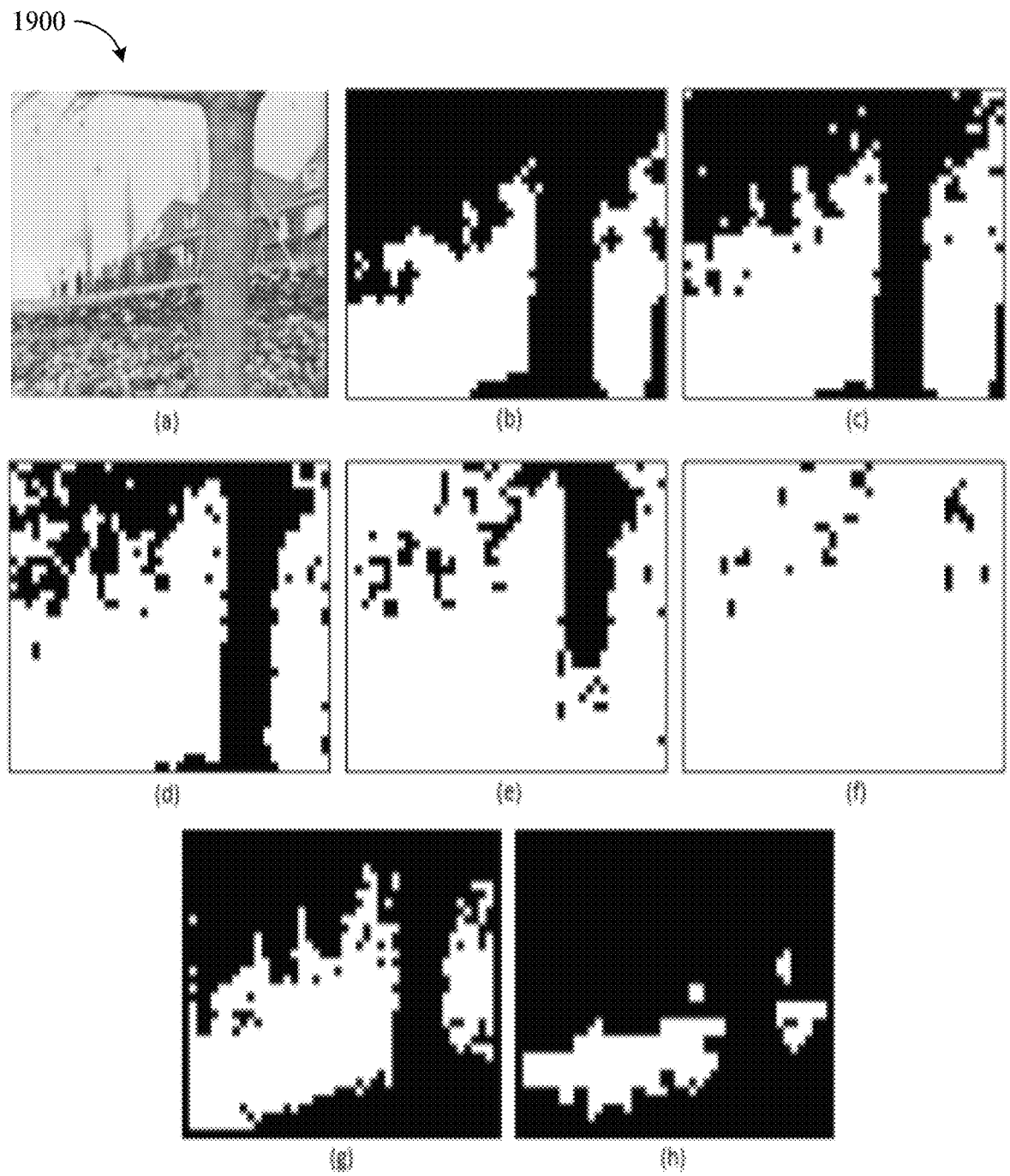
FIG. 19 is an illustrative video sequence of an example of different computed candidate selection masks according to an embodiment.
Figure 20:
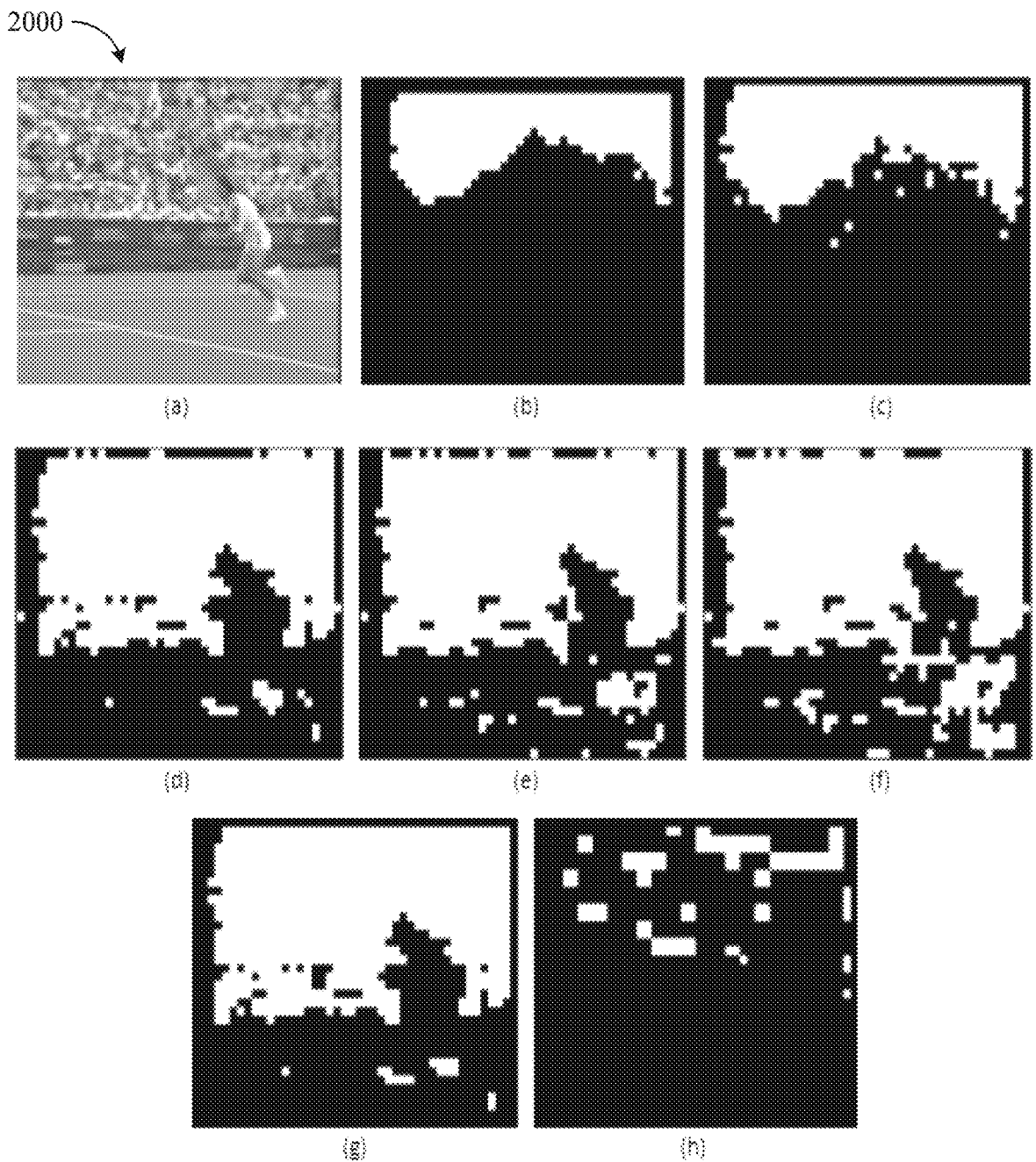
FIG. 20 is an illustrative video sequence of an example of different computed candidate selection masks according to an embodiment.

The initial affine global motion model may first used to generate several candidate selection masks (e.g., 5, although a different number could be used). The selection masks obtained from initial affine model are in essence binary masks, which classify all frame blocks into two classes: 1) globally moving blocks, and 2) locally moving blocks. Blocks whose global motion vector computed from the initial model is not similar to corresponding block-based motion vector are marked as local while the other blocks are marked as global. A binary mask may be used to indicate the motion vectors that are pertinent to global motion. An additional mask may be obtained by eroding the mask from the first level of hierarchy. Examples of the computed masks are shown in FIGS. 19 and 20. For each of the 5 masks, an affine global motion model may be computed using the described least squares fitting algorithm such that only the motion vectors indicated by the mask are used in least squares computation process. Finally, the mask that yield the smallest estimated error measure may be selected as current selection mask. If none of the hierarchical refinement models beats the initial model (e.g., in terms of smallest error), the selected model is set to the initial model.

Next, additional refinement steps (e.g., 2, although a different number could be used) may be performed on the current selected mask in attempt to create a more accurate selection mask. First, all blocks lying on a frame border may be removed as well as all blocks with very low texture activity. This alternate selection mask's error is compared to the error of the current selected mask and better mask is set as the current one. Finally, only the high texture blocks may be selected (e.g., blocks containing multiple edges, corners and complex patterns) from the current selection mask and final candidate mask is formed. Again, the final selection mask's error may be compared to the error of the current selected mask and better mask may be set as the final block selection mask, which defines blocks to be used for the global motion model computation. As a byproduct, this process produces an affine 6-parameter model for the frame.

Figure 18:
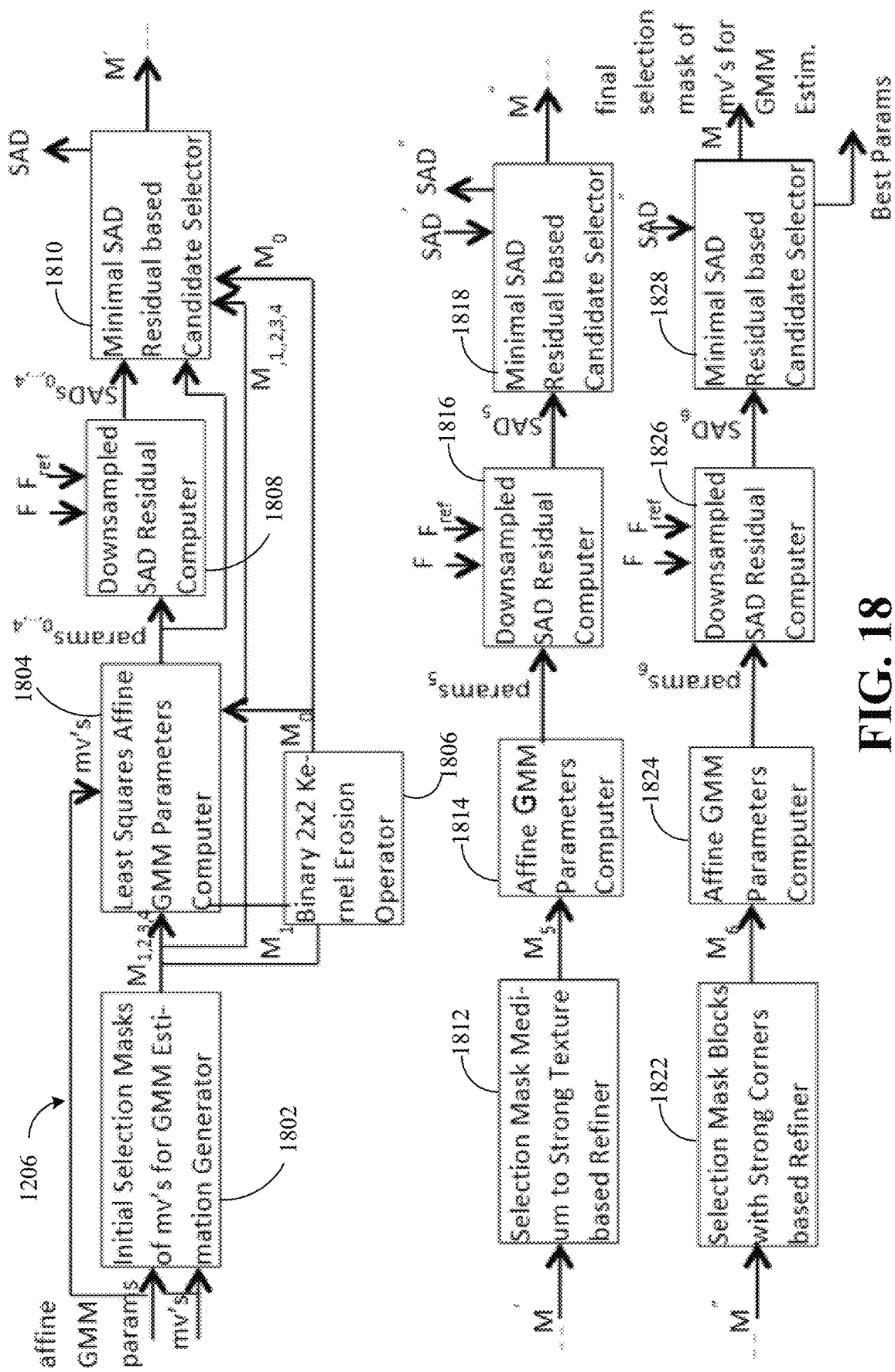
FIG. 18 is an illustrative block diagram of an example motion vectors for GMM estimation selector according to an embodiment.

FIG. 18 is an illustrative block diagram of an example motion vectors for GMM estimation selector 1206, arranged in accordance with at least some implementations of the present disclosure. In various implementations, motion vectors for GMM estimation selector 1206 may include an initial selection masks of MVs for GMM estimation generator 1802, a least squares affine GMM parameters computer 1804, a binary 2×2 kernel erosion operator 1806, a downsampled SAD residual computer 1808, a minimal SAD residual based candidate selector 1810, a selection mask medium to strong texture based refiner 1812, an affine GMM parameters computer 1814, a downsampled SAD residual computer 1816, a minimal SAD residual based candidate selector 1818, a selection mask blocks with strong corners based refiner 1822, an affine GMM parameters computer 1824, a downsampled SAD residual computer 1826, and a minimal SAD residual based candidate selector 1828.

As illustrated, shows a detailed block diagram of the second block of FIG. 12, motion vectors for GMM estimation selector 1206. FIG. 18 illustrates an example of the steps that may be used for computation of the selection mask, which may be used to identify which motion vectors are to be used in the global motion model estimation phase. In the first step of this process, the initial affine model is used to generate an estimated global motion field at the center of the block of the same size as the blocks of the block-based motion vector field via initial selection masks of MVs for GMM estimation generator 1802. Such global motion vector field is then differenced with the block-based field (e.g., by computing the sum of absolute differences for each vector coordinate). The differences are classified with 4 different adaptively chosen thresholds to obtain 4 candidate binary selection masks $M_{1, \ldots, 4}$.

An additional mask $M_0$ may be computed by eroding mask $M_1$ with a 2×2 kernel via binary 2×2 kernel erosion operator 1806.

Next, 5 affine models are computed using the least squares fitting method according to the 5 binary selection masks (e.g., a vector is used in the fitting process if the mask value is 1; otherwise, it is skipped) via least squares affine GMM parameters computer 1804. This produces the initial 5 candidate models denoted by $params_{0, \ldots, 4}$.

For each of them a subsampled SAD error may be computed using the current and the reference frames as input via downsampled SAD residual computer 1808, and the mask M' is selected which corresponds to the minimal error via minimal SAD residual based candidate selector 1810.

After that, two more candidate masks may be generated. The first one, denoted $M_5$, may be obtained by refining M' so that only medium and strong texture blocks are kept while flat texture blocks are removed via selection mask medium to strong texture based refiner 1812. In addition, frame borders may also be removed since most of the uncovered area appears there, which yields unreliable vectors. Similarly the corresponding affine model for $M_5$ and the corresponding subsampled SAD error may be computed via affine GMM parameters computer 1814. Then, either $M_5$ or M' is chosen (and denoted by M") via downsampled SAD residual computer 1816 and minimal SAD residual based candidate selector 1818.

The chosen M" may be input to the $2^{nd}$ refinement step, which may produce the candidate selection mask $M_6$ by selecting only the high texture blocks (e.g., blocks with both Rs and Cs values high) from the input mask M" via selection mask blocks with strong corners based refiner 1822. Using the same steps as before, the corresponding affine model may be computed for $M_6$ via affine GMM parameters computer 1824 and the corresponding subsampled SAD error, and, according to the smallest error, either $M_6$ or M" may be chosen as the final selection mask via downsampled SAD residual computer 1826 and minimal SAD residual based candidate selector 1828.

In some implementations, the algorithm for selection of motion vectors for global motion model estimation may include the following steps:

1. For i=1 to 4 do the following:
   a. Set t=0
   b. Set minimum local objects size m to a value that estimates how many global blocks should minimally be present in the mask. In our implementation m=0.1×N (10% of total number of blocks).
   c. Compute global motion vector field {$GMX_j$, $GMY_j$}, j=0, ..., N−1 using the initial affine global motion model
   d. Set t=t+i
   e. For each position j in the motion vector field compute $e_j$=abs($GMX_j$−$MX_j$)+abs($GMY_j$−$MY_j$). If $e_j \le t$ then set mask $M_i[j]$=1; otherwise set $M_i[j]$=0
   f. If sum of all values of $M_i$ is less than m then repeat go back to step 1c
2. Set mask $M_0$ to erosion of mask $M_1$
3. For all 5 masks $M_0$, ..., $M_4$ compute affine 6 parameter models using the described least squares fitting algorithm such that only the motion vectors indicated by the mask are used in least squares computation process
4. Compute SAD measure for all 5 least square fit affine models and set l∈{0, ..., 4} to the index of the model with the smallest SAD measure value. Set the current selection mask to mask $M_l$.
5. Compare SAD measure of the selected l-th affine parameter model with the SAD measure of the initial affine global motion vector model and set the current best initial affine global motion model to the model that yields smaller SAD measure.
6. If H<300 and W<600 and W×H<180,000 then set T=4; otherwise set T=6.
7. Create additional candidate mask $M_5$ by refining the current selection mask as follows:
   a. Remove all blocks that lie on the frame border
   b. Remove all blocks whose minimum of Rs and Cs texture measures is smaller than the threshold T
8. For mask $M_5$ compute affine 6 parameter model using the least squares fitting algorithm such that only the motion vectors indicated by the mask are used in least squares computation process
9. Compute SAD measure the computed affine model for $M_5$
10. Compare SAD measures of the current model and computed model for $M_5$ mask and set the current model and mask to the one that has the smallest SAD measure.
11. Set thresholds $T_{RS}$ to 1.5× average Rs value in the Rs/Cs 2-D array, and $T_{CS}$ to 1.5× average Cs value in the Rs/Cs 2-D array
12. Create final candidate selection mask $M_6$ by refining the current selection mask as follows:
    a. Remove all blocks whose Rs texture measure is smaller than threshold $T_{RS}$ and whose Cs texture measure is smaller than threshold $T_{CS}$
13. For mask $M_6$ compute affine 6 parameter model using the least squares fitting algorithm such that only the motion vectors indicated by the mask are used in least squares computation process
14. Compute SAD measure the computed affine model for $M_6$
15. Compare SAD measures of the current model and computed model for $M_6$ mask and set the current model and mask to the one that has the smallest SAD measure. Output the current model and mask as the final selection mask to be used in the global motion model computation.

FIG. 19 is an illustrative video sequence of an example of different computed candidate selection masks 1900, arranged in accordance with at least some implementations of the present disclosure. In various implementations, this example of the computed candidate selection masks 1900 for the "Flower" sequence may include: frame (a) original YUV frame, candidate selection mask (b) $M_0$ eroded estimated mask in the $1^{st}$ level of hierarchy ($M_0$-based error measure=987505), candidate selection mask (c) $M_1$ estimated mask in the $1^{st}$ level of hierarchy ($M_1$-based error measure=970341), candidate selection mask (d) $M_2$ estimated mask in the $2^{nd}$ level of hierarchy ($M_2$-based error measure=1002673), candidate selection mask (e) $M_3$ estimated mask in the $3^{rd}$ level of hierarchy ($M_3$-based error measure=1373757), candidate selection mask (f) $M_4$ estimated mask in the $4^{th}$ level of hierarchy ($M_4$-based error measure=1417258), candidate selection mask (g) $M_5$ refined mask using best mask from the 5 hierarchical candidates (e.g., in this case the best candidate is $M_1$, e.g., the candidate with the smallest error measure) where flat blocks and frame border blocks are removed from the mask ($M_5$-based error measure=972156), and candidate selection mask (h) $M_6$ refined mask using the best mask from the previous 6 candidates (e.g., in this case it is still mask $M_1$) where only high texture blocks (e.g., such as blocks containing multiple edges, corners and complex patterns) are selected ($M_6$-based error measure=981807). In this example, the final candidate selection mask is set to $M_1$.

FIG. 20 is an illustrative video sequence of an example of different computed candidate selection masks 2000, arranged in accordance with at least some implementations of the present disclosure. In various implementations, this example of the computed candidate selection masks 2000 for the "Stefan" sequence may include: frame (a) original YUV frame, candidate selection mask (b) $M_0$ eroded estimated mask in the $1^{st}$ level of hierarchy ($M_0$-based error measure=1365848), candidate selection mask (c) $M_1$ estimated mask in the $1^{st}$ level of hierarchy ($M_1$-based error measure=1363467), candidate selection mask (d) $M_2$ estimated mask in the $2^{nd}$ level of hierarchy ($M_2$-based error measure=1318886), candidate selection mask (e) $M_3$ estimated mask in the $3^{rd}$ level of hierarchy ($M_3$-based error measure=1327907), candidate selection mask (f) $M_4$ estimated mask in the $4^{th}$ level of hierarchy ($M_4$-based error measure=1349339), candidate selection mask (g) $M_5$ refined mask using best mask from the 5 hierarchical candidates (in this case the best candidate is $M_2$, e.g., candidate with the smallest error measure) where flat blocks and frame border blocks are removed from the mask ($M_5$-based error measure=1313352), and candidate selection mask (h) $M_6$ refined mask using the best mask from the previous 6 candidates (in this case it is mask $M_5$) where only high texture blocks (e.g., such as blocks containing multiple edges, corners and complex patterns) are selected ($M_6$-based error measure=1348624). In this example, the final candidate selection mask is set to $M_5$.

Adaptive Sub-Pel Filter Selection

Once the initial affine global motion parameters are refined, the next stage may be to select optimal sub-pixel filtering used in global motion compensation phase. In some implementations described herein, one of several different sub-pixel filtering methods (e.g., 4, although a different number may be used) may be selected. Table 3 lists the 4 filters used in one such implementation.

TABLE 3

Sub-pixel filters used in global motion compensation

| Filter | # of Taps | Accuracy Typically Suited For |
|---|---|---|
| Bilinear filter for all 1/16 pel positions | 2 | 1/16 pel Blurry texture |
| Bicubic filter for all 1/16 pel positions AVC-based filter | 16 | 1/16 pel Blurry and normal texture |
| [1 −5 20 20 −5 1] for 1/2 pel and 1/4 pel positions Bilinear for 1/8 pel positions HEVC-based filter | 6 2 | 1/8 pel Normal and sharp texture |
| [−1 4 −11 40 40 −11 4 −1] for 1/2 pel [−1 4 −10 58 17 −5 1 0] and [0 1 −5 17 58 −10 4 −1] for 1/4 pel positions [0 −1 9 9 −1 0] for 1/8 pel positions | 8 8 8 6 | 1/8 pel Sharp texture |

The optimal filter for the given frame may be content dependent. Typically, sharper luma content may be better filtered via HEVC-based filters and AVC-based filters. For example, HEVC-based filter usually may work better on content with very sharp texture. On the other hand, more blurry textured luma frames may be better filtered with Bicubic and Bilinear filters, where Bicubic filters likely work better in interpolating medium textured scenes. Clearly, the best-suited filter yields the smallest SAD of the reconstructed frame in comparison to the current frame. In order to select the most optimal filter for the given frame, in the interest of speed, a simplified, sub-sampled SAD (SSAD) measure may be computed. The method for automatically selecting an optimal filter is described next.

Figure 21:
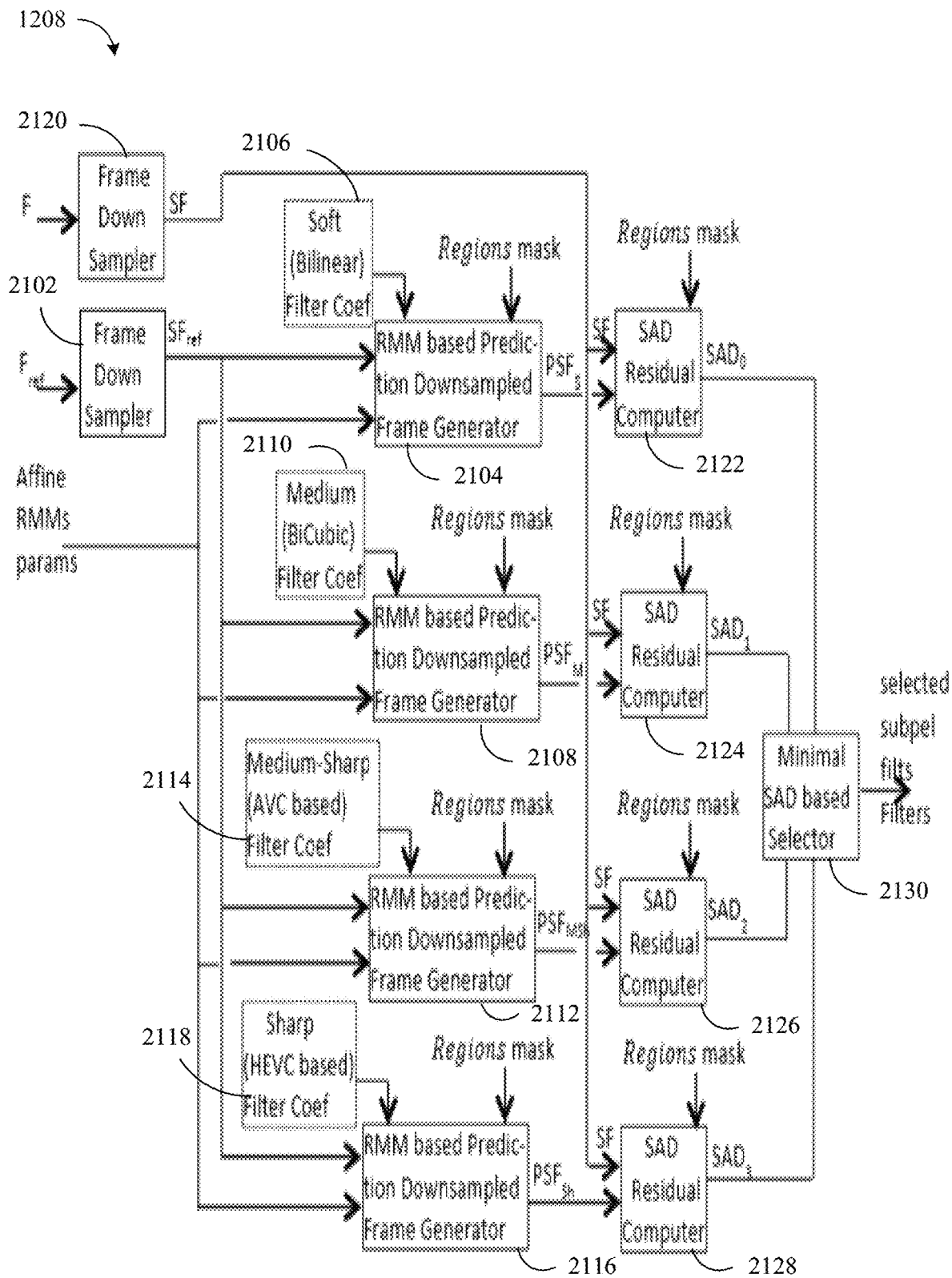
FIG. 21 is an illustrative block diagram of an example adaptive sub-pel interpolation filter selector according to an embodiment.

FIG. 21 is an illustrative block diagram of an example adaptive sub-pel interpolation filter selector 1208, arranged in accordance with at least some implementations of the present disclosure. In various implementations, adaptive sub-pel interpolation filter selector 1208 may include a frame downsampler 2102, a GMM based prediction downsampled frame generator 2104, a soft (Bilinear) filter coefficient 2106, a GMM based prediction downsampled frame generator 2108, a medium (BiCubic) filter coefficient 2110, a GMM based prediction downsampled frame generator 2112, a medium (AVC based) filter coefficient 2114, a GMM based prediction downsampled frame generator 2116, a sharp (HEVC based) filter coefficient 2118, a frame downsampler 2120, an SAD residual computer 2122, an SAD residual computer 2124, an SAD residual computer 2126, an SAD residual computer 2128, and a minimal SAD based selector 2130.

The illustrated example shows a detailed view of the third block of FIG. 12, adaptive sub-pel interpolation filter selector 1208. In FIG. 21, adaptive sub-pel interpolation filter selector 1208 serves to adaptively select the adequate sub-pixel filter according to the video content. In the example adaptive sub-pel interpolation filter selector 1208 illustrated in FIG. 21, there are 4 predefined filters (although a different number could be used): (1) $1/16^{th}$-pel smooth texture filter (bilinear), (2) $1/16^{th}$-pel medium texture filter (bicubic), (3) $1/8^{th}$-pel medium sharp texture filter (modified AVC filter), and (4) $1/8^{th}$-pel sharp texture filter (modified HEVC filter). The initial affine global motion model computed previously is used to move all pixels in the reference frame according to the model and all four filter candidates.

The reference frame $F_{ref}$ may be subsampled to generate a subsampled reference frame $SF_{ref}$ via frame downsampler 2102. Similarly, the current frame F may be subsampled to generate a subsampled current frame SF via frame downsampler 2120.

For each pixel in the subsampled reference frame $SF_{ref}$ the resulting motion vectors are rounded to either $1/16^{th}$-pel or $1/8^{th}$-pel accuracy (depending on the filter candidate) via GMM based prediction downsampled frame generators 2104, 2108, 2112, and 2116. This results in four prediction frames denoted by $PSF_S$ (which is computed by using the smooth sub-pel filter candidate via soft (Bilinear) filter coefficient 2106), $PSF_M$ (result of using the medium sub-pel filter candidate via medium (BiCubic) filter coefficient 2110), $PSF_{MSh}$ (result of using the medium sharp sub-pel filter candidate via medium (AVC based) filter coefficient 2114) and $PSF_{Sh}$ (result of using the sharp sub-pel filter candidate sharp (HEVC based) filter coefficient 2118). Next, subsampled SAD error is computed for all 4 candidates via SAD residual computers 2122, 2124, 2126, and 2128 and the minimal SAD criterion may be used to select the final candidate sub-pel filter filt via minimal SAD based selector 2130. In addition, two control signals $f_{hi}$ and h, are set as follows: $f_{hi}=0$ and $f_{lo}=0$ if the soft sub-pel filter was selected, $f_{hi}=0$ and $f_{lo}=1$ if medium sub-pel filter was selected, $f_{hi}=1$ and $f_{lo}=0$ if medium sharp sub-pel filer was selected, and $f_{hi}=1$ and $f_{lo}=1$ if sharp sub-pel filter was selected.

An example algorithm for automatically selecting optimal sub-pixel filtering may include the following steps:
1. Set $SSAD_i=0$, i=0, . . . , 3.
2. For each filter $filt_i$, i=0, . . . , 3, do the following:
    a. For each N×N block in the reference frame:
        i. Take the pixel in the center of the frame, compute motion vector according to the computed initial affine global motion model.
        ii. Round the computed vector either to $1/8^{th}$ or $1/16^{th}$ pixel accuracy depending on the filter $filt_i$ (corresponding filter accuracy shown in Table 3).
        iii. Compute interpolated sub-pixel value corresponding to the computed motion vector using $filt_i$ filter.
        iv. Compute absolute difference between the current block's center pixel in the current frame and the computed interpolated sub-pixel value and increase $SSAD_i$ by that amount.
3. Select filter $filt_i$ for which $SSAD_i$ is the smallest.

Figure 22:
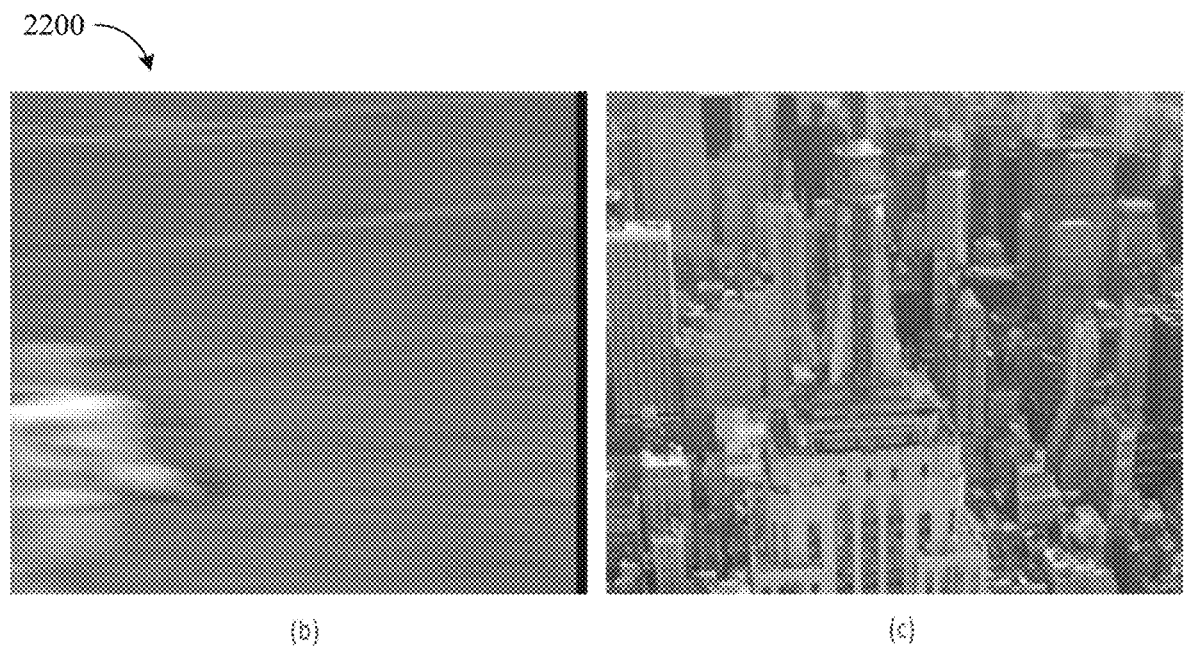
FIG. 22 is an illustrative video sequence of an example of adaptive content dependent sub-pel filtering according to an embodiment.

FIG. 22 is an illustrative video sequence 2200 of an example of adaptive content dependent sub-pel filtering, arranged in accordance with at least some implementations of the present disclosure. In various implementations, video sequence 2200 illustrates an example of content dependent sub-pixel filtering where: frame (a) illustrates a blurry luma frame of "Football" sequence using a bilinear filter as an optimal sub-pel filter (e.g., SAD with bilinear filter is 984309, SAD with bicubic filter is 994009, SAD with AVC-based filter is 996384, and SAD with HEVC-based filter is 998296), and frame (b) illustrates a sharp texture luma frame of "City" sequence using an HEVC-based filter as an optimal sub-pel filter (e.g., SAD with bilinear filter is 444644, SAD with bicubic filter is 439190, SAD with AVC-based filter is 432654, and SAD with HEVC-based filter is 428042).

In some implementations described herein, an N×N block size may be set to 16×16, however smaller sizes could be used depending on the quality/speed tradeoff adequate for the given application.

Adaptive Global Motion Model Computation and Selection

Depending on the mode of operation, in this step the algorithm may select optimal complexity global motion model. There are may be several modes of operation (e.g., 2 modes, although the number could vary) defined in some implementations described herein. In one such example, the modes may include:
1. Mode 0 (default mode)—is a mode that may be designed for sequences with normal motion complexity. Mode 0 may adaptively switch on a frame basis between translational 4-parameter, affine 6-parameter, and pseudo-perspective 8-parameter global motion models, for example.
2. Mode 1—is a mode that may be designed for sequences with complex motion (such as sequences with high perspective depth, fast motion etc.). Mode 1 may adaptively switch on a frame basis between affine 6-parameter, pseudo-perspective 8-parameter, and bi-quadratic 12-parameter global motion models, for example.

For typical applications, the adaptive translational 4-parameter, affine 6-parameter, and pseudo-perspective 8-parameter mode (e.g., Mode 0) may be used. Therefore, it Mode 0 may be set as a default mode of operation in some implementations described herein.

Figure 23:
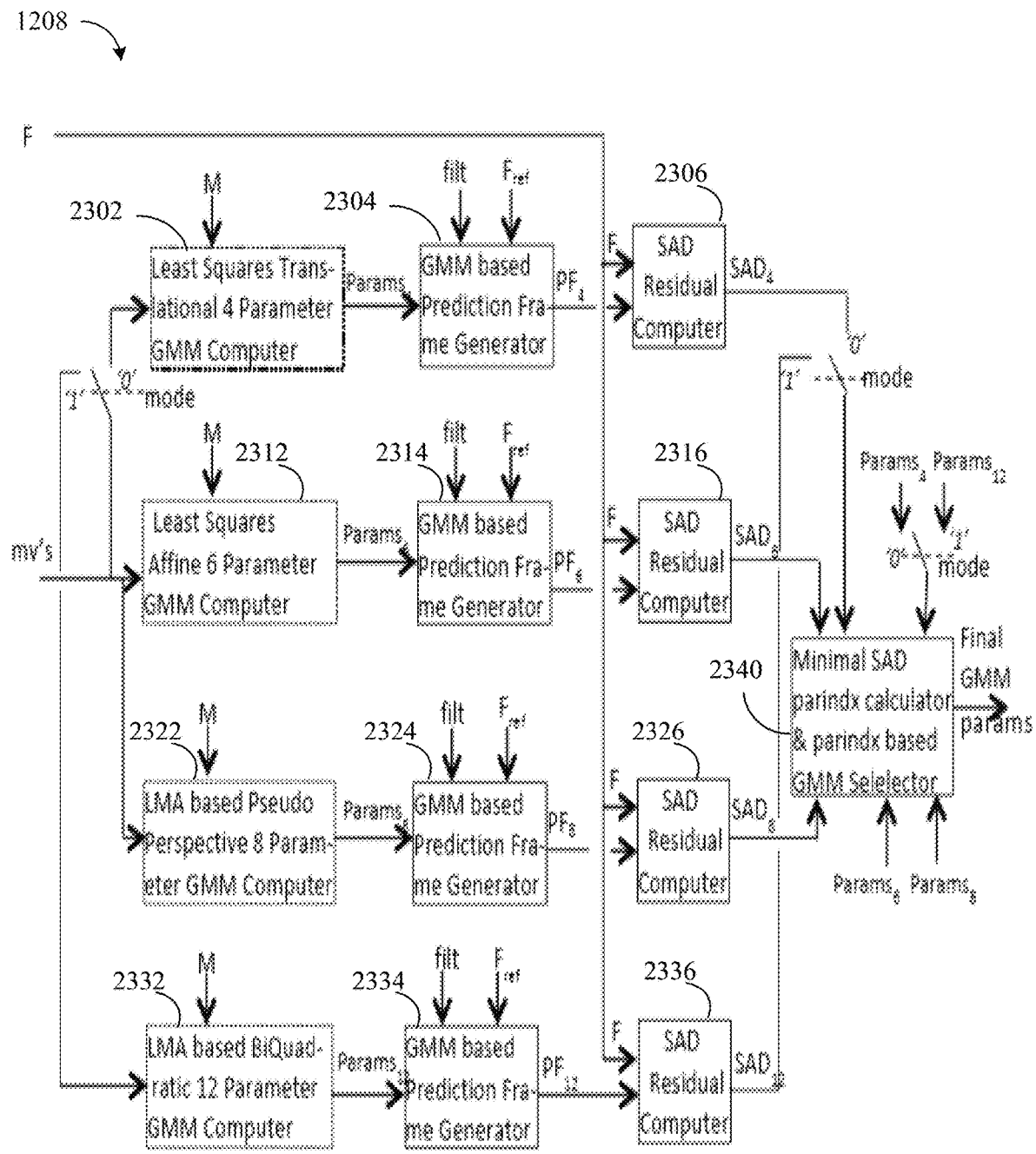
FIG. 23 is an illustrative block diagram of an example adaptive GMM computer and selector according to an embodiment.

FIG. 23 is an illustrative block diagram of an example adaptive GMM computer and selector 1210, arranged in accordance with at least some implementations of the present disclosure. In various implementations, adaptive GMM computer and selector 1210 may include a least squares translational 4 parameter GMM computer 2302, a GMM based prediction frame generator 2304, an SAD residual computer 2306, a least squares affine 6 parameter GMM computer 2312, a GMM based prediction frame generator 2314, an SAD residual computer 2316, an LMA (Levenberg-Marquardt algorithm) based pseudo perspective 8 parameter GMM computer 2322, a GMM based prediction frame generator 2324, an SAD residual computer 2326, an LMA (Levenberg-Marquardt algorithm) based BiQuadratic 12 parameter GMM computer 2332, a GMM based prediction frame generator 2334, an SAD residual computer 2336, and a minimal SAD parameter index (parindx) calculator and parameter index (parindx) based GMM selector.

In the illustrated example, FIG. 23 shows a detailed view of the fourth block of FIG. 12, adaptive GMM computer and selector 1210. In FIG. 23, the final global motion model is generated via adaptive GMM computer and selector 1210. A control signal mode may be used to select between standard and high-complexity models. While the illustrated example shows 4 total models with 3 models being used in a first mode and 3 models being used in a second mode, it will be appreciated that a different number of modes may be use, a different number of total models may be used, an/or a different number of models per mode may be used.

In the illustrated example, the control signal mode may be used to select between standard and high-complexity models as follows: if mode=0, adaptive GMM computer and selector 1210 may adaptively selects one of the following models: (1) translational 4-parameter model, (2) affine 6-parameter model, and (3) pseudo-perspective 8-parameter model. Otherwise, if mode=1 adaptive GMM computer and selector 1210 may select between: (1) affine 6-parameter model, (2) pseudo-perspective 8-parameter model, and (3) bi-quadratic 12-parameter model.

In either case, 3 of the 4 models may be computed using the motion vector selection mask M and the corresponding model computation method (e.g., least squares fitting for 4-parameter models and 6-parameter models, and Levenberg-Marquardt algorithm (LMA) for 8-parameter models and 12-parameter models). For example, 3 of the 4 models may be computed using the motion vector selection mask M and the corresponding model computation method via corresponding least squares translational 4 parameter GMM computer 2302, least squares affine 6 parameter GMM computer 2312, LMA (Levenberg-Marquardt algorithm) based pseudo perspective 8 parameter GMM computer 2322, and LMA (Levenberg-Marquardt algorithm) based BiQuadratic 12 parameter GMM computer 2332.

For the 3 computed models, using the previously selected sub-pixel filtering method filt and the reference frame $F_{ref}$ the corresponding prediction frames may be generated via corresponding GMM based prediction frame generators 2304, 2314, 2324, and/or 2334.

Furthermore, the frame-based SAD error may be computed for the 3 prediction frames in respect to the current frame F via SAD residual computers 2306, 2316, 2326, and/or 2336.

Finally, SAD errors are weighted and compared so that the smallest weighted SAD is used to select the corresponding model via minimal SAD parameter index (parindx) calculator and parameter index (parindx) based GMM selector.

In Mode 0, the affine 6-parameter model may be set to the initial affine global motion model computed in the refinement step (e.g., the previous step). The transitional 4-parameter motion model may be computed using direct least squares fitting approach described above. It is important to note that the selected global/local binary mask computed in the refinement step may be used to filter only motion vectors pertinent to global motion. The least squares fitting may be done on motion vectors from the motion vector field whose corresponding value in the global/local binary mask is 1. Next, the pseudo-perspective 8-parameter model may be computed using Levenberg-Marquardt (LMA) algorithm for non-linear least squares fitting. Likewise, the new parameter set (8-parameter model) may be computed using only motion vectors from the motion vector field whose corresponding value in the global/local binary mask from the previous step is 1. Once the parameters for all models are available, SAD measure for 4-, 6-, and 8-parameter models may be computed, denoted by $SAD_{4p}$, $SAD_{6p}$ and $SAD_{8p}$, respectively. The SAD measure may be the sum of absolute differences between the current luma frame, and reconstructed luma frame. The reconstructed frame may be obtained by applying global motion equations on all pixels in the reference frame. In this process, either a $\frac{1}{8}^{th}$ or a $\frac{1}{16}^{th}$ pixel precision may be used, depending on the sub-pel filter chosen.

The quality control parameter in Mode 0, denoted by $\delta_0$, may be computed as follows:

$$\delta_0 = 0.01 \times \min(SAD_{4p}, SAD_{6p}, SAD_{8p})$$

The selection of final parameter model may be done as follows:

If $SAD_{6p} < SAD_{8} + \delta_0$ and $SAD_{4p} < SAD_{6p} + \delta_0$ then select translational 4-parameter model to model global motion in the current frame;

If $SAD_{6p} < SAD_{8p} + \delta_0$ and $SAD_{4p} \geq SAD_{6p} + \delta_0$ then select affine 6-parameter model to model global motion in the current frame;

If $SAD_{6p} \geq SAD_{8p} + \delta_0$ and $SAD_{4p} < SAD_{6p} + \delta_0$ then select translational 4-parameter model to model global motion in the current frame; and If $SAD_{6p} \geq SAD_{8p}+\delta_0$ and $SAD_{4p} \geq SAD_{6p}+\delta_0$ then select pseudo-perspective 8-parameter model to model global motion in the current frame.

In Mode 1, the affine 6-parameter model may also be set to the initial affine global motion model computed in the refinement step. The pseudo-perspective 8-parameter model and bi-quadratic 12-parameter model may be computed using Levenberg-Marquardt (LMA) algorithm for non-linear least squares fitting. These parameter sets may be computed using only motion vectors from the motion vector field whose corresponding value in the global/local binary mask from the previous step is 1. Once the parameters for all models are available, SAD measure for 6-, 8-, and 12-parameter models may be computed, denoted by $SAD_{6p}$, $SAD_{8p}$ and $SAD_{12}$, respectively. The SAD measure may be the sum of absolute differences between the current luma frame, and reconstructed luma frame. The reconstructed frame may be obtained by applying global motion equations on all pixels in the reference frame. In this process, either a $\frac{1}{8}^{th}$ or a $\frac{1}{16}^{th}$ pixel precision is used, depending on the sub-pel filter chosen.

The quality control parameter in Mode 1, denoted by $\delta_1$, may be computed as follows:

$$\delta_1 = 0.01 \times \min(SAD_{6p}, SAD_{8p}, SAD_{12p})$$

The selection of final parameter model may be done as follows:

If $SAD_{8p} < SAD_{12p}+\delta_1$ and $SAD_{6p} < SAD_{8p}+\delta_1$ then select translational 4-parameter model to model global motion in the current frame;

If $SAD_{8p} < SAD_{12p}+\delta_1$ and $SAD_{6p} \geq SAD_{8p}+\delta_1$ then select affine 6-parameter model to model global motion in the current frame;

If $SAD_{8p} \geq SAD_{12p}+\delta_1$ and $SAD_{6p} < SAD_{8p}+\delta_1$ then select translational 4-parameter model to model global motion in the current frame; and If $SAD_{8p} \geq SAD_{12p}+\delta_1$ and $SAD_{6p} \geq SAD_{8p}+\delta_1$ then select pseudo-perspective 8-parameter model to model global motion in the current frame.

Impact of Non-Active Area on Global Motion Estimation

Video can often contain a non-active content area, which can cause problems when computing or applying global motion. Such non-content areas may include: black bars and areas due to letterboxing, pillar-boxing, circular or cropped circular fisheye cameras capture, etc. Detecting and excluding such area may greatly improve the GMM results.

Figure 24:
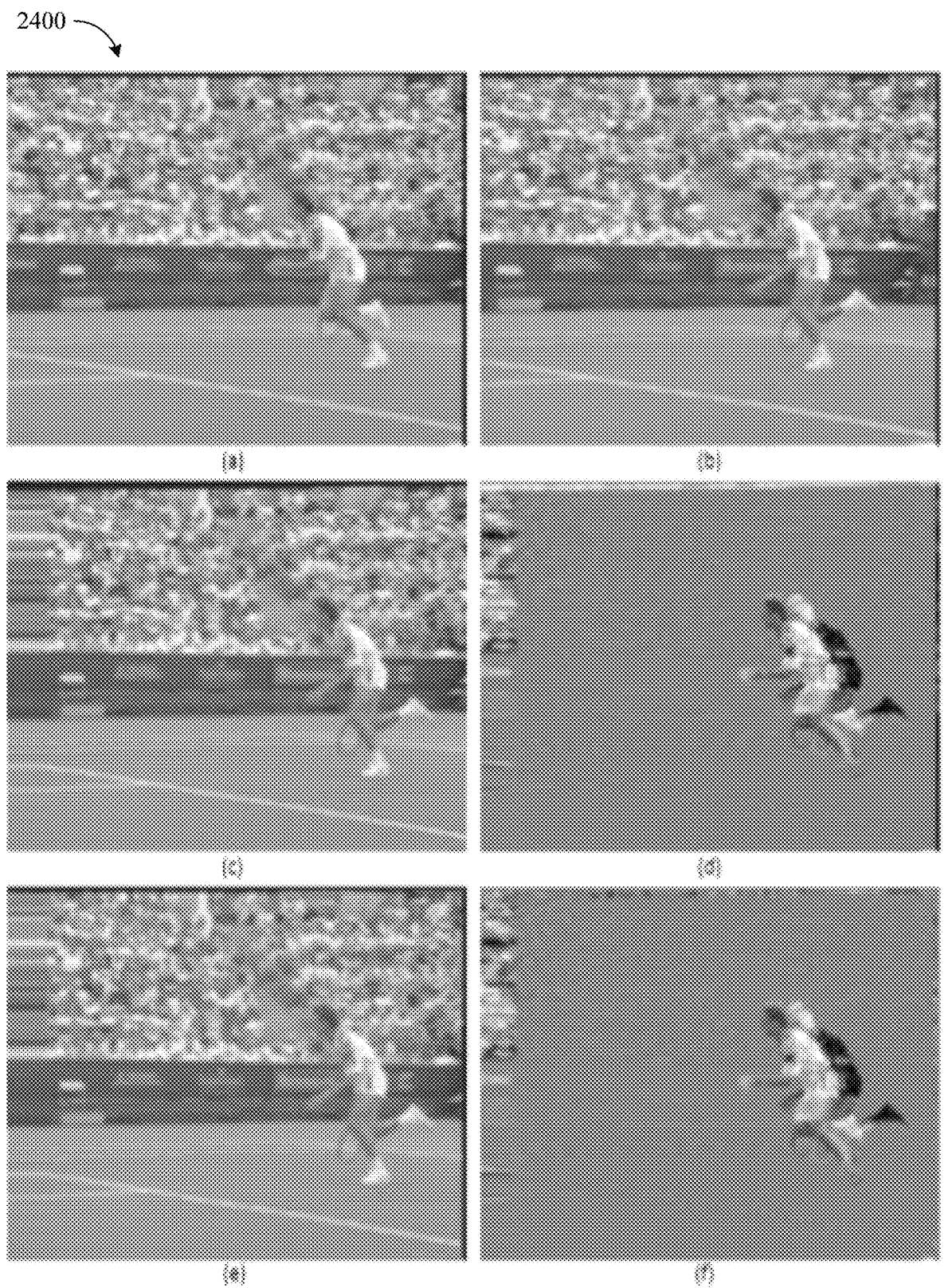
FIG. 24 is an illustrative video sequence of an example of compensation of detected non-content areas according to an embodiment.

FIG. 24 is an illustrative video sequence 2400 of an example of compensation of detected non-content areas, arranged in accordance with at least some implementations of the present disclosure. In various implementations, FIG. 24 shows an example video sequence 2400 where black bars are detected and removed from GMM and the resulting impact on the quality. The algorithm for letterboxing and pillar-boxing area detection and removal from GMM is described next:

1. For all pixels in F that are at the left edge of the frame do:
    a. Scan current luma frame $F_y$ from left towards right and break at break position when $RsCs(F_y)$ is larger than threshold $T_{bar}$ (which is in our implementation set to 240) or if the pixel value of $F_y$ exceeds black bar threshold $T_{blk}$ (we use $T_{blk}=20$);
2. Determine the dominant break position of the left frame edge, denoted $L_{brp}$ as the multiple of 4 pels that is closest to the majority of left edge break positions;
3. If $L_{brp}$ is larger than 4 pels, smaller than ⅓ of W (the frame width) and 90% or more left edge break positions are within 4 pixel distance of $L_{brp}$, then declare non-content area at left edge that spans to $L_{brp}$ pixels wide; and
4. Repeat steps 1-3 for right edge, top, edge, and bottom edge to detect non-content area at remaining sides of the frame.

In the example illustrated in FIG. 24, shows video sequence 2400, based on the "Stefan" sequence, there are 4 pixel thick bars detected on top and on right frame edge, while in another scene ("Football" sequence) there is one 8 pel bar detected on the right side. The non-content area is then excluded from GMM compensation and zero motion is applied. Remaining area is normally modeled with GMM, as FIG. 24 depicts.

For example, the "Stefan" video sequence 2400 shows compensation of detected non-content area (e.g., 2 bars, top and right, both 4 pixel thick are detected and coded, [0,0] motion is used at bar area) where: frame (a) is the current original luma frame, frame (b) is the reference luma frame (1 frame apart), frame (c) is the reconstructed frame without bar detection, frame (d) is the residuals frame without bar detection (SAD=1087071), frame (e) is the reconstructed frame with bar detection, and frame (f) is the residuals frame without bar detection (SAD=933913).

Global Motion Model Based Accurate Motion Compensation

At the beginning of the global motion compensation phase, a model was selected (e.g., depending on the mode of operation, either with 4, 6, 8, or 12 parameters), as well as a sub-pixel filtering method. Although the global motion compensation processes blocks of frame at a time, GMM may be applied on a pixel level within the given block. In other words, for each pixel within a block, a global motion may be computed and the pixel may be moved at a sub-pel position according to the previously determined sub-pel filtering method. Thus, a pixel on one side of the block may have different motion vector than a pixel on the other side of the same block, as illustrated by an example in FIG. 25 below.

Figure 25:
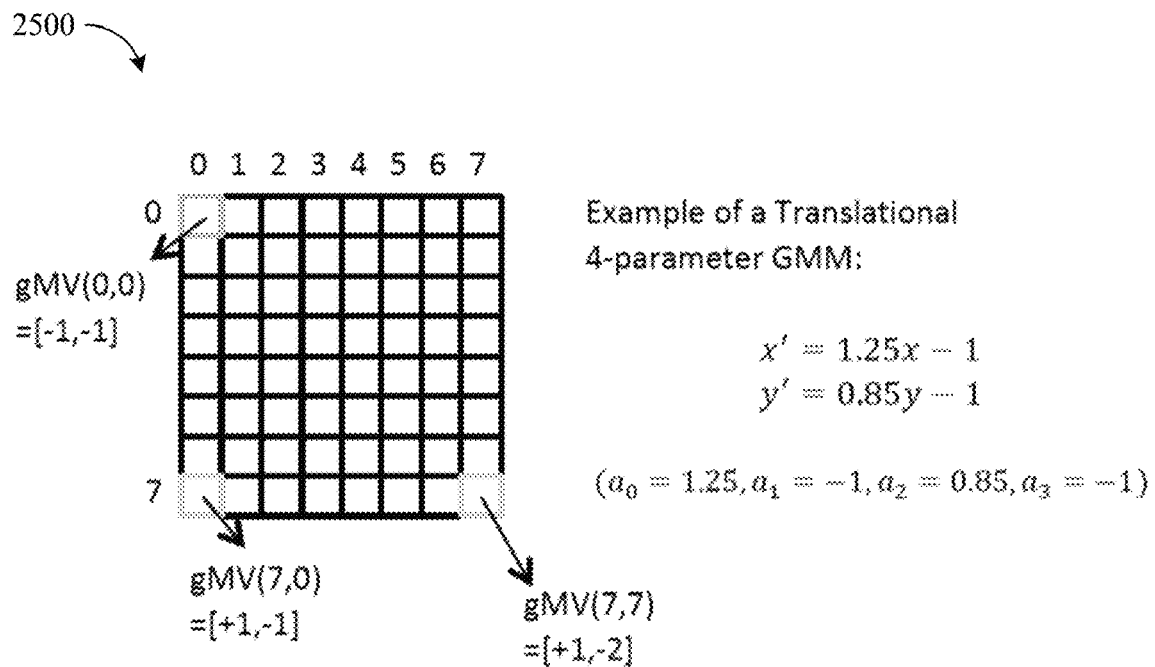
FIG. 25 is an illustrative chart of an example translational 4-parameter global motion model according to an embodiment.

FIG. 25 is an illustrative chart of an example of translational 4-parameter global motion model 2500, arranged in accordance with at least some implementations of the present disclosure. In various implementations, an example of a translational 4-parameter model 2500 may be applied on different pixel positions within an 8×8 block. Note that different global motion vectors could appear within a block.

In the illustrated example, the chosen block size depends on the resolution. In one example, for standard and high definition, the block size may be set to 8; while, for low definition sequences the block size may be set to 16. If a frame width is smaller than 600, frame height is smaller than 300, and the product of frame width and height is smaller than 180,000, then sequence may classified as a low definition sequence, although different numbers may be used.

Figure 26:
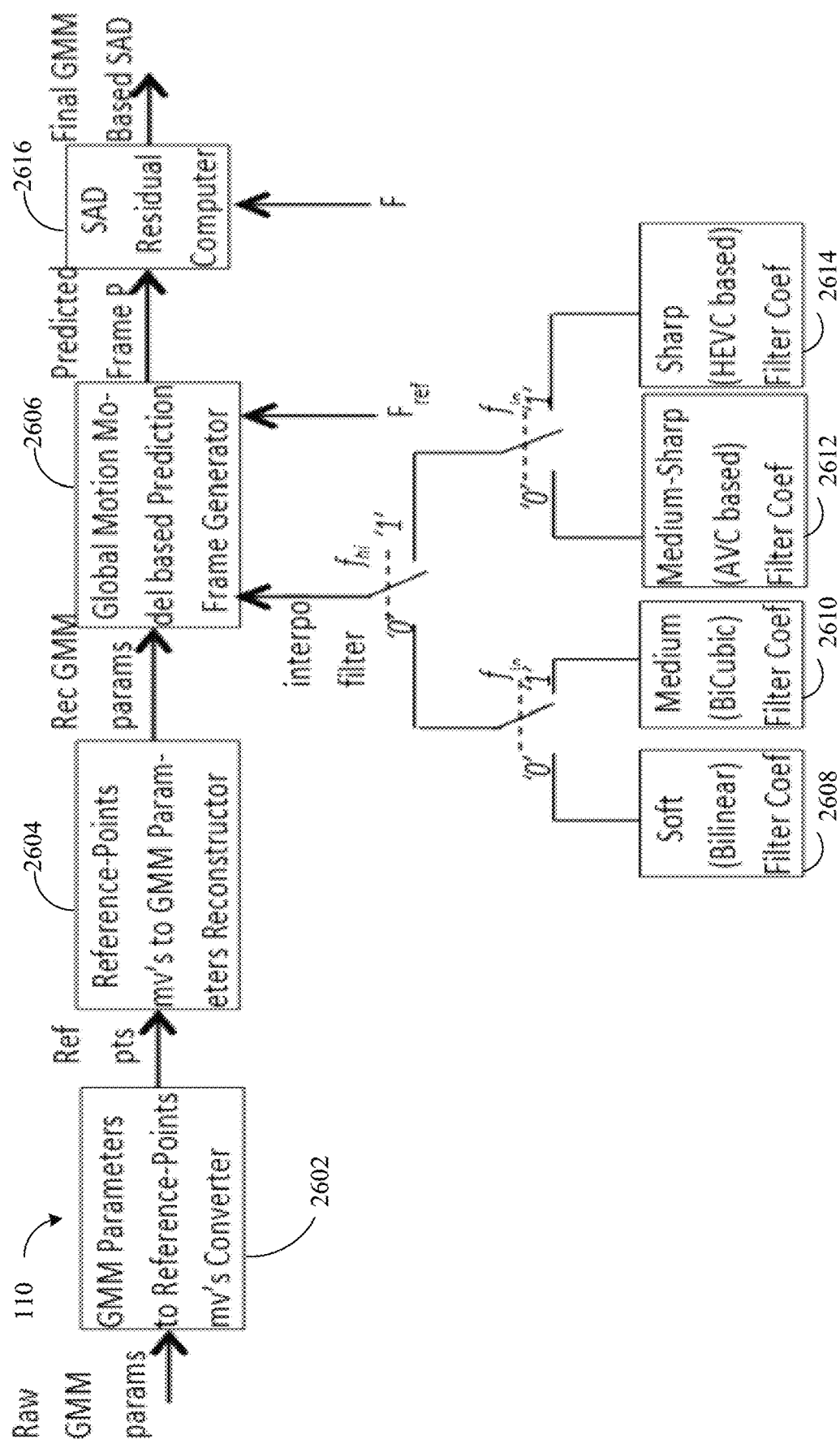
FIG. 26 is an illustrative block diagram of an example adaptive global motion compensator according to an embodiment.

FIG. 26 is an illustrative block diagram of an example adaptive global motion compensator 110, arranged in accordance with at least some implementations of the present disclosure. In various implementations, adaptive global motion compensator 110 may include a GMM parameters to reference points MVs converter 2602, a reference points MVs to GMM parameters reconstructor 2604, a global motion model based prediction frame generator 2606, a soft (Bilinear) filter coefficient 2608, a medium (BiCubic) filter coefficient 2610, a medium sharp (AVC based) filter coefficient 2612, a sharp (HEVC based) filter coefficient 2614, and an SAD residual computer 2616.

In the illustrated example, FIG. 26 shows the details of adaptive global motion compensator 110 (originally discussed in FIG. 1) that may produce the final predicted frame and the corresponding SAD. The input into the first block of this method may be the final global motion model parameters, which are applied to the frame-based reference points via GMM parameters to reference points MVs converter 2602. As previously described in detail, the number of reference points depends on the model. An n-parameter model uses n/2 reference points. Therefore, an n/2 motion vectors corresponding to the motion at the reference points may be computed in the first step. The computed motion vectors may be quantized to a ¼-pel accuracy.

Next, from the reference points, the reconstructed parameters may be generated via reference points MVs to GMM parameters reconstructor 2604. The reconstructed parameters may be obtained by solving the system of equations for the motion vectors at the reference points. Also, the reconstructed parameters may be represented as a quotient where the denominator is scaled to a power of 2. This means that the parameters can be applied with just multiplication and binary shifting operations in the interest of speed.

After that, the prediction frame P may generated by applying the reconstructed motion model parameters to the pixels of the reference frame $F_{ref}$ where sub-pixel positions are interpolated via global motion model based prediction frame generator 2606 with the previously chosen filter filt via filters 2608, 2610, 2612, and/or 2614. In this diagram selected filter may be redirected to global motion model based prediction frame generator 2606 using the control signals $f_{hi}$ and $f_{lo}$. Finally, the corresponding frame-based SAD may be computed from the predicted frame P and the current frame F via SAD residual computer 2616.

Since it is not feasible to encode the actual floating point representation of the global motion model parameters, an approximation of the parameters is performed. The method of representing the GMM parameters is based on the concept of reference points (also referred to as control grid points), which were described above. According to that representation, an n-parameter GMM model requires n/2 reference points. At each reference point a motion vector may need to be sent in order to reconstruct the parameters at the decoder side. The accuracy of the encoded motion vectors at reference points determines the GMM parameter approximation accuracy. In some implementations herein, the accuracy may be set to a ¼-pel precision.

The locations of the reference points are defined as follows:

$$z_0 = (x_0, y_0)$$

$$z_1 = (x_1, y_1) = (x_0 + W, y_0)$$

$$z_2 = (x_2, y_2) = (x_0, y_0 + H)$$

$$z_3 = (x_3, y_3) = (x_0 + W, y_0 + H)$$

$$z_4 = (x_4, y_4) = (x_0 - W, y_0)$$

$$z_5 = (x_5, y_5) = (x_0, y_0 - H)$$

For 4-parameter model, points $z_0$ and $z_3$ are used. Applying translational global motion model $g_4$ on $z_0$ and $z_3$ yields globally moved points $g_4(z_0) = (g_4(x_0), g_4(y_0)) = (a_0 x_0 + a_1, a_2 y_0 + a_3)$, and $g_4(z_3) = (a_0 x_3 + a_1, a_2 y_3 + a_3)$. On the other hand, for 6-parameter model points $z_0$, $z_1$, and $z_2$ are used. Applying affine global motion model $g_6$ on $z_0$, $z_1$, and $z_2$ yields globally moved points $g_6(z_i) = (g_6(x_i), g_6(y_i)) = (a_0 x_i + a_1 y_i + a_2, a_3 x_i + a_4 y_i + a_5)$, i=0, 1, 2. For 8-parameter model points $z_0$, $z_1$, $z_2$, and $z_3$ are used. Applying pseudo-perspective global motion model $g_8$ on $z_0$, $z_1$, $z_2$ and $z_3$ yields globally moved points $g_8(z_i) = (g_8(x_i), g_8(y_i)) = (a_0 x_i^2 + a_1 x_i y_i + a_2 x_i + a_3 y_i + a_4, a_1 y_i^2 + a_0 x_i y_i + a_5 x_i + a_6 y_i + a_7)$, i=0, 1, 2, 3. Finally, for a 12-parameter model all 6 points are used ($z_0$, $z_1$, $z_2$, $z_3$, $z_4$ and $z_5$). Applying 12-parameter bi-quadratic global motion model $g_{12}$ on $z_0$, $z_1$, $z_2$, $z_3$, $z_4$ and $z_5$ yields globally moved points $g_{12}(z_i) = (g_{12}(x_i), g_{12}(x_i) = (a_0 x_i^2 + a_1 y_i^2 + a_2 x_i y_i + a_3 x_i + a_4 y_i + a_5, a_6 x_i^2 + a_7 y_i^2 + a_8 x_i y_i + a_9 x_i + a_{10} y_i + a_{11})$, i=0, 1, 2, 3, 4, 5.

As discussed earlier, the motion vectors at reference points define a system of equations whose solution determines the reconstructed global motion model parameters. In order to allow for fast processing, the reconstructed parameters may be approximated with a ratio of two integers, with denominator being a power of 2. This way, applying GMM on any pixel location in the frame can be achieved with a multiplication and binary shifting operations.

For example, to obtain the reconstructed 4-parameter model $\{\bar{a}_0, \bar{a}_1, \bar{a}_2, \bar{a}_3\}$ from the given model $g_4$ (applied at 1/s-th pixel precision) the following equation may be used:

$$\bar{a}_0 = \frac{g_4(x_3) - g_4(x_0)}{sW}, \bar{a}_1 = \frac{g_4(x_0)}{s},$$

$$\bar{a}_2 = \frac{g_4(y_3) - g_4(y_0)}{sH}, \bar{a}_3 = \frac{g_4(y_0)}{s}$$

This equation may be modified to allow for fast global motion modeling as follows:

$$\bar{a}_0 = \frac{d_0}{2^k}, \bar{a}_1 = \frac{d_1}{2^k}, \bar{a}_2 = \frac{d_2}{2^l}, \bar{a}_3 = \frac{d_3}{2^l}$$

Where $d_0 = (2^k/(sW)) \times (g_4(x_3) - g_4(x_0))$, $d_1 = (2^k/s) \times g_4(x_0)$, $k = \lceil \log_2 sW \rceil$, $d_2 = (2^l/(sH)) \times (g_4(y_3) - g_4(y_0))$, $d_3 = (2^l/s) \times g_4(y_0)$, $l = \lceil \log_2 sH \rceil$.

Therefore, in order to apply the reconstructed global motion model $\bar{g}_4$ to a pixel location (x, y), the following equation without division may be used:

$$\bar{g}_4(x) = \bar{a}_0 x + \bar{a}_1 = \frac{d_0}{2^k} x + \frac{d_1}{2^k} = (d_0 x + d_1) \gg k$$

And $$\bar{g}_4(y) = \bar{a}_2 y + \bar{a}_3 = \frac{d_2}{2^l} y + \frac{d_3}{2^l} = (d_2 x + d_3) \gg l$$

Where $\gg$ denotes bitwise shift to the right.

To obtain the reconstructed 6-parameter model $\{\bar{a}_0, \ldots \bar{a}_5\}$ from the given model $g_6$ (applied at 1/s-th pixel precision) the following equation may be used:

$$\bar{a}_0 = \frac{g_6(x_1) - g_6(x_0)}{sW}, \bar{a}_1 = \frac{g_6(x_2) - g_6(x_0)}{sH}, \bar{a}_2 = \frac{g_6(x_0)}{s},$$

$$\bar{a}_3 = \frac{g_6(y_1) - g_6(y_0)}{sW}, \bar{a}_4 = \frac{g_6(y_2) - g_6(y_0)}{sH}, \bar{a}_5 = \frac{g_6(y_0)}{s}$$

This equation may be modified to allow for fast global motion modeling as follows:

$$\bar{a}_0 = \frac{d_0}{2^k}, \bar{a}_1 = \frac{d_1}{2^k}, \bar{a}_2 = \frac{d_2}{2^k}, \bar{a}_3 = \frac{d_3}{2^k}, \bar{a}_4 = \frac{d_4}{2^k}, \bar{a}_5 = \frac{d_5}{2^k}$$

Where $d_0=(2^k/(sW))\times(g_6(x_1)-g_6(x_0))$, $d_1=(2^k/(sH))\times(g_6(x_2)-g_6(x_0))$, $d_2=(2^k/s)\times g_6(x_0)$, $d_3=(2^k/(sW))\times g_6(y_1)-g_6(y_0))$, $d_4=(2^k/(sH))\times(g_6(y_2)-g_6(y_0))$, $d_5=(2^k/s)\times g_6(y_0)$, $k=\lceil\log_2(s^2\ W\ H)\rceil$.

Therefore, in order to apply the reconstructed global motion model $\bar{g}_6$ to a pixel location (x, y), the following equation without division may be used:

$$\bar{g}_6(x) = \bar{a}_0 x + \bar{a}_1 y + \bar{a}_2 = \frac{d_0}{2^k}x + \frac{d_1}{2^k}y + \frac{d_2}{2^k} = (d_0 x + d_1 y + d_2) \gg k$$

And $$\bar{g}_6(y) = \bar{a}_3 x + \bar{a}_4 y + \bar{a}_5 = \frac{d_3}{2^k}x + \frac{d_4}{2^k}y + \frac{d_5}{2^k} = (d_3 x + d_4 y + d_5) \gg k$$

In case of pseudo-perspective model, in order to obtain the reconstructed 8-parameter model $\{\bar{a}_0, \ldots, \bar{a}_7\}$ from the given model $g_8$ (applied at 1/s-th pixel precision) the following equation may be used:

$$\bar{a}_0 = \frac{g_8(y_0) - g_8(y_1) - g_8(y_2) + g_8(y_3)}{s^2 WH},$$

$$\bar{a}_1 = \frac{g_8(x_0) - g_8(x_1) - g_8(x_2) + g_8(x_3)}{s^2 WH},$$

$$\bar{a}_2 = \frac{-sHg_8(x_0) - sWg_8(y_0) + sHg_8(x_1) + sWg_8(y_1) + sWg_8(y_2) - sWg_8(y_3)}{s^2 WH},$$

$$\bar{a}_3 = \frac{g_8(x_2) - g_8(x_0)}{sH}, \bar{a}_4 = \frac{g_8(x_0)}{s},$$

$$\bar{a}_5 = \frac{g_8(y_1) - g_8(y_0)}{sW}, \bar{a}_7 = \frac{g_8(y_0)}{s},$$

$$\bar{a}_6 = \frac{-sHg_8(x_0) - sWg_8(y_0) + sHg_8(x_1) + sHg_8(x_2) + sWg_8(y_2) - sHg_8(x_3)}{s^2 WH}$$

Like in the previous cases of simpler models, this equation may be expressed as follows:

$$\bar{a}_i = \frac{d_i}{2^k}, i = 0, \ldots, 7$$

To apply the reconstructed global motion model $\bar{g}_8$ to a pixel location (x, y), the following equation without division may be used:

$$\bar{g}_8(x)=(d_0 x^2+d_1 xy+d_2 x+d_3 y+d_4)\gg k$$

And $$\bar{g}_8(y)=(d_1 y^2+d_0 xy+d_5 x+d_6 y+d_7)\gg k$$

Where $k=\lceil\log_2(s^2\ W\ H)\rceil$.

Finally, in the case of bi-quadratic model, in order to obtain the reconstructed 12-parameter model $\{\bar{a}_0, \ldots, \bar{a}_{11}\}$ from the given model $g_{12}$ (applied at 1/s-th pixel precision) the following equation may be used:

$$\bar{a}_0 = \frac{-2g_{12}(x_0) + g_{12}(x_1) + g_{12}(x_4)}{2s^2 W^2},$$

$$\bar{a}_1 = \frac{-2g_{12}(x_0) + g_{12}(x_2) + g_{12}(x_5)}{2s^2 H^2},$$

$$\bar{a}_2 = \frac{g_{12}(x_0) - g_{12}(x_1) - g_{12}(x_2) + g_{12}(x_3)}{s^2 WH},$$

$$\bar{a}_3 = \frac{g_{12}(x_1) - g_{12}(x_4)}{sW}$$

$$\bar{a}_3 = \frac{g_{12}(x_{12}) - g_{12}(x5_4)}{sH}, \bar{a}_5 = \frac{g_{12}(x_0)}{s}$$

$$\bar{a}_6 = \frac{-2g_{12}(y_0) + g_{12}(y_1) + g_{12}(y_4)}{2s^2 W^2},$$

$$\bar{a}_7 = \frac{-2g_{12}(y_0) + g_{12}(y_2) + g_{12}(y_5)}{2s^2 H^2},$$

$$\bar{a}_8 = \frac{g_{12}(y_0) - g_{12}(y_1) - g_{12}(y_2) + g_{12}(y_3)}{s^2 WH},$$

$$\bar{a}_9 = \frac{g_{12}(y_1) - g_{12}(y_4)}{sW}$$

$$\bar{a}_{10} = \frac{g_{12}(y_2) - g_{12}(y_5)}{sH}, \bar{a}_{11} = \frac{g_{12}(y_0)}{s}$$

Like in the previous cases of simpler models, this equation can be expressed as follows:

$$\bar{a}_i = \frac{d_i}{2^k}, i = 0, \ldots, 11$$

Where $k=\lceil\log_2(s^2 W^2\ H_2)\rceil$.

To apply the reconstructed global motion model $\bar{g}_{12}$ to a pixel location (x, y), the following equation without division may be used:

$$\bar{g}_{12}(x)=(d_0 x^2+d_1 y^2+d_2 xy+d_3 x+d_4 y+d_5)\gg k$$

And $$\bar{g}_{12}(d_6 x^2+d_7 y^2+d_8 xy+d_9 x+d_{10} y+d_{11})\gg k$$

Based on the computed SAD, either the computed global motion model parameters are encoded, or the model is approximated from a set of previous models. Typically, the approximated model produces larger SAD than the computed one, but it is usually encoded using significantly smaller number of bits. The details of the coding process are described next.

Efficient Coding of Global Motion Model Parameters

In a typical video content, consecutive frames within the same scene, and even the frames that are at a few frames distance from each other (but still within the same scene), maintain the same or very similar motion properties. In other words, abrupt changes in global motion, such as direction or magnitude, are a rare occurrence within a video scene. Therefore, global motion models for consecutive or close frames are unlikely to change very much. Also, models from recent past frames typically work very well as global motion models for the current frame. In that sense, the method of coding the global motion parameters in MPEG-4 standard is suboptimal, as it does not fully utilize previous models from the recent past. Accordingly, some implementations herein may us a coding algorithm that fully exploits the redundancy of past global motion models to represent and code GMM parameters.

The proposed method for GMM parameters coding, like the global motion coding method of MPEG-4 standard, may rely on reference points for representing a model. The global motion coding method of MPEG-4 was described above.

A codebook is a collection of past parameters represented as global motion based motion vectors of reference points.

At the beginning the codebook is empty, as no past models are known. As the frames are processed, the codebook is updated to include newly coded models. Only unique models may be added. When the codebook becomes full, e.g., when the number of models in the codebook is the same as the maximum capacity of the codebook, the oldest model is replaced with the newest one. The codebook is therefore content adaptive as it changes during encoding/decoding process. In experiments based on implementations described herein, the best performance/complexity tradeoff was achieved with a codebook of size 8. Thus, in some implementation, the size of the codebook is set to 8, although a different size could be used.

As already discussed, the number of motion vectors needed to represent a model depends on the number of parameters in the model itself. Suppose each frame uses an affine 6-parameter model (e.g., Mode 0). Then each model's parameters may be represented with 3 motion vectors associated with 3 reference points. A full codebook would therefore contain a total of 24 motion vectors associated with the reference points of past models, in such an example.

Figure 27:
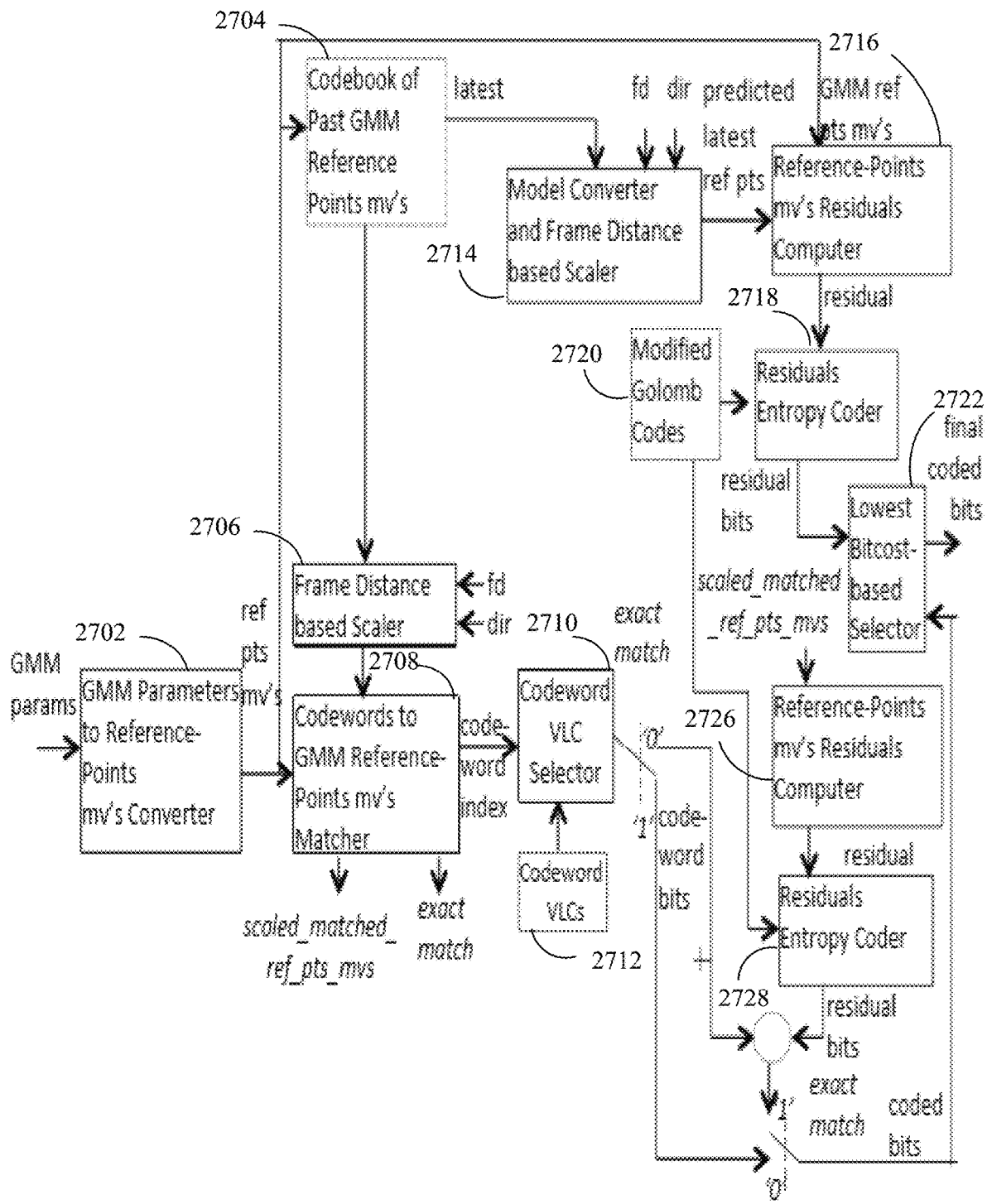
FIG. 27 is an illustrative block diagram of an example GMM parameter and header encoder according to an embodiment.

FIG. 27 is an illustrative block diagram of an example GMM parameter and header encoder 112, arranged in accordance with at least some implementations of the present disclosure. In various implementations, GMM parameter and header encoder 112 may include a GMM parameters to Reference-Points mv's converter 2702, a Codebook of Past GMM Reference Points mv's 2704, a frame distance based scaler 2706, a Codewords to GMM Reference-Points mv's Matcher 2708, a Codeword VLC (variable length code) Selector 2710, a Codeword VLCs 2712, a Model Converter and Frame Distance based Scaler 2714, a Reference Points mv's Residuals Computer 2716, a Residuals Entropy Coder 2718, a Modified Golomb Codes 2720, a lowest bitcost based Selector 2722, a Reference Points mv's Residuals Computer 2726, and a Residuals Entropy Coder 2728.

FIG. 27 shows an example GMM parameter and header encoder 112 that may be used to encode global motion model parameters. In this example, the coding of GMM parameters is based on the codebook principle. The codebook of up to 8 last encountered parameters is kept and updated with every new frame via Codebook of Past GMM Reference Points mv's 2704. There is one codebook kept for each model separately, therefore resulting in a total of 3 codebooks in the system. The entries in the codebook (e.g., the codewords) are used as predictors for the current parameters. Each codeword includes the reference points' motion vectors (corresponding to previous GMM parameters) along with the number of parameters information, as well as the frame distance fd (distance between the current and reference frames) and the direction dir that was used in estimating the model.

The final computed GMM parameters are first converted to the frame-level reference points via GMM parameters to Reference-Points mv's converter 2702. As previously described in detail, the number of reference points depends on the model. An n-parameter model uses n/2 reference points. Therefore, n/2 motion vectors corresponding to the motion at the reference points are computed in the first step. The computed motion vectors may be quantized to a ¼-pel accuracy.

In the illustrated example, two coded bits may computed in parallel: (1) coded residuals with the latest codeword via Residuals Entropy Coder 2718, and (2) coded residuals with the closest matched codeword via Residuals Entropy Coder 2728 and/or codebook index code via Codeword VLC (variable length code) Selector 2710.

In the first path, the latest model from all 3 codebooks is chosen from Codebook of Past GMM Reference Points mv's 2704, denoted in the diagram by latest, and then scaled according to the fd and dir values so that it matches to ref_pts_mvs's distance and direction via Model Converter and Frame Distance based Scaler 2714. In addition to scaling, the model is converted to match the number of points in the current model. In the case when the current model has more points than the latest model, the model is reconstructed and the missing additional points' MVs are computed and added to the latest model's points' MVs. The resulting predicted points are referred to in the diagram as predicted_latest_ref_pts_mvs.

The resulting predicted points predicted_latest_ref_pts_mvs may be differenced with ref_pts_mvs to produce the residuals via Reference Points mv's Residuals Computer 2716.

Such residuals may then be encoded via Residuals Entropy Coder 2718 with the modified Golomb code from Modified Golomb Codes 2720. The modified Golomb codes may be adaptive and either sharp, medium of flat table is chosen based on previous residual magnitude.

The first coded bits may be redirected to lowest bitcost based Selector 2722, which serves to select the method with smallest bitcost. The lowest bitcost based Selector 2722 also has as an input the $2^{nd}$ coded bits which are obtained in the second path, as stated earlier.

In the $2^{nd}$ path, the computed points ref_pts_mvs are compared to the points from to the corresponding codebook using GMM Reference-Points mv's Matcher 2708. Before comparison, the points from Codebook of Past GMM Reference Points mv's 2704 may be scaled according to the fd and dir values via frame distance based scaler 2706. If ref_pts_mvs match to an entry in the codebook, the control signal exact_match is set to 1 via GMM Reference-Points mv's Matcher 2708 and the process outputs the bits for the codebook index as the $2^{nd}$ set of coded bits.

Otherwise, exact_match is set to 0 via GMM Reference-Points mv's Matcher 2708 and the ref_pts_mvs are coded differentially as follows. The closest model computed by GMM Reference-Points mv's Matcher 2708, and denoted by scaled_matched_ref_pts_mvs in the diagram, is used to compute the residuals via Reference Points mv's Residuals Computer 2726. The residuals are computed and encoded via Residuals Entropy Coder 2728 with modified adaptive Golomb codes from Modified Golomb Codes 2720. The bits for the codebook index and the residual bits are joined into $2^{nd}$ set of coded bits. The final step is to select the coding method and output the final coded bits to which a one-bit selection bit is prepended.

Figure 28:
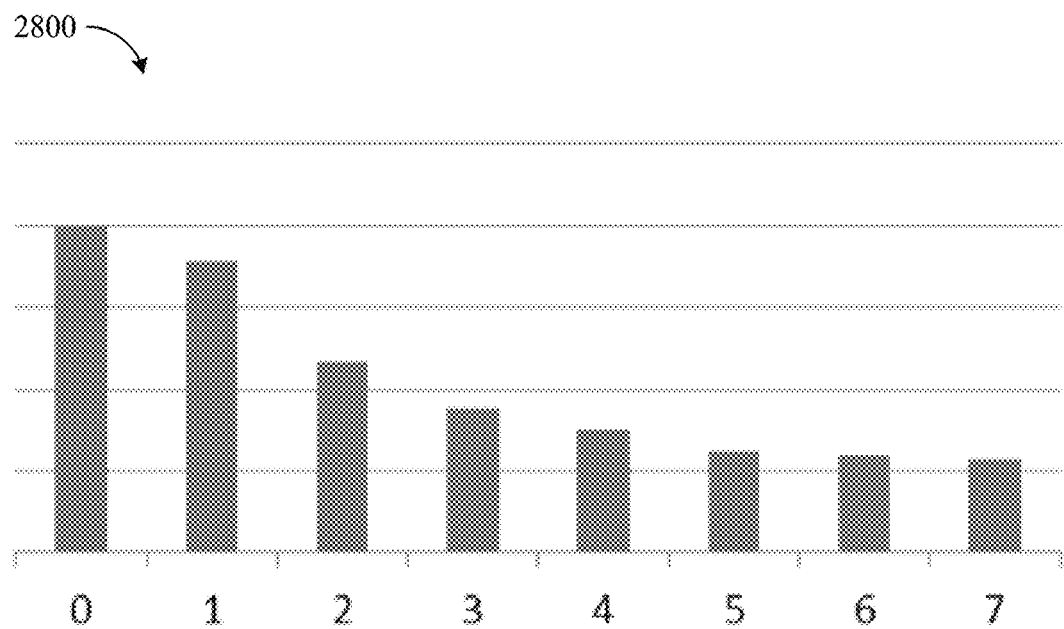
FIG. 28 is an illustrative chart of an example probability distribution of the best past codebook models according to an embodiment.

Each entry in the codebook is also associated with a codeword from Codeword VLCs 2712 selected by Codeword VLC (variable length code) Selector 2710, which is used to encode its index. The probability distribution of the most optimal codebook model in respect to the current frame is slightly skewed towards the most recent model, as shown in FIG. 28. Based on these observations, Table 4 defines the variable length code (VLC) tables used for coding the codebook indices.

Table 4, below, illustrates a Variable length codes used for coding the codeword index in the codebook in GMM:

| Codeword | VLCs for all codewords in the codebook depending on the size of the codebook | | | | | | | |
|---|---|---|---|---|---|---|---|---|
| Index | size = 0/1 | size = 2 | size = 3 | size = 4 | size = 5 | size = 6 | size = 7 | size = 8 |
| 0 | — | 0 | 0 | 00 | 00 | 00 | 00 | 00 |
| 1 | — | 1 | 10 | 01 | 01 | 01 | 01 | 01 |
| 2 | — | — | 11 | 10 | 10 | 100 | 100 | 100 |
| 3 | — | — | — | 11 | 110 | 101 | 101 | 101 |
| 4 | — | — | — | — | 111 | 110 | 110 | 1100 |
| 5 | — | — | — | — | — | 111 | 1110 | 1101 |
| 6 | — | — | — | — | — | — | 1111 | 1110 |
| 7 | — | — | — | — | — | — | — | 1111 |

FIG. 28 is an illustrative chart 2800 of an example probability distribution of the best past codebook models, arranged in accordance with at least some implementations of the present disclosure. In various implementations, chart 2800 illustrates a probability distribution of the best past codebook models (with codebook indices 0-7) for the current frame. It can be observed that the most likely optimal model is the most recent one (index 0) while the least likely is the oldest (index 7). However, the distribution is not too peaky.

In the proposed approach, each model may have its own codebook. In Mode 0, as well as Mode 1, there may be a plurality (e.g., 3) codebooks being maintained since each of the modes allows for a plurality (e.g., up to 3) models.

Codebook-based methods described herein may switch between coding an exact model with the codebook index and coding the index and the error residuals. In order to determine which coding method is adequate for the given frame, SADs of all past parameters from the corresponding model's codebook may be computed. The parameter set corresponding to the smallest SAD may be chosen and the SAD of the computed model may be compared to it. If the SAD of the chosen codebook model up to a threshold (e.g., 1% larger than the SAD of the computed model), the codebook model may be chosen and encoded according to the Table 4. Otherwise, the computed model may be chosen. Next, a method of coding the computed model with a prediction approach is described.

Coding of the computed global motion model may be done by encoding the residuals of the predicted global motion vectors of the reference points (i.e. control grid points). As discussed earlier, the number of reference points depends on the number of parameter of the model. The prediction of the motion vectors at the reference points may be done with the global motion model from the previous frame, even though the model of the current frame and that of the previous frame could differ. In the case when the models of the current and previous frames are the same or if the current frame model uses less reference points, the motion vectors at grid points may be copied from previous frame. However, if the current frame model is more complex, e.g., it uses more points than the model of the previous frame, then the motion vectors of the reference points of the previous frame are all copied, and additional missing reference points may be computed with the model from the previous frame. Once predicted reference points are obtained, the differential (residual) between them and the motion vectors at reference points corresponding to the current frame's computed global motion model may be obtained and coded with, "modified" generalized Golomb codes.

Instead of relying on exp-Golomb code like in MPEG-4 global motion parameters coding, an adaptive VLC method may be used in some implementations herein, which is able to select one of 3 contexts based on the previously observed differentials/residuals. When a past differential is small (magnitude is <=4), the sharp VLC table may be used. The sharp VLC table may be a modified generalized exp-Golomb code with k=0 where first 15 entries are modified to sizes {1, 3, 3, 4, 4, 6, 6, 7, 7, 7, 7, 7, 7, 8, 8}. An example VLC table is shown in Table 5. In the case when the past differential is of medium magnitude (>4 and <=64) then the medium VLC table may be used. The medium VLC table may be a modified generalized exp-Golomb code with k=2 where first 30 entries are modified to sizes {3, 4, 4, 4, 4, 4, 4, 5, 5, 5, 5, 5, 5, 5, 5, 6, 6, 6, 6, 7, 7, 7, 7, 7, 7, 8, 8, 8, 8, 8}. An example VLC table is shown in Table 6. Finally when the past differentials are large (>64), the flat VLC table may be used. The flat VLC table may be the modified generalized exp-Golomb code with k=5 where the first 40 entries are modified to sizes {5, 6, 6, 6, 6, 6, 6, 6, 6, 6, 6, 6, 6, 6, 6, 6, 6, 6, 6, 6, 6, 6, 6, 6, 6, 6, 6, 7, 7, 7, 7, 7, 7, 8, 8, 8, 8, 8}. An example VLC table is shown in Table 7.

The following tables show details of the "modified" generalized Golomb codes used in GMM. The motion vector differential value m is represented as a non-negative integer $v_m$ using the following rule:

$$v_m = \begin{cases} 2m - 1 & \text{when } m > 0, \\ -2m & \text{when } m \leq 0. \end{cases}$$

Table 5, below, illustrates the sharp VLC table uses modified generalized exp-Golomb code with k=0 where the first 15 entries are modified to better fit experimentally observed statistics:

| m | $v_m$ | Exp-Golomb Code | Bit Length |
|---|---|---|---|
| 0 | 0 | 1 | 1 |
| 1 | 1 | 011 | 3 |
| −1 | 2 | 010 | 3 |
| 2 | 3 | 0011 | 4 |
| −2 | 4 | 0010 | 4 |
| 3 | 5 | 000111 | 6 |
| −3 | 6 | 000110 | 6 |
| 4 | 7 | 0001011 | 7 |
| −4 | 8 | 0001010 | 7 |
| 5 | 9 | 0001001 | 7 |
| −5 | 10 | 0001000 | 7 |
| 6 | 11 | 0000111 | 7 |
| −6 | 12 | 0000110 | 7 |
| 7 | 13 | 00001011 | 8 |
| −7 | 14 | 00001010 | 8 |
| . . . | . . . | Exp-Golomb (k = 0) | . . . |

Table 6, below, illustrates a medium VLC table that uses modified generalized exp-Golomb code with k=2 where the first 30 entries are modified to better fit experimentally observed statistics:

| m | $v_m$ | VLC Code | Bit Length |
|---|---|---|---|
| 0 | 0 | 111 | 3 |
| 1 | 1 | 1101 | 4 |
| −1 | 2 | 1100 | 4 |
| 2 | 3 | 1011 | 4 |
| −2 | 4 | 1010 | 4 |
| 3 | 5 | 1001 | 4 |
| −3 | 6 | 1000 | 4 |
| 4 | 7 | 01111 | 5 |
| −4 | 8 | 01110 | 5 |
| 5 | 9 | 01101 | 5 |
| −5 | 10 | 01100 | 5 |
| 6 | 11 | 01011 | 5 |
| −6 | 12 | 01010 | 5 |
| 7 | 13 | 01001 | 5 |
| −7 | 14 | 01000 | 5 |
| 8 | 15 | 001111 | 6 |
| −8 | 16 | 001110 | 6 |
| 9 | 17 | 001101 | 6 |
| −9 | 18 | 001100 | 6 |
| 10 | 19 | 0001111 | 7 |
| −10 | 20 | 0001110 | 7 |
| 11 | 21 | 0001101 | 7 |
| −11 | 22 | 0001100 | 7 |
| 12 | 23 | 0001011 | 7 |
| −12 | 24 | 0001010 | 7 |
| 13 | 25 | 00010011 | 8 |
| −13 | 26 | 00010010 | 8 |
| 14 | 27 | 00010001 | 8 |
| −14 | 28 | 00010000 | 8 |
| 15 | 29 | 00001111 | 8 |
| ... | ... | Exp-Golomb (k = 2) | ... |

Table 7, below, illustrates, a flat VLC table that uses modified generalized exp-Golomb code with k=5 where the first 40 entries are modified to better fit experimentally observed statistics:

| m | $v_m$ | VLC Code | Bit Length |
|---|---|---|---|
| 0 | 0 | 11111 | 5 |
| 1 | 1 | 111101 | 6 |
| −1 | 2 | 111100 | 6 |
| 2 | 3 | 111011 | 6 |
| −2 | 4 | 111010 | 6 |
| 3 | 5 | 111001 | 6 |
| −3 | 6 | 111000 | 6 |
| 4 | 7 | 110111 | 6 |
| −4 | 8 | 110110 | 6 |
| 5 | 9 | 110101 | 6 |
| −5 | 10 | 110100 | 6 |
| 6 | 11 | 110011 | 6 |
| −6 | 12 | 110010 | 6 |
| 7 | 13 | 110001 | 6 |
| −7 | 14 | 110000 | 6 |
| 8 | 15 | 101111 | 6 |
| −8 | 16 | 101110 | 6 |
| 9 | 17 | 101101 | 6 |
| −9 | 18 | 101100 | 6 |
| 10 | 19 | 101011 | 6 |
| −10 | 20 | 101010 | 6 |
| 11 | 21 | 101001 | 6 |
| −11 | 22 | 101000 | 6 |
| 12 | 23 | 100111 | 6 |
| −12 | 24 | 100110 | 6 |
| 13 | 25 | 100101 | 6 |
| −13 | 26 | 100100 | 6 |
| 14 | 27 | 100011 | 6 |
| −14 | 28 | 100010 | 6 |
| 15 | 29 | 1000011 | 7 |
| −15 | 30 | 1000010 | 7 |
| 16 | 31 | 1000001 | 7 |
| −16 | 32 | 1000000 | 7 |
| 17 | 33 | 0111111 | 7 |
| −17 | 34 | 0111110 | 7 |
| 18 | 35 | 01111011 | 8 |
| −18 | 36 | 01111010 | 8 |
| 19 | 37 | 01111001 | 8 |
| −19 | 38 | 01111000 | 8 |
| 20 | 39 | 01110111 | 8 |
| ... | ... | Exp-Golomb (k = 5) | ... |

Figure 29A:
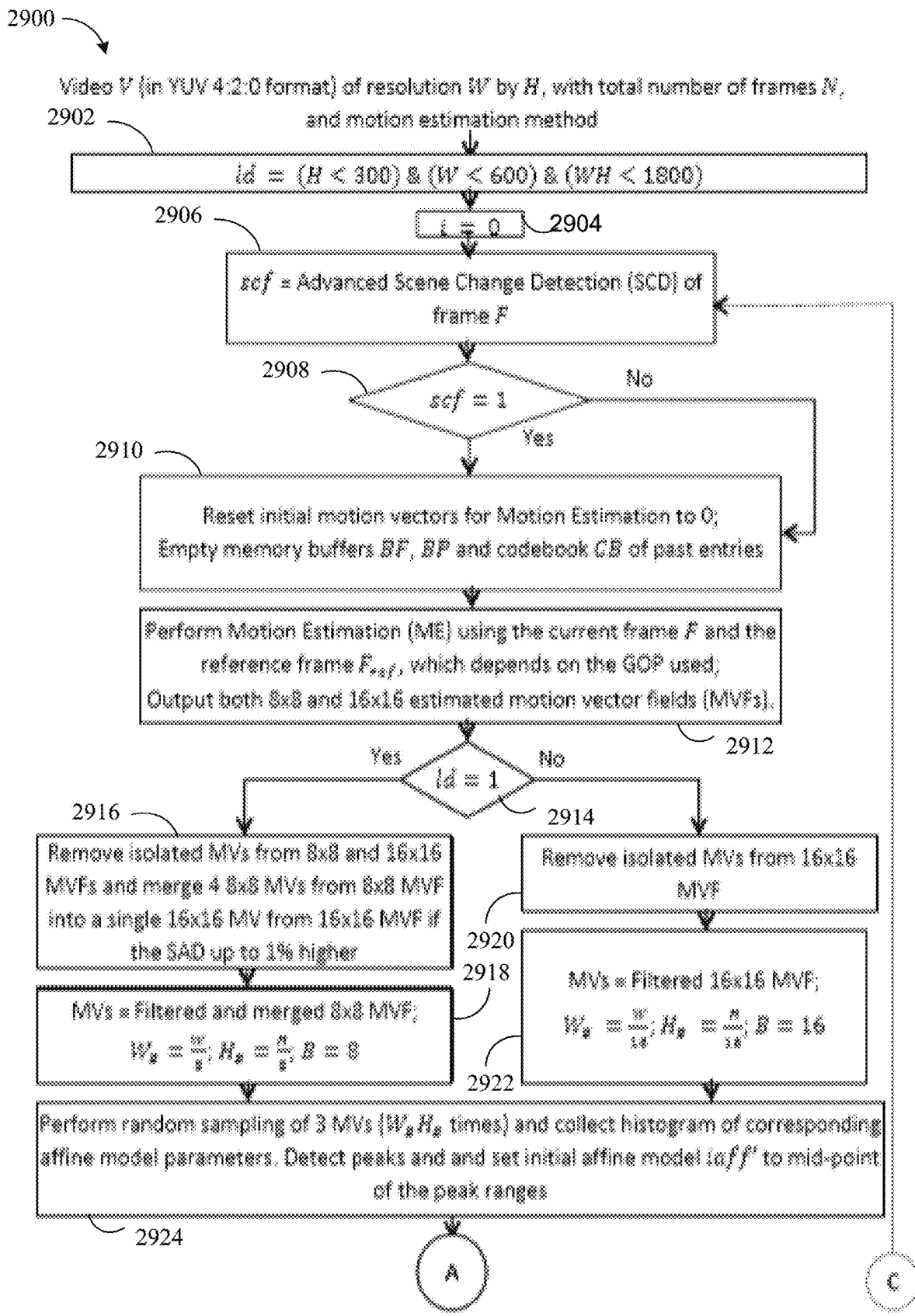
FIGS. 29A-29C are an illustrative flow chart of an example process for the global motion analyzer system according to an embodiment.
Figure 29B:
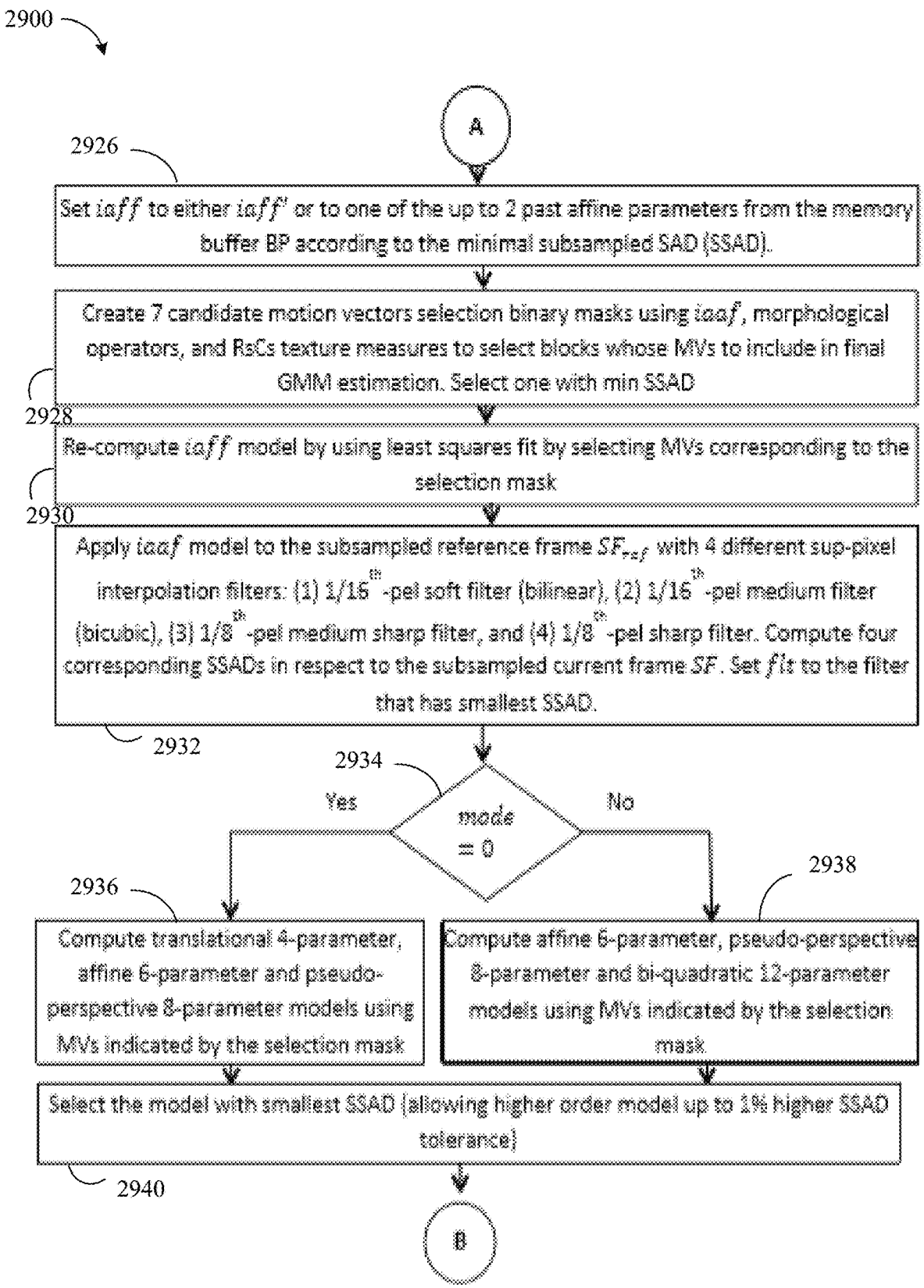
Figure 29C:
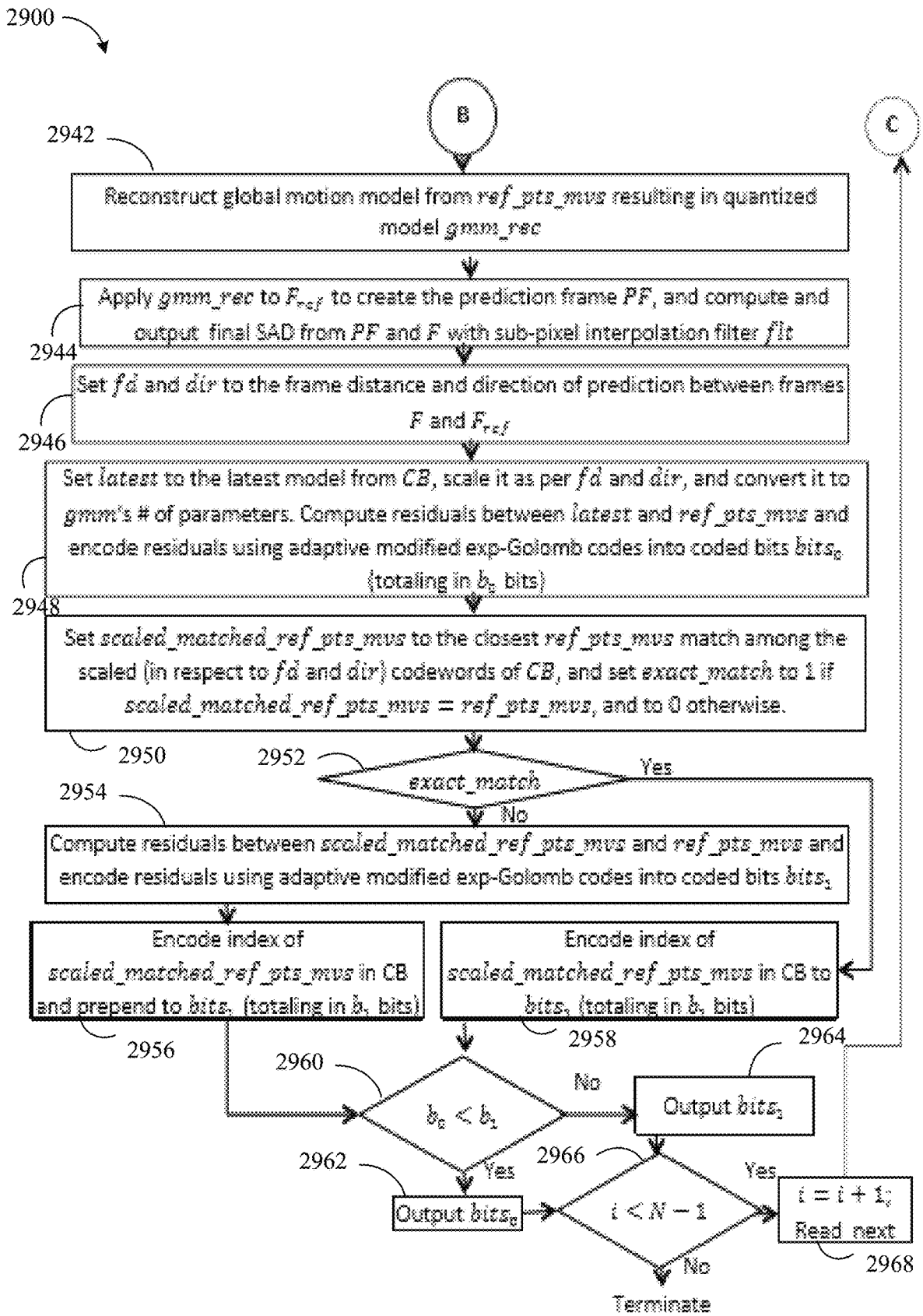

FIGS. 29A-29C shows a process 2900 of global motion estimation and compensation, arranged in accordance with at least some implementations of the present disclosure. In various implementations, process 2900 may generally be implemented via one or more of the components of the global motion analyzer system 100 (e.g., global motion analyzer system 100 of FIG. 1, FIG. 3, and/or FIG. 4), already discussed.

At operation 2902 "ld=(H<300) & (W<600) & (WH<1800)" if a frame width is smaller than 600, frame height is smaller than 300, and the product of frame width and height is smaller than 180,000, then sequence is classified as low definition via a low definition flag (ld). If H<300 and W<600 and W×H<180,000 then set ld=1; otherwise set ld=0.

At operation 2904 "i=0"

At operation 2906 "scf=Advanced Scene Change Detection (SCD) of frame f'" scene change detection may be performed to set a scene change flag (scf).

At operation 2908 "scf=1" scene change flag (scf)=1 indicates that a scene change has been detected, while scene change flag (scf)=0 indicates that no scene change has been detected.

When operation 2908 is met (e.g., a scene change has been detected), at operation 2910 "Reset initial motion vectors for Motion Estimation to 0; Empty memory buffers BF, BP and codebook CB of past entries" initial motion vectors for Motion Estimation may be reset to zero, and memory buffers BF, BP and codebook CB may be emptied of past entries.

When operation 2908 is not met (e.g., a scene change has not been detected), at operation 2912 "Perform Motion Estimation (ME) using the current frame F and the reference frame Fref, which depends on the GOP used; Output both 8×8 and 16×16 estimated motion vector fields (MVFs)" block motion estimation may be performed between current frame F and the reference frame Fref.

At operation 2914 "ld=1" a determination may be made as to whether the current fame is low definition, where low definition flag (ld)=1 indicates low definition.

When operation 2914 is met (e.g., the current frame F is low definition), at operation 2916 "remove isolated MVs from 8×8 and 16×16 MVFs and merge 4 8×8 MVs from 8×8 MVF into a singe 16×16 MV from 16×16 MVF if the SAD up to 1% higher" where primarily isolated MVs from 8×8 may be removed.

At operation 2918 "MVs=Filtered and merged 8×8 MVF; $W_B$=W/8, $H_B$=H/8, B=8" the remaining motion vectors may be filtered and merged.

When operation 2914 is not met (e.g., the current frame F is not low definition), at operation "Remove isolated MVs from 16×16 MVF" where primarily isolated MVs from 16×16 may be removed.

At operation 2922 "MVs=Filtered 16×16 MVF; $W_B$=W/16, $H_B$=H/16, B=16" remaining motion vectors may be filtered and merged.

At operation 2924 "Perform random sampling of 3 MVs ($W_B H_B$ times) and collect histogram of corresponding affine model parameters. Detect peaks and set initial affine model iaff' to mid-point of the peak ranges" a repeated random sampling may be performed three motion vectors at a time to calculate affine model parameters. For each parameter, a histogram may be utilized to detect a peak to set an initial affine model iaff' to a mid-point of the peak range.

At operation 2926 "Set iaff to either iaff' or to one of the up to 2 past affine parameters from the memory buffer BP according to the minimal subsampled SAD (SSAD)" two prior affine motion models from two prior frames as well as the initial affine model iaff' are used to select a best initial affine model iaff.

At operation 2928 "Create 7 candidate motion vectors selection binary masks using iaaf, morphological operators, and RsCs texture measures to select blocks whose MVs to include in final GMM estimation; Select one with min SAD" a plurality of candidate motion vectors selection binary masks may be created based on the best initial affine model iaff. A best selection mask from the candidate motion vectors selection binary mask with a minimum error may be selected.

As used herein the term "RsCs" is defined as the square root of average row difference square and average column difference squares over a given block of pixels.

At operation 2930 "Re-compute iaff model by using least squares fit by selecting MVs corresponding to the selection mask" the best initial affine model iaff may be re-computed based on the best selection mask.

At operation 2932 "Apply iaaf model to the subsampled reference frame SFref with 4 different sub-pixel interpolation filters: (1) $\frac{1}{16}^{th}$-pel soft filter (bilinear), (2) $\frac{1}{16}^{th}$-pel medium filter (bicubic), (3) $\frac{1}{8}^{th}$ pel medium sharp filter, and (4) $\frac{1}{8}^{th}$ pel sharp filter; Compute four corresponding SSADs in respect to the subsampled current frame SF; Set fit to the filter that has the smallest SSAD" the re-computed best initial affine model iaff may be applied to a subsampled reference frame SFref with several different sub-pixel interpolation filters.

At operation 2934 "mode=0" a determination may be made regarding a mode of operation. Mode 0 (default mode)—is a mode designed for sequences with normal motion complexity. Mode 1—is a mode designed for sequences with complex motion (such as sequences with high perspective depth, fast motion etc.).

When operation 2934 is met, at operation 2936 "Compute translational 4-parameter, affine 6-parameter and pseudo-perspective 8-parameter models using MVs indicated by the selection mask" when operating in mode 0 (default mode) process 2900 may adaptively switch on a frame basis between translational 4-parameter, affine 6-parameter and pseudo-perspective 8-parameter global motion model.

When operation 2934 is not met, at operation 2938 "Compute affine 6-parameter, pseudo-perspective 8-parameter, and bi-quadratic 12-parameter models using MVs indicated by the selection mask" when operating in mode 1 process 2900 may adaptively switch on a frame basis between affine 6-parameter, pseudo-perspective 8-parameter and bi-quadratic 12-parameter global motion model.

At operation 2940 "Select the model with smallest SSAD (allowing higher order model up to 1% higher SSAD tolerance" final global motion model parameters may be selected based on the smallest subsampled error.

At operation 2942 "Reconstruct global motion model form ref_pts_mvs resulting in quantized model gmm_rec" the final global motion model parameters may be applied to frame-based reference points to form reference points motion vectors ref_pts_mvs. The computed reference points motion vectors ref_pts_mvs may be quantized, e.g., to a ¼-pel accuracy. Next, from the reference points motion vectors ref_pts_mvs, the reconstructed parameters gmm_rec may be generated. The reconstructed parameters gmm_rec may be obtained by solving the system of equations for the motion vectors at the reference points.

At operation 2944 "Apply gmm_rec to Fref to create the prediction frame PF, and compute and output final SAD from PF and F with sub-pixel interpolation filter flt" the reconstructed parameters gmm_rec may be applied to the reference frame Fref to create the prediction frame PF. the prediction frame PF may be generated by applying the reconstructed parameters gmm_rec to the pixels of the reference frame Fref where sub-pixel positions may be interpolated with the previously chosen filter filt.

At operation 2946 "Set fd and dir to the frame distance and direction of prediction between frames F and Fref" a frame distance fd (distance between the current frame F and reference frames Fref) and a direction dir may be set by the frame distance and direction of prediction that was used in estimating the model between the current frame F and the reference frames Fref.

At operation 2948 "Set latest to the latest model from CB, scale it as per fd and dir, and convert it to gram's # of parameters; Compute residuals between latest and ref_pts_mvs and encode residuals using adaptive modified exp-goulomb coders into coded bits $bits_0$ (totaling in $b_0$ bits)" the latest model from at least one codebook (CB) may be chosen, and then scaled according to the fd and dir values so that it matches to ref_pts_mvs's distance and direction. In addition to scaling, the model may be converted to match the number of points in the current model. In the case when the current model has more points than the latest model, the model may be reconstructed and the missing additional points' MVs may be computed and added to the latest model's points' MVs. The resulting predicted points are differenced with ref_pts_mvs to produce the residuals, which are then encoded with the modified Golomb code.

At operation 2950 "Set scaled_matched_ref_pts_mvs to the closest ref_pts_mvs match among the scaled (in respect to fd and dir) codewords of CB, and set exact_match to 1 if scaled_matched_ref_pts_mvs=ref_pts_mvs, and to 0 otherwise" the computed points ref_pts_mvs may be compared to the points from to the corresponding codebook using a matcher to find corresponding points from codebook (CB). Before comparison, the points from the codebook may be scaled according to the fd and dir values to get scaled matched reference points scaled_matched_ref_pts_mvs. If ref_pts_mvs match to an entry in the codebook, the control signal exact_match is set to 1. Otherwise, exact_match is set to 0.

At operation 2952 "exact_match=1" a determination may be made as to whether the exact_match control signal is set to 1 for an exact match or to 0 for not an exact match.

When operation 2952 is not met (e.g., not an exact match), at operation 2954 "Compute residuals between scaled_matched_ref_pts_mvs and ref_pts_mvs and encode residuals using adaptive modified exp-Golomb codes into coded bits bits$_1$," the closest model computed by the matcher, denoted by scaled_matched_ref_pts_mvs, may be used to compute the residuals with ref_pts_mvs. The residuals are computed and encoded with modified adaptive Golomb codes. The bits for the codebook index and the residual bits are joined into a $2^{nd}$ set of coded bits.

When operation 2952 is met (e.g., an exact match), at operation 2956 "Encode index of scaled_matched_ref_pts_mvs in CB and prepend to bits$_1$ (totaling in b$_1$ bits)" when ref_pts_mvs match to an entry in the codebook CB, the control signal exact_match is set to 1 and the process 2900 outputs the bits for the codebook index as the $2^{nd}$ set of coded bits.

At operation 2958 "Encode index of scaled_matched_ref_pts_mvs in CB and prepend to bits$_1$ (totaling in b$_1$ bits)" where an index of scaled_matched_ref_pts_mvs in CB is encoded and prepend to bits$_1$.

At operation 2960 "b$_0$<b$_1$," the bits b$_0$ from operation 2948 are compared to the bits b$_1$ from operation 2956 or 2958.

When operation 2960 is met (e.g., the bits b$_0$ from operation 2948 are smaller than the bits b$_1$ from operation 2956 or 2958), at operation 2962 "Output bits$_0$" the bits b$_0$ from operation 2948 are output.

When operation 2960 is not met (e.g., the bits b$_0$ from operation 2948 are not smaller than the bits b$_1$ from operation 2956 or 2958), at operation 2964 "Output bits$_1$" the bits b$_1$ from operation 2956 or 2958 are output.

At operation 2966 "i<N−1" a determination may be made as to whether counter i is completed.

When operation 2966 is met, at operation 2968 "i=i+1; Read next frame F" process 2900 iterates and increases counter i by one.

When operation 2966 is not met, then process 2900 is terminated.

Embodiments of the method 2900 (and other methods herein) may be implemented in a system, apparatus, processor, reconfigurable device, etc., for example, such as those described herein. More particularly, hardware implementations of the method 2900 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 2900 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, embodiments or portions of the method 2900 (and other methods herein) may be implemented in applications (e.g., through an application programming interface/API) or driver software running on an OS. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Results

SAD Reduction and Entropy Coding of GMM Model Parameter Results

One implementation was evaluated on test sets of various resolutions. The tabulated results use the following column headers:

F=the index of the current frame

R=the reference frame index

Ref SAD=the 8×8 block-based SAD (the reference SAD)

GMM SAD=is the global motion full frame SAD

NBB=refer to the number of 16×16 blocks in the frame whose GMM SAD is better or equal to the collocated Ref SAD Bits=total number of bits per frame spent for GMM parameters coding and coding of headers that signal the selected model and sub-pel filter SP Filter=denotes the selected sub-pel filter (values are "1/16 BIL"=1/16-pel Bilinear filter, "1/16 BIC"=1/16-pel Bicubic filter, "1/8 AVC"=1/8-pel AVC-based filter, and "1/8 HEVC"=1/8-pel HEVC-based filter)

Mod=is the chosen global motion model (values are "4par"=translational 4-parameter global motion model, "6-par"=affine 6-parameter global motion model, and "8par"=pseudo-perspective 8-parameter global motion model)

GMM Parameters=selected global motion model parameter coefficients

Frame Based SAD Reduction for Low Delay IPP Pictures

Table 8, below, illustrates an average SAD Results of GMM for CIF sequences (33 frame) with low delay IPP pictures:

| Sequence | Ref SAD (33 frame Avg) | GMM SAD (33 frame Avg) | NBB (33 frame Avg) | Bits (33 frame Avg) |
|---|---|---|---|---|
| Bus | 389601 | 836786 | 154 | 23 |
| City | 210014 | 420229 | 177 | 34 |
| Flower | 444764 | 990330 | 51 | 15 |
| Stefan | 614102 | 841802 | 101 | 54 |
| Mobile | 503788 | 702767 | 109 | 14 |
| Football | 349557 | 862037 | 40 | 41 |
| Foreman | 213772 | 433714 | 100 | 19 |
| Harbor | 481541 | 514964 | 163 | 16 |
| Soccer | 287422 | 750866 | 106 | 21 |
| Tennis | 286460 | 488897 | 169 | 12 |
| Tennis2 | 352610 | 583862 | 196 | 9 |
| Coast | 431386 | 593426 | 124 | 23 |

Table 9, below, illustrates SAD Results of GMM for CIF "Bus" sequence (33 frames) with Low Delay IPP pictures:

| F | R | Ref SAD | GMM SAD | NBB | Bits | SP Filter | Mod | GMM Parameters |
|---|---|---|---|---|---|---|---|---|
| 1 | 0 | 450196 | 879308 | 165 | 40 | 1/16 BIC | 4par | a0 = 1.005859 a1 = −4.5<br>a2 = 1.005371 a3 = −0.75 |
| 2 | 1 | 456828 | 892720 | 106 | 11 | 1/16 BIC | 4par | a0 = 1.005859 a1 = −4.5<br>a2 = 1.005859 a3 = −1.0 |

-continued

| F | R | Ref SAD | GMM SAD | NBB | Bits | SP Filter | Mod | GMM Parameters |
|---|---|---------|---------|-----|------|-----------|-----|----------------|
| 3 | 2 | 449217 | 874675 | 161 | 12 | 1/8 AVC | 4par | a0 = 1.004883 a1 = −4.5 a2 = 1.005371 a3 = −0.75 |
| 4 | 3 | 439079 | 870706 | 114 | 12 | 1/16 BIC | 4par | a0 = 1.004395 a1 = −4.5 a2 = 1.004395 a3 = −0.5 |
| 5 | 4 | 407518 | 841078 | 147 | 49 | 1/8 AVC | 8par | a0 = −0.000016 a1 = 0.0 a2 = 0.021859 a3 = −0.001953 a4 = −18.0 a5 = 0.001953 a6 = 0.017361 a7 = −2.0 |
| 6 | 5 | 385958 | 831714 | 131 | 19 | 1/8 HEVC | 4par | a0 = 1.00293 a1 = −4.25 a2 = 1.002441 a3 = −0.25 |
| 7 | 6 | 368091 | 821459 | 121 | 25 | 1/8 HEVC | 6par | a0 = 1.001465 a1 = −0.000977 a2 = −4.0 a3 = −0.000488 a4 = 1.000977 a5 = 0.0 |
| 8 | 7 | 338548 | 781961 | 176 | 50 | 1/16 BIC | 8par | a0 = −0.000014 a1 = 0.000002 a2 = 0.006471 a3 = −0.001953 a4 = −16.0 a5 = 0.001465 a6 = 0.002367 a7 = 0.0 |
| 9 | 8 | 336075 | 783359 | 154 | 6 | 1/16 BIC | 8par | a0 = −0.000014 a1 = 0.000002 a2 = 0.006471 a3 = −0.001953 a4 = −16.0 a5 = 0.001465 a6 = 0.002367 a7 = 0.0 |
| 10 | 9 | 329192 | 787734 | 132 | 23 | 1/16 BIL | 4par | a0 = 1.0 a1 = −4.0 a2 = 0.999023 a3 = 0.25 |
| 11 | 10 | 319843 | 758254 | 231 | 13 | 1/8 HEVC | 4par | a0 = 1.0 a1 = −4.0 a2 = 1.0 a3 = 0.0 |
| 12 | 11 | 339549 | 781136 | 195 | 7 | 1/8 HEVC | 4par | a0 = 1.0 a1 = −4.0 a2 = 1.0 a3 = 0.0 |
| 13 | 12 | 363667 | 767944 | 243 | 44 | 1/16 BIC | 8par | a0 = −0.000021 a1 = 0.000002 a2 = 0.007655 a3 = −0.002441 a4 = −17.0 a5 = 0.00293 a6 = 0.003235 a7 = 0.0 |
| 14 | 13 | 367329 | 790588 | 173 | 19 | 1/8 HEVC | 4par | a0 = 1.0 a1 = −4.25 a2 = 1.0 a3 = 0.0 |
| 15 | 14 | 366339 | 786652 | 193 | 15 | 1/8 HEVC | 4par | a0 = 1.0 a1 = −4.5 a2 = 1.0 a3 = 0.0 |
| 16 | 15 | 376432 | 816330 | 173 | 8 | 1/8 HEVC | 4par | a0 = 1.0 a1 = −4.5 a2 = 1.0 a3 = 0.0 |
| 17 | 16 | 375927 | 814829 | 172 | 8 | 1/8 HEVC | 4par | a0 = 1.0 a1 = −4.5 a2 = 1.0 a3 = 0.0 |
| 18 | 17 | 369877 | 786601 | 161 | 15 | 1/8 HEVC | 6par | a0 = 1.0 a1 = −0.000977 a2 = −4.5 a3 = 0.0 a4 = 1.0 a5 = 0.0 |
| 19 | 18 | 349564 | 789818 | 182 | 14 | 1/8 HEVC | 4par | a0 = 1.0 a1 = −4.75 a2 = 1.0 a3 = 0.0 |
| 20 | 19 | 363053 | 823347 | 136 | 16 | 1/16 BIC | 4par | a0 = 1.000488 a1 = −5.25 a2 = 1.0 a3 = 0.0 |
| 21 | 20 | 406103 | 829013 | 185 | 45 | 1/8 HEVC | 8par | a0 = −0.000026 a1 = 0.000002 a2 = 0.00947 a3 = −0.002441 a4 = −23.0 a5 = 0.003418 a6 = 0.004104 a7 = 0.0 |
| 22 | 21 | 388160 | 856312 | 138 | 23 | 1/16 BIC | 4par | a0 = 0.999512 a1 = −5.75 a2 = 0.999023 a3 = 0.25 |
| 23 | 22 | 370195 | 863948 | 91 | 13 | 1/16 BIL | 4par | a0 = 1.0 a1 = −6.0 a2 = 0.999023 a3 = 0.25 |
| 24 | 23 | 381250 | 851249 | 172 | 43 | 1/8 HEVC | 8par | a0 = −0.000021 a1 = 0.000007 a2 = 0.006945 a3 = −0.003418 a4 = −25.0 a5 = 0.00293 a6 = 0.000868 a7 = 0.0 |
| 25 | 24 | 427065 | 867751 | 203 | 40 | 1/8 HEVC | 8par | a0 = −0.000028 a1 = 0.000002 a2 = 0.009233 a3 = −0.003418 a4 = −26.0 a5 = 0.004395 a6 = 0.004814 a7 = 0.0 |

-continued

| F | R | Ref SAD | GMM SAD | NBB | Bits | SP Filter | Mod | GMM Parameters |
|---|---|---------|---------|-----|------|-----------|-----|----------------|
| 26 | 25 | 396717 | 901297 | 108 | 19 | 1/8 AVC | 4par | a0 = 1.0 a1 = −6.75<br>a2 = 0.999023 a3 = 0.25 |
| 27 | 26 | 410356 | 875413 | 105 | 44 | 1/8 AVC | 8par | a0 = −0.00003<br>a1 = −0.000001<br>a2 = 0.010417<br>a3 = −0.002441 a4 = −29.0<br>a5 = 0.004395<br>a6 = 0.005761 a7 = 0.0 |
| 28 | 27 | 419391 | 926063 | 145 | 29 | 1/8 HEVC | 8par | a0 = −0.000033<br>a1 = 0.000003<br>a2 = 0.009785<br>a3 = −0.003418 a4 = −29.0<br>a5 = 0.004883<br>a6 = 0.004261 a7 = 0.0 |
| 29 | 28 | 446769 | 906014 | 114 | 36 | 1/8 AVC | 6par | a0 = 1.0 a1 = −0.000977<br>a2 = −7.25 a3 = 0.0<br>a4 = 1.0 a5 = 0.25 |
| 30 | 29 | 430705 | 897525 | 98 | 6 | 1/8 AVC | 6par | a0 = 1.0 a1 = −0.000977<br>a2 = −7.25 a3 = 0.0<br>a4 = 1.0 a5 = 0.25 |
| 31 | 30 | 414954 | 843836 | 183 | 40 | 1/8 AVC | 8par | a0 = −0.000035<br>a1 = 0.000002<br>a2 = 0.012547<br>a3 = −0.003418 a4 = −30.0<br>a5 = 0.004883<br>a6 = 0.005682 a7 = 0.0 |
| 32 | 31 | 423283 | 878507 | 108 | 7 | 1/8 HEVC | 6par | a0 = 1.0 a1 = −0.000977<br>a2 = −7.25 a3 = 0.0<br>a4 = 1.0 a5 = 0.25 |

Table 10, below, illustrates SAD Results of GMM for CIF "City" sequence (33 frames) with Low Delay IPP pictures:

| F | R | Ref SAD | GMM SAD | NBB | Bits | SP Filter | Mod | GMM Parameters |
|---|---|---------|---------|-----|------|-----------|-----|----------------|
| 1 | 0 | 212423 | 417803 | 254 | 75 | 1/8 HEVC | 8par | a0 = 0.000022<br>a1 = −0.000005<br>a2 = −0.007102<br>a3 = −0.005371 a4 = 9.0<br>a5 = −0.003418<br>a6 = −0.002131 a7 = 0.0 |
| 2 | 1 | 229550 | 439165 | 219 | 35 | 1/8 HEVC | 6par | a0 = 1.0 a1 = 0.001953<br>a2 = 1.75 a3 = 0.000488<br>a4 = 1.0 a5 = −0.75 |
| 3 | 2 | 205169 | 420018 | 157 | 49 | 1/8 HEVC | 8par | a0 = 0.000013<br>a1 = −0.000008<br>a2 = −0.003314<br>a3 = −0.004395 a4 = 5.0<br>a5 = −0.001953<br>a6 = 0.00071 a7 = −3.0 |
| 4 | 3 | 209697 | 411984 | 179 | 43 | 1/8 HEVC | 8par | a0 = 0.000008<br>a1 = −0.000012<br>a2 = −0.000631<br>a3 = −0.001953 a4 = 4.0<br>a5 = −0.003418<br>a6 = 0.00221 a7 = −3.0 |
| 5 | 4 | 215696 | 428456 | 230 | 28 | 1/8 HEVC | 6par | a0 = 1.0 a1 = −0.001953<br>a2 = 1.25 a3 = 0.0<br>a4 = 1.0 a5 = −0.5 |
| 6 | 5 | 219246 | 432101 | 172 | 17 | 1/8 HEVC | 6par | a0 = 1.0 a1 = −0.002441<br>a2 = 1.0 a3 = 0.0<br>a4 = 1.0 a5 = −0.5 |
| 7 | 6 | 208662 | 420065 | 168 | 53 | 1/8 HEVC | 8par | a0 = 0.000028 a1 = −0.0<br>a2 = −0.00797<br>a3 = −0.01123 a4 = 4.0<br>a5 = −0.001953<br>a6 = −0.00363 a7 = 0.0 |
| 8 | 7 | 200582 | 406064 | 205 | 33 | 1/8 HEVC | 6par | a0 = 1.0 a1 = −0.000977<br>a2 = 0.25 a3 = 0.000488<br>a4 = 1.0 a5 = 0.0 |

-continued

| F | R | Ref SAD | GMM SAD | NBB | Bits | SP Filter | Mod | GMM Parameters |
|---|---|---------|---------|-----|------|-----------|-----|----------------|
| 9 | 8 | 213050 | 407931 | 234 | 18 | 1/8 HEVC | 6par | a0 = 1.0 a1 = −0.002441<br>a2 = 0.25 a3 = 0.001465<br>a4 = 1.0 a5 = 0.0 |
| 10 | 9 | 209863 | 413712 | 118 | 41 | 1/8 HEVC | 8par | a0 = 0.000006<br>a1 = 0.000002<br>a2 = −0.002841<br>a3 = −0.008789 a4 = 1.0<br>a5 = 0.00293<br>a6 = −0.001973 a7 = 0.0 |
| 11 | 10 | 187940 | 400421 | 177 | 18 | 1/8 AVC | 6par | a0 = 0.999512<br>a1 = −0.001953<br>a2 = 0.5 a3 = 0.0<br>a4 = 1.0 a5 = 0.0 |
| 12 | 11 | 210591 | 412334 | 193 | 22 | 1/8 HEVC | 6par | a0 = 1.0 a1 = −0.003418<br>a2 = 1.0 a3 = 0.001465<br>a4 = 1.0 a5 = 0.0 |
| 13 | 12 | 206503 | 411588 | 222 | 48 | 1/8 AVC | 8par | a0 = 0.000011 a1 = 0.0<br>a2 = −0.004261<br>a3 = −0.013184 a4 = 6.0<br>a5 = 0.005859<br>a6 = −0.001894 a7 = 0.0 |
| 14 | 13 | 220126 | 425047 | 187 | 53 | 1/8 HEVC | 8par | a0 = 0.000023<br>a1 = 0.000019<br>a2 = −0.01239<br>a3 = −0.015625 a4 = 8.0<br>a5 = 0.00293<br>a6 = −0.01089 a7 = 2.0 |
| 15 | 14 | 216806 | 430851 | 216 | 43 | 1/8 AVC | 8par | a0 = 0.000017<br>a1 = −0.00001<br>a2 = −0.005682<br>a3 = −0.007813 a4 = 9.0<br>a5 = 0.001465<br>a6 = 0.000079 a7 = −2.0 |
| 16 | 15 | 204315 | 410581 | 146 | 34 | 1/16 BIC | 8par | a0 = 0.000019<br>a1 = −0.000009<br>a2 = −0.006313<br>a3 = −0.008789 a4 = 9.0<br>a5 = 0.000488<br>a6 = 0.000394 a7 = −4.0 |
| 17 | 16 | 220697 | 418895 | 204 | 48 | 1/8 HEVC | 8par | a0 = 0.000023<br>a1 = −0.000001<br>a2 = −0.008128<br>a3 = −0.015625 a4 = 8.0<br>a5 = 0.001953<br>a6 = −0.00292 a7 = −2.0 |
| 18 | 17 | 212522 | 439008 | 126 | 27 | 1/16 BIC | 6par | a0 = 1.0 a1 = −0.003418<br>a2 = 1.5 a3 = 0.001953<br>a4 = 1.0 a5 = −0.75 |
| 19 | 18 | 202083 | 427589 | 114 | 20 | 1/16 BIC | 6par | a0 = 1.0 a1 = −0.002441<br>a2 = 1.25 a3 = 0.001465<br>a4 = 1.0 a5 = −0.5 |
| 20 | 19 | 228566 | 432506 | 208 | 21 | 1/8 HEVC | 6par | a0 = 1.0 a1 = −0.001953<br>a2 = 1.5 a3 = 0.0<br>a4 = 1.000977 a5 = −0.75 |
| 21 | 20 | 214900 | 420494 | 168 | 45 | 1/8 AVC | 8par | a0 = 0.00003 a1 = 0.0<br>a2 = −0.010574<br>a3 = −0.014648<br>a4 = 9.0 a5 = 0.0<br>a6 = −0.006076 a7 = −1.0 |
| 22 | 21 | 210792 | 412003 | 210 | 42 | 1/16 BIC | 8par | a0 = 0.000026<br>a1 = 0.000004<br>a2 = −0.00947<br>a3 = −0.010254<br>a4 = 7.0 a5 = −0.001953<br>a6 = −0.005129 a7 = 1.0 |
| 23 | 22 | 209067 | 420550 | 205 | 23 | 1/8 HEVC | 6par | a0 = 1.0 a1 = −0.001953<br>a2 = 1.0 a3 = 0.000488<br>a4 = 0.999023 a5 = 0.25 |
| 24 | 23 | 192579 | 404646 | 182 | 18 | 1/8 HEVC | 6par | a0 = 1.0 a1 = −0.002441<br>a2 = 1.0 a3 = 0.0<br>a4 = 1.0 a5 = 0.0 |
| 25 | 24 | 210923 | 422503 | 180 | 22 | 1/8 AVC | 6par | a0 = 1.0 a1 = −0.000977<br>a2 = 1.0 a3 = 0.0<br>a4 = 1.0 a5 = −0.25 |

| F | R | Ref SAD | GMM SAD | NBB | Bits | SP Filter | Mod | GMM Parameters |
|---|---|---|---|---|---|---|---|---|
| 26 | 25 | 220190 | 426712 | 144 | 9 | 1/8 HEVC | 8par | a0 = 0.000023<br>a1 = 0.000019<br>a2 = −0.01239<br>a3 = −0.015625<br>a4 = 8.0 a5 = 0.00293<br>a6 = −0.01089 a7 = 2.0 |
| 27 | 26 | 217409 | 443848 | 120 | 31 | 1/8 HEVC | 6par | a0 = 1.0 a1 = −0.003418<br>a2 = 2.0 a3 = 0.001465<br>a4 = 1.0 a5 = 0.25 |
| 28 | 27 | 201569 | 415898 | 76 | 42 | 1/8 AVC | 8par | a0 = 0.000034<br>a1 = −0.000008<br>a2 = −0.010101<br>a3 = −0.015625 a4 = 9.0<br>a5 = 0.003418<br>a6 = −0.00292 a7 = 0.0 |
| 29 | 28 | 200677 | 404661 | 168 | 47 | 1/8 HEVC | 8par | a0 = 0.000043 a1 = 0.0<br>a2 = −0.015398<br>a3 = −0.018066 a4 = 10.0<br>a5 = 0.003418<br>a6 = −0.008523 a7 = −1.0 |
| 30 | 29 | 200552 | 414757 | 194 | 36 | 1/8 HEVC | 8par | a0 = 0.000019<br>a1 = −0.000001<br>a2 = 0.007023<br>a3 = −0.016602 a4 = 9.0<br>a5 = 0.005859<br>a6 = −0.003788 a7 = −1.0 |
| 31 | 30 | 203812 | 425640 | 154 | 28 | 1/8 HEVC | 6par | a0 = 1.0 a1 = −0.004395<br>a2 = 2.0 a3 = 0.001953<br>a4 = 1.0 a5 = −0.25 |
| 32 | 31 | 203885 | 429489 | 127 | 8 | 1/8 AVC | 6par | a0 = 1.0 a1 = −0.004395<br>a2 = 2.0 a3 = 0.001953<br>a4 = 1.0 a5 = −0.25 |

Table 11, below, illustrates SAD Results of GMM for CIF "Flower" sequence (33 frames) with Low Delay IPP pictures:

| F | R | Ref SAD | GMM SAD | NBB | Bits | SP Filter | Mod | GMM Parameters |
|---|---|---|---|---|---|---|---|---|
| 1 | 0 | 527540 | 1001145 | 39 | 35 | 1/8 AVC | 6par | a0 = 1.001953<br>a1 = 0.010254 a2 = −1.25<br>a3 = 0.0 a4 = 1.0<br>a5 = −0.25 |
| 2 | 1 | 463009 | 917449 | 93 | 65 | 1/16 BIC | 8par | a0 = 0.000001<br>a1 = 0.00001<br>a2 = 0.004656<br>a3 = 0.039063 a4 = −4.0<br>a5 = −0.001953<br>a6 = −0.003551 a7 = 0.0 |
| 3 | 2 | 355197 | 865089 | 47 | 27 | 1/16 BIC | 6par | a0 = 1.001953<br>a1 = 0.01123 a2 = −1.25<br>a3 = 0.0 a4 = 1.0<br>a5 = 0.0 |
| 4 | 3 | 327923 | 833806 | 68 | 12 | 1/8 HEVC | 6par | a0 = 1.001953<br>a1 = 0.010254 a2 = −1.25<br>a3 = 0.0 a4 = 1.0<br>a5 = 0.0 |
| 5 | 4 | 424389 | 909382 | 57 | 12 | 1/8 AVC | 6par | a0 = 1.001953<br>a1 = 0.010254 a2 = −1.25<br>a3 = −0.000488 a4 = 1.0<br>a5 = 0.0 |
| 6 | 5 | 426906 | 917955 | 63 | 12 | 1/16 BIC | 6par | a0 = 1.00293<br>a1 = 0.01123<br>a2 = −1.5 a3 = −0.000488<br>a4 = 1.0 a5 = 0.0 |
| 7 | 6 | 381103 | 900018 | 79 | 7 | 1/8 HEVC | 6par | a0 = 1.00293<br>a1 = 0.01123<br>a2 = −1.5 a3 = −0.000488<br>a4 = 1.0 a5 = 0.0 |

-continued

| F | R | Ref SAD | GMM SAD | NBB | Bits | SP Filter | Mod | GMM Parameters |
|---|---|---------|---------|-----|------|-----------|-----|----------------|
| 8 | 7 | 361055 | 886754 | 50 | 8 | 1/8 AVC | 6par | a0 = 1.001953<br>a1 = 0.01123 a2 = −1.25<br>a3 = 0.0 a4 = 1.0<br>a5 = 0.0 |
| 9 | 8 | 332791 | 869496 | 50 | 8 | 1/16 BIC | 6par | a0 = 1.001953<br>a1 = 0.01123 a2 = −1.25<br>a3 = 0.0 a4 = 1.0<br>a5 = 0.0 |
| 10 | 9 | 327951 | 863980 | 43 | 8 | 1/16 BIC | 6par | a0 = 1.001953<br>a1 = 0.01123 a2 = −1.25<br>a3 = 0.0 a4 = 1.0<br>a5 = 0.0 |
| 11 | 10 | 427390 | 925002 | 73 | 14 | 1/8 HEVC | 6par | a0 = 1.001953<br>a1 = 0.01123 a2 = −1.25<br>a3 = −0.000488 a4 = 1.0<br>a5 = 0.0 |
| 12 | 11 | 501845 | 1006280 | 46 | 7 | 1/8 AVC | 6par | a0 = 1.00293<br>a1 = 0.01123 a2 = −1.5<br>a3 = −0.000488<br>a4 = 1.0 a5 = 0.0 |
| 13 | 12 | 570213 | 1075441 | 47 | 18 | 1/8 AVC | 6par | a0 = 1.001953<br>a1 = 0.009766 a2 = −1.0<br>a3 = 0.0 a4 = 1.0<br>a5 = −0.25 |
| 14 | 13 | 635293 | 1145118 | 37 | 7 | 1/8 AVC | 6par | a0 = 1.001953<br>a1 = 0.009766 a2 = −1.0<br>a3 = 0.0 a4 = 1.0<br>a5 = −0.25 |
| 15 | 14 | 587789 | 1130642 | 38 | 12 | 1/16 BIC | 6par | a0 = 1.001953<br>a1 = 0.010254 a2 = −1.0<br>a3 = 0.0 a4 = 1.0<br>a5 = −0.25 |
| 16 | 15 | 501674 | 1030718 | 63 | 8 | 1/16 BIC | 6par | a0 = 1.001953<br>a1 = 0.009766 a2 = −1.0<br>a3 = 0.0 a4 = 1.0<br>a5 = −0.25 |
| 17 | 16 | 558112 | 1114428 | 50 | 8 | 1/8 AVC | 6par | a0 = 1.001953<br>a1 = 0.010254 a2 = −1.25<br>a3 = 0.0 a4 = 1.0<br>a5 = −0.25 |
| 18 | 17 | 610278 | 1145899 | 55 | 18 | 1/8 AVC | 6par | a0 = 1.001465<br>a1 = 0.008789 a2 = −0.75<br>a3 = 0.0 a4 = 1.000977<br>a5 = −0.5 |
| 19 | 18 | 583351 | 1117079 | 55 | 8 | 1/8 AVC | 6par | a0 = 1.001465<br>a1 = 0.008789 a2 = −0.75<br>a3 = 0.0 a4 = 1.000977<br>a5 = −0.5 |
| 20 | 19 | 520348 | 1051776 | 56 | 8 | 1/16 BIC | 6par | a0 = 1.001465<br>a1 = 0.008789 a2 = −0.75<br>a3 = 0.0 a4 = 1.000977<br>a5 = −0.5 |
| 21 | 20 | 515361 | 1078087 | 49 | 16 | 1/8 HEVC | 6par | a0 = 1.001953<br>a1 = 0.007813 a2 = −0.75<br>a3 = 0.000488<br>a4 = 1.000977 a5 = −0.5 |
| 22 | 21 | 489436 | 1054760 | 79 | 6 | 1/16 BIC | 8par | a0 = 0.000001<br>a1 = 0.00001<br>a2 = 0.004656<br>a3 = 0.039063 a4 = −4.0<br>a5 = −0.001953<br>a6 = −0.003551 a7 = 0.0 |
| 23 | 22 | 339256 | 942809 | 37 | 21 | 1/16 BIC | 6par | a0 = 1.001953<br>a1 = 0.010254 a2 = −1.0<br>a3 = 0.0 a4 = 1.0<br>a5 = 0.0 |
| 24 | 23 | 345407 | 944717 | 37 | 8 | 1/16 BIC | 6par | a0 = 1.001953<br>a1 = 0.010254 a2 = −1.0<br>a3 = 0.0 a4 = 1.0<br>a5 = 0.0 |
| 25 | 24 | 406658 | 987026 | 51 | 16 | 1/16 BIC | 6par | a0 = 1.001953<br>a1 = 0.009766 a2 = −0.75<br>a3 = −0.000488 a4 = 1.0<br>a5 = 0.0 |

-continued

| F | R | Ref SAD | GMM SAD | NBB | Bits | SP Filter | Mod | GMM Parameters |
|---|---|---|---|---|---|---|---|---|
| 26 | 25 | 347566 | 961225 | 44 | 8 | 1/8 AVC | 6par | a0 = 1.001953<br>a1 = 0.010254 a2 = −1.0<br>a3 = 0.0 a4 = 1.0<br>a5 = 0.0 |
| 27 | 26 | 337929 | 962653 | 34 | 8 | 1/16 BIC | 6par | a0 = 1.001953<br>a1 = 0.010254 a2 = −1.0<br>a3 = 0.0 a4 = 1.0<br>a5 = 0.0 |
| 28 | 27 | 378206 | 1006470 | 19 | 14 | 1/16 BIL | 6par | a0 = 1.001465<br>a1 = 0.008789 a2 = −0.5<br>a3 = 0.0 a4 = 1.0<br>a5 = 0.0 |
| 29 | 28 | 382465 | 992879 | 27 | 8 | 1/16 BIC | 6par | a0 = 1.001465<br>a1 = 0.008789 a2 = −0.5<br>a3 = 0.0 a4 = 1.0<br>a5 = 0.0 |
| 30 | 29 | 478232 | 1045325 | 60 | 17 | 1/16 BIC | 6par | a0 = 1.001953<br>a1 = 0.010254 a2 = −1.0<br>a3 = 0.000488 a4 = 1.0<br>a5 = −0.25 |
| 31 | 30 | 374235 | 993347 | 33 | 8 | 1/16 BIC | 6par | a0 = 1.001465<br>a1 = 0.008789 a2 = −0.5<br>a3 = 0.0 a4 = 1.0<br>a5 = 0.0 |
| 32 | 31 | 413527 | 1013810 | 61 | 50 | 1/8 HEVC | 8par | a0 = −0.00001 a1 = 0.0<br>a2 = 0.010496<br>a3 = 0.035645 a4 = −3.0<br>a5 = −0.001465<br>a6 = 0.00363 a7 = 0.0 |

Table 12, below, illustrates SAD Results of GMM for CIF "Stefan" sequence (33 frames) with Low Delay IPP pictures:

| F | R | Ref SAD | GMM SAD | NBB | Bits | SP Filter | Mod | GMM Parameters |
|---|---|---|---|---|---|---|---|---|
| 1 | 0 | 654874 | 1019482 | 52 | 134 | 1/16 BIL | 8par | a0 = −0.000303 a1 = −0.000066 a2 = 0.184738 a3 = 0.044434 a4 = −123.0 a5 = 0.040527 a6 = 0.137626 a7 = −18.0 |
| 2 | 1 | 651072 | 1025556 | 59 | 66 | 1/16 BIL | 8par | a0 = −0.000271<br>a1 = 0.000019<br>a2 = 0.170297<br>a3 = 0.01123 a4 = −118.0 a5 = 0.037598<br>a6 = 0.12279<br>a7 = −18.0 |
| 3 | 2 | 625153 | 1055452 | 41 | 6 | 1/16 BIL | 8par | a0 = −0.000271<br>a1 = 0.000019<br>a2 = 0.170297<br>a3 = 0.01123<br>a4 = −118.0<br>a5 = 0.037598<br>a6 = 0.12279<br>a7 = −18.0 |
| 4 | 3 | 644435 | 1086655 | 50 | 72 | 1/16 BIL | 8par | a0 = −0.000386<br>a1 = −0.000017<br>a2 = 0.219539<br>a3 = 0.015625<br>a4 = −117.0<br>a5 = 0.05127<br>a6 = 0.153725<br>a7 = −22.0 |
| 5 | 4 | 665556 | 944265 | 92 | 61 | 1/16 BIL | 8par | a0 = −0.000244<br>a1 = −0.000027<br>a2 = 0.165325<br>a3 = 0.005859 a4 = −110.0 a5 = 0.03418<br>a6 = 0.123264<br>a7 = −18.0 |

-continued

| F | R | Ref SAD | GMM SAD | NBB | Bits | SP Filter | Mod | GMM Parameters |
|---|---|---------|---------|-----|------|-----------|-----|----------------|
| 6 | 5 | 668844 | 1003037 | 73 | 52 | 1/16 BIL | 8par | a0 = −0.000238<br>a1 = −0.000082<br>a2 = 0.169587<br>a3 = 0.016602<br>a4 = −107.0<br>a5 = 0.034668<br>a6 = 0.133523<br>a7 = −19.0 |
| 7 | 6 | 647494 | 928122 | 103 | 61 | 1/16 BIL | 8par | a0 = −0.000216<br>a1 = −0.000019<br>a2 = 0.155382<br>a3 = 0.005859<br>a4 = −102.0<br>a5 = 0.03125<br>a6 = 0.115767<br>a7 = −17.0 |
| 8 | 7 | 618380 | 920572 | 89 | 53 | 1/16 BIL | 8par | a0 = −0.000202<br>a1 = 0.000009<br>a2 = 0.147648 a3 = −0.003418 a4 = −97.0<br>a5 = 0.029785<br>a6 = 0.108112<br>a7 = −17.0 |
| 9 | 8 | 647492 | 915804 | 84 | 51 | 1/16 BIL | 8par | a0 = −0.000232<br>a1 = −0.000021<br>a2 = 0.162484<br>a3 = 0.002441 a4 = −96.0 a5 = 0.032715<br>a6 = 0.12137<br>a7 = −19.0 |
| 10 | 9 | 645440 | 874790 | 109 | 50 | 1/16 BIL | 8par | a0 = −0.000214<br>a1 = −0.000034<br>a2 = 0.154198<br>a3 = 0.009766 a4 = −94.0 a5 = 0.029785<br>a6 = 0.11703<br>a7 = −18.0 |
| 11 | 10 | 632047 | 874523 | 93 | 8 | 1/16 BIL | 8par | a0 = −0.000214 a1 = −0.000034<br>a2 = 0.154198<br>a3 = 0.009766<br>a4 = −94.0<br>a5 = 0.029785<br>a6 = 0.11703<br>a7 = −18.0 |
| 12 | 11 | 618218 | 862980 | 116 | 51 | 1/16 BIL | 8par | a0 = −0.000209 a1 = −0.000041<br>a2 = 0.142282<br>a3 = 0.005371<br>a4 = −90.0<br>a5 = 0.030762<br>a6 = 0.107481<br>a7 = −17.0 |
| 13 | 12 | 610206 | 817830 | 94 | 55 | 1/16 BIL | 8par | a0 = −0.00022<br>a1 = 0.000005<br>a2 = 0.13589<br>a3 = 0.000977<br>a4 = −88.0<br>a5 = 0.030762<br>a6 = 0.088068<br>a7 = −15.0 |
| 14 | 13 | 609041 | 828579 | 100 | 51 | 1/16 BIL | 8par | a0 = −0.000186<br>a1 = 0.000006<br>a2 = 0.113715 a3 = −0.000977 a4 = −84.0<br>a5 = 0.027832<br>a6 = 0.078835<br>a7 = −13.0 |
| 15 | 14 | 602598 | 821354 | 96 | 64 | 1/16 BIL | 8par | a0 = −0.00023 a1 = −0.000036 a2 = 0.125631<br>a3 = 0.007813<br>a4 = −84.0<br>a5 = 0.030762<br>a6 = 0.086174<br>a7 = −13.0 |

-continued

| F | R | Ref SAD | GMM SAD | NBB | Bits | SP Filter | Mod | GMM Parameters |
|---|---|---------|---------|-----|------|-----------|-----|----------------|
| 16 | 15 | 588861 | 850276 | 101 | 43 | 1/16 BIL | 8par | a0 = −0.000182<br>a1 = 0.000025<br>a2 = 0.097696 a3 = −0.000977 a4 = −80.0<br>a5 = 0.027832<br>a6 = 0.059265<br>a7 = −11.0 |
| 17 | 16 | 597418 | 825002 | 111 | 54 | 1/16 BIL | 8par | a0 = −0.000211 a1 = −0.000008<br>a2 = 0.105271<br>a3 = 0.002441<br>a4 = −80.0<br>a5 = 0.029297<br>a6 = 0.064946<br>a7 = −11.0 |
| 18 | 17 | 585503 | 807038 | 91 | 48 | 1/16 BIL | 8par | a0 = −0.000183 a1 = −0.000005<br>a2 = 0.087358<br>a3 = −0.001953<br>a4 = −77.0<br>a5 = 0.02832<br>a6 = 0.055161<br>a7 = −10.0 |
| 19 | 18 | 578727 | 765652 | 99 | 49 | 1/16 BIL | 8par | a0 = −0.00018<br>a1 = 0.000013<br>a2 = 0.082307 a3 = −0.002441 a4 = −75.0<br>a5 = 0.02832<br>a6 = 0.046717<br>a7 = −9.0 |
| 20 | 19 | 587894 | 780533 | 104 | 41 | 1/16 BIL | 8par | a0 = −0.000185<br>a1 = 0.000025<br>a2 = 0.077178 a3 = −0.004395 a4 = −72.0<br>a5 = 0.02832<br>a6 = 0.040167<br>a7 = −8.0 |
| 21 | 20 | 592239 | 793588 | 81 | 61 | 1/16 BIL | 8par | a0 = −0.000175 a1 = −0.000033<br>a2 = 0.06684<br>a3 = 0.014648<br>a4 = −69.0<br>a5 = 0.024902<br>a6 = 0.036616<br>a7 = −6.0 |
| 22 | 21 | 591439 | 744479 | 169 | 55 | 1/16 BIC | 8par | a0 = −0.000164<br>a1 = 0.000007<br>a2 = 0.059738 a3 = −0.003418 a4 = −65.0<br>a5 = 0.023926<br>a6 = 0.028646<br>a7 = −6.0 |
| 23 | 22 | 605240 | 771242 | 142 | 51 | 1/16 BIC | 8par | a0 = −0.000156<br>a1 = 0.000013<br>a2 = 0.057686 a3 = −0.000977 a4 = −62.0<br>a5 = 0.024902<br>a6 = 0.025174<br>a7 = −7.0 |
| 24 | 23 | 583796 | 781793 | 113 | 61 | 1/16 BIC | 8par | a0 = −0.000114<br>a1 = 0.000033<br>a2 = 0.037169 a3 = −0.01123 a4 = −55.0<br>a5 = 0.019043<br>a6 = 0.009233<br>a7 = −6.0 |
| 25 | 24 | 599172 | 738157 | 92 | 51 | 1/16 BIC | 8par | a0 = −0.000129<br>a1 = 0.000064<br>a2 = 0.036537 a3 = −0.008789 a4 = −51.0<br>a5 = 0.020508<br>a6 = 0.001657<br>a7 = −6.0 |
| 26 | 25 | 596005 | 748481 | 111 | 68 | 1/16 BIC | 8par | a0 = −0.000103 a1 = −0.000044<br>a2 = 0.027936 |

-continued

| F | R | Ref SAD | GMM SAD | NBB | Bits | SP Filter | Mod | GMM Parameters |
|---|---|---------|---------|-----|------|-----------|-----|----------------|
|   |   |         |         |     |      |           |     | a3 = 0.001953 a4 = −45.0 a5 = 0.01709 a6 = 0.015704 a7 = −5.0 |
| 27 | 26 | 595740 | 742557 | 112 | 59 | 1/16 BIC | 8par | a0 = −0.000105 a1 = 0.000046 a2 = 0.017045 a3 = −0.004395 a4 = −39.0 a5 = 0.01709 a6 = −0.0116 a7 = −3.0 |
| 28 | 27 | 588121 | 730107 | 130 | 59 | 1/8 AVC | 8par | a0 = −0.000085 a1 = 0.0 a2 = 0.006155 a3 = 0.000977 a4 = −34.0 a5 = 0.013672 a6 = −0.009549 a7 = −1.0 |
| 29 | 28 | 584520 | 742937 | 80 | 53 | 1/16 BIC | 8par | a0 = −0.000097 a1 = −0.000014 a2 = 0.009864 a3 = −0.004395 a4 = −31.0 a5 = 0.013672 a6 = −0.004498 a7 = 0.0 |
| 30 | 29 | 580826 | 694025 | 171 | 44 | 1/16 BIC | 8par | a0 = −0.000091 a1 = −0.000017 a2 = 0.005445 a3 = 0.000977 a4 = −28.0 a5 = 0.012695 a6 = −0.006155 a7 = 1.0 |
| 31 | 30 | 619900 | 729157 | 112 | 50 | 1/16 BIC | 8par | a0 = −0.000088 a1 = 0.000013 a2 = 0.000552 a3 = −0.004395 a4 = −25.0 a5 = 0.013672 a6 = −0.017519 a7 = 2.0 |
| 32 | 31 | 635018 | 713646 | 173 | 46 | 1/16 BIC | 8par | a0 = −0.000079 a1 = 0.0 a2 = −0.002525 a3 = 0.0 a4 = −24.0 a5 = 0.012207 a6 = −0.019097 a7 = 3.0 |

Frame Based SAD Reduction for 8 Pyramid Pictures

Table 13, below, illustrates average SAD Results of GMM for CIF sequences (33 frames) with GOP 8 Pyramid:

| Sequence | Ref SAD (33 frame Avg) | GMM SAD (33 frame Avg) | NBB (33 frame Avg) | Bits (33 frame Avg) |
|----------|------------------------|------------------------|--------------------|--------------------|
| Bus | 483177 | 1032391 | 125 | 30 |
| City | 230626 | 526430 | 138 | 39 |
| Flower | 568928 | 1419638 | 24 | 18 |
| Stefan | 823399 | 1598189 | 72 | 41 |
| Mobile | 545725 | 946015 | 75 | 16 |
| Football | 457122 | 979650 | 57 | 40 |
| Foreman | 268949 | 613473 | 83 | 25 |
| Harbor | 589246 | 673510 | 128 | 18 |
| Soccer | 420177 | 1138538 | 76 | 24 |
| Tennis | 366775 | 649176 | 164 | 17 |
| Tennis2 | 456448 | 750942 | 161 | 14 |
| Coast | 556849 | 797352 | 117 | 27 |

Table 14, below, illustrates SAD Results of GMM for CIF "Bus" sequence (33 frames) with GOP 8 Pyramid:

| F | R | Ref SAD | GMM SAD | NBB | Bits | SP Filter | Mod | GMM Parameters |
|---|---|---------|---------|-----|------|-----------|-----|----------------|
| 8 | 0 | 900494 | 1658990 | 117 | 128 | 1/16 BIL | 8par | a0 = −0.000156 a1 = −0.000016 a2 = 0.178425 a3 = −0.008789 a4 = −145.0 a5 = 0.021484 a6 = 0.154751 a7 = −21.0 |
| 4 | 0 | 653306 | 1312393 | 115 | 72 | 1/16 BIC | 8par | a0 = −0.000065 a1 = 0.000002 a2 = 0.109769 a3 = |

-continued

| F | R | Ref SAD | GMM SAD | NBB | Bits | SP Filter | Mod | GMM Parameters |
|---|---|---|---|---|---|---|---|---|
| 4 | 8 | 635044 | 1289257 | 175 | 59 | 1/16 BIC | 8par | −0.005371 a4 = −74.0 a5 = 0.009766 a6 = 0.096828 a7 = −15.0 a0 = 0.000068 a1 = 0.000009 a2 = −0.057844 a3 = 0.004395 a4 = 68.0 a5 = −0.009766 a6 = −0.048848 a7 = 6.0 |
| 2 | 0 | 501929 | 1086881 | 136 | 48 | 1/16 BIC | 4par | a0 = 1.01123 a1 = −9.0 a2 = 1.01123 a3 = −1.75 |
| 2 | 4 | 520552 | 1125383 | 81 | 23 | 1/16 BIC | 4par | a0 = 0.990234 a1 = 9.0 a2 = 0.990234 a3 = 1.25 |
| 6 | 4 | 471445 | 1085720 | 98 | 25 | 1/16 BIC | 4par | a0 = 1.006348 a1 = −8.75 a2 = 1.005859 a3 = −0.75 |
| 6 | 8 | 438162 | 1048101 | 117 | 47 | 1/8 AVC | 8par | a0 = 0.000031 a1 = −0.000001 a2 = −0.018545 a3 = 0.002441 a4 = 33.0 a5 = −0.004395 a6 = −0.012468 a7 = 1.0 |
| 1 | 0 | 450196 | 879308 | 165 | 14 | 1/16 BIC | 4par | a0 = 1.005859 a1 = −4.5 a2 = 1.005371 a3 = −0.75 |
| 1 | 2 | 444833 | 856810 | 187 | 35 | 1/8 AVC | 8par | a0 = 0.000019 a1 = 0.000002 a2 = −0.028172 a3 = 0.000977 a4 = 18.0 a5 = −0.00293 a6 = −0.024542 a7 = 4.0 |
| 3 | 2 | 449217 | 874675 | 161 | 8 | 1/8 AVC | 4par | a0 = 1.004883 a1 = −4.5 a2 = 1.005371 a3 = −0.75 |
| 3 | 4 | 449248 | 867255 | 181 | 39 | 1/16 BIC | 8par | a0 = 0.000015 a1 = 0.000002 a2 = −0.023674 a3 = 0.000977 a4 = 18.0 a5 = −0.00293 a6 = −0.02107 a7 = 3.0 |
| 5 | 4 | 407518 | 859338 | 129 | 8 | 1/16 BIC | 8par | a0 = −0.00002 a1 = −0.000002 a2 = 0.022806 a3 = −0.000977 a4 = −18.0 a5 = 0.00293 a6 = 0.020202 a7 = −3.0 |
| 5 | 6 | 388181 | 829671 | 136 | 18 | 1/8 HEVC | 4par | a0 = 0.99707 a1 = 4.25 a2 = 0.997559 a3 = 0.25 |
| 7 | 6 | 368091 | 811517 | 122 | 48 | 1/8 HEVC | 6par | a0 = 1.001465 a1 = −0.000977 a2 = −4.0 a3 = 0.0 a4 = 1.000977 a5 = 0.0 |
| 7 | 8 | 338624 | 800205 | 160 | 23 | 1/16 BIC | 4par | a0 = 0.999512 a1 = 4.0 a2 = 1.0 a3 = 0.0 |
| 16 | 8 | 796434 | 1678058 | 104 | 69 | 1/16 BIL | 8par | a0 = −0.000152 a1 = 0.000008 a2 = 0.057449 a3 = −0.012207 a4 = −136.0 a5 = 0.021973 a6 = 0.026357 a7 = −2.0 |
| 12 | 8 | 533135 | 1277171 | 55 | 52 | 1/16 BIL | 8par | a0 = −0.000051 a1 = −0.000009 a2 = 0.018782 a3 = −0.004395 a4 = −64.0 a5 = 0.009277 a6 = 0.012547 a7 = −1.0 |
| 12 | 16 | 672631 | 1273437 | 119 | 40 | 1/16 BIC | 8par | a0 = 0.000078 a1 = −0.000004 a2 = −0.025016 a3 = 0.006836 a4 = 70.0 a5 = −0.01123 a6 = −0.012232 a7 = 1.0 |
| 10 | 8 | 414607 | 1067736 | 51 | 24 | 1/16 BIL | 4par | a0 = 1.0 a1 = −8.0 a2 = 1.000977 a3 = 0.0 |
| 10 | 12 | 413312 | 1017943 | 62 | 9 | 1/16 BIL | 8par | a0 = 0.000026 a1 = 0.000004 a2 = −0.00947 a3 = 0.002441 a4 = 32.0 a5 = −0.004883 a6 = −0.005998 a7 = 1.0 |
| 14 | 12 | 452885 | 1040629 | 100 | 8 | 1/8 HEVC | 8par | a0 = −0.000038 a1 = 0.000002 a2 = 0.014757 a3 = −0.003418 a4 = −34.0 a5 = 0.005859 a6 = 0.007418 a7 = −1.0 |

-continued

| F | R | Ref SAD | GMM SAD | NBB | Bits | SP Filter | Mod | GMM Parameters |
|---|---|---------|---------|-----|------|-----------|-----|----------------|
| 14 | 16 | 440150 | 1013923 | 187 | 41 | 1/16 BIC | 8par | a0 = 0.00004 a1 = −0.000004 a2 = −0.012232 a3 = 0.003418 a4 = 36.0 a5 = −0.005859 a6 = −0.004577 a7 = 0.0 |
| 9 | 8 | 336075 | 799113 | 194 | 15 | 1/8 HEVC | 4par | a0 = 1.0 a1 = −4.0 a2 = 1.0 a3 = 0.0 |
| 9 | 10 | 336559 | 791097 | 137 | 8 | 1/16 BIL | 4par | a0 = 0.999512 a1 = 4.0 a2 = 1.0 a3 = 0.0 |
| 11 | 10 | 319843 | 758254 | 231 | 8 | 1/16 BIL | 4par | a0 = 1.0 a1 = −4.0 a2 = 1.0 a3 = 0.0 |
| 11 | 12 | 344970 | 785935 | 185 | 8 | 1/16 BIL | 4par | a0 = 1.0 a1 = 4.0 a2 = 1.0 a3 = 0.0 |
| 13 | 12 | 363667 | 786433 | 163 | 17 | 1/16 BIC | 6par | a0 = 1.0 a1 = −0.000977 a2 = −4.0 a3 = 0.0 a4 = 1.0 a5 = 0.0 |
| 13 | 14 | 363736 | 790515 | 158 | 18 | 1/8 HEVC | 4par | a0 = 1.0 a1 = 4.25 a2 = 1.0 a3 = 0.0 |
| 15 | 14 | 366339 | 786652 | 193 | 17 | 1/8 HEVC | 4par | a0 = 1.0 a1 = −4.5 a2 = 1.0 a3 = 0.0 |
| 15 | 16 | 372746 | 819372 | 185 | 8 | 1/8 HEVC | 4par | a0 = 1.0 a1 = 4.5 a2 = 1.0 a3 = 0.0 |
| 24 | 16 | 880059 | 1729079 | 54 | 62 | 1/16 BIL | 8par | a0 = −0.000165 a1 = 0.000041 a2 = 0.057213 a3 = −0.020996 a4 = −173.0 a5 = 0.023438 a6 = 0.023595 a7 = −2.0 |
| 20 | 16 | 620885 | 1216244 | 152 | 39 | 1/8 AVC | 8par | a0 = −0.000082 a1 = 0.000013 a2 = 0.027225 a3 = −0.008789 a4 = −77.0 a5 = 0.012207 a6 = 0.011127 a7 = −1.0 |
| 20 | 24 | 716340 | 1479408 | 62 | 56 | 1/16 BIL | 8par | a0 = 0.000103 a1 = −0.00001 a2 = −0.02904 a3 = 0.010254 a4 = 95.0 a5 = −0.015625 a6 = −0.0131 a7 = 1.0 |
| 18 | 16 | 448988 | 1006451 | 125 | 35 | 1/16 BIC | 8par | a0 = −0.000038 a1 = 0.000001 a2 = 0.013889 a3 = −0.003418 a4 = −37.0 a5 = 0.005859 a6 = 0.00726 a7 = −1.0 |
| 18 | 20 | 433039 | 1000119 | 113 | 33 | 1/16 BIL | 8par | a0 = 0.00004 a1 = −0.000008 a2 = −0.01239 a3 = 0.004395 a4 = 40.0 a5 = −0.007324 a6 = −0.004656 a7 = 1.0 |
| 22 | 20 | 477322 | 1119180 | 50 | 27 | 1/16 BIC | 4par | a0 = 1.0 a1 = −11.5 a2 = 1.0 a3 = 0.25 |
| 22 | 24 | 466533 | 1147725 | 55 | 33 | 1/8 AVC | 6par | a0 = 1.0 a1 = 0.000977 a2 = 12.25 a3 = −0.000488 a4 = 1.0 a5 = 0.0 |
| 17 | 16 | 375927 | 814829 | 172 | 9 | 1/8 HEVC | 4par | a0 = 1.0 a1 = −4.5 a2 = 1.0 a3 = 0.0 |
| 17 | 18 | 374826 | 791886 | 169 | 23 | 1/8 HEVC | 6par | a0 = 1.0 a1 = 0.000977 a2 = 4.5 a3 = 0.0 a4 = 1.0 a5 = 0.0 |
| 19 | 18 | 349564 | 789818 | 182 | 18 | 1/8 HEVC | 4par | a0 = 1.0 a1 = −4.75 a2 = 1.0 a3 = 0.0 |
| 19 | 20 | 372863 | 823653 | 145 | 26 | 1/16 BIC | 6par | a0 = 1.0 a1 = 0.000977 a2 = 5.0 a3 = 0.0 a4 = 1.0 a5 = 0.0 |
| 21 | 20 | 406103 | 869507 | 100 | 19 | 1/8 HEVC | 4par | a0 = 1.000488 a1 = −5.75 a2 = 1.000977 a3 = 0.0 |
| 21 | 22 | 406097 | 898189 | 122 | 8 | 1/16 BIC | 4par | a0 = 1.0 a1 = 5.75 a2 = 1.0 a3 = −0.25 |
| 23 | 22 | 370195 | 886176 | 122 | 18 | 1/8 HEVC | 4par | a0 = 1.0 a1 = −6.0 a2 = 1.0 a3 = 0.0 |
| 23 | 24 | 368492 | 883825 | 52 | 20 | 1/16 BIC | 4par | a0 = 1.0 a1 = 6.25 a2 = 1.000977 a3 = −0.25 |
| 32 | 24 | 973272 | 1865627 | 66 | 67 | 1/16 BIL | 8par | a0 = −0.000234 a1 = 0.000049 a2 = 0.082544 a3 = |

-continued

| F | R | Ref SAD | GMM SAD | NBB | Bits | SP Filter | Mod | GMM Parameters |
|---|---|---|---|---|---|---|---|---|
| | | | | | | | | −0.03125 a4 = −231.0<br>a5 = 0.031738<br>a6 = 0.035038 a7 = −1.0 |
| 28 | 24 | 715782 | 1430763 | 59 | 54 | 1/16 BIL | 8par | a0 = −0.000126<br>a1 = 0.000011<br>a2 = 0.046402 a3 = −0.012207 a4 = −113.0<br>a5 = 0.019043<br>a6 = 0.019334 a7 = −1.0 |
| 28 | 32 | 805621 | 1449332 | 61 | 58 | 1/16 BIL | 8par | a0 = 0.000134<br>a1 = 0.000002 a2 = −0.041351 a3 = 0.009766<br>a4 = 119.0 a5 = −0.019043<br>a6 = −0.022806 a7 = 0.0 |
| 26 | 24 | 518848 | 1166479 | 93 | 30 | 1/16 BIC | 6par | a0 = 0.999512 a1 = −0.000977 a2 = −13.0<br>a3 = 0.000488 a4 = 1.0<br>a5 = 0.25 |
| 26 | 28 | 530123 | 1191961 | 83 | 26 | 1/8 AVC | 4par | a0 = 1.0 a1 = 14.5 a2 = 1.0<br>a3 = −0.25 |
| 30 | 28 | 520043 | 1132544 | 80 | 9 | 1/16 BIC | 8par | a0 = −0.000068 a1 = −0.000002 a2 = 0.022333<br>a3 = −0.004395 a4 = −60.0<br>a5 = 0.009766<br>a6 = 0.012547 a7 = 0.0 |
| 30 | 32 | 543066 | 1146119 | 59 | 8 | 1/8 AVC | 8par | a0 = 0.000068<br>a1 = 0.000002 a2 = −0.022333 a3 = 0.004395<br>a4 = 60.0 a5 = −0.009766<br>a6 = −0.012547 a7 = 0.0 |
| 25 | 24 | 427065 | 870190 | 194 | 32 | 1/8 HEVC | 8par | a0 = −0.00003<br>a1 = 0.000002<br>a2 = 0.009864 a3 = −0.003418 a4 = −26.0<br>a5 = 0.004883<br>a6 = 0.004972 a7 = 0.0 |
| 25 | 26 | 407764 | 899489 | 101 | 18 | 1/8 AVC | 4par | a0 = 1.0 a1 = 6.75<br>a2 = 1.000977 a3 = −0.25 |
| 27 | 26 | 410356 | 870995 | 146 | 35 | 1/8 AVC | 8par | a0 = −0.000028 a1 = 0.0<br>a2 = 0.009391 a3 = −0.002441 a4 = −29.0<br>a5 = 0.004395<br>a6 = 0.00363 a7 = 0.0 |
| 27 | 28 | 412657 | 900617 | 63 | 8 | 1/8 AVC | 8par | a0 = 0.000034 a1 = 0.0<br>a2 = −0.010811<br>a3 = 0.002441 a4 = 30.0<br>a5 = −0.004883 a6 = −0.005208 a7 = 0.0 |
| 29 | 28 | 446769 | 906014 | 114 | 31 | 1/8 AVC | 6par | a0 = 1.0 a1 = −0.000977<br>a2 = −7.25 a3 = 0.0 a4 = 1.0<br>a5 = 0.25 |
| 29 | 30 | 429576 | 873182 | 157 | 9 | 1/8 AVC | 8par | a0 = 0.000034 a1 = 0.0<br>a2 = −0.010811<br>a3 = 0.002441 a4 = 30.0<br>a5 = −0.004883 a6 = −0.005208 a7 = 0.0 |
| 31 | 30 | 414954 | 846932 | 188 | 8 | 1/8 AVC | 8par | a0 = −0.000034 a1 = 0.0<br>a2 = 0.010811 a3 = −0.002441 a4 = −30.0<br>a5 = 0.004883<br>a6 = 0.005208 a7 = 0.0 |
| 31 | 32 | 423535 | 865368 | 176 | 35 | 1/8 HEVC | 8par | a0 = 0.000032<br>a1 = 0.000003 a2 = −0.011758 a3 = 0.001953<br>a4 = 30.0 a5 = −0.004395<br>a6 = −0.006155 a7 = 0.0 |

Table 15, below, illustrates SAD Results of GMM for CIF "City" sequence (33 frames) with GOP 8 Pyramid:

| F | R | Ref SAD | GMM SAD | NBB | Bits | SP Filter | Mod | GMM Parameters |
|---|---|---------|---------|-----|------|-----------|-----|----------------|
| 8 | 0 | 349291 | 960017 | 25 | 112 | 1/16 BIC | 8par | a0 = 0.000089 a1 = −0.000017 a2 = −0.033538 a3 = −0.052246 a4 = 41.0 a5 = −0.009766 a6 = −0.008759 a7 = −12.0 |
| 4 | 0 | 292468 | 723278 | 116 | 66 | 1/8 HEVC | 8par | a0 = 0.000067 a1 = −0.000025 a2 = −0.021465 a3 = −0.022461 a4 = 27.0 a5 = −0.010742 a6 = −0.001973 a7 = −9.0 |
| 4 | 8 | 251973 | 703560 | 72 | 71 | 1/8 AVC | 8par | a0 = −0.00003 a1 = 0.000021 a2 = 0.010574 a3 = 0.026855 a4 = −14.0 a5 = 0.001465 a6 = −0.001736 a7 = 4.0 |
| 2 | 0 | 244547 | 558712 | 144 | 61 | 1/8 HEVC | 8par | a0 = 0.000043 a1 = −0.000006 a2 = −0.014599 a3 = −0.014648 a4 = 17.0 a5 = −0.004883 a6 = −0.005919 a7 = −2.0 |
| 2 | 4 | 240473 | 580918 | 92 | 52 | 1/8 AVC | 6par | a0 = 1.0 a1 = 0.002441 a2 = −2.5 a3 = 0.0 a4 = 1.0 a5 = 1.75 |
| 6 | 4 | 215832 | 535843 | 134 | 49 | 1/8 HEVC | 6par | a0 = 1.0 a1 = −0.002441 a2 = 2.0 a3 = 0.0 a4 = 1.0 a5 = −1.0 |
| 6 | 8 | 218831 | 527786 | 149 | 56 | 1/8 HEVC | 8par | a0 = −0.000012 a1 = 0.000002 a2 = 0.005129 a3 = 0.017578 a4 = −6.0 a5 = −0.001953 a6 = 0.001341 a7 = 0.0 |
| 1 | 0 | 212423 | 423397 | 57 | 54 | 1/16 BIL | 8par | a0 = 0.000028 a1 = −0.000004 a2 = −0.009391 a3 = −0.006836 a4 = 9.0 a5 = −0.004395 a6 = −0.002841 a7 = 0.0 |
| 1 | 2 | 232035 | 461326 | 177 | 34 | 1/8 HEVC | 6par | a0 = 1.0 a1 = 0.001953 a2 = −1.75 a3 = 0.0 a4 = 1.0 a5 = 0.75 |
| 3 | 2 | 205169 | 421067 | 155 | 54 | 1/8 HEVC | 8par | a0 = 0.000013 a1 = −0.000007 a2 = −0.003314 a3 = −0.004395 a4 = 5.0 a5 = −0.001953 a6 = 0.000868 a7 = −3.0 |
| 3 | 4 | 209406 | 419165 | 121 | 55 | 1/8 AVC | 8par | a0 = −0.000009 a1 = 0.000013 a2 = 0.001657 a3 = 0.001953 a4 = −4.0 a5 = 0.003418 a6 = −0.001894 a7 = 3.0 |
| 5 | 4 | 215696 | 428447 | 194 | 33 | 1/8 HEVC | 6par | a0 = 0.999512 a1 = −0.001953 a2 = 1.25 a3 = 0.0 a4 = 1.0 a5 = −0.5 |
| 5 | 6 | 214571 | 426518 | 221 | 33 | 1/8 HEVC | 6par | a0 = 1.0 a1 = 0.000977 a2 = −0.75 a3 = 0.0 a4 = 1.0 a5 = 0.5 |
| 7 | 6 | 208662 | 418514 | 182 | 50 | 1/8 HEVC | 8par | a0 = 0.000028 a1 = 0.0 a2 = −0.007813 a3 = −0.01123 a4 = 4.0 a5 = −0.001953 a6 = −0.002604 a7 = 0.0 |
| 7 | 8 | 202397 | 408155 | 194 | 36 | 1/8 AVC | 6par | a0 = 1.0 a1 = 0.000977 a2 = −0.25 a3 = −0.000488 a4 = 1.0 a5 = 0.0 |
| 16 | 8 | 328135 | 912842 | 16 | 68 | 1/16 BIL | 8par | a0 = 0.000077 a1 = −0.000002 a2 = −0.031092 a3 = −0.090332 a4 = 41.0 a5 = 0.027832 a6 = −0.013652 a7 = −4.0 |
| 12 | 8 | 253081 | 705517 | 72 | 39 | 1/16 BIC | 6par | a0 = 1.0 a1 = −0.010254 a2 = 2.0 a3 = 0.004883 a4 = 1.0 a5 = −0.25 |

-continued

| F | R | Ref SAD | GMM SAD | NBB | Bits | SP Filter | Mod | GMM Parameters |
|---|---|---|---|---|---|---|---|---|
| 12 | 16 | 272053 | 719368 | 103 | 72 | ⅛ HEVC | 8par | a0 = −0.00006 a1 = −0.000001 a2 = 0.024542 a3 = 0.045898 a4 = −32.0 a5 = −0.012695 a6 = 0.009233 a7 = 5.0 |
| 10 | 8 | 238885 | 535540 | 109 | 34 | ⅛ HEVC | 6par | a0 = 1.0 a1 = −0.005371 a2 = 0.5 a3 = 0.001953 a4 = 0.999023 a5 = 0.25 |
| 10 | 12 | 228026 | 543931 | 145 | 31 | ⅛ HEVC | 6par | a0 = 1.0 a1 = 0.005371 a2 = −1.5 a3 = −0.00293 a4 = 1.0 a5 = 0.25 |
| 14 | 12 | 232028 | 560906 | 109 | 32 | 1/16 BIC | 6par | a0 = 1.0 a1 = −0.006836 a2 = 3.25 a3 = 0.003418 a4 = 0.999023 a5 = 0.25 |
| 14 | 16 | 233995 | 583921 | 112 | 41 | ⅛ HEVC | 6par | a0 = 1.0 a1 = 0.005371 a2 = −4.5 a3 = −0.001953 a4 = 0.999023 a5 = 1.75 |
| 9 | 8 | 213050 | 407931 | 234 | 27 | ⅛ HEVC | 6par | a0 = 1.0 a1 = −0.002441 a2 = 0.25 a3 = 0.001465 a4 = 1.0 a5 = 0.0 |
| 9 | 10 | 203540 | 407103 | 147 | 41 | ⅛ HEVC | 8par | a0 = −0.000004 a1 = −0.000001 a2 = 0.001105 a3 = 0.008789 a4 = −1.0 a5 = −0.00293 a6 = 0.00142 a7 = 0.0 |
| 11 | 10 | 187940 | 400421 | 177 | 25 | ⅛ AVC | 6par | a0 = 0.999512 a1 = −0.001953 a2 = 0.5 a3 = 0.0 a4 = 1.0 a5 = 0.0 |
| 11 | 12 | 213070 | 416112 | 186 | 21 | ⅛ HEVC | 6par | a0 = 1.0 a1 = 0.003418 a2 = −1.0 a3 = −0.001465 a4 = 1.0 a5 = 0.0 |
| 13 | 12 | 206503 | 411588 | 222 | 56 | ⅛ AVC | 8par | a0 = 0.000011 a1 = −0.0 a2 = −0.004261 a3 = −0.013184 a4 = 6.0 a5 = 0.005859 a6 = −0.001894 a7 = 0.0 |
| 13 | 14 | 222698 | 436905 | 185 | 30 | ⅛ HEVC | 6par | a0 = 1.0 a1 = 0.003418 a2 = −1.75 a3 = −0.001465 a4 = 1.0 a5 = −0.25 |
| 15 | 14 | 216806 | 430851 | 216 | 46 | ⅛ AVC | 8par | a0 = 0.000017 a1 = −0.00001 a2 = −0.005682 a3 = −0.007813 a4 = 9.0 a5 = 0.001465 a6 = 0.000079 a7 = −2.0 |
| 15 | 16 | 194441 | 405884 | 193 | 52 | 1/16 BIC | 8par | a0 = −0.000014 a1 = 0.000007 a2 = 0.00434 a3 = 0.008789 a4 = −9.0 a5 = −0.001465 a6 = 0.0 a7 = 4.0 |
| 24 | 16 | 324850 | 905047 | 9 | 71 | 1/16 BIL | 8par | a0 = 0.000115 a1 = −0.000027 a2 = −0.040167 a3 = −0.075684 a4 = 49.0 a5 = 0.007813 a6 = −0.012863 a7 = −7.0 |
| 20 | 16 | 254971 | 696028 | 68 | 64 | 1/16 BIC | 8par | a0 = 0.00006 a1 = −0.000022 a2 = −0.01886 a3 = −0.041504 a4 = 26.0 a5 = 0.007813 a6 = −0.003078 a7 = −8.0 |
| 20 | 24 | 261868 | 695916 | 52 | 59 | ⅛ AVC | 8par | a0 = −0.000053 a1 = 0.000003 a2 = 0.020123 a3 = 0.034668 a4 = −23.0 a5 = 0.0 a6 = 0.008602 a7 = 0.0 |
| 18 | 16 | 227467 | 536515 | 164 | 50 | ⅛ HEVC | 8par | a0 = 0.000034 a1 = −0.000011 a2 = −0.010259 a3 = −0.025391 a4 = 14.0 a5 = 0.007813 a6 = −0.001105 a7 = −5.0 |
| 18 | 20 | 228630 | 543826 | 120 | 37 | ⅛ HEVC | 6par | a0 = 1.000488 a1 = 0.005371 a2 = −3.0 a3 = −0.001465 a4 = 1.0 a5 = 1.0 |

-continued

| F | R | Ref SAD | GMM SAD | NBB | Bits | SP Filter | Mod | GMM Parameters |
|---|---|---|---|---|---|---|---|---|
| 22 | 20 | 223630 | 553531 | 114 | 43 | ⅛ HEVC | 8par | a0 = 0.000024 a1 = −0.000016 a2 = −0.005445 a3 = −0.014648 a4 = 14.0 a5 = 0.001953 a6 = 0.001105 a7 = −1.0 |
| 22 | 24 | 232178 | 535575 | 136 | 29 | ⅛ HEVC | 6par | a0 = 1.0 a1 = 0.004395 a2 = −2.0 a3 = 0.0 a4 = 1.0 a5 = −0.25 |
| 17 | 16 | 220697 | 418895 | 204 | 45 | ⅛ HEVC | 8par | a0 = 0.000023 a1 = −0.000001 a2 = −0.008128 a3 = −0.015625 a4 = 8.0 a5 = 0.001953 a6 = −0.00292 a7 = −2.0 |
| 17 | 18 | 212831 | 434990 | 183 | 33 | ⅛ HEVC | 6par | a0 = 1.0 a1 = 0.003418 a2 = −1.5 a3 = −0.001953 a4 = 1.0 a5 = 0.75 |
| 19 | 18 | 202083 | 427589 | 114 | 31 | 1/16 BIC | 6par | a0 = 1.0 a1 = −0.002441 a2 = 1.25 a3 = 0.001465 a4 = 1.0 a5 = −0.5 |
| 19 | 20 | 231711 | 426593 | 207 | 57 | ⅛ HEVC | 8par | a0 = −0.000021 a1 = 0.00001 a2 = 0.006234 a3 = 0.005371 a4 = −6.0 a5 = 0.00293 a6 = −0.000079 a7 = 2.0 |
| 21 | 20 | 214900 | 437380 | 134 | 54 | ⅛ HEVC | 8par | a0 = 0.000046 a1 = −0.000002 a2 = −0.015941 a3 = −0.013184 a4 = 9.0 a5 = −0.004395 a6 = −0.007576 a7 = 0.0 |
| 21 | 22 | 210653 | 422546 | 181 | 29 | 1/16 BIC | 6par | a0 = 1.0 a1 = 0.001953 a2 = −1.5 a3 = −0.000488 a4 = 1.0 a5 = 0.0 |
| 23 | 22 | 209067 | 420550 | 205 | 29 | ⅛ HEVC | 6par | a0 = 1.0 a1 = −0.001953 a2 = 1.0 a3 = 0.000488 a4 = 0.999023 a5 = 0.25 |
| 23 | 24 | 195141 | 428223 | 59 | 24 | 1/16 BIL | 6par | a0 = 1.0 a1 = 0.003418 a2 = −1.0 a3 = 0.0 a4 = 1.0 a5 = 0.0 |
| 32 | 24 | 339240 | 894948 | 27 | 73 | 1/16 BIL | 8par | a0 = 0.000134 a1 = −0.000007 a2 = −0.050032 a3 = −0.106934 a4 = 65.0 a5 = 0.032715 a6 = −0.023438 a7 = −2.0 |
| 28 | 24 | 255895 | 691528 | 85 | 56 | ⅛ AVC | 8par | a0 = 0.000071 a1 = 0.000002 a2 = −0.025963 a3 = −0.04248 a4 = 29.0 a5 = 0.004395 a6 = −0.014994 a7 = 3.0 |
| 28 | 32 | 264889 | 702908 | 102 | 66 | ⅛ AVC | 8par | a0 = −0.000072 a1 = 0.0 a2 = 0.027699 a3 = 0.065918 a4 = −36.0 a5 = −0.026855 a6 = 0.013021 a7 = 5.0 |
| 26 | 24 | 219013 | 515088 | 163 | 51 | ⅛ AVC | 8par | a0 = 0.000025 a1 = 0.000004 a2 = −0.010574 a3 = −0.017578 a4 = 12.0 a5 = −0.000488 a6 = −0.005998 a7 = 1.0 |
| 26 | 28 | 225375 | 539130 | 81 | 69 | ⅛ HEVC | 8par | a0 = −0.00007 a1 = −0.000002 a2 = 0.024937 a3 = 0.027832 a4 = −18.0 a5 = −0.003418 a6 = 0.013415 a7 = −2.0 |
| 30 | 28 | 226806 | 525481 | 182 | 61 | ⅛ HEVC | 8par | a0 = 0.000041 a1 = 0.000003 a2 = −0.015546 a3 = −0.034668 a4 = 19.0 a5 = 0.01416 a6 = −0.008759 a7 = −3.0 |
| 30 | 32 | 223568 | 529963 | 205 | 62 | ⅛ HEVC | 8par | a0 = −0.000038 a1 = −0.000001 a2 = 0.013889 a3 = 0.032227 a4 = −17.0 a5 = −0.01123 a6 = 0.006629 a7 = 1.0 |

-continued

| F | R | Ref SAD | GMM SAD | NBB | Bits | SP Filter | Mod | GMM Parameters |
|---|---|---|---|---|---|---|---|---|
| 25 | 24 | 210923 | 419048 | 205 | 30 | 1/8 HEVC | 6par | a0 = 1.0 a1 = −0.000977 a2 = 1.0 a3 = 0.0 a4 = 1.0 a5 = −0.25 |
| 25 | 26 | 225954 | 434205 | 86 | 53 | 1/8 HEVC | 8par | a0 = −0.000038 a1 = −0.00002 a2 = 0.017598 a3 = 0.016602 a4 = −8.0 a5 = −0.000488 a6 = 0.012311 a7 = −2.0 |
| 27 | 26 | 217409 | 443848 | 120 | 31 | 1/8 HEVC | 6par | a0 = 1.0 a1 = −0.003418 a2 = 2.0 a3 = 0.001465 a4 = 1.0 a5 = 0.25 |
| 27 | 28 | 207104 | 435868 | 100 | 30 | 1/8 HEVC | 6par | a0 = 1.0 a1 = 0.004395 a2 = −2.25 a3 = −0.001953 a4 = 1.0 a5 = 0.25 |
| 29 | 28 | 200677 | 422772 | 126 | 52 | 1/8 HEVC | 8par | a0 = 0.000028 a1 = 0.000002 a2 = −0.010653 a3 = −0.019043 a4 = 10.0 a5 = 0.006348 a6 = −0.007339 a7 = −1.0 |
| 29 | 30 | 200843 | 415328 | 185 | 52 | 1/8 HEVC | 8par | a0 = −0.000021 a1 = 0.000002 a2 = 0.007339 a3 = 0.016602 a4 = −9.0 a5 = −0.004883 a6 = 0.003078 a7 = 1.0 |
| 31 | 30 | 203812 | 425640 | 154 | 30 | 1/8 HEVC | 6par | a0 = 1.0 a1 = −0.004395 a2 = 2.0 a3 = 0.001953 a4 = 1.0 a5 = −0.25 |
| 31 | 32 | 207354 | 435344 | 158 | 24 | 1/8 HEVC | 6par | a0 = 1.0 a1 = 0.004395 a2 = −2.0 a3 = −0.001953 a4 = 1.0 a5 = 0.25 |

Table 16, below, illustrates SAD Results of GMM for CIF "Flower" sequence (33 frames) with GOP 8 Pyramid:

| F | R | Ref SAD | GMM SAD | NBB | Bits | SP Filter | Mod | GMM Parameters |
|---|---|---|---|---|---|---|---|---|
| 8 | 0 | 1065857 | 2842512 | 9 | 58 | 1/16 BIL | 6par | a0 = 1.008301 a1 = 0.064453 a2 = −5.0 a3 = −0.001465 a4 = 1.001953 a5 = −1.0 |
| 4 | 0 | 832035 | 1968118 | 16 | 38 | 1/16 BIL | 6par | a0 = 1.009277 a1 = 0.049316 a2 = −6.75 a3 = −0.000488 a4 = 1.001953 a5 = −0.75 |
| 4 | 8 | 754003 | 1936289 | 19 | 10 | 1/16 BIL | 6par | a0 = 0.990723 a1 = −0.049316 a2 = 6.75 a3 = 0.000488 a4 = 0.998047 a5 = 0.75 |
| 2 | 0 | 676041 | 1413647 | 15 | 22 | 1/16 BIC | 6par | a0 = 1.004883 a1 = 0.023438 a2 = −3.0 a3 = −0.000488 a4 = 1.0 a5 = −0.25 |
| 2 | 4 | 465725 | 1275960 | 19 | 24 | 1/16 BIL | 6par | a0 = 0.994141 a1 = −0.025879 a2 = 3.75 a3 = 0.0 a4 = 1.0 a5 = 0.0 |
| 6 | 4 | 590593 | 1393504 | 18 | 7 | 1/16 BIL | 6par | a0 = 1.004883 a1 = 0.025391 a2 = −3.5 a3 = 0.0 a4 = 1.000977 a5 = −0.5 |
| 6 | 8 | 519689 | 1332080 | 25 | 20 | 1/16 BIL | 6par | a0 = 0.995117 a1 = −0.024414 a2 = 3.25 a3 = 0.000488 a4 = 1.0 a5 = 0.0 |
| 1 | 0 | 527540 | 1001145 | 39 | 20 | 1/8 AVC | 6par | a0 = 1.001953 a1 = 0.010254 a2 = −1.25 a3 = 0.0 a4 = 1.0 a5 = −0.25 |
| 1 | 2 | 456716 | 937572 | 34 | 20 | 1/16 BIL | 6par | a0 = 0.99707 a1 = −0.01123 a2 = 1.5 a3 = 0.0 a4 = 0.999023 a5 = 0.25 |

-continued

| F | R | Ref SAD | GMM SAD | NBB | Bits | SP Filter | Mod | GMM Parameters |
|---|---|---|---|---|---|---|---|---|
| 3 | 2 | 355197 | 860148 | 41 | 23 | 1/16 BIC | 6par | a0 = 1.001953 a1 = 0.008789 a2 = −0.75 a3 = 0.0 a4 = 1.0 a5 = 0.0 |
| 3 | 4 | 321680 | 848183 | 53 | 8 | 1/8 AVC | 6par | a0 = 0.998047 a1 = −0.008789 a2 = 0.75 a3 = 0.0 a4 = 1.0 a5 = 0.0 |
| 5 | 4 | 424389 | 945072 | 21 | 17 | 1/16 BIL | 6par | a0 = 1.001953 a1 = 0.010254 a2 = −1.25 a3 = −0.000488 a4 = 1.0 a5 = 0.0 |
| 5 | 6 | 426476 | 909514 | 55 | 8 | 1/16 BIC | 6par | a0 = 0.99707 a1 = −0.01123 a2 = 1.5 a3 = 0.0 a4 = 0.999023 a5 = 0.25 |
| 7 | 6 | 381103 | 894437 | 43 | 8 | 1/16 BIC | 6par | a0 = 1.00293 a1 = 0.01123 a2 = −1.5 a3 = 0.0 a4 = 1.000977 a5 = −0.25 |
| 7 | 8 | 359640 | 915704 | 20 | 8 | 1/16 BIL | 6par | a0 = 0.99707 a1 = −0.01123 a2 = 1.5 a3 = 0.0 a4 = 0.999023 a5 = 0.25 |
| 16 | 8 | 1167958 | 3078263 | 25 | 40 | 1/16 BIL | 4par | a0 = 0.981445 a1 = 12.25 a2 = 1.002441 a3 = −2.0 |
| 12 | 8 | 806026 | 1966330 | 8 | 29 | 1/16 BIL | 6par | a0 = 1.010742 a1 = 0.050293 a2 = −6.75 a3 = −0.000488 a4 = 1.000977 a5 = −0.25 |
| 12 | 16 | 723865 | 1998476 | 21 | 32 | 1/16 BIL | 6par | a0 = 0.989258 a1 = −0.044922 a2 = 5.25 a3 = 0.0 a4 = 0.998047 a5 = 1.5 |
| 10 | 8 | 455365 | 1308600 | 8 | 8 | 1/16 BIL | 6par | a0 = 1.005859 a1 = 0.025879 a2 = −3.5 a3 = 0.0 a4 = 1.000977 a5 = −0.25 |
| 10 | 12 | 616462 | 1437441 | 19 | 21 | 1/16 BIL | 6par | a0 = 0.994141 a1 = −0.026855 a2 = 3.75 a3 = 0.0 a4 = 1.0 a5 = 0.25 |
| 14 | 12 | 712264 | 1537799 | 8 | 25 | 1/16 BIL | 6par | a0 = 1.004883 a1 = 0.022461 a2 = −2.75 a3 = 0.000488 a4 = 1.000977 a5 = −1.0 |
| 14 | 16 | 678750 | 1565416 | 22 | 21 | 1/16 BIL | 6par | a0 = 0.995117 a1 = −0.021484 a2 = 2.5 a3 = 0.0 a4 = 0.999023 a5 = 0.75 |
| 9 | 8 | 332791 | 874837 | 30 | 8 | 1/16 BIC | 6par | a0 = 1.001953 a1 = 0.008789 a2 = −0.75 a3 = 0.0 a4 = 1.0 a5 = 0.0 |
| 9 | 10 | 322590 | 853633 | 41 | 21 | 1/16 BIC | 6par | a0 = 0.998047 a1 = −0.010254 a2 = 1.0 a3 = 0.0 a4 = 1.0 a5 = 0.0 |
| 11 | 10 | 427390 | 925771 | 82 | 8 | 1/8 HEVC | 6par | a0 = 1.00293 a1 = 0.013184 a2 = −1.75 a3 = −0.000488 a4 = 1.0 a5 = 0.0 |
| 11 | 12 | 488020 | 999705 | 84 | 8 | 1/16 BIC | 6par | a0 = 0.99707 a1 = −0.013672 a2 = 2.0 a3 = 0.0 a4 = 1.0 a5 = 0.25 |
| 13 | 12 | 570213 | 1135347 | 24 | 8 | 1/16 BIL | 6par | a0 = 1.001953 a1 = 0.01123 a2 = −1.25 a3 = 0.0 a4 = 1.000977 a5 = −0.5 |
| 13 | 14 | 607657 | 1182453 | 17 | 8 | 1/16 BIL | 6par | a0 = 0.998047 a1 = −0.01123 a2 = 1.25 a3 = 0.0 a4 = 0.999023 a5 = 0.5 |
| 15 | 14 | 587789 | 1169060 | 24 | 8 | 1/16 BIL | 6par | a0 = 1.001953 a1 = 0.01123 a2 = −1.25 a3 = 0.0 a4 = 1.000977 a5 = −0.5 |
| 15 | 16 | 498267 | 1102754 | 28 | 8 | 1/16 BIL | 6par | a0 = 0.998047 a1 = −0.010254 a2 = 1.25 a3 = 0.000488 a4 = 1.0 a5 = 0.0 |

-continued

| F | R | Ref SAD | GMM SAD | NBB | Bits | SP Filter | Mod | GMM Parameters |
|---|---|---|---|---|---|---|---|---|
| 24 | 16 | 1111119 | 3064921 | 14 | 40 | 1/16 BIL | 6par | a0 = 1.015137<br>a1 = 0.087891 a2 = −11.0<br>a3 = −0.001953<br>a4 = 0.996582 a5 = −0.5 |
| 20 | 16 | 765985 | 2120299 | 10 | 34 | 1/16 BIL | 6par | a0 = 1.009277<br>a1 = 0.054688 a2 = −8.25<br>a3 = −0.000488<br>a4 = 1.001953 a5 = −1.5 |
| 20 | 24 | 794463 | 2247317 | 8 | 8 | 1/16 BIL | 6par | a0 = 0.989258 a1 =<br>−0.050293 a2 = 6.75<br>a3 = 0.000488<br>a4 = 0.999023 a5 = 0.25 |
| 18 | 16 | 658793 | 1611719 | 5 | 8 | 1/16 BIL | 6par | a0 = 1.004883<br>a1 = 0.022461 a2 = −2.75<br>a3 = 0.000488<br>a4 = 1.000977 a5 = −1.0 |
| 18 | 20 | 688350 | 1607794 | 13 | 8 | 1/16 BIL | 6par | a0 = 0.995117 a1 =<br>−0.021484 a2 = 2.5<br>a3 = 0.0 a4 = 0.999023<br>a5 = 0.75 |
| 22 | 20 | 696387 | 1607629 | 15 | 22 | 1/16 BIL | 6par | a0 = 1.004395<br>a1 = 0.021484 a2 = −2.5<br>a3 = −0.000488<br>a4 = 1.000977 a5 = −0.5 |
| 22 | 24 | 457275 | 1482179 | 15 | 8 | 1/16 BIL | 6par | a0 = 0.995605 a1 =<br>−0.020996 a2 = 2.0<br>a3 = 0.0 a4 = 1.0 a5 = 0.0 |
| 17 | 16 | 558112 | 1174934 | 13 | 20 | 1/16 BIL | 6par | a0 = 1.001953<br>a1 = 0.010254 a2 = −1.25<br>a3 = 0.0 a4 = 1.0 a5 = −0.25 |
| 17 | 18 | 601155 | 1173669 | 38 | 8 | 1/8 AVC | 6par | a0 = 0.998047 a1 =<br>−0.010254 a2 = 1.25<br>a3 = 0.0 a4 = 1.0 a5 = 0.25 |
| 19 | 18 | 583351 | 1121115 | 68 | 76 | 1/8 AVC | 8par | a0 = 0.000008<br>a1 = 0.000028<br>a2 = 0.000079<br>a3 = 0.038086 a4 = −4.0<br>a5 = −0.003418 a6 =<br>−0.010259 a7 = 0.0 |
| 19 | 20 | 511175 | 1112124 | 21 | 45 | 1/16 BIL | 8par | a0 = −0.000002 a1 =<br>−0.000028 a2 =<br>−0.003788 a3 =<br>−0.040039 a4 = 5.0<br>a5 = 0.000488<br>a6 = 0.009391 a7 = 0.0 |
| 21 | 20 | 515361 | 1137822 | 14 | 9 | 1/16 BIL | 6par | a0 = 1.001953<br>a1 = 0.010254 a2 = −1.25<br>a3 = 0.0 a4 = 1.0 a5 = −0.25 |
| 21 | 22 | 487168 | 1077373 | 12 | 21 | 1/16 BIL | 6par | a0 = 0.998047 a1 =<br>−0.009766 a2 = 1.0<br>a3 = 0.0 a4 = 0.999023<br>a5 = 0.25 |
| 23 | 22 | 339256 | 958823 | 14 | 8 | 1/16 BIL | 6par | a0 = 1.001953<br>a1 = 0.010254 a2 = −1.0<br>a3 = 0.0 a4 = 1.0 a5 = 0.0 |
| 23 | 24 | 346765 | 942447 | 39 | 8 | 1/16 BIC | 6par | a0 = 0.998047 a1 =<br>−0.010254 a2 = 1.0<br>a3 = 0.0 a4 = 1.0 a5 = 0.0 |
| 32 | 24 | 1104437 | 3320432 | 10 | 28 | 1/16 BIL | 4par | a0 = 0.98291 a1 = 12.0<br>a2 = 1.002441 a3 = −1.0 |
| 28 | 24 | 794436 | 2216463 | 15 | 35 | 1/16 BIL | 6par | a0 = 1.01123<br>a1 = 0.059082 a2 = −8.25<br>a3 = 0.0 a4 = 1.001953<br>a5 = −0.5 |
| 28 | 32 | 733215 | 2295072 | 19 | 8 | 1/16 BIL | 6par | a0 = 0.98877 a1 =<br>−0.059082 a2 = 8.25<br>a3 = 0.0 a4 = 0.998047<br>a5 = 0.5 |
| 26 | 24 | 518843 | 1518457 | 11 | 8 | 1/16 BIL | 6par | a0 = 1.004395<br>a1 = 0.020996 a2 = −2.0<br>a3 = 0.0 a4 = 1.0 a5 = 0.0 |
| 26 | 28 | 517528 | 1507434 | 12 | 8 | 1/16 BIL | 6par | a0 = 0.995605 a1 =<br>−0.020996a2 = 2.0<br>a3 = 0.0 a4 = 1.0 a5 = 0.0 |

-continued

| F | R | Ref SAD | GMM SAD | NBB | Bits | SP Filter | Mod | GMM Parameters |
|---|---|---|---|---|---|---|---|---|
| 30 | 28 | 560409 | 1595069 | 3 | 8 | 1/16 BIL | 6par | a0 = 1.004395<br>a1 = 0.020996 a2 = −2.0<br>a3 = 0.0 a4 = 1.0 a5 = 0.0 |
| 30 | 32 | 516114 | 1520758 | 14 | 8 | 1/16 BIL | 6par | a0 = 0.995605 a1 =<br>−0.020996 a2 = 2.0<br>a3 = 0.0 a4 = 1.0 a5 = 0.0 |
| 25 | 24 | 406658 | 1033086 | 21 | 8 | 1/16 BIL | 6par | a0 = 1.001953<br>a1 = 0.010254 a2 = −1.0<br>a3 = 0.0 a4 = 1.0 a5 = 0.0 |
| 25 | 26 | 350815 | 969036 | 43 | 8 | 1/16 BIC | 6par | a0 = 0.998047 a1 =<br>−0.010254 a2 = 1.0<br>a3 = 0.0 a4 = 1.0 a5 = 0.0 |
| 27 | 26 | 337929 | 959223 | 40 | 8 | 1/8 HEVC | 6par | a0 = 1.001953<br>a1 = 0.010254 a2 = −1.0<br>a3 = 0.0 a4 = 1.0 a5 = 0.0 |
| 27 | 28 | 381513 | 1039772 | 17 | 8 | 1/16 BIL | 6par | a0 = 0.998047 a1 =<br>−0.010254 a2 = 1.0<br>a3 = 0.0 a4 = 1.0 a5 = 0.0 |
| 29 | 28 | 382465 | 1021223 | 18 | 49 | 1/16 BIL | 8par | a0 = −0.000002<br>a1 = 0.000013<br>a2 = 0.007576<br>a3 = 0.043457 a4 = −4.0<br>a5 = 0.0 a6 = −0.003472<br>a7 = 0.0 |
| 29 | 30 | 485630 | 1092822 | 16 | 9 | 1/16 BIL | 6par | a0 = 0.998047 a1 =<br>−0.009766 a2 = 1.0<br>a3 = 0.0 a4 = 0.999023<br>a5 = 0.25 |
| 31 | 30 | 374235 | 1014510 | 18 | 8 | 1/16 BIL | 6par | a0 = 1.001953<br>a1 = 0.010254 a2 = −1.0<br>a3 = 0.0 a4 = 1.0 a5 = 0.0 |
| 31 | 32 | 404632 | 1024983 | 28 | 8 | 1/16 BIC | 6par | a0 = 0.998047 a1 =<br>−0.010254a2 = 1.0<br>a3 = 0.0 a4 = 1.0 a5 = 0.0 |

Table 17, below, illustrates Detailed results of GMM for CIF "Stefan" sequence (33 frames) with GOP 8 Pyramid:

| F | R | Ref SAD | GMM SAD | NBB | Bits | SP Filter | Mod | GMM Parameters |
|---|---|---|---|---|---|---|---|---|
| 8 | 0 | 1985617 | 2885177 | 43 | 34 | 1/16 BIL | 4par | a0 = 1.012207 a1 = −4.5<br>a2 = 1.008789 a3 = −0.25 |
| 4 | 0 | 1430278 | 2756948 | 32 | 9 | 1/16 BIL | 4par | a0 = 1.005859 a1 = −2.25<br>a2 = 1.005371 a3 = −0.25 |
| 4 | 8 | 1186822 | 2758704 | 20 | 9 | 1/16 BIL | 4par | a0 = 0.994141 a1 = 2.25<br>a2 = 0.994629 a3 = 0.25 |
| 2 | 0 | 930617 | 2635587 | 26 | 5 | 1/16 BIL | 4par | a0 = 1.003418 a1 = −1.25<br>a2 = 1.001953 a3 = 0.0 |
| 2 | 4 | 1018371 | 2599034 | 32 | 5 | 1/16 BIL | 4par | a0 = 0.996582 a1 = 1.25<br>a2 = 0.998047 a3 = 0.0 |
| 6 | 4 | 996999 | 2604087 | 25 | 5 | 1/16 BIL | 4par | a0 = 1.003418 a1 = −1.25<br>a2 = 1.001953 a3 = 0.0 |
| 6 | 8 | 954066 | 2693730 | 21 | 5 | 1/16 BIL | 4par | a0 = 0.996582 a1 = 1.25<br>a2 = 0.998047 a3 = 0.0 |
| 1 | 0 | 654874 | 1019482 | 52 | 122 | 1/16 BIL | 8par | a0 = −0.000303 a1 =<br>−0.000066 a2 = 0.184738<br>a3 = 0.044434 a4 =<br>−123.0 a5 = 0.040527<br>a6 = 0.137626 a7 = −18.0 |
| 1 | 2 | 627656 | 2513389 | 45 | 6 | 1/16 BIL | 4par | a0 = 0.998535 a1 = 0.5<br>a2 = 0.999023 a3 = 0.0 |
| 3 | 2 | 625153 | 1044904 | 54 | 59 | 1/16 BIL | 8par | a0 = −0.000269 a1 =<br>−0.00008 a2 = 0.173374<br>a3 = 0.040039 a4 =<br>−117.0 a5 = 0.039063<br>a6 = 0.148043 a7 = −20.0 |
| 3 | 4 | 621097 | 2462139 | 47 | 6 | 1/16 BIL | 4par | a0 = 0.998535 a1 = 0.5<br>a2 = 0.999023 a3 = 0.0 |
| 5 | 4 | 665556 | 946806 | 91 | 74 | 1/16 BIL | 8par | a0 = −0.000226<br>a1 = 0.000023<br>a2 = 0.154356<br>a3 = 0.003418 a4 = |

-continued

| F | R | Ref SAD | GMM SAD | NBB | Bits | SP Filter | Mod | GMM Parameters |
|---|---|---------|---------|-----|------|-----------|-----|----------------|
| 5 | 6 | 628535 | 2520087 | 49 | 6 | 1/16 BIL | 4par | −109.0 a5 = 0.031738 a6 = 0.108428 a7 = −17.0 a0 = 0.998535 a1 = 0.5 a2 = 0.999023 a3 = 0.0 |
| 7 | 6 | 647494 | 957385 | 81 | 71 | 1/16 BIL | 8par | a0 = −0.000199 a1 = −0.000076 a2 = 0.153962 a3 = 0.02002 a4 = −103.0 a5 = 0.030762 a6 = 0.121212 a7 = −17.0 |
| 7 | 8 | 580157 | 851152 | 129 | 62 | 1/16 BIL | 8par | a0 = 0.000198 a1 = −0.000004 a2 = −0.136758 a3 = 0.001953 a4 = 94.0 a5 = −0.029297 a6 = −0.102509 a7 = 16.0 |
| 16 | 8 | 2066764 | 2999263 | 36 | 6 | 1/16 BIL | 4par | a0 = 1.012207 a1 = −4.5 a2 = 1.008789 a3 = −0.25 |
| 12 | 8 | 1325317 | 2803159 | 14 | 5 | 1/16 BIL | 4par | a0 = 1.005859 a1 = −2.25 a2 = 1.005371 a3 = −0.25 |
| 12 | 16 | 1313917 | 2807874 | 31 | 5 | 1/16 BIL | 4par | a0 = 0.994141 a1 = 2.25 a2 = 0.994629 a3 = 0.25 |
| 10 | 8 | 940879 | 1179866 | 117 | 70 | 1/16 BIL | 8par | a0 = −0.000337 a1 = −0.000037 a2 = 0.277383 a3 = 0.006836 a4 = −188.0 a5 = 0.052734 a6 = 0.217961 a7 = −35.0 |
| 10 | 12 | 829085 | 2681021 | 37 | 6 | 1/16 BIL | 4par | a0 = 0.996582 a1 = 1.25 a2 = 0.998047 a3 = 0.0 |
| 14 | 12 | 783156 | 1088080 | 86 | 61 | 1/16 BIL | 8par | a0 = −0.000316 a1 = −0.000019 a2 = 0.222301 a3 = 0.002441 a4 = −171.0 a5 = 0.048828 a6 = 0.161774 a7 = −27.0 |
| 14 | 16 | 720158 | 2673634 | 22 | 6 | 1/16 BIL | 4par | a0 = 0.996582 a1 = 1.25 a2 = 0.998047 a3 = 0.0 |
| 9 | 8 | 647492 | 913364 | 84 | 52 | 1/16 BIL | 8par | a0 = −0.000194 a1 = −0.000015 a2 = 0.146307 a3 = −0.004395 a4 = −94.0 a5 = 0.029297 a6 = 0.111506 a7 = −18.0 |
| 9 | 10 | 598905 | 814111 | 124 | 46 | 1/16 BIL | 8par | a0 = 0.000198 a1 = −0.000002 a2 = −0.138179 a3 = −0.001953 a4 = 91.0 a5 = −0.02832 a6 = −0.10393 a7 = 17.0 |
| 11 | 10 | 632047 | 869866 | 110 | 8 | 1/16 BIL | 8par | a0 = −0.000198 a1 = 0.000002 a2 = 0.138179 a3 = 0.001953 a4 = −91.0 a5 = 0.02832 a6 = 0.10393 a7 = −17.0 |
| 11 | 12 | 600497 | 2508136 | 7 | 29 | 1/16 BIL | 4par | a0 = 1.043945 a1 = −15.75 a2 = 0.997559 a3 = 0.5 |
| 13 | 12 | 610176 | 828118 | 86 | 9 | 1/16 BIL | 8par | a0 = −0.000158 a1 = −0.00001 a2 = 0.111585 a3 = 0.001953 a4 = −86.0 a5 = 0.024902 a6 = 0.081676 a7 = −14.0 |
| 13 | 14 | 604355 | 2491867 | 9 | 7 | 1/16 BIL | 4par | a0 = 1.043945 a1 = −15.75 a2 = 0.997559 a3 = 0.5 |
| 15 | 14 | 602598 | 818347 | 107 | 55 | 1/16 BIL | 8par | a0 = −0.000186 a1 = 0.000007 a2 = 0.106613 a3 = 0.0 a4 = −82.0 a5 = 0.027832 a6 = 0.072917 a7 = −12.0 |
| 15 | 16 | 588762 | 2571623 | 13 | 66 | 1/16 BIL | 6par | a0 = 1.006348 a1 = 0.027832 a2 = −10.75 a3 = −0.001465 a4 = 0.999023 a5 = 0.5 |
| 24 | 16 | 2053045 | 3223454 | 36 | 7 | 1/16 BIL | 4par | a0 = 1.012207 a1 = −4.5 a2 = 1.008789 a3 = −0.25 |
| 20 | 16 | 1091688 | 2825787 | 22 | 32 | 1/16 BIL | 4par | a0 = 1.021973 a1 = −7.75 a2 = 1.008789 a3 = −2.0 |

-continued

| F | R | Ref SAD | GMM SAD | NBB | Bits | SP Filter | Mod | GMM Parameters |
|---|---|---|---|---|---|---|---|---|
| 20 | 24 | 939731 | 2834707 | 26 | 33 | 1/16 BIL | 4par | a0 = 0.898926 a1 = 34.25 a2 = 1.005859 a3 = 0.5 |
| 18 | 16 | 786086 | 2716934 | 13 | 7 | 1/16 BIL | 4par | a0 = 1.05127 a1 = −17.25 a2 = 0.996582 a3 = −0.25 |
| 18 | 20 | 732015 | 2690631 | 25 | 7 | 1/16 BIL | 4par | a0 = 0.94873 a1 = 17.25 a2 = 1.003418 a3 = 0.25 |
| 22 | 20 | 759746 | 989827 | 85 | 66 | 1/16 BIL | 8par | a0 = −0.000319 a1 = 0.000009 a2 = 0.124369 a3 = −0.004395 a4 = −134.0 a5 = 0.04834 a6 = 0.061395 a7 = −13.0 |
| 22 | 24 | 734949 | 928066 | 106 | 63 | 1/16 BIL | 8par | a0 = 0.000288 a1 = 0.000026 a2 = −0.095565 a3 = 0.000977 a4 = 116.0 a5 = −0.04541 a6 = −0.051531 a7 = 14.0 |
| 17 | 16 | 597418 | 825035 | 102 | 67 | 1/16 BIL | 8par | a0 = −0.000217 a1 = −0.000018 a2 = 0.10685 a3 = 0.001953 a4 = −80.0 a5 = 0.030762 a6 = 0.06834 a7 = −11.0 |
| 17 | 18 | 602224 | 795042 | 96 | 59 | 1/16 BIL | 8par | a0 = 0.00025 a1 = −0.000022 a2 = −0.102273 a3 = 0.006836 a4 = 76.0 a5 = −0.033203 a6 = −0.054293 a7 = 10.0 |
| 19 | 18 | 578727 | 760486 | 99 | 56 | 1/16 BIL | 8par | a0 = −0.000173 a1 = 0.000015 a2 = 0.079861 a3 = 0.0 a4 = −75.0 a5 = 0.027832 a6 = 0.045612 a7 = −9.0 |
| 19 | 20 | 587760 | 724549 | 146 | 47 | 1/16 BIC | 8par | a0 = 0.000174 a1 = −0.000015 a2 = −0.068655 a3 = 0.005371 a4 = 71.0 a5 = −0.027832 a6 = −0.03851 a7 = 8.0 |
| 21 | 20 | 592239 | 787052 | 85 | 49 | 1/16 BIL | 8par | a0 = −0.000159 a1 = −0.000002 a2 = 0.060606 a3 = 0.003418 a4 = −69.0 a5 = 0.024902 a6 = 0.031644 a7 = −6.0 |
| 21 | 22 | 592910 | 753958 | 114 | 59 | 1/16 BIC | 8par | a0 = 0.000132 a1 = −0.000012 a2 = −0.04869 a3 = −0.001953 a4 = 65.0 a5 = −0.021973 a6 = −0.017913 a7 = 5.0 |
| 23 | 22 | 605240 | 771242 | 142 | 50 | 1/16 BIC | 8 Par | a0 = −0.000156 a1 = 0.000013 a2 = 0.057686 a3 = −0.000977 a4 = −62.0 a5 = 0.024902 a6 = 0.025174 a7 = −7.0 |
| 23 | 24 | 579047 | 739101 | 102 | 47 | 1/16 BIL | 8par | a0 = 0.000143 a1 = 0.000012 a2 = −0.050663 a3 = 0.0 a4 = 57.0 a5 = −0.021973 a6 = −0.023043 a7 = 7.0 |
| 32 | 24 | 1277869 | 2159839 | 22 | 75 | 1/16 BIL | 6par | a0 = 0.966797 a1 = 0.000977 a2 = −65.0 a3 = 0.01123 a4 = 0.963379 a5 = −0.25 |
| 28 | 24 | 1014496 | 1325967 | 70 | 83 | 1/16 BIL | 8par | a0 = −0.000395 a1 = −0.000028 a2 = 0.105429 a3 = 0.003418 a4 = −172.0 a5 = 0.06543 a6 = 0.024148 a7 = −17.0 |
| 28 | 32 | 1047565 | 1208368 | 95 | 82 | 1/16 BIL | 8par | a0 = 0.000293 a1 = −0.000013 a2 = 0.020044 a3 = 0.007813 a4 = 107.0 a5 = −0.046387 a6 = 0.072049 a7 = −8.0 |
| 26 | 24 | 783933 | 972573 | 79 | 60 | 1/16 BIL | 8par | a0 = −0.000286 a1 = −0.000004 a2 = 0.088857 a3 = −0.002441 a4 = −98.0 a5 = 0.041992 |

-continued

| F | R | Ref SAD | GMM SAD | NBB | Bits | SP Filter | Mod | GMM Parameters |
|---|---|---------|---------|-----|------|-----------|-----|----------------|
| 26 | 28 | 736997 | 900312 | 89 | 66 | 1/16 BIL | 8par | a6 = 0.031171 a7 = −12.0 a0 = 0.000172 a1 = 0.000007 a2 = −0.017045 a3 = 0.0 a4 = 73.0 a5 = −0.02832 |
| 30 | 28 | 768169 | 939811 | 80 | 53 | 1/16 BIL | 8par | a6 = 0.012153 a7 = 4.0 a0 = −0.00017 a1 = −0.000012 a2 = 0.0116 a3 = −0.000977 a4 = −59.0 a5 = 0.025391 |
| 30 | 32 | 762601 | 932579 | 84 | 54 | 1/16 BIL | 8par | a6 = −0.017913 a7 = 1.0 a0 = 0.000144 a1 = −0.000018 a2 = 0.014362 a3 = 0.006836 a4 = 48.0 a5 = −0.023926 |
| 25 | 24 | 599172 | 738157 | 92 | 64 | 1/16 BIC | 8 Par | a6 = 0.044902 a7 = −6.0 a0 = −0.000129 a1 = 0.000064 a2 = 0.036537 a3 = −0.008789 a4 = −51.0 a5 = 0.020508 |
| 25 | 26 | 559107 | 733139 | 85 | 58 | 1/16 BIC | 8 Par | a6 = 0.001657 a7 = −6.0 a0 = 0.000108 a1 = −0.000036 a2 = −0.025489 a3 = −0.000977 a4 = 46.0 a5 = −0.017578 |
| 27 | 26 | 595740 | 731586 | 115 | 46 | 1/16 BIC | 8par | a6 = 0.004735 a7 = 4.0 a0 = −0.000102 a1 = 0.0 a2 = 0.018939 a3 = 0.002441 a4 = −40.0 a5 = 0.016113 a6 = −0.003314 a7 = −3.0 |
| 27 | 28 | 578767 | 706373 | 162 | 52 | 1/16 BIC | 8par | a0 = 0.00008 a1 = −0.000021 a2 = −0.003314 a3 = 0.0 a4 = 34.0 a5 = −0.013672 a6 = 0.013889 a7 = 1.0 |
| 29 | 28 | 584511 | 715124 | 102 | 45 | 1/16 BIC | 8par | a0 = −0.000084 a1 = −0.000002 a2 = 0.005129 a3 = −0.000977 a4 = −31.0 a5 = 0.012695 a6 = −0.007576 a7 = 0.0 |
| 29 | 30 | 597165 | 698368 | 158 | 47 | 1/16 BIC | 8par | a0 = 0.000097 a1 = −0.000003 a2 = −0.00434 a3 = 0.002441 a4 = 28.0 a5 = −0.013672 a6 = 0.008759 a7 = −1.0 |
| 31 | 30 | 619900 | 729157 | 112 | 51 | 1/16 BIC | 8par | a0 = −0.000088 a1 = 0.000013 a2 = 0.000552 a3 = −0.004395 a4 = −25.0 a5 = 0.013672 a6 = −0.017519 a7 = 2.0 |
| 31 | 32 | 627709 | 737154 | 145 | 48 | 1/16 BIC | 8par | a0 = 0.000086 a1 = −0.00002 a2 = 0.00434 a3 = 0.004395 a4 = 23.0 a5 = −0.012695 a6 = 0.022727 a7 = −3.0 |

Figure 30:
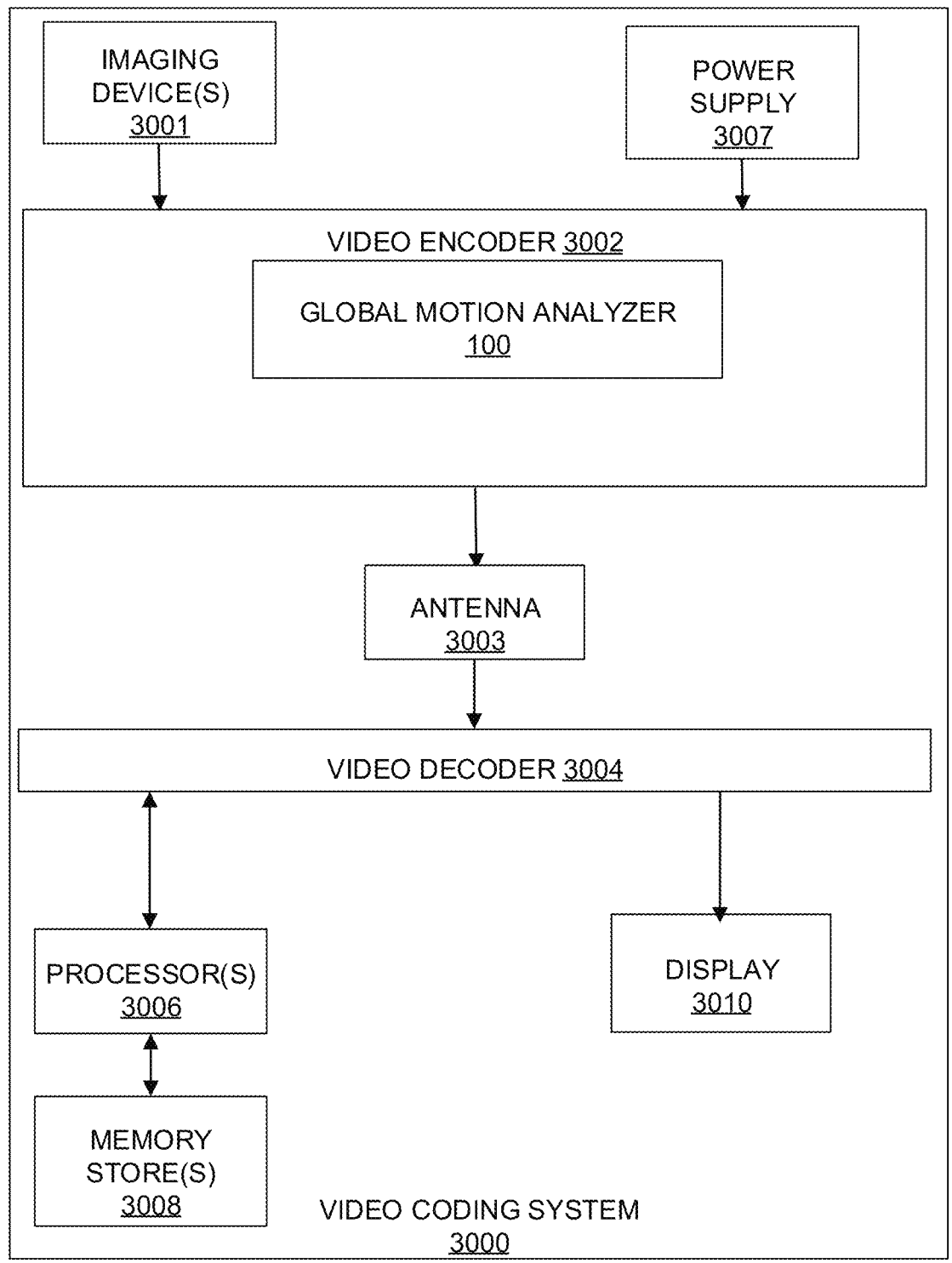
FIG. 30 is an illustrative block diagram of an example video coding system according to an embodiment.

FIG. 30 is an illustrative diagram of example video coding system 3000, arranged in accordance with at least some implementations of the present disclosure. In the illustrated implementation, video coding system 3000, although illustrated with both video encoder 3002 and video decoder 3004, video coding system 3000 may include only video encoder 3002 or only video decoder 3004 in various examples. Video coding system 3000 may include imaging device(s) 3001, an antenna 3003, one or more processor(s) 3006, one or more memory store(s) 3008, a power supply 3007, and/or a display device 3010. As illustrated, imaging device(s) 3001, antenna 3003, video encoder 3002, video decoder 3004, processor(s) 3006, memory store(s) 3008, and/or display device 3010 may be capable of communication with one another.

In some examples, video coding system 3000 may include a global motion analyzer system 100 (e.g., global motion analyzer system 100 of FIG. 1, FIG. 3, and/or FIG. 4) associated with video encoder 3002 and/or video decoder 3004. Further, antenna 3003 may be configured to transmit or receive an encoded bitstream of video data, for example. Processor(s) 3006 may be any type of processor and/or processing unit. For example, processor(s) 3006 may include distinct central processing units, distinct graphic processing units, integrated system-on-a-chip (SoC) architectures, the like, and/or combinations thereof. In addition, memory store(s) 3008 may be any type of memory. For example, memory store(s) 3008 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 3008 may be implemented by cache memory. Further, in some implementations, video coding system 3000 may include display device 3010. Display device 3010 may be configured to present video data.

Figure 31:
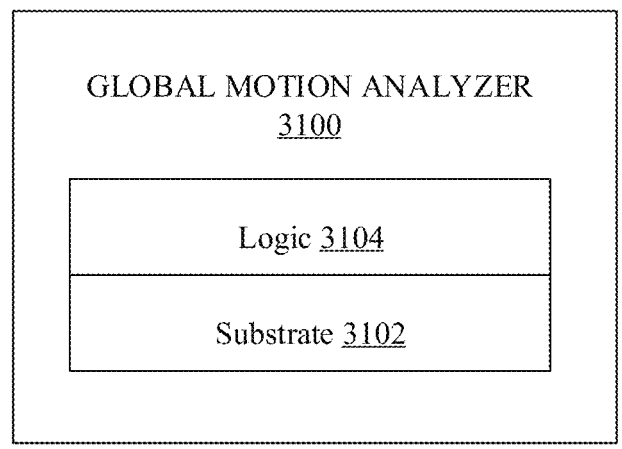
FIG. 31 is an illustrative block diagram of an example of a logic architecture according to an embodiment.

FIG. 31 shows a global motion estimator and compensator apparatus 3100 (e.g., semiconductor package, chip, die). The apparatus 3100 may implement one or more aspects of process 2900 (FIG. 29). The apparatus 3100 may be readily substituted for some or all of the global motion analyzer system 100 (e.g., global motion analyzer system 100 of FIG. 1, FIG. 3, and/or FIG. 4), already discussed.

The illustrated apparatus 3100 includes one or more substrates 3102 (e.g., silicon, sapphire, gallium arsenide) and logic 3104 (e.g., transistor array and other integrated circuit/IC components) coupled to the substrate(s) 3102. The logic 3104 may be implemented at least partly in configurable logic or fixed-functionality logic hardware. In one example, the logic 3104 includes transistor channel regions that are positioned (e.g., embedded) within the substrate(s) 3102. Thus, the interface between the logic 3104 and the substrate(s) 3102 may not be an abrupt junction. The logic 3104 may also be considered to include an epitaxial layer that is grown on an initial wafer of the substrate(s) 3102.

Moreover, the logic 3104 may configure one or more first logical cores associated with a first virtual machine of a cloud server platform, where the configuration of the one or more first logical cores is based at least in part on one or more first feature settings. The logic 3104 may also configure one or more active logical cores associated with an active virtual machine of the cloud server platform, where the configuration of the one or more active logical cores is based at least in part on one or more active feature settings, and where the active feature settings are different than the first feature settings.

Figure 32:
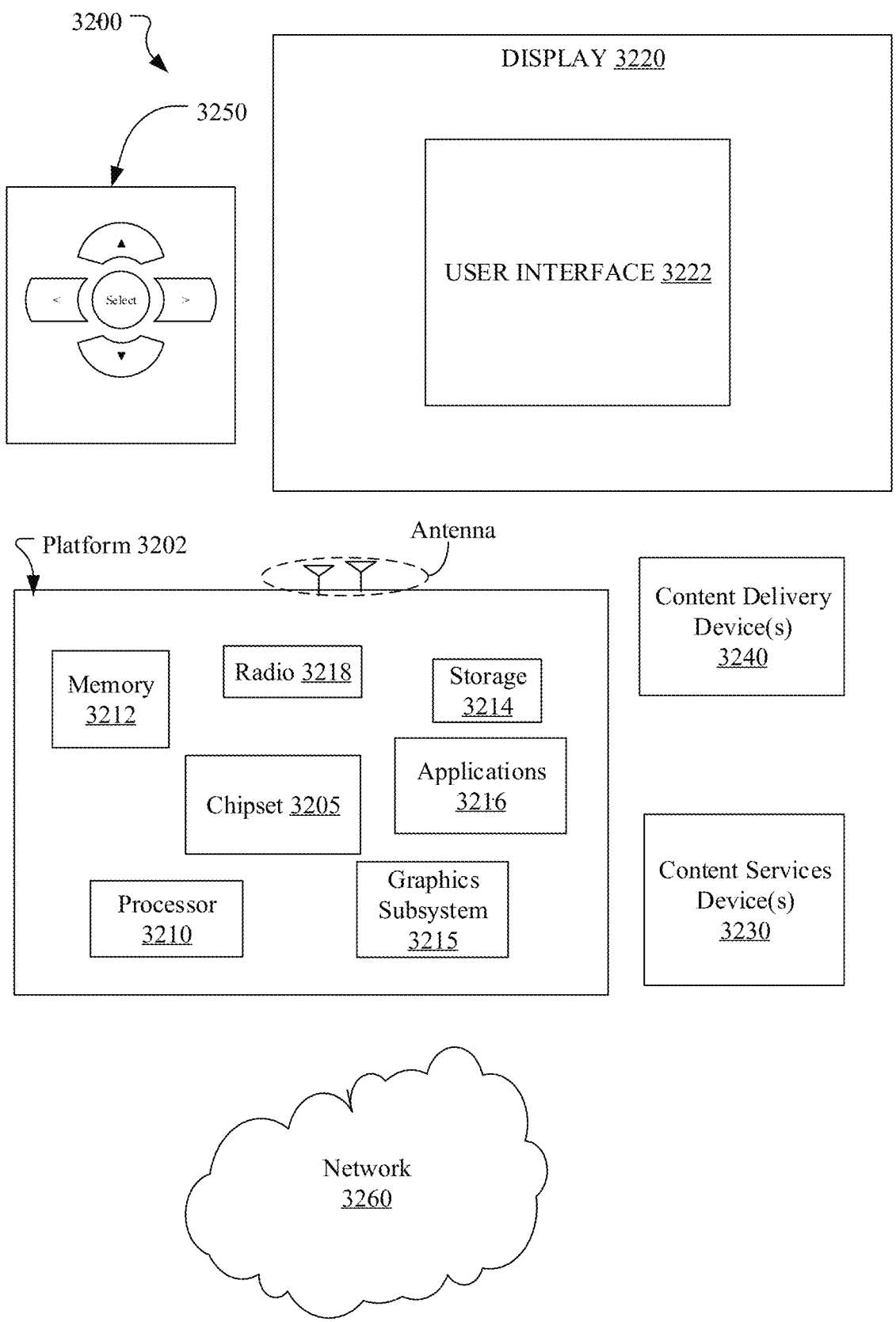
FIG. 32 is an illustrative block diagram of an example system according to an embodiment.

FIG. 32 illustrates an embodiment of a system 3200. In embodiments, system 3200 may include a media system although system 3200 is not limited to this context. For example, system 3200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 3200 comprises a platform 3202 coupled to a display 3220 that presents visual content. The platform 3202 may receive video bitstream content from a content device such as content services device(s) 3230 or content delivery device(s) 3240 or other similar content sources. A navigation controller 3250 comprising one or more navigation features may be used to interact with, for example, platform 3202 and/or display 3220. Each of these components is described in more detail below.

In embodiments, the platform 3202 may comprise any combination of a chipset 3205, processor 3210, memory 3212, storage 3214, graphics subsystem 3215, applications 3216 and/or radio 3218 (e.g., network controller). The chipset 3205 may provide intercommunication among the processor 3210, memory 3212, storage 3214, graphics subsystem 3215, applications 3216 and/or radio 3218. For example, the chipset 3205 may include a storage adapter (not depicted) capable of providing intercommunication with the storage 3214.

The processor 3210 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 3210 may comprise dual-core processor(s), dual-core mobile processor(s), and so forth.

The memory 3212 may be implemented as a volatile memory device such as, but not limited to, a Random Access Memory (RAM), Dynamic Random Access Memory (DRAM), or Static RAM (SRAM).

The storage 3214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 3214 may comprise technology to increase the storage performance enhanced protection for valuable digital media when multiple hard drives are included, for example.

The graphics subsystem 3215 may perform processing of images such as still or video for display. The graphics subsystem 3215 may be a graphics processing unit (GPU) or a visual processing unit (VPU), for example. An analog or digital interface may be used to communicatively couple the graphics subsystem 3215 and display 3220. For example, the interface may be any of a High-Definition Multimedia Interface (HDMI), DisplayPort, wireless HDMI, and/or wireless HD compliant techniques. The graphics subsystem 3215 could be integrated into processor 3210 or chipset 3205. The graphics subsystem 3215 could be a stand-alone card communicatively coupled to the chipset 3205. In one example, the graphics subsystem 3215 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 3218 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 3218 may operate in accordance with one or more applicable standards in any version.

In embodiments, the display 3220 may comprise any television type monitor or display. The display 3220 may comprise, for example, a computer display screen, touch screen display, video monitor, television-like device, and/or a television. The display 3220 may be digital and/or analog. In embodiments, the display 3220 may be a holographic display. Also, the display 3220 may be a transparent surface that may receive a visual projection. Such projections may convey various forms of information, images, and/or objects. For example, such projections may be a visual overlay for a mobile augmented reality (MAR) application. Under the control of one or more software applications 3216, the platform 3202 may display user interface 3222 on the display 3220.

In embodiments, content services device(s) 3230 may be hosted by any national, international and/or independent service and thus accessible to the platform 3202 via the Internet, for example. The content services device(s) 3230 may be coupled to the platform 3202 and/or to the display 3220. The platform 3202 and/or content services device(s) 3230 may be coupled to a network 3260 to communicate (e.g., send and/or receive) media information to and from network 3260. The content delivery device(s) 3240 also may be coupled to the platform 3202 and/or to the display 3220.

In embodiments, the content services device(s) 3230 may comprise a cable television box, personal computer, network, telephone, Internet enabled devices or appliance capable of delivering digital information and/or content, and any other similar device capable of unidirectionally or bidirectionally communicating content between content providers and platform 3202 and/display 3220, via network 3260 or directly. It will be appreciated that the content may be communicated unidirectionally and/or bidirectionally to and from any one of the components in system 3200 and a content provider via network 3260. Examples of content may include any media information including, for example, video, music, medical and gaming information, and so forth.

The content services device(s) 3230 receives content such as cable television programming including media information, digital information, and/or other content. Examples of content providers may include any cable or satellite television or radio or Internet content providers. The provided examples are not meant to limit embodiments.

In embodiments, the platform 3202 may receive control signals from a navigation controller 3250 having one or more navigation features. The navigation features of the controller 3250 may be used to interact with the user interface 3222, for example. In embodiments, the navigation controller 3250 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 3250 may be echoed on a display (e.g., display 3220) by movements of a pointer, cursor, focus ring, or other visual indicators displayed on the display. For example, under the control of software applications 3216, the navigation features located on the navigation controller 3250 may be mapped to virtual navigation features displayed on the user interface 3222, for example. In embodiments, the controller 3250 may not be a separate component but integrated into the platform 3202 and/or the display 3220. Embodiments, however, are not limited to the elements or in the context shown or described herein.

In embodiments, drivers (not shown) may comprise technology to enable users to instantly turn on and off the platform 3202 like a television with the touch of a button after initial boot-up, when enabled, for example. Program logic may allow the platform 3202 to stream content to media adaptors or other content services device(s) 3230 or content delivery device(s) 3240 when the platform is turned "off." In addition, chipset 3205 may comprise hardware and/or software support for (5.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 3200 may be integrated. For example, the platform 3202 and the content services device(s) 3230 may be integrated, or the platform 3202 and the content delivery device(s) 3240 may be integrated, or the platform 3202, the content services device(s) 3230, and the content delivery device(s) 3240 may be integrated, for example. In various embodiments, the platform 3202 and the display 3220 may be an integrated unit. The display 3220 and content service device(s) 3230 may be integrated, or the display 3220 and the content delivery device(s) 3240 may be integrated, for example. These examples are not meant to limit the embodiments.

In various embodiments, system 3200 may be implemented as a wireless system, a wired system, or a combination of both. When implemented as a wireless system, system 3200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 3202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 33.

Figure 33:
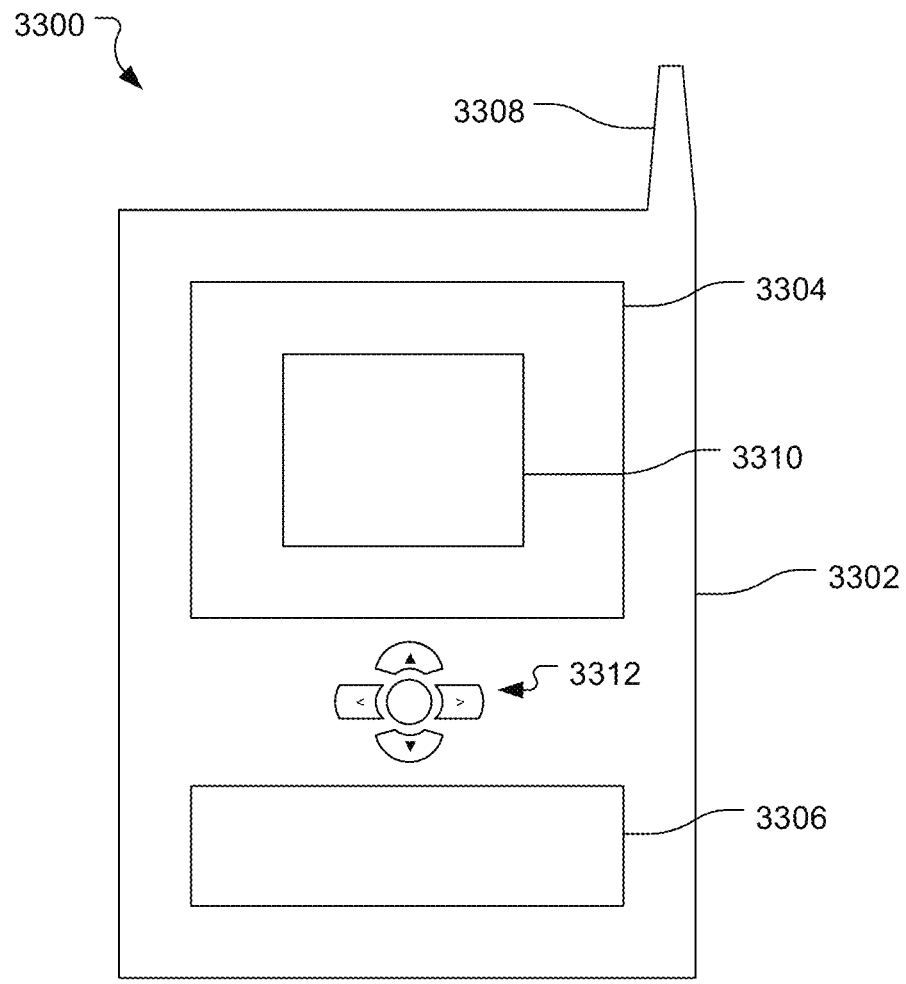
FIG. 33 is an illustrative diagram of an example of a system having a small form factor according to an embodiment.

As described above, the system 3200 may be embodied in varying physical styles or form factors. FIG. 33 illustrates embodiments of a small form factor device 3300 in which the system 3200 may be embodied. In embodiments, for example, the device 3300 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 33, the device 3300 may comprise a housing 3302, a display 3304, an input/output (I/O) device 3306, and an antenna 3308. The device 3300 also may comprise navigation features 3312. The display 3304 may comprise any suitable display unit for displaying information appropriate for a mobile computing device. The I/O device 3306 may comprise any suitable I/O device for entering information into a mobile computing device. Examples for the I/O device 3306 may include an alphanumeric keyboard, a numeric keypad, a touch pad, input keys, buttons, switches, rocker switches, microphones, speakers, voice recognition device and software, and so forth. Information also may be entered into the device 3300 by way of microphone. Such information may be digitized by a voice recognition device. The embodiments are not limited in this context.

Additional Notes and Examples

Example 1 may include a system to perform efficient motion based video processing using global motion, including: a global motion analyzer, the global motion analyzer including one or more substrates and logic coupled to the one or more substrates, where the logic is to: obtain a plurality of block motion vectors for a plurality of blocks of a current frame with respect to a reference frame; modify the plurality of block motion vectors, where the modification of the plurality of block motion vectors includes one or more of the following operations: smoothing of at least a portion of the plurality of block motion vectors, merging of at least a portion of the plurality of block motion vectors, and discarding of at least a portion of the plurality of block motion vectors; restrict the modified plurality of block motion vectors by excluding a portion of the frame in some instances; compute a plurality of candidate global motion models based on the restricted-modified plurality of block motion vectors for the current frame with respect to the reference frame, where each candidate global motion model includes a set of candidate global motion model parameters representing global motion of the current frame; determine a best global motion model from the plurality of candidate global motion models on a frame-by-frame basis, where each best global motion model includes a set of best global motion model parameters representing global motion of the current frame; modify a precision of the best global motion model parameters in response to one or more application parameters; map the modified-precision best global motion model parameters to a pixel-based coordinate system to determine a plurality of mapped global motion warping vectors for a plurality of reference frame control-grid points; predict and encode the plurality of mapped global motion warping vectors for the current frame with respect to a plurality of previous mapped global motion warping vectors; determine a best sub-pel filter to use for interpolation at an $\frac{1}{8}^{th}$ pel location or a $\frac{1}{16}^{th}$ pel location from among two or more sub-pel filter choices per frame; apply the plurality of mapped global motion warping vectors at sub-pel locations to the reference frame and perform interpolation of pixels based on the determined best sub-pel filter to generate a global motion compensated warped reference frame; and a power supply to provide power to the global motion analyzer.

Example 2 may include the system of Example 1, where the modification of the plurality of block motion vectors further includes operations to: calculate a set of initial global motion model parameters for an initial global motion model for the current frame; apply the initial global motion model to a center of each of the plurality of blocks of the current frame to determine an initial global motion vector of each block; calculate a global/local difference between the initial global motion vector of each block and a local motion vector of each block; calculate an adaptive threshold to apply to the global/local motion difference, where the adaptive threshold adaptively changes based on the content of the particular current frame; and segment the current frame into a global motion region and a local motion region based on a size of the global/local difference as applied to the adaptive threshold.

Example 3 may include the system of Example 2, where the calculation of initial global motion model parameters further includes operations to: use random sampling through a plurality of iterations to selects a set of three linearly independent motion vectors at a time per iteration, where each set of three linearly independent motion vectors is linearly independent motion vectors is used to calculate a sampled six parameter global motion model; and generate a histogram for each of the sampled six parameter global motion model to find a best model parameter from a peak value of each parameter, where a set of best model parameters describes an initial global motion equation.

Example 4 may include the system of Example 2, where the global motion region and the local motion region segmentation is performed in at least some instances using several thresholds to create multiple alternate segmentations.

Example 5 may include the system of Example 21, where the global motion region and the local motion region segmentation is performed in at least some instances by morphologically operation of erosion and dilation to form one or more revised segmentations; where the selection of a best global motion region and the local motion region segmentation is made between all such available segmentations, alternate segmentations, and revised segmentations to find the segmentation that generates a least residual between the current frame an the reference frame; where the best global motion region and the local motion region segmentation is further refined by determining and discarding low-detail portions of the current frame that is detected by a texture measure; where the best global motion region and the local motion region segmentation is further refined by determining and discarding all other blocks except blocks containing object corners as well as blocks containing high texture as detected by a texture measure; and where the restriction of the modified plurality of block motion vectors further includes operations to: determine and remove certain block motion vectors as they may belong to an inactive static region, where the one or more inactive static areas include one or more of the following inactive static area types: black bar-type inactive static areas, black boarder-type inactive static areas, letterbox-type inactive static areas, logo overlay-type inactive static areas, and text overlay-type inactive static areas.

Example 6 may include the system of Example 1, where the computation of the plurality of candidate global motion models further includes operations to: choose a global motion region and a local motion region segmentation for selection of a valid region for choosing candidate motion vectors for global motion model computation; choose a set of global motion models in a first mode selected from among four parameter models, six parameter models, and eight parameter models as well as in a second mode selected from among six parameter models, eight parameter models, and twelve parameter models, where the first mode is selected for low definition scene sequences and the second mode is selected for high definition scene sequences; choose a method for computing each individual global motion model of the set of global motion models selected from among least square and Levenberg Marquardt (LMA); and choose one or more convergence parameters for the chosen least square and Levenberg Marquardt method.

Example 7 may include the system of Example 6, further including operations to: select a method for computing each individual global motion model depending on the order of the model including for four and six parameter model using the least square method, and for eight and twelve parameter model using the Levenberg Marquardt method; perform computation of the each global motion model using the related chosen method; and select a best model based on lowest modified distortion.

Example 8 may include the system of Example 6, further including operations to: select a method for computing each individual global motion model depending on the order of the model including for four and six parameter model using the least square method, and for eight and twelve parameter model using the Levenberg Marquardt method; perform computation of the each global motion model using the related chosen method; and select a best model based on a best Rate Distortion Optimization tradeoff that takes into account both distortion as well as rate.

Example 9 may include the system of Example 1, where the modification of the precision of the best global motion model parameters further includes operations to: determine the significance of each model parameter of the best global motion model parameters to define an active range; determine the application parameters including one or more of the following application parameter types: coding bit-rate, resolution, and required quality; and assign a different accuracy to each model parameter of the best global motion model parameters based on the determined significance in some instances, based on the determined application parameter in other instances, and based on the determined significance and the determined application parameter in further instances.

Example 10 may include the system of Example 1, where the map of the modified-precision best global motion model parameters to the pixel-based coordinate system to determine the plurality of mapped global motion warping vectors for the plurality of reference frame control-grid points further includes operations to: map modified precision global motion model parameters to pixel-domain based mapped global motion warping vectors as applied to control-grid points, where the control-grid points include two vertices of a frame for four parameters, three vertices of a frame for six parameters, all four vertices of a frame for eight parameters, and four vertices of a frame plus two negative-mirror vertices of a frame for twelve parameters.

Example 11 may include the system of Example 1, where the prediction and encode of the plurality of mapped global motion warping vectors further includes operations to: predict the warping vectors of the current frame based on one or more previously stored warping vectors to generate first predicted warping vectors, where the previously stored warping vectors are scaled to adjust for frame distance; predict the warping vectors of the current frame based on multiple codebook warping vectors to generate second predicted warping vectors, where the codebook warping vectors are scaled to adjust for frame distance; compute a difference of the warping vectors of the current frame with the first and second predicted warping vectors to generate residual warping vectors; choose a best one of the residual warping vectors based on minimal residual warping vectors, of the first prediction and the second prediction resulting in the selected warping vectors prediction; entropy encode a codebook index associated with the predicted codebook warping vectors when the best residual warping vectors is chosen based on the multiple codebook warping vectors and entropy encode identifying information associated with the one or more previously stored warping vectors when the best residual warping vectors is chosen based on the one or more previously stored warping vectors; and entropy encode the best residual warping vectors.

Example 12 may include the system of Example 1, where predicting and encoding warping vectors further includes operations to: predict the warping vectors of the current frame based on a most recently stored warping vectors to generate first predicted warping vectors, where the most recently stored warping vectors are scaled to adjust for frame distance, and where the most recently stored warping vectors are mapped at initialization to one-half of a number of global motion parameters of the current frame; predict the warping vectors of the current frame based on multiple codebook warping vectors to generate second predicted warping vectors, where the codebook warping vectors are scaled to adjust for frame distance; compute a difference of the warping vectors of the current frame with the first and second predicted warping vectors to generate residual warping vectors; choose a best one of the residual warping vectors based on minimal residual warping vectors, of the first prediction and the second prediction resulting in the selected warping vectors prediction; entropy encode a codebook index associated with the predicted codebook warping vectors when the best residual warping vectors is chosen based on the multiple codebook warping vectors and entropy encode identifying information associated with the most recently stored warping vectors when the best residual warping vectors is chosen based on the most recently stored warping vectors; and entropy encode the best residual warping vectors.

Example 13 may include the system of Example 1, where the determination of the best sub-pel filter to use for interpolation at the $\frac{1}{8}^{th}$ pel location from among the two or more sub-pel filter choices per frame further includes operations to: determine the application parameters including one or more of the following application parameter types: coding bit-rate, resolution, and required quality; determine a filter overhead bit-cost that can be afforded based on the application parameters to determine whether the best sub-pel filter can be sent on one of the following basis: a per frame basis, a per slice basis, and a per large block basis; determine for each of the two or more sub-pel filter choices: an extended-AVC $¼^{th}$ pel filter to $⅛^{th}$ pel accuracy, and an extended HEVC $¼^{th}$ pel filter to $⅛^{th}$ pel accuracy, and where the determination of the best sub-pel filter is determined by computing a residual of at least a portion of the current frame with respect to a corresponding portion of the global motion compensated warped reference frame, and by selection of the best of the two or more sub-pel filter choices per frame that produces the smallest residual, where the portion of the current frame chosen to correspond to based on the basis of the best sub-pel filter from among the per frame basis, the per slice basis, and the per large block basis.

Example 14 may include the system of Example 1, where the determination of the best sub-pel filter further includes operations to: determine the application parameters including one or more of the following application parameter types: coding bit-rate, resolution, and required quality; determine a filter overhead bit-cost that can be afforded based on the application parameters to determine whether the best sub-pel filter can be sent on one of the following basis: a per frame basis, a per slice basis, and a per large block basis; determine for each of four filter choices of the two or more sub-pel filter choices: an extended-AVC $¼^{th}$ pel filter to $⅛^{th}$ pel accuracy, an extended HEVC $¼^{th}$ pel filter to $⅛^{th}$ pel accuracy, a bi-linear $\frac{1}{16}^{th}$ pel filter, and a bi-cubic $\frac{1}{16}^{th}$ pel filter, and where the determination of the best filter is determined by computing a residual of at least a portion of the current frame with respect to a corresponding portion of the global motion compensated warped reference frame, and by selection of the best of the four filters per frame that produces the smallest residual, where the portion of the current frame chosen to correspond to based on the basis of the best sub-pel filter from among the per frame basis, the per slice basis, and the per large block basis.

Example 15 may include a method to perform efficient motion based video processing using global motion, including: obtaining a plurality of block motion vectors for a plurality of blocks of a current frame with respect to a reference frame; modifying the plurality of block motion vectors, where the modification of the plurality of block motion vectors includes one or more of the following operations: smoothing of at least a portion of the plurality of block motion vectors, merging of at least a portion of the plurality of block motion vectors, and discarding of at least a portion of the plurality of block motion vectors; restricting the modified plurality of block motion vectors by excluding a portion of the frame in some instances; computing a plurality of candidate global motion models based on the restricted-modified plurality of block motion vectors for the current frame with respect to the reference frame, where each candidate global motion model includes a set of candidate global motion model parameters representing global motion of the current frame; determining a best global motion model from the plurality of candidate global motion models on a frame-by-frame basis, where each best global motion model includes a set of best global motion model parameters representing global motion of the current frame; modifying a precision of the best global motion model parameters in response to one or more application parameters; mapping the modified-precision best global motion model parameters to a pixel-based coordinate system to determine a plurality of mapped global motion warping vectors for a plurality of reference frame control-grid points; predicting and encoding the plurality of mapped global motion warping vectors for the current frame with respect to a plurality of previous mapped global motion warping vectors; determining a best sub-pel filter to use for interpolation at an $⅛^{th}$ pel location or a $\frac{1}{16}^{th}$ pel location from among two or more sub-pel filter choices per frame; and applying the plurality of mapped global motion warping vectors at sub-pel locations to the reference frame and perform interpolation of pixels based on the determined best sub-pel filter to generate a global motion compensated warped reference frame.

Example 16 may include the method of Example 15, where the modification of the plurality of block motion vectors further includes operations to: calculating a set of initial global motion model parameters for an initial global motion model for the current frame; applying the initial global motion model to a center of each of the plurality of blocks of the current frame to determine an initial global motion vector of each block; calculating a global/local difference between the initial global motion vector of each block and a local motion vector of each block; calculating an adaptive threshold to apply to the global/local motion difference, where the adaptive threshold adaptively changes based on the content of the particular current frame; and segmenting the current frame into a global motion region and a local motion region based on a size of the global/local difference as applied to the adaptive threshold.

Example 17 may include the method of Example 16, where the global motion region and the local motion region segmentation is performed in at least some instances by morphologically operation of erosion and dilation to form one or more revised segmentations, and where the selection of a best global motion region and the local motion region segmentation is made between all such available segmentations, alternate segmentations, and revised segmentations to find the segmentation that generates a least residual between the current frame an the reference frame; where the best global motion region and the local motion region segmentation is further refined by determining and discarding low-detail portions of the current frame that is detected by a texture measure; where the best global motion region and the local motion region segmentation is further refined by determining and discarding all other blocks except blocks containing object corners as well as blocks containing high texture as detected by a texture measure; where the restriction of the modified plurality of block motion vectors further includes: determining and removing certain block motion vectors as they may belong to an inactive static region, where the one or more inactive static areas include one or more of the following inactive static area types: black bar-type inactive static areas, black boarder-type inactive static areas, letterbox-type inactive static areas, logo overlay-type inactive static areas, and text overlay-type inactive static areas.

Example 18 may include the method of Example 15, where the computation of the plurality of candidate global motion models further includes: choosing a global motion region and a local motion region segmentation for selection of a valid region for choosing candidate motion vectors for global motion model computation; choosing a set of global motion models in a first mode selected from among four parameter models, six parameter models, and eight parameter models as well as in a second mode selected from among six parameter models, eight parameter models, and twelve parameter models, where the first mode is selected for low definition scene sequences and the second mode is selected for high definition scene sequences; choosing a method for computing each individual global motion model of the set of global motion models selected from among least square and Levenberg Marquardt (LMA), including for four and six parameter model using the least square method, and for eight and twelve parameter model using the Levenberg Marquardt method; performing computation of the each global motion model using the related chosen method; and selecting a best model based on a select one of a lowest modified distortion and a best Rate Distortion Optimization tradeoff that takes into account both distortion as well as rate.

Example 19 may include the method of Example 15, where the modification of the precision of the best global motion model parameters further includes: determining the significance of each model parameter of the best global motion model parameters to define an active range; and determining the application parameters including one or more of the following application parameter types: coding bit-rate, resolution, and required quality; and assigning a different accuracy to each model parameter of the best global motion model parameters based on the determined significance in some instances, based on the determined application parameter in other instances, and based on the determined significance and the determined application parameter in further instances.

Example 20 may include the method of Example 15, where the prediction and encode of the plurality of mapped global motion warping vectors further includes: predicting the warping vectors of the current frame based on one or more previously stored warping vectors to generate first predicted warping vectors, where the previously stored warping vectors are scaled to adjust for frame distance; predicting the warping vectors of the current frame based on multiple codebook warping vectors to generate second predicted warping vectors, where the codebook warping vectors are scaled to adjust for frame distance; computing a difference of the warping vectors of the current frame with the first and second predicted warping vectors to generate residual warping vectors; choosing a best one of the residual warping vectors based on minimal residual warping vectors, of the first prediction and the second prediction resulting in the selected warping vectors prediction; entropy encoding a codebook index associated with the predicted codebook warping vectors when the best residual warping vectors is chosen based on the multiple codebook warping vectors and entropy encode identifying information associated with the one or more previously stored warping vectors when the best residual warping vectors is chosen based on the one or more previously stored warping vectors; and entropy encoding the best residual warping vectors.

Example 21 may include the method of Example 15, where the determination of the best sub-pel filter further includes: determining the application parameters including one or more of the following application parameter types: coding bit-rate, resolution, and required quality; determining a filter overhead bit-cost that can be afforded based on the application parameters to determine whether the best sub-pel filter can be sent on one of the following basis: a per frame basis, a per slice basis, and a per large block basis; determining for each of four filter choices of the two or more sub-pel filter choices: an extended-AVC $\frac{1}{4}^{th}$ pel filter to $\frac{1}{8}^{th}$ pel accuracy, an extended HEVC $\frac{1}{4}^{th}$ pel filter to $\frac{1}{8}^{th}$ pel accuracy, a bi-linear $\frac{1}{16}^{th}$ pel filter, and a bi-cubic $\frac{1}{16}^{th}$ pel filter, and where the determination of the best filter is determined by computing a residual of at least a portion of the current frame with respect to a corresponding portion of the global motion compensated warped reference frame, and by selection of the best of the four filters per frame that produces the smallest residual, where the portion of the current frame chosen to correspond to based on the basis of the best sub-pel filter from among the per frame basis, the per slice basis, and the per large block basis.

Example 22 may include at least one computer readable storage medium including a set of instructions, which when executed by a computing system, cause the computing system to: obtain a plurality of block motion vectors for a plurality of blocks of a current frame with respect to a reference frame; modify the plurality of block motion vectors, where the modification of the plurality of block motion vectors includes one or more of the following operations: smoothing of at least a portion of the plurality of block motion vectors, merging of at least a portion of the plurality of block motion vectors, and discarding of at least a portion of the plurality of block motion vectors; restrict the modified plurality of block motion vectors by excluding a portion of the frame in some instances; compute a plurality of candidate global motion models based on the restricted-modified plurality of block motion vectors for the current frame with respect to the reference frame, where each candidate global motion model includes a set of candidate global motion model parameters representing global motion of the current frame; determine a best global motion model from the plurality of candidate global motion models on a frame-by-frame basis, where each best global motion model includes a set of best global motion model parameters representing global motion of the current frame; modify a precision of the best global motion model parameters in response to one or more application parameters; map the modified-precision best global motion model parameters to a pixel-based coordinate system to determine a plurality of mapped global motion warping vectors for a plurality of reference frame control-grid points; predict and encode the plurality of mapped global motion warping vectors for the current frame with respect to a plurality of previous mapped global motion warping vectors; determine a best sub-pel filter to use for interpolation at an $\frac{1}{8}^{th}$ pel location or a $\frac{1}{16}^{th}$ pel location from among two or more sub-pel filter choices per frame; and apply the plurality of mapped global motion warping vectors at sub-pel locations to the reference frame and perform interpolation of pixels based on the determined best sub-pel filter to generate a global motion compensated warped reference frame.

Example 23 may include the at least one computer readable storage medium of Example 22, where the instructions, when executed, cause the computing system to: choose a global motion region and a local motion region segmentation for selection of a valid region for choosing candidate motion vectors for global motion model computation; choose a set of global motion models in a first mode selected from among four parameter models, six parameter models, and eight parameter models as well as in a second mode selected from among six parameter models, eight parameter models, and twelve parameter models, where the first mode is selected for low definition scene sequences and the second mode is selected for high definition scene sequences; choose a method for computing each individual global motion model of the set of global motion models selected from among least square and Levenberg Marquardt (LMA), including for four and six parameter model using the least square method, and for eight and twelve parameter model using the Levenberg Marquardt method; perform computation of the each global motion model using the related chosen method; and select a best model based on a select one of a lowest modified distortion and a best Rate Distortion Optimization tradeoff that takes into account both distortion as well as rate.

Example 24 may include the system of Example 1, where the logic coupled to the one or more substrates includes transistor channel regions that are positioned within the one or more substrates.

Example 25 may include means for performing a method as described in any preceding Example.

Example 26 may include machine-readable storage including machine-readable instructions which, when executed, implement a method or realize an apparatus as described in any preceding Example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. A system to perform efficient motion based video processing using global motion, comprising:
   a global motion analyzer, the global motion analyzer including one or more substrates and logic coupled to the one or more substrates, wherein the logic is to:
      obtain a plurality of block motion vectors for a plurality of blocks of a current frame with respect to a reference frame;
      modify the plurality of block motion vectors, wherein the modification of the plurality of block motion vectors includes one or more of the following operations: smoothing of one or more of the plurality of block motion vectors, merging of one or more of the plurality of block motion vectors, and discarding of one or more of the plurality of block motion vectors;
      restrict the modified plurality of block motion vectors by excluding a portion of the frame;
      compute a plurality of candidate global motion models based on the restricted-modified plurality of block motion vectors for the current frame with respect to the reference frame, wherein each candidate global motion model comprises a set of candidate global motion model parameters representing global motion of the current frame, wherein the computation of the plurality of candidate global motion models further comprises operations to:
         choose a global motion region and a local motion region segmentation for selection of a valid region for choosing candidate motion vectors for global motion model computation, wherein the global motion region includes an area of blocks whose motion corresponds to globally moving objects, wherein the local motion region includes an area of blocks whose motion corresponds to locally moving objects, and
         choose a set of global motion models in a first mode selected from among four parameter models, six parameter models, and eight parameter models as well as in a second mode selected from among six parameter models, eight parameter models, and twelve parameter models, wherein the first mode is selected for first definition scene sequences and the second mode is selected for second definition scene sequences wherein the first definition scene sequences and the second definition scene sequences have different levels of resolution;
      determine a final global motion model from the computed plurality of candidate global motion models on a frame-by-frame basis, wherein each final global motion model comprises a set of final global motion model parameters representing global motion of the current frame;
      modify a precision of the final global motion model parameters in response to one or more application parameters, wherein the application parameters, include one or more of the following application parameter types: coding bit-rate, resolution, and required visual quality, wherein the modification of the precision of the final global motion model parameters includes assigning a different accuracy to one or more model parameter of the final global motion model parameters;
      map the modified-precision final global motion model parameters to a pixel-based coordinate system to determine a plurality of mapped global motion warping vectors for a plurality of reference frame control-grid points;
      predict and encode the plurality of mapped global motion warping vectors for the current frame with respect to a plurality of previous mapped global motion warping vectors;
      determine a final sub-pel filter to use for interpolation at an $\frac{1}{8}^{th}$ pel location or a $\frac{1}{16}^{th}$ pel location from among two or more sub-pel filter choices per frame;
      apply the plurality of mapped global motion warping vectors at sub-pel locations to the reference frame and perform interpolation of pixels based on the determined final sub-pel filter to generate a global motion compensated warped reference frame; and
   a power supply to provide power to the global motion analyzer.

2. The system of claim 1, wherein the computation of the plurality of candidate global motion models further comprises operations to:
   choose a method for computing each individual global motion model of the set of global motion models selected from among least square and Levenberg Marquardt (LMA); and
   choose one or more convergence parameters for the chosen least square and Levenberg Marquardt method.

3. The system of claim 2, further comprising operations to:
   select a method for computing each individual global motion model depending on the order of each individual global motion model of the set of global motion models including for four and six parameter model using the least square method, and for eight and twelve parameter model using the Levenberg Marquardt method;
   perform computation of the each global motion model using the related chosen method; and
   select a final model based on lowest distortion.

4. The system of claim 2, further comprising operations to:
   select a method for computing each individual global motion model depending on the order of each individual global motion model of the set of global motion models including for four and six parameter model using the least square method, and for eight and twelve parameter model using the Levenberg Marquardt method;
   perform computation of the each global motion model using the related chosen method; and
   select a final model from the set of global motion models based on a Rate Distortion Optimization tradeoff that takes into account distortion.

5. A method to perform efficient motion based video processing using global motion, comprising:
   obtaining a plurality of block motion vectors for a plurality of blocks of a current frame with respect to a reference frame;
   modifying the plurality of block motion vectors, wherein the modification of the plurality of block motion vectors includes one or more of the following operations: smoothing of one or more of the plurality of block motion vectors, merging of one or more of the plurality of block motion vectors, and discarding of one or more of the plurality of block motion vectors;
   restricting the modified plurality of block motion vectors by excluding a portion of the frame;
   computing a plurality of candidate global motion models based on the restricted-modified plurality of block motion vectors for the current frame with respect to the reference frame, wherein each candidate global motion model comprises a set of candidate global motion model parameters representing global motion of the current frame, wherein the computation of the plurality of candidate global motion models further comprises:
      choosing a global motion region and a local motion region segmentation for selection of a valid region for choosing candidate motion vectors for global motion model computation, wherein the global motion region includes an area of blocks whose motion corresponds to globally moving objects, wherein the local motion region includes an area of blocks whose motion corresponds to locally moving objects, and
      choosing a set of global motion models in a first mode selected from among four parameter models, six parameter models, and eight parameter models as well as in a second mode selected from among six parameter models, eight parameter models, and twelve parameter models, wherein the first mode is selected for first definition scene sequences and the second mode is selected for second definition scene sequences wherein the first definition scene sequences and the second definition scene sequences have different levels of resolution;
   determining a final global motion model from the computed plurality of candidate global motion models on a frame-by-frame basis, wherein each final global motion model comprises a set of final global motion model parameters representing global motion of the current frame;
   modifying a precision of the final global motion model parameters in response to one or more application parameters, wherein the application parameters, include one or more of the following application parameter types: coding bit-rate, resolution, and required visual quality, wherein the modification of the precision of the final global motion model parameters includes assigning a different accuracy to one or more model parameter of the final global motion model parameters;
   mapping the modified-precision final global motion model parameters to a pixel-based coordinate system to determine a plurality of mapped global motion warping vectors for a plurality of reference frame control-grid points;
   predicting and encoding the plurality of mapped global motion warping vectors for the current frame with respect to a plurality of previous mapped global motion warping vectors;
   determining a final sub-pel filter to use for interpolation at an $\frac{1}{8}^{th}$ pel location or a $\frac{1}{16}^{th}$ pel location from among two or more sub-pel filter choices per frame;
   applying the plurality of mapped global motion warping vectors at sub-pel locations to the reference frame and perform interpolation of pixels based on the determined final sub-pel filter to generate a global motion compensated warped reference frame.

6. The method of claim 5, wherein the computation of the plurality of candidate global motion models further comprises:
   choosing a method for computing each individual global motion model of the set of global motion models selected from among least square and Levenberg Marquardt (LMA), including for four and six parameter model using the least square method, and for eight and twelve parameter model using the Levenberg Marquardt method;
   performing computation of the each global motion model using the related chosen method; and
   selecting a final model from the set of global motion models based on a select one of a lowest distortion and a Rate Distortion Optimization tradeoff that takes into account distortion.

7. At least one non-transitory computer readable storage medium comprising a set of instructions, which when executed by a computing system, cause the computing system to:
   obtain a plurality of block motion vectors for a plurality of blocks of a current frame with respect to a reference frame;
   modify the plurality of block motion vectors, wherein the modification of the plurality of block motion vectors includes one or more of the following operations: smoothing of one or more of the plurality of block motion vectors, merging of one or more of the plurality of block motion vectors, and discarding of one or more of the plurality of block motion vectors;
   restrict the modified plurality of block motion vectors by excluding a portion of the frame;
   compute a plurality of candidate global motion models based on the restricted-modified plurality of block motion vectors for the current frame with respect to the reference frame, wherein each candidate global motion model comprises a set of candidate global motion model parameters representing global motion of the current frame, wherein the computation of the plurality of candidate global motion models further comprises operations to:
      choose a global motion region and a local motion region segmentation for selection of a valid region for choosing candidate motion vectors for global motion model computation, wherein the global motion region includes an area of blocks whose motion corresponds to globally moving objects, wherein the local motion region includes an area of blocks whose motion corresponds to locally moving objects, and
      choose a set of global motion models in a first mode selected from among four parameter models, six parameter models, and eight parameter models as well as in a second mode selected from among six parameter models, eight parameter models, and twelve parameter models, wherein the first mode is selected for first definition scene sequences and the second mode is selected for second definition scene sequences wherein the first definition scene sequences and the second definition scene sequences have different levels of resolution;

determine a final global motion model from the computed plurality of candidate global motion models on a frame-by-frame basis, wherein each final global motion model comprises a set of final global motion model parameters representing global motion of the current frame;

modify a precision of the final global motion model parameters in response to one or more application parameters, wherein the application parameters, include one or more of the following application parameter types: coding bit-rate, resolution, and required visual quality, wherein the modification of the precision of the final global motion model parameters includes assigning a different accuracy to one or more model parameter of the final global motion model parameters;

map the modified-precision final global motion model parameters to a pixel-based coordinate system to determine a plurality of mapped global motion warping vectors for a plurality of reference frame control-grid points;

predict and encode the plurality of mapped global motion warping vectors for the current frame with respect to a plurality of previous mapped global motion warping vectors;

determine a final sub-pel filter to use for interpolation at an $\frac{1}{8}$th pel location or a $\frac{1}{16}$th pel location from among two or more sub-pel filter choices per frame;

apply the plurality of mapped global motion warping vectors at sub-pel locations to the reference frame and perform interpolation of pixels based on the determined final sub-pel filter to generate a global motion compensated warped reference frame.

8. The at least one non-transitory computer readable storage medium of claim 7, wherein the instructions, when executed, cause the computing system to:

choose a method for computing each individual global motion model of the set of global motion models selected from among least square and Levenberg Marquardt (LMA), including for four and six parameter model using the least square method, and for eight and twelve parameter model using the Levenberg Marquardt method;

perform computation of the each global motion model using the related chosen method; and select a final model from the set of global motion models based on a select one of a lowest distortion and a Rate Distortion Optimization tradeoff that takes into account distortion.

* * * * *